US008429630B2

(12) United States Patent
Nickolov et al.

(10) Patent No.: US 8,429,630 B2
(45) Date of Patent: Apr. 23, 2013

(54) GLOBALLY DISTRIBUTED UTILITY COMPUTING CLOUD

(75) Inventors: Peter Nickolov, Laguna Niguel, CA (US); Bert Armijo, Mission Viejo, CA (US); Vladimir Miloushev, Dana Point, CA (US)

(73) Assignee: CA, Inc., Islandia, NY (US)

( * ) Notice: Subject to any disclaimer, the term of this patent is extended or adjusted under 35 U.S.C. 154(b) by 1080 days.

(21) Appl. No.: 12/400,710

(22) Filed: Mar. 9, 2009

(65) Prior Publication Data

US 2009/0276771 A1 Nov. 5, 2009

Related U.S. Application Data

(63) Continuation-in-part of application No. 11/522,050, filed on Sep. 15, 2006.

(60) Provisional application No. 61/068,659, filed on Mar. 7, 2008, provisional application No. 61/125,334, filed on Apr. 23, 2008, provisional application No. 60/717,381, filed on Sep. 15, 2005.

(51) Int. Cl.
*G06F 9/45* (2006.01)
*G06F 9/445* (2006.01)

(52) U.S. Cl.
USPC ........... 717/148; 717/110; 717/118; 717/169; 717/170

(58) Field of Classification Search ........................ None
See application file for complete search history.

(56) References Cited

U.S. PATENT DOCUMENTS

| | | | |
|---|---|---|---|
| 5,197,130 | A | 3/1993 | Chen et al. |
| 5,692,192 | A | 11/1997 | Sudo |
| 6,003,066 | A | 12/1999 | Ryan et al. |
| 6,021,492 | A | 2/2000 | May |
| 6,038,651 | A | 3/2000 | VanHuben et al. |
| 6,049,789 | A | 4/2000 | Frison et al. |
| 6,105,053 | A | 8/2000 | Kimmel et al. |
| 6,138,238 | A | 10/2000 | Scheifer et al. |
| 6,275,900 | B1 | 8/2001 | Liberty |
| 6,516,304 | B1 | 2/2003 | Yoshimura et al. |
| 6,549,930 | B1 | 4/2003 | Chrysos et al. |

(Continued)

OTHER PUBLICATIONS

IPER for PCT/US 2006/036130 dtd Mar. 17, 2009; 1 page, Mar. 17, 2009.

(Continued)

*Primary Examiner* — Chuck Kendall
(74) *Attorney, Agent, or Firm* — Baker Botts, L.L.P.

(57) ABSTRACT

In at least one embodiment, the computing network may include multiple different data centers and/or server grids which are deployed different geographic locations. In at least one embodiment, at least some of the 20 server grids may be operable to provide on-demand, grid and/or utility computing resources for hosting various types of distributed applications. In at least one embodiment, a distributed application may be characterized as an application made up of distinct components (e.g., virtual appliances, virtual machines, virtual interfaces, virtual volumes, virtual network connections, etc.) in separate runtime environments. In at least one embodiment, different 25 ones of the distinct components of the distributed application may be hosted or deployed on different platforms (e.g., different servers) connected via a network. In some embodiments, a distributed application may be characterized as an application that runs on two or more networked computers.

26 Claims, 85 Drawing Sheets

U.S. PATENT DOCUMENTS

| | | | | |
|---|---|---|---|---|
| 6,675,261 | B2 | 1/2004 | Shandony | |
| 6,880,157 | B1 | 4/2005 | Havemose | |
| 6,985,956 | B2 | 1/2006 | Luke et al. | |
| 6,990,667 | B2 | 1/2006 | Ulrich et al. | |
| 7,085,897 | B2 | 8/2006 | Blake et al. | |
| 7,127,713 | B2 * | 10/2006 | Davis et al. | 717/177 |
| 7,143,307 | B1 | 11/2006 | Witte et al. | |
| 2002/0049749 | A1 | 4/2002 | Helgeson et al. | |
| 2002/0166117 | A1 | 11/2002 | Abrams et al. | |
| 2003/0074286 | A1 | 4/2003 | Rodrigo | |
| 2003/0083995 | A1 | 5/2003 | Ramachandran et al. | |
| 2003/0084343 | A1 | 5/2003 | Ramachandran et al. | |
| 2003/0135380 | A1 | 7/2003 | Lehr et al. | |
| 2003/0135474 | A1 | 7/2003 | Circenis et al. | |
| 2004/0030822 | A1 | 2/2004 | Rajan et al. | |
| 2004/0098383 | A1 | 5/2004 | Tabellion et al. | |
| 2004/0194098 | A1 | 9/2004 | Chung et al. | |
| 2005/0027616 | A1 | 2/2005 | Jones et al. | |
| 2005/0091365 | A1 | 4/2005 | Lowell et al. | |
| 2005/0138422 | A1 | 6/2005 | Hancock et al. | |
| 2005/0228856 | A1 | 10/2005 | Seildens et al. | |
| 2006/0184741 | A1 | 8/2006 | Hrusecky et al. | |
| 2006/0248010 | A1 | 11/2006 | Krishnamoorthy et al. | |
| 2007/0043672 | A1 | 2/2007 | Martin et al. | |
| 2007/0078988 | A1 | 4/2007 | Miloushev | |
| 2007/0162420 | A1 | 7/2007 | Ou et al. | |
| 2007/0226064 | A1 | 9/2007 | Yu et al. | |
| 2007/0226155 | A1 | 9/2007 | Yu et al. | |

OTHER PUBLICATIONS

Written Opinion for PCT/US2006/036130 dtd Mar. 24, 2008; 4 pages, Mar. 24, 2008.
International Search Report for PCT/US2009/036579 dtd Oct. 28, 2009; 15 pages, Oct. 28, 2009.
Miloushev et al., Office Action, U.S. Appl. No. 11/522,050 dtd Sep. 18, 2009; 10 pages, Sep. 18, 2009.
Open Single System Image (Open SSI) Linux Cluster Project by Bruce Walter (http://openssi.org/ssi-intro.pdf).
The Physiology of the Grid: An Open Grid Services Architecture for Distribued Systems Integration by Ian Foster et al. (http://www.globus.org/research/papers/ogsa.pdf).
A Portable Platform to Support Parallel Programming Languages in Proceedings of the Unenix Symposium on Experiences with Distributed and Multiprocessor Systems (SEDMS IV) Sep. 1993.
Chant: Lightweight Threads in a Distributed Memory Environment Institute for Computer Applications in Science and Engineering, NASA Langley Research Center Jun. 8, 1995 by Matthew Haines et al.
Thread Migration and its Applications in Distributed Shared Memory Systems. Technicon CS/LPCR Technical Report #9603 Jul. 1996 by Ayal Itzkovitz et al.
Thread Migration in Distributed Memory Multicomputers. Technical Report TR-CS-98-01, The Australian National University, Feb. 1998 Scott Milton.
The Mosix Multicomputer Operating System for High Performance Cluster Computing by Ammon Barak et al., Journal of Future Generation Computer Systems Apr. 1998.
Distributed-Thread Scheduling Methods for Reducing Page-Thrashing in Proceeds of The Sixth IEEE International Symposium on High Performance Distributed Computing, 1997 by Sudo et al.
Thread Migration and Communication Minimization in DSM Systems by Kritchalach Thitikamol and Pete Keleher Proceedings of the IEEE Special Issue on Distributed Shared Memory Systems, vol. 87, No. 3, pp. 487-497, Mar. 1999.
A Distributed Java Virtual Machine With Transparent Thread Migration Support by Wenzhang Zhu et al., Proceedings of the IEEE 4th Intl. Conference on Cluster Computing, Sep. 2002.
"Microsoft Tests "Pay-As-You-Go" Software," Neowin.net, 2007, http://www.neowin.net/index.php?act=view&id=38317.
"Five Benefits of Software as a Service," Trumba Corporation, 2007, http:www.trumba.com/connect/knowledgecenter/software_as_a_service.aspx.
Pay As You Go (PAYG) MaxWebAuthor™, MaxView Corporation, 2005, http://www.maxview.com/index.php?payasyougo.
Shankland, S., "Sun Starts Pay-As-You-Go Supercomputing," CNET Networks, Inc., 2006, http://news.zdnet.co.uk/harware/0,1000000091,39167297,00.htm.
U.S. Office Action for U.S. Appl. No. 11/024,641, mailed Nov. 13, 2006.
U.S. Final Office Action for U.S. Appl. No. 11/024,641, mailed Jul. 17, 2007.
Notice of Allowance for U.S. Appl. No. 11/024,641, mailed Jan. 25, 2008.
International Search Report, dated Apr. 16, 2009 for PCT/US2006/03613.
Grimshaw, Andrew, et al. The Legion Vision of a Worldwide Virtual Computer. In Communications of the ACM archive, vol. 40, Issue 1 (Jan. 1997), pp. 39-45, 1997 [retrieved Apr. 30, 2009]. Retrieved from the Internet:<URL: http://www.cs.umd.edu/class/spring2004/cmsc818s/Readings/legion-cacm.pdf.

* cited by examiner

100

290

292

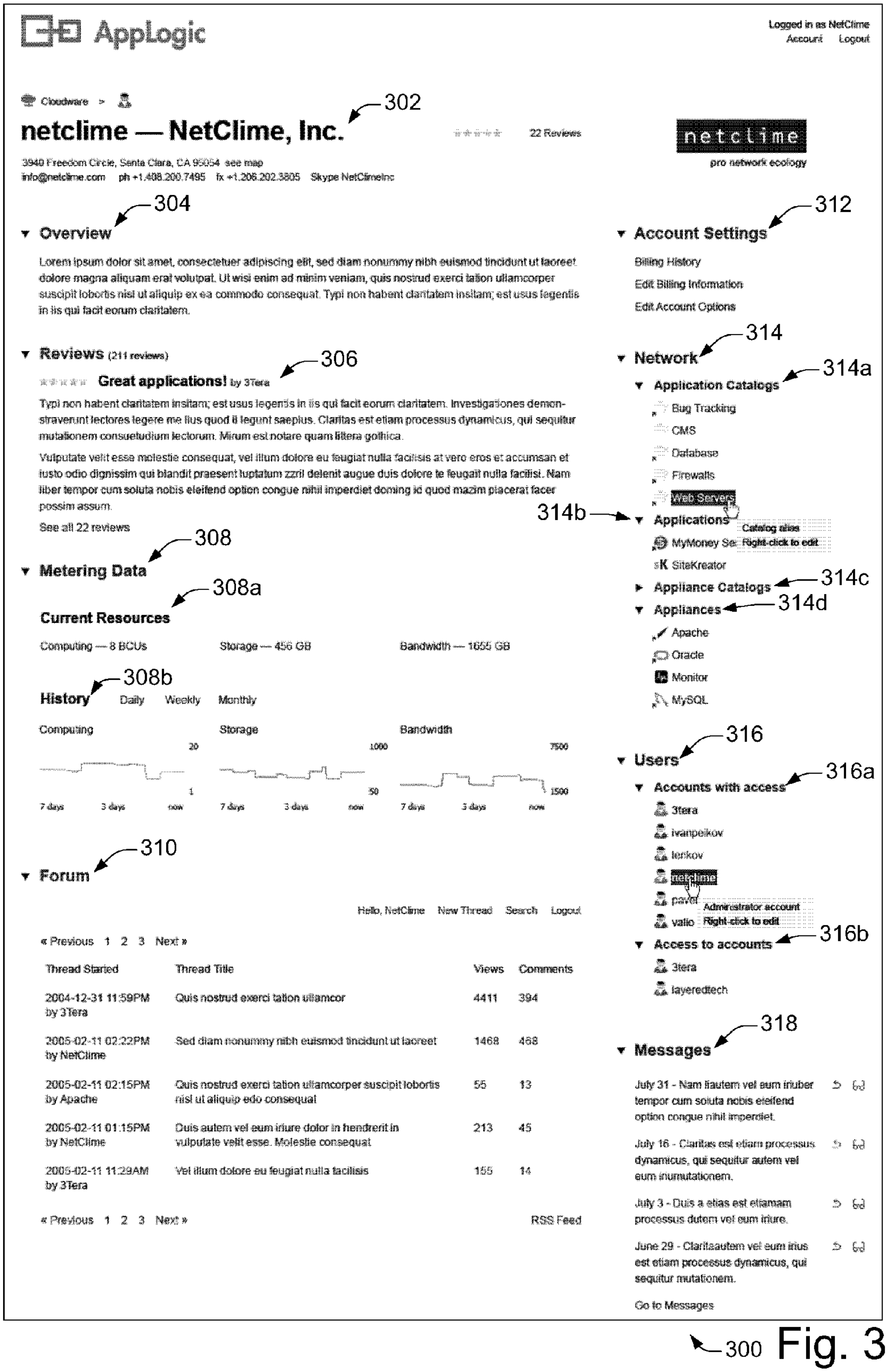
300 Fig. 3

WEB — Simple Web Server

▾ Functional Overview ← 602

WEB is a web server appliance based on the Apache open-source web server software (see http://httpd.apache.org).

WEB serves static web content and executes scripts from a user-configurable read-only content volume. The paths to the documents and scripts are configurable, so that the same volume can be shared between multiple web servers and/or other appliances serving different content.

WEB has three generic output terminals intended for accessing external services from scripts on the content volume. The db terminal is for accessing a MySQL database; the fs terminal is for accessing shared file storage (using NFS); and the aux terminal is for sending e-mail messages to an SMTP server.

The log terminal can be used to connect WEB to a shared file system on which WEB can store its logs.

The configuration of the web server is provided through properties. The properties are designed to cover the most uses in an easy-to-configure way and in most cases only a few need to be set to non-default values. Advanced configurations can be achieved through include files in the Apache configuration format, coming from the content volume. Access and options to content and script files can be further specialized through .htaccess files in the content directories.

If the features provided by the WEB appliance do not meet your needs, please contact our Technical Support to discuss the possible options. We may be able to extend the catalog by providing appliances that cover your needs.

At a Glance

| | |
|---|---|
| Catalog | System |
| Category | Web Servers |
| User volumes | yes |
| Min. memory | 64 MB |
| OS | Linux |
| Constraints | no |
| Rating | ★★★★★ |
| Reviews | 5 reviews |
| Instances | 22123 instances |
| Bugs Reported | 98 bugs |
| Total Hours | 423134 hours |
| MTBF | 553 hours |
| Related Appliances | MySQL<br>LoadBalancer |

620

▾ Boundary ← 610

Resources ← 612

| Resource | Minimum | Maximum | Default |
|---|---|---|---|
| CPU | 1% | 400% | 1% |
| Memory | 64 MB | 8 GB | 64 MB |
| Bandwidth | 1 Mbps | 100 Mbps | 1 Mbps |

Terminals ← 614

| Name | Dir | Protocol | Description |
|---|---|---|---|
| in | in | http | Serves HTTP requests coming from web clients. Serves the HTTP/1.1 and 1.0 protocols. |
| db | out | mysql | Access to a MySQL server. Usage is defined by whatever scripts reside on the content volume (if any). This terminal may be left unconnected if it is not used. |
| fs | out | nfs | Access to a network file system for shared file storage, providing read-write file access over NFS. Usage is defined by whatever scripts reside on the content volume (if any). Software on the content volume 'sees' the mounted remote file system as /mnt/fs in the appliance's filesystem space. This terminal may be left unconnected if it is not used. The connected server must have a read-write share named /mnt/data. |
| log | out | cifs | Access to a CIFS-based network file system for storing access and error logs. This terminal may be left unconnected if it is not used. The connected server must allow anonymous logins and have a read-write share named share. |
| aux | out | any | Access to an SMTP server for sending outgoing e-mail. Usage is defined by whatever scripts reside on the content volume (if any). Note that 'sendmail' is not configured on the appliance, any application that needs to send mail, should simply use SMTP directly, using 'aux' as the target hostname. For Perl CGI scripts the Mail::Mailer module can be used to do that.<br>This terminal may be left unconnected if it is not used. |
| net | out | any | Gateway output for subnet access.<br>This terminal may be left unconnected if it is not used. |
| mon | out | cce | Sends performance and resource usage statistics.<br>This terminal may be left unconnected if it is not used. |

600

▸ Memory Usage ← 616

▸ Setting Up the Content, Shared File Storage ← 617

▸ Typical Usage ← 618

▸ Notes and Links ← 619

Fig. 6

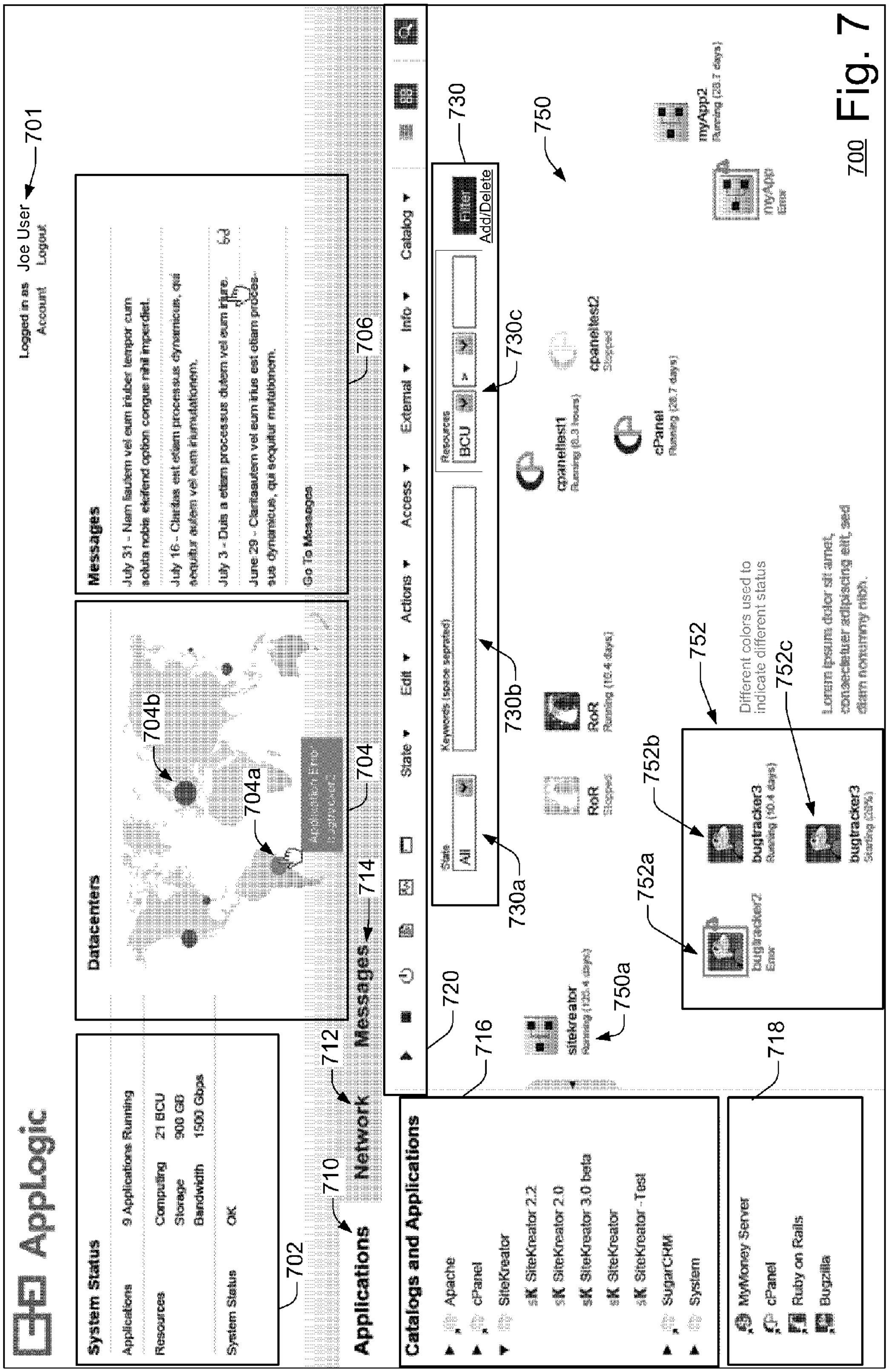
AppLogic
Logged in as Joe User
Account Logout
701
System Status
Applications 9 Applications Running
Resources Computing 21 BCU
Storage 900 GB
Bandwidth 1500 Gbps
System Status OK
702
Datacenters
704a
704b
704
Messages
July 31 - Nam liautem vel eum iruber tempor cum soluta nobis eleifend option congue nihil imperdiet.
July 16 - Claritas est etiam processus dynamicus, qui sequitur autem vel eum iriumutationem.
July 3 - Duis a etiam processus dutem vel eum iriure.
June 29 - Claritautem vel eum irius est etiam processus dynamicus, qui sequitur mutationem.
Go To Messages
706
Applications
Network
Messages
710
712
714
State
Edit
Actions
Access
External
Info
Catalog
720
State All
Keywords (space seprated)
Resources BCU
Filter
Add/Delete
730
730a
730b
730c
750
Catalogs and Applications
Apache
cPanel
SiteKreator
SiteKreator 2.2
SiteKreator 2.0
SiteKreator 3.0 beta
SiteKreator
SiteKreator -Test
SugarCRM
System
716
MyMoney Server
cPanel
Ruby on Rails
Bugzilla
718
sitekreator
750a
RoR
cpaneltest1
cpaneltest2
cPanel
myApp
myApp2
bugtracker2
bugtracker3
752
752a
752b
752c
Different colors used to indicate different status
Lorem ipsum dolor sit amet, consectetuer adipiscing elit, sed diam nonummy nibh.
700
Fig. 7

800

1100
AppLogic
System Status
Datacenters
Messages
Applications
Network
Catalogs and Applications
SiteKreator 2.0 — Application Settings
Resources
Location
Properties
Details
Name
Type
Value
Options
admin_email
usr_hostname
usr_ip
admin_ip
out_ip
netmask
gateway
dns1
dns2
mail_server
admin_user
admin_password
allowed_hosts
Save
Cancel
801
906
1102
1103
1104
1106
1108
1120

1600

| Feature \ Plan | Package 1 $49/mo | Package 2 $500/mo | Package 3 $3000/mo | Pay as you go (no monthly fee) |
|---|---|---|---|---|
| GB-hours included/overage | 200<br>$0.18 | 5,000<br>$0.15 | 30,000<br>$0.10 | -<br>$0.20 |
| Transfer included/overage | 200GB<br>$0.15/GB | 1000GB<br>$0.12/GB | 4000GB<br>$0.10/GB | -<br>$0.17/GB |
| Storage included/overage | 60GB<br>$0.14/GB | 500GB<br>$0.12/GB | 4000GB<br>$0.09/GB | -<br>$0.15/GB |
| Oracle SE1 appliance license (per CPU) | $2000 | $2000 | $2000 | $5/CPU/hr |
| Splunk appliance license (per GB) | $60 | $60 | $60 | $0.2/GB/hr |

| USER BILLING SUMMARY | |
|---|---|
| Billing period: | Jan 1, 2008 – Jan 31, 2008 |
| Billing plan: | Package 2 ($500/mo) |
| Last payment | $500 received on Jan 2, 2008 |
| Next payment (est.) | $2620 due on Feb 5, 2008<br>(plus projected overage fee $144) |
| | |
| Current usage, GB-hours per hour | 10 |
| Accumulated usage, GB-hours | 3,600 |
| Projected usage at current level, GB-hours | 7,200 |
| Projected overage, GB-hours | 1,200 @ $0.12 / GB-hour |
| Projected overage fee | $144 |
| | |
| Current transfer (hourly average), GB/hour | 1.2 |
| Accumulated usage, GB | 360 |
| Projected usage at current level, GB | 720 |
| Projected overage, GB | - |
| Projected overage fee | - |
| | |
| Current storage use, GB | 400 |
| Average storage growth, GB/hour | 0.2 |
| Projected usage at current level, GB | 472 |
| Projected overage, GB | - |
| | |
| Appliance license, Oracle | $2000 |
| Appliance license, Splunk | $120 (2 GB @ $60/GB) |

| COST ESTIMATOR | Value | Range Selector |
|---|---|---|
| **Virtual Server** | | |
| CPU, cores | 0.75 | 0.2 <--\|----------> 8 |
| Memory, MB | 1024 | 256 <-----\|--------> 65536 |
| Storage, GB | 80 | 40 <--\|-----------> 1000 |
| Duration | 3 days | 1 hr <---\|---------> 1 month |
| **Est. Cost** | **$15** | |
| | | |
| **Virtual LAMP Stack** | | |
| Firewall | - | *included* |
| SSL accelerator | $50 | <on> \| off |
| Load balancer | - | *included* |
| Web nodes | 8 | 1 <--\|-------> 64 |
| CPU, cores, node | 1 | 1 <-\|---------------> 4 |
| memory, MB | 1024 | 512 <-----\|--------> 65536 |
| web storage, GB | 80 | 40 <--\|-----------> 1000 |
| MySQL masters | 1 | <1> \| 2 |
| MySQL slaves | 4 | 0 <------------\|-> 8 |
| dbase CPU/node | 1 | 1 <-\|---------------> 8 |
| dbase mem/node | 4096 | 1024 <-----\|--------> 65536 |
| Duration | 1 month | 1 hr <------------\|-> 1 month |
| **Est. Cost** | **$9000** | |
| | | |
| **Virtual .NET Stack** | | |
| Firewall | - | *included* |
| SSL accelerator | $50 | <on> \| off |
| Load balancer | - | *included* |
| Web nodes | 2 | 1 <--\|-------> 64 |
| CPU, cores, node | 2 | 1 <-\|---------------> 4 |
| memory, MB | 4096 | 512 <-----\|--------> 65536 |
| web storage, GB | 160 | 40 <--\|-----------> 1000 |
| MS SQL nodes | 1 | <1> \| 2 |
| dbase CPU/node | 2 | 1 <-\|---------------> 8 |
| dbase mem/node | 8192 | 1024 <-----\|--------> 65536 |
| Duration | 1 month | 1 hr <------------\|-> 1 month |
| **Est. Cost** | **$6000** | |

| Server/Network Resource Publisher Account Statement | | |
|---|---|---|
| **Resources Published** | | **Jan 1, 2008 – Jan 31, 2008** |
| Servers published | 400 | Server specs:<br>• 8 cores @ 3 GHz/core<br>• 4:1 Memory-to-CPU ratio (GB-to-cores) |
| Server-hours published | 292,000 | |
| Starting price | $3/server/hr | |
| Auction reserve price | $2/server/hr | |
| Support SLA guarantee | 99.999% | Class A |
| Connection quality | 3 x 10 Gbps | |
| Certification | SAS70, HIPPA | |
| Location | Dallas, TX, USA | |
| Additional notes | Safe Harbor registered | |
| | | |
| Traffic transfer price | $100/TB | |
| Traffic reserve price | $80/TB | |
| | | |
| **Resources Subscribed** | | |
| Servers used, peak | 360 | |
| Server-hours used | 230,000 | |
| Blended price (servers) | $2.88/server/hr | |
| Servers revenue | $662,400 | |
| | | |
| Transfer used | 200 TB | |
| Blended price (transfer) | $80/TB | |
| Transfer revenue | $16,000 | |
| | | |
| TOTAL sold | $678,400 | |
| SLA bonus(+)/penalty(-) | +$4,000 | 100% uptime, no failures detected |
| TOTAL remitted | $682,400 | (transfer to account completed Feb 2, 2008) |

| Publisher Appliance/Application/Support Account Statement | | | |
|---|---|---|---|
| **Region: North America** | **A/C Statement** | **Jan 1, 2008 – Jan 31, 2008** | |
| | | | |
| **Appliance Pricelist** | **Published Price** | **Pricing Model** | **Usage Reported for Region** |
| Zeus ZXTM | $1/cpu-hr | per CPU core per hour | 4000 |
| Zeus ZXTM LB | $2/cpu-hr | | 1022 |
| Zeus ZXTM GLB | $1.30/GB-hr | per GB of RAM in use per hour | 300 |
| Zeus ZWS | $100/cpu-month | per CPU per month | 3777 |
| Oracle SE1 | $4/cpu-hr | | 6003 |
| Checkpoint VPN | $10/user/month | per user signed up per month | 10,000 |
| Checkpoint IPS-1 | $100/TB traffic | per TB of traffic secured | 103,000 |
| Barracuda spam filter | $0.0001/message | per message filtered | 100,000,000 |
| | | | |
| **Application Templates** | | | |
| SugarCRM single | $0.4/user/hr | per user per hour | 2000 |
| SugarCRM cluster | $0.2/user/hr | " | 20000 |
| Atlassian Confluence | $1000/month | per instance per month | 400 |
| Atlassian JIRA | $1000/month | per instance per month | 275 |
| | | | |
| **Support Pricing** | | | |
| Level 1 (installation/training) | $40/hr | | 778 |
| Level 2 (troubleshooting) | $150/hr | | 20 |
| Level 3 (customizations) | $300/hr | 8 hrs. minimum | 72 |
| | | | |
| **TOTAL revenue:** | **$123,456** | | |
| | | | |
| *Note: Each appliance user has accepted the posted license agreement for the appliance. Records on file, call 800-555-5555 for inquiries* | | | |

GLOBALLY DISTRIBUTED UTILITY COMPUTING CLOUD

RELATED APPLICATION DATA

The present application claims benefit, pursuant to the provisions of 35 U.S.C. §119, of U.S. Provisional Application Ser. No. 61/068,659, naming Nickolov et al. as inventors, and filed Mar. 7, 2008, the entirety of which is incorporated herein by reference for all purposes.

The present application claims benefit, pursuant to the provisions of 35 U.S.C. §119, of U.S. Provisional Application Ser. No. 61/125,334, naming Nickolov et al. as inventors, and filed Apr. 23, 2008, the entirety of which is incorporated herein by reference for all purposes.

This application is also a continuation-in-part application, pursuant to the provisions of 35 U.S.C. §120, of prior U.S. patent application Ser. No. 11/522,050, by Miloushev et al., entitled "APPARATUS, METHOD AND SYSTEM FOR RAPID DELIVERY OF DISTRIBUTED APPLICATIONS", filed Sep. 15, 2006, which claims benefit, pursuant to the provisions of 35 U.S.C. §119, of U.S. Provisional Application Ser. No. 60/717,381, filed Sep. 15, 2005. Each of these applications is incorporated herein by reference in its entirety and for all purposes.

BACKGROUND

Traditional data centers tend to run a single operating system instance and a single business application on one physical server. This "one server, one appliance" model leads to extremely poor resource utilization. For example, it is not uncommon for a significant portion of data center resources to be unused for a majority of the data center's "up" time. Wasted resources include CPU, RAM, Storage, and Network Bandwidth. Additionally, many traditional data centers are typically implemented by combining a heterogenous mix of different servers, operating systems, applications and data. Consequently, deploying, managing, and reconfiguring software or hardware on physical servers and the data center's network infrastructure is mostly achieved via manual (e.g., human) labor, and it typically very time consuming. Additionally, in such data centers, the upgrading of servers typically involves a relatively slow and costly process. Further, in situations where workloads grow more rapidly than expected and place heavy demands on server resources, such traditional data centers face the problem of overutilizing their servers, which may result in business continuity being placed at risk.

BRIEF DESCRIPTION OF THE DRAWINGS

FIG. 3 shows an example embodiment of a graphical user interface (GUI) 300 which may be used for implementing various Cloudware related aspects/features.

FIG. 6 shows an example embodiment of another graphical user interface (GUI) 600 which may be used for implementing various Cloudware related aspects/features.

FIG. 7 shows an example embodiment of a graphical user interface (GUI) 700 which may be used for implementing various Cloudware related aspects/features.

FIGS. 20-29B illustrate various example embodiments of different graphical user interfaces (GUIs) and/or virtualized components which may be utilized, for example, for enabling, accessing and/or implementing various types of global utility computing features and/or information described herein.

DESCRIPTION OF EXAMPLE EMBODIMENTS

Overview

Figure 1:
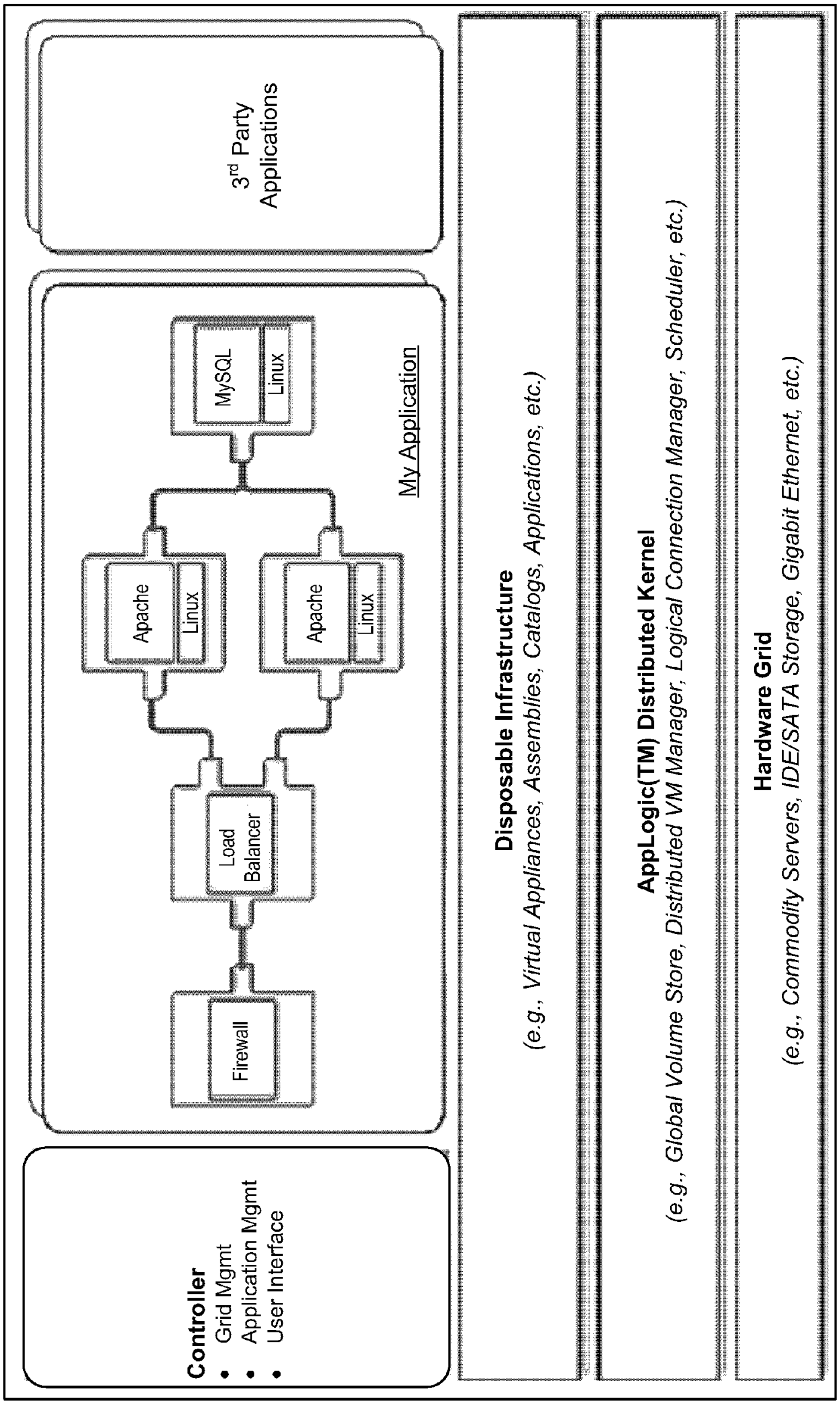
FIG. 1 shows an example embodiment of a portion of an AppLogic™ Grid Operating System architecture.

Various aspects described herein are directed to different methods, systems, and computer program products relating to a global utility computing service (herein referred to a "Cloudware") which may combine multiple virtualized utility computing grids into a single scalable, highly available computing cloud, which, for example, may be used to run a variety of distributed applications such as, for example, Web 2.0 applications, desktop applications, etc.

In at least one embodiment, a Cloudware network may be implemented as a unified, globally distributed computer system having functionality similar to a mainframe computing system. Thus, for example, in one embodiment, all or selected portions of the Cloudware network may be configured or designed to function as a globally distributed mainframe computing cloud, wherein the user or client computer systems may be operable as individual terminals for providing interfaces with the mainframe computing cloud.

In at least one embodiment, all or selected resources associated with selected computing grids may be aggregated, shared, and/or combined, and collectively represented (e.g., to end users) as a single entity which represents a virtual, globally distributed computing system (or computing cloud).

In addition to being able to run various types of server-type applications (such as, for example, website applications/software, Web 2.0 applications, etc.), various embodiments of the Cloudware network may be operable to provide services for running various types desktop computer software, such as, for example, desktop computer operating system software (e.g., Linux, MS Windows, MAC OS, Solaris, etc.), desktop computer applications, etc.

According to different embodiments, various aspects described herein are directed to different methods, systems, and computer program products for use in computing networks such as, for example, on-demand, grid and/or utility computing networks. Examples of at least a portion of the techniques (and/or related features, aspects, and/or benefits) disclosed herein include: techniques for migrating virtual appliances from a first server grid to a second server grid via a communication network; techniques for migrating distributed applications from a first server grid to a second server grid via a communication network; techniques for delivering pre-packaged software in virtual appliances to computing systems for use in operating software applications; techniques for managing use of virtualized computing resources implemented in a computing network; exchange systems for renting or leasing computing resources provided over a computing network; techniques for offering, via a computing network, virtualized computing resources for use in deployment of one or more distributed applications at one or more server grids of a computing network; techniques for offering, via a computing network, distributed application components for use in deployment of one or more distributed applications at one or more server grids of a computing network; techniques for implementing exchange of computing resources between computing resource providers and computing resource subscribers of a computing network; an the like.

In at least one embodiment, different embodiments of computing networks may include multiple different data centers and/or server grids which are deployed different geographic locations. In at least one embodiment, at least some of the server grids may be operable to provide on-demand, grid and/or utility computing resources for hosting various types of distributed applications. In at least one embodiment, a distributed application may be characterized as an application made up of distinct components (e.g., virtual appliances, virtual machines, virtual interfaces, virtual volumes, virtual network connections, etc.) in separate runtime environments. In at least one embodiment, different ones of the distinct components of the distributed application may be hosted or deployed on different platforms (e.g., different servers) connected via a network. In some embodiments, a distributed application may be characterized as an application that runs on two or more networked computers.

Additional objects, features and advantages of the various aspects described herein will become apparent from the following description of its preferred embodiments, which description should be taken in conjunction with the accompanying drawings.

DETAILED DESCRIPTION

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) is described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like is described in a sequential order, such processes, methods and algorithms is configured to work in alternate orders. In other words, any sequence or order of steps that is described in this patent application does not, in and of itself, indicate a requirement that the steps be performed in that order. The steps of described processes may be performed in any order practical. Further, some steps is performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) is used in place of a single device/article. Similarly, where more than one device or article is described (whether or not they cooperate), it will be readily apparent that a single device/article is used in place of the more than one device or article.

The functionality and/or the features of a device is alternatively embodied by one or more other devices that are not explicitly described as having such functionality/features. Thus, other embodiments of one or more of the invention(s) need not include the device itself.

Techniques and mechanisms described herein will sometimes be described in singular form for clarity. However, it should be noted that particular embodiments include multiple iterations of a technique or multiple instantiations of a mechanism unless noted otherwise.

U.S. patent application Ser. No. 11/522,050, entitled "APPARATUS, METHOD AND SYSTEM FOR RAPID DELIVERY OF DISTRIBUTED APPLICATIONS", discloses various techniques for visually constructing and rapidly delivering distributed applications. A commercialized grid operating system referred to as AppLogic™ (developed by 3TERA, Inc., www.3TERA.com) illustrates an example embodiment of one such technique.

It may be noted that the following discussion of AppLogic™ and its features is in no way to be construed as an admission of prior art.

According to a specific embodiment, AppLogic™ may be implemented as a grid operating system designed to enable utility computing for web applications. AppLogic™may run distributed transactional and streaming applications on grids of commodity hardware. It does not require a SAN or other expensive shared storage, and may be open and vendor-neutral. Additionally, AppLogic™ may be completely compatible with existing web applications.

Traditionally, grid computing has been limited to running computational applications such as business intelligence, simulations, derivatives trading, etc. However, the vast majority of Internet services and business applications are not computational; instead, they process large numbers of relatively small concurrent transactions (transactional applications) and/or deliver content (I/O intensive applications).

In at least one embodiment, AppLogic™ may be implemented as a grid operating system that may be designed for web applications and may be optimized for transactional and I/O intensive workloads. It uses advanced virtualization technologies to ensure complete compatibility with existing operating systems, middleware and applications. As a result, AppLogic™ makes it easy to move existing web applications onto a grid without modifications.

FIG. 1 illustrates an example architecture of a portion of an AppLogic™ Grid Operating System. The system may run on a hardware grid assembled from commodity servers connected via Gigabit Ethernet interconnect, for example. Some (or all or selected) of the servers may include directly attached storage (such as, for example, inexpensive IDE/ATA/SATA hard drives) which AppLogic™ may use to provide a distributed storage pool for applications. In at least one embodiment, the AppLogic™ Grid Operating System may include one or more of the following subsystems (or combinations thereof):

- Distributed Kernel—abstracts and virtualizes the grid hardware and provides system services.
- Disposable Infrastructure Manager—handles the infrastructure for each AppLogic™ application.
- Grid Controller—provides a central point for managing and monitoring the grid.

Such subsystems provide a foundation for executing and scaling existing web applications on grids of commodity servers.

In at least one embodiment, AppLogic™ may use virtualization to enable each disposable infrastructure component to run on its own copy of one or more selected operating systems, and focuses on providing the abstractions and services needed at the distributed application level. This approach results in a system that may be very robust, while capable of integrating and running existing software unchanged.

In at least one embodiment, AppLogic™ may manage and/or use disposable infrastructure in order to provide, within the application, the necessary infrastructure which may be preferred to run a given application. For example, in one embodiment, whenever a given application is started, the system may automatically manufacture and assemble the infrastructure required to run it. Once the application is stopped, AppLogic™ may dispose of all or selected infrastructure associated with it. This dramatically simplifies both the construction and the operation of N-tier applications: building infrastructure for each individual application may be much simpler than building and managing shared infrastructure. More importantly, including the infrastructure within each application makes applications self-contained and portable and enables AppLogic™ to instantiate them on demand and migrate them from one grid to another.

In at least one embodiment, AppLogic™ treats the entire N-tier application as a single logical entity that can be copied, instantiated, configured, started, stopped, cloned, exported, imported, etc. As a result, once the application has been integrated and tested, it can be manipulated with remarkable ease. For example, a user can scale an instance of the application from a fraction of a server to dozens of servers simply by defining how much CPU, memory and bandwidth may be allocated to that specific instance. Any number of instances of the same application can be executed simultaneously on the same grid. Multiple, unrelated applications can share the grid. Additionally, an instance of an application can be cloned, together with its state, database and content, and exported to run on another grid that may be located half-way around the world.

According to specific embodiments, AppLogic™ may be operable to provide a set of functions that for running mainstream web applications. Such functions may include, but are not limited to, one or more of the following (or combinations thereof):

- Ability to aggregate commodity servers into a single scalable grid;
- Native support for transactional and I/O intensive workloads;
- Allowing an unmodified application to run on different grids;
- Concurrent execution of multiple unrelated applications each with its own resource quota;
- Scaling applications from a fraction of a server up to the full resources of the grid;
- Supporting hardware, middleware and applications from a variety of vendors.

In addition, AppLogic™ may be operable to implement a variety of services that enable the building of real-world utility computing systems. Examples of such services may include, but are not limited to, one or more of the following (or combinations thereof):

- Resource and license metering system—enables pay-per-use models;
- Catalog delivery system—distributes and shares applications and infrastructure;
- Grid management system—manages a datacenter as a single system.

As described in greater detail below, the various features/functionality provided by AppLogic™ and/or by the disclosures of U.S. patent application Ser. No. 11/522,050, and U.S. patent application Ser. No. 11/024,641 may be leveraged in a manner which enables one to implement a utility computing service (herein referred to a "Cloudware") which may combine multiple virtualized utility computing grids (such as, for example, multiple AppLogic™-based grids) into a single scalable, highly available computing cloud that, for example, may be used to run distributed Web 2.0 applications. In at least one embodiment, the term "Cloud Computing" may be characterized as a pool of abstracted, highly scalable, and managed computing resources capable of hosting end-customer applications.

Cloudware System Embodiments

Generally, the cloudware techniques described herein may be implemented on software and/or hardware. For example, they can be implemented in an operating system kernel, in a separate user process, in a library package bound into network applications, on a specially constructed machine, over a utility computing grid, on a network interface card, etc. In a specific embodiment of this invention, the technique described herein may be implemented in software such as an operating system or in an application running on an operating system.

A software or software/hardware hybrid implementation of various cloudware related techniques may be implemented on a general-purpose programmable machine selectively activated or reconfigured by a computer program stored in memory. Such programmable machine may be a network device designed to handle network traffic, such as, for example, a router, a switch and/or a server. Such network devices may have multiple network interfaces including frame relay and ISDN interfaces, for example. A general architecture for some of these devices will appear from the description given below. In other embodiments, some cloudware techniques described herein may be implemented on a general-purpose network host machine such as a personal computer, server, or workstation. Further, at least one embodiment may be at least partially implemented on a card (e.g., an interface card) for a network device or a general-purpose computing device.

Figure 1A:
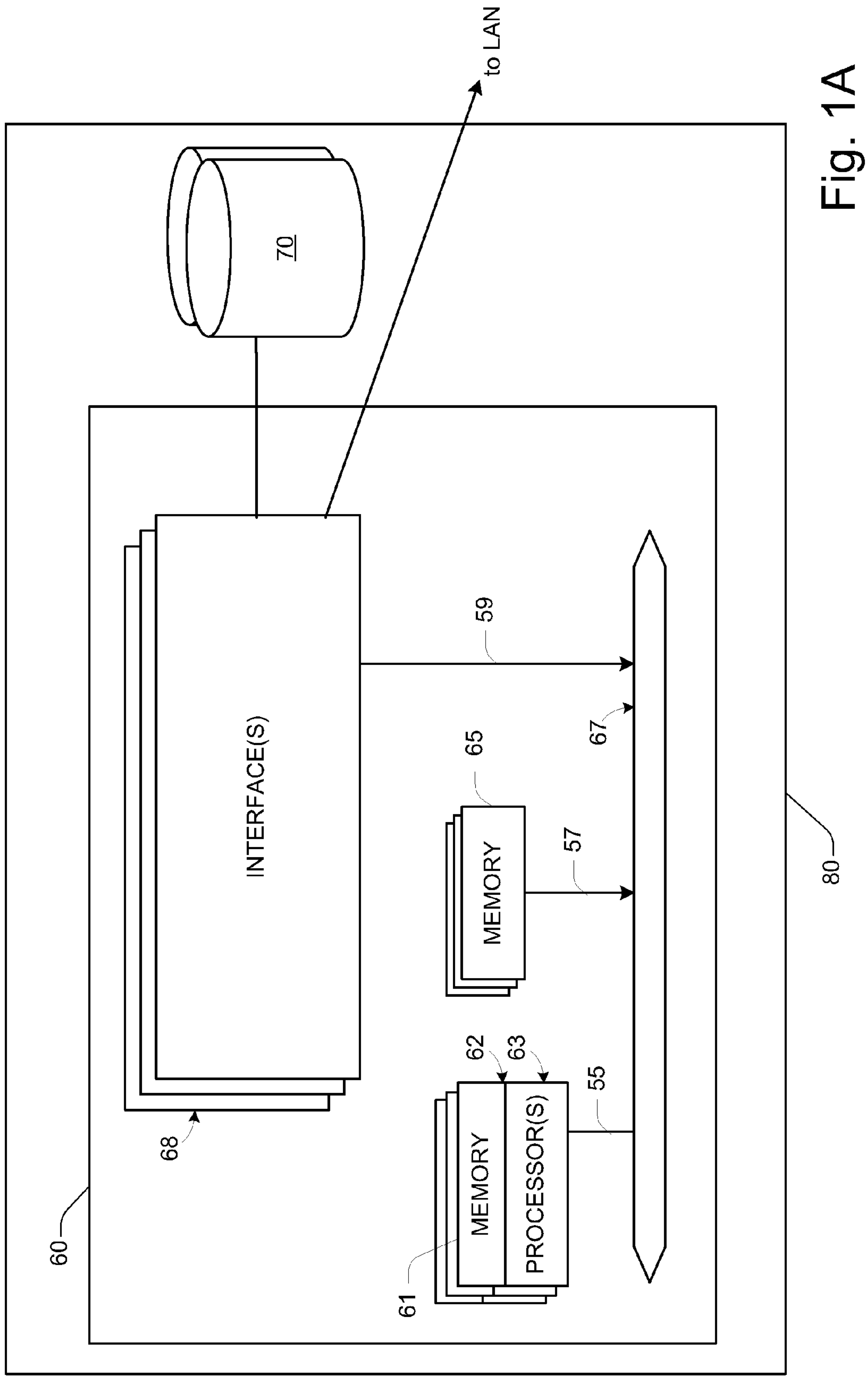
FIG. 1A illustrates an example embodiment of a server system 80 which may be used for implementing various aspects/features described herein.

FIG. 1A illustrates an example embodiment of a server system 80 which may be used for implementing various aspects/features described herein. In at least one embodiment, the server system 80 includes at least one network device 60, and at least one storage device 70 (such as, for example, a direct attached storage device).

In one embodiment, server system 80 may be suitable for implementing at least some of the cloudware techniques described herein.

In according to one embodiment, network device 60 may include a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a server, the CPU 62 may be responsible for analyzing packets; encapsulating packets; forwarding packets to appropriate network devices; instantiating various types of virtual machines, virtual interfaces, virtual storage volumes, virtual appliances; etc. The CPU 62 preferably accomplishes at least a portion of these functions under the control of software including an operating system (e.g. Linux), and any appropriate system software (such as, for example, AppLogic™ software).

CPU 62 may include one or more processors 63 such as, for example, one or more processors from the AMD, Motorola, Intel and/or MIPS families of microprocessors. In an alternative embodiment, processor 63 may be specially designed hardware for controlling the operations of server system 80. In a specific embodiment, a memory 61 (such as non-volatile RAM and/or ROM) also forms part of CPU 62. However, there may be many different ways in which memory could be coupled to the system. Memory block 61 may be used for a variety of purposes such as, for example, caching and/or storing data, programming instructions, etc.

The interfaces 68 may be typically provided as interface cards (sometimes referred to as "line cards"). Alternatively, one or more of the interfaces 68 may be provided as on-board interface controllers built into the system motherboard. Generally, they control the sending and receiving of data packets over the network and sometimes support other peripherals used with the server system 80. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

In at least one embodiment, some interfaces may be configured or designed to allow the server system 80 to communicate with other network devices associated with various local area network (LANs) and/or wide area networks (WANs). Other interfaces may be configured or designed to allow network device 60 to communicate with one or more direct attached storage device(s) 70.

Although the system shown in FIG. 1A illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 65, which, for example, may include random access memory (RAM)) configured to store data, program instructions for the general-purpose network operations and/or other information relating to the functionality of the various cloudware techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 1B:
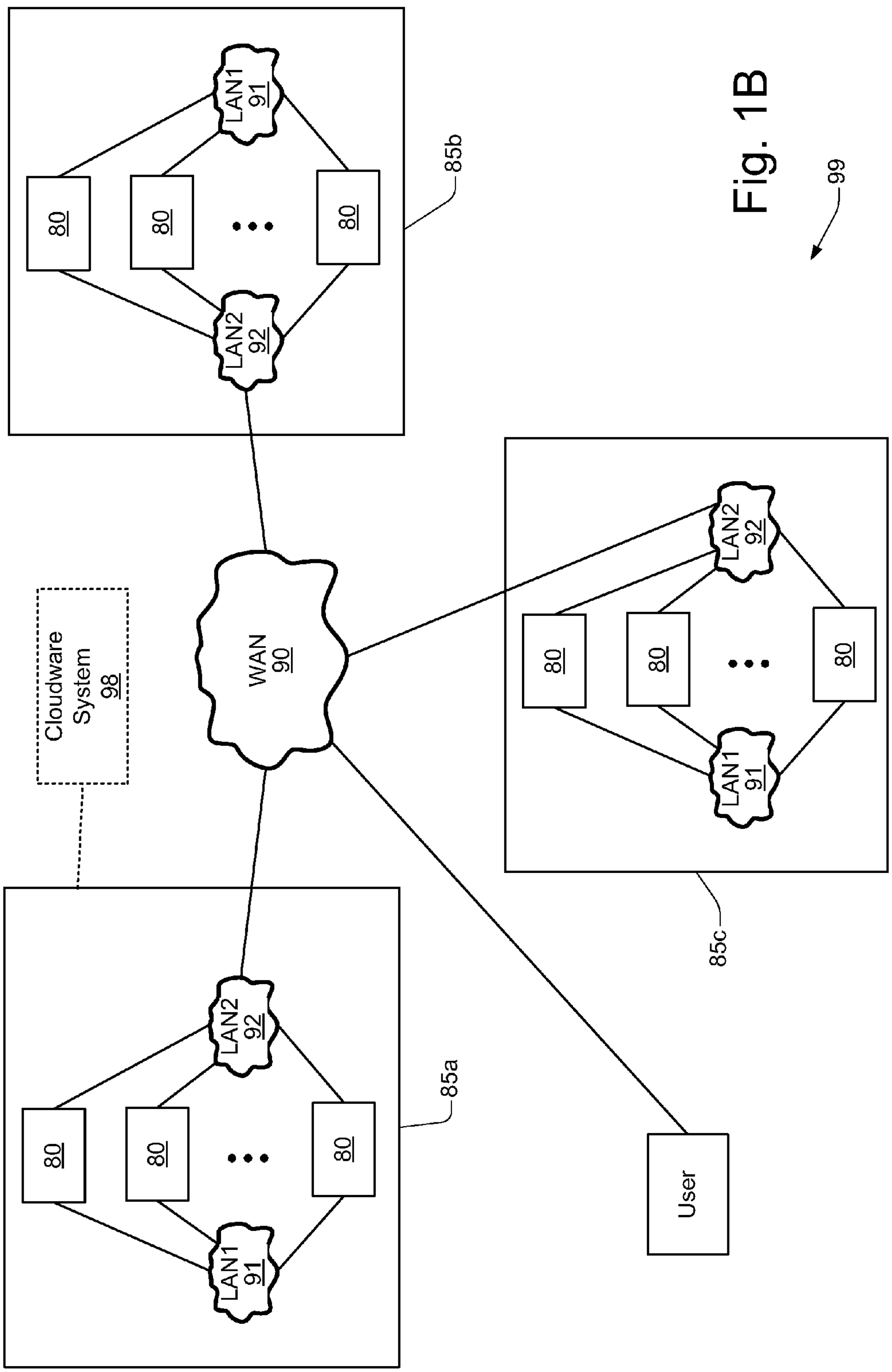
FIG. 1B shows an example embodiment of a global network portion 99 which may be used for implementing various aspects described herein.

FIG. 1B shows an example embodiment of a global network portion 99 which may be used for implementing various aspects described herein. As illustrated in the example of FIG. 1B, global network portion 99 may include a plurality of different data centers (e.g., 85*a-c*) which, for example, may reside at different physical and/or geographic locations. For example, in one embodiment, data center 85*a* may be located in the United States, data center 85*b* may be located in Europe, and data center 85*c* may be located in Asia. In at least one embodiment, each of the different data centers may be communicatively coupled to each other via a wide area network (e.g., WAN 90) such as, for example, the Internet or world wide web.

In at least one embodiment, each data center may include a respective plurality of server systems 80 (herein "servers") which may be communicatively coupled together via one or more local area networks (e.g., LAN1 91 and/or LAN2 92). In at least one embodiment, at least a portion of the data center servers may include at least a portion of features and/or components similar server system 80 of FIG. 1A.

According to specific embodiments, at least some of the data centers may include several different types of local area networks such as, for example, a backbone LAN (e.g., LAN1 91) which may be utilized for providing localized communication between various local network elements within a given data center, and an internet LAN (e.g., LAN2 92) which, for example, may be utilized for providing WAN or Internet access to various local network elements within the data center.

In at least one embodiment, one or more of the data centers may be operable to host a variety of different types of applications and/or other software. Examples of such applications may include, but are not limited to, one or more of the following (or combinations thereof):

- website applications/software (e.g., applications/software use for implementing portions of a website such as, for example, www.uspto.gov, youtube.com, etc.);
- web-based applications/services (such as, for example, those provided by Mircosoft® Office Online, office.microsoft.com, Google's search, Salesforce.com, etc.);
- web-based application services (such as, for example, Amazon's S3 storage service or Google's adwords);
- general purpose business applications (such as, for example, Oracle, SAP, enterprise resource planning, customer relationship management, payroll, accounting, human resources, logistics, stock trading such as www.schwab.com, etc.);
- communications applications (such as, for example, Asterisk or Skype);
- video on-demand applications;
- high-performance-computing applications;
- online gaming systems (such as, for example, Blizzard's World of Warcraft);
- online desktops;
- network services, such as, for example, the Domain Name Service, proxy servers, e-mail filters, e-mail servers, etc.;
- video-conferencing services (such as, for example, Cisco's WebEx);
- service-oriented architecture and XML web service components (such as, for example, the Aivea eShip Web Service at www.aivea.com/eshipinfo.htm, and/or the GeoIP lookup service at www.hostip.info/use.html)
- e-commerce applications such (such as, for example, Amazon.com, e-Bay and Apple iTunes)
- parallel computation applications (such as, for example, applications based on MPI interface or MapReduce interfaces like Hadoop);
- data mining applications (such as, for example, customer loyalty databases, mapping software; video, image and sound processing and conversion);
- in-the-cloud services (like Google's MapReduce);
- content delivery networks, including but not limited to applications that provide distributed content by caching or other methods closer to the consumer;
- etc.

Additionally, in at least one embodiment, one or more of the data centers may be operable to provide various types of database services such as, for example, data storage, database queries, data access, etc.

Additionally, by utilizing virtualization software such as 3TERA's AppLogic™, one or more of the servers of a given data center may be implemented as a server grid which may be operable to enable utility computing for distributed applications. Additionally, in at least one embodiment, multiple server grids from different data centers may be linked together to form a virtual global server grid which may be used to facilitate utility computing for distributed applications.

In at least one embodiment, a distributed application may be characterize as an application made up of distinct components (e.g., virtual appliances, virtual machines, virtual interfaces, virtual volumes, virtual network connections, etc.) in separate runtime environments. In at least one embodiment, different ones of the distinct components of the distributed application may be hosted or deployed on different platforms (e.g., different servers) connected via a network. In some embodiments, a distributed application may be characterize as an application that runs on two or more networked computers.

In the example of FIG. 1B, users (e.g., at client systems and/or other network devices) may be able to access one or more of the data centers via the WAN 90.

Additionally, as explained in greater detail below, one or more of the data centers may include hardware/software for implementing a Cloudware System 98 which may be used to provide users and/or data centers with various types of different functionalities. In at least one embodiment, the global network 99 may be collectively referred to as a Cloudware network.

In at least one embodiment, one aspect of the various Cloudware techniques described herein may be directed to a Cloudware-based utility computing service. For example, in one embodiment, Cloudware may be implemented as a global service which, for example, may be operable to provide computing resources to users according to various pricing models (such as, for example, subscription model, pay-as-you-go model, etc.). In one embodiment, the service may be operated by a business entity (e.g., 3Tera) and the computing resources may be provided by the business entity's (3Tera's) hosting partners or other service subscribers.

As used herein, the term "Nimbus" may be used to characterize a first portion of functionality which may be provided by Cloudware.

By way of illustration, the following examples may be intended to help illustrate various aspects and/were features relating to the various Cloudware related techniques described herein.

EXAMPLE A

In this example it may be assumed that a user navigates the Internet and accesses the Cloudware network via the Cloudware portal. In one embodiment, the Cloudware home page may describe what Cloudware is and may offer the user access to log in and/or sign up. During the sign up process, the user may choose one or more a data center locations for instantiating and running one or more distributed application(s) selected by the user. In one embodiment, the Cloudware services may be offered at different geographic locations, such as, for example, Texas, Germany, Japan, etc.

In one embodiment, once the user has logged into his/her account, one or more customized user dashboard page(s) (see, e.g., FIGS. 7-14) may be displayed the user. In one embodiment, the user dashboard page may include status information (e.g., status summary) relating to one or more of the user's associated applications. Additionally, in at least one embodiment, the user dashboard page may include one or more different types of messages sent to the user's account. The user dashboard page may also include a list of the user's applications and/or other Cloudware network resources. For example, in at least one embodiment, the user can also see a catalog of available application templates by expanding an appropriate side bar and/or by accessing an expanded dashboard GUI. According to different embodiments, the user dashboard page(s) may include various functionality for allowing the user to perform a variety of operations such as, for example, one or more of the following (or combinations thereof):

- creating new applications;
- starting and/or stopping applications;
- viewing or editing the application's infrastructure;
- reviewing application's log;
- logging into an application or application's management interface;
- reserving resources for an application prior to starting it;
- configuring an application (configuring parameters, resources, location, etc.);
- renaming, copying or deleting the application;
- exporting an application (e.g., for backup or deployment outside of Cloudware);
- importing an application (e.g., from backup);
- automatically migrating the application between grids or datacenters (e.g., based on various detected conditions/events), so that a more appropriate location can be used (e.g., cheaper, better quality, closer to user's locality, resource availability, etc.);
- publishing an application so that other users and accounts can create instances of it (free or for-pay);
- creating an instance (provisioning) of a published application;
- promoting an application instance into an application template, e.g., so instances of that template can be easily provisioned;
- perform various other operations over whole applications;
- reading messages received through the service;
- viewing user's account status and account balance;
- viewing user's account resource usage and estimated resource usage and charges;
- viewing user's payment history;
- viewing the amount of license and usage fees accrued to user's account for resources and applications or appliances published by the user or user's account;
- etc.

Figure 14:
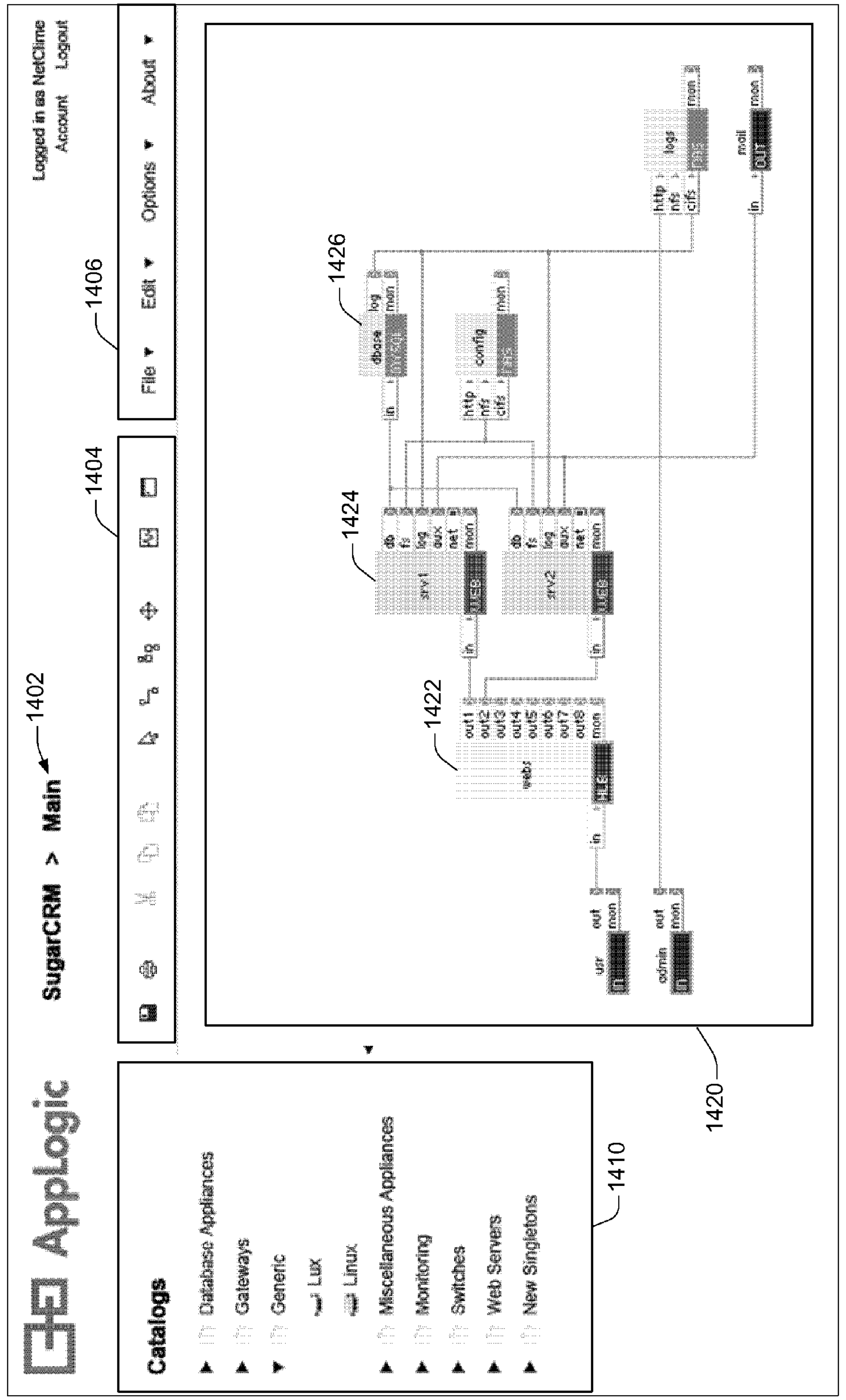
FIG. 14 shows an example embodiment of a graphical user interface (GUI) 1400 which may be used for implementing various Cloudware related aspects/features.

In at least one embodiment, a user may edit a selected application using an infrastructure editor, such as that shown, for example, in the example of FIG. 14. The user can assign resources to each component (appliance) of the user's application separately, as well as to the application as a whole.

In at least one embodiment, a user may be charged for use of different Cloudware services and/or Cloudware resources. For example, in one embodiment, a user may be charged for one or more of the following Cloudware services/resources (and/or combinations thereof):

- account monthly fee (e.g., $ fee/month);
- CPU/memory time: (e.g., $ fee per CPU core/1 GB RAM, per hour);
- storage: (e.g., $ fee per 10 GB per hour reserved storage);
- transfer: (e.g., $ fee per GB of transfer);
- routable IP addresses: (e.g., $ fee per address per hour);
- appliance use (e.g., $ fee per instance or per resource used by a licensed appliance);

application use (e.g., $ fee per instance, per application user/seat, or per resources used by a licensed application);

service use for services published Cloudware (e.g., $ fee per web service request);

etc.

According to different embodiments, the prices/fees may be based on many factors and may differ from data center to data center. In some embodiments, various services/resources may be bundled together. For example, in one embodiment, different bundles may be offered which include fixed amounts of CPU/memory, storage (e.g., 10 GB per CPU-month) and/or bandwidth (e.g., 100 GB per CPU-month). In this way, for applications that utilize a typical amount of resources, the use may only be charged for costs relating to the monthly account fee plus the CPU/memory (e.g., because most other resources fit in the bundle and don't require a separate charge). Such bundling also allows for better planning of resources at the datacenters that provide the resources.

According to different embodiments, the various prices/fee structures may also be based on a periodic (e.g., monthly, yearly, etc.) payment plan plus overage schema, similar to mobile phone plans in the ONE (e.g., like T-mobile's Individual Max.). In one embodiment, the user can pre-pay for a certain amount of resources (e.g., 10,000 GB-hours of RAM and hours of CPU) at a lower per-resource price for the pre-paid resources and be charged a higher price for resources used in excess of the pre-paid resources. This payment schema allows for better planning both on the user side and on the datacenter/service operator side. It also allows some users, e.g., such as those who are able to better predict and pre-buy their resource use, to obtain prices that may be low enough and closer to the price of dedicated resources, while still allowing the flexibility of dynamically adding additional resources on the fly (e.g., to handle bursts in resource need/utilization) should conditions warrant. In other embodiments, the periodic plans may be for different time periods—e.g., from hours to years; as well as simply a pre-bought package of resources (e.g., 1 million GB-hours) that can be used over a specified time period, (e.g., much like a prepaid phone card).

In at least one embodiment, the pre-pay and bundle approaches may be combined to achieve predictable and competitive pricing for the service(s) offered.

Features

According to different embodiments, Cloudware and/or Cloudware Nimbus may provide various features and/or functionalities such as, for example, one or more of the following (or combinations thereof):

- Full AppLogic capabilities
- Global data center selection
  - multiple geographic locations of different data centers/grids
  - multiple grids possible in each data center
  - accounts may be bound by default to a shared grid in a selected data center
  - accounts can be migrated manually between grids, data centers, or even moved to a dedicated grid (e.g., a grouping of Cloudware-enabled servers which have been allocated for exclusive use by a given user/account)
- Account portal
  - on-line sign up that doesn't require human interaction
  - credit card billing
  - on-line statement
- Per-usage billing for resources
  - hourly billing
  - flexible resource assignment (CPU in 10% increments, memory in 128 MB increments, storage in 25 MB increments)
  - bundled storage and transfer resources
- Public IP address management
  - automatic IP address assignment
  - direct routable IP address assignment
  - IP address enforcement
- Application templates
  - Linux, Solaris and Windows Virtual Private Servers
  - Lamp, LampX4, LampX8
  - LampCluster
  - DotNet
- Grid detached operation prevents global outages for the applications in case of outage of the control service
- Notes:
- AppLogic preferably continues to exist as a product for standalone virtual private data centers
- Nimbus supports both accounts going to shared grids and/or to dedicated grids;
- Various mechanisms may be provided for handling assignment of dedicated grids (e.g., user-requested subcription to dedicated grid; data center-driven push to subscriber account, etc.). In at least one embodiment, a dedicated grid may include a group of physical servers in the Cloudware network which have been allocated for exclusive use by a specified user/account.

Other Features

According to different embodiments, Cloudware and/or Cloudware Nimbus may also provide other features and/or functionalities such as, for example, one or more of the following (or combinations thereof):

- multiple users per account
- controlling multiple data centers from the same account
- globally accessible catalogs of appliances and/or applications
- easy migration of applications between data centers and/or between accounts
- social networking features (incl. detailed statistics)

Architecture Overview

For example, in one embodiment, Cloudware Nimbus may be configured or designed to follow a shared grid design which allows it to support all (or selected) desired features of Cloudware.

In at least one embodiment, Cloudware can be thought of as operating system for the world's first global distributed computer. In this sense, it has resources (e.g., grids located at various different locations over the world), a kernel and a user interface.

More specifically, in one embodiment, Cloudware Nimbus (also referred to herein as "Nimbus") may include one or more of the following components (or combinations thereof):

- CUI—Cloudware User Interface
  - Portal—portal application; provides web site, registration, billing and login, as well as all or selected other portal functions—forums, docs, etc.
  - Shell(s)—account shells, one per active account
  - API(s)—API(s) gateway to the service (used for programmatic control over entities, using web services interfaces)
- KERNEL—Cloudware Kernel
  - Controller—service controller
  - Metering—metering system
  - Authentication—authentication service Worker Apps—worker applications (long-term tasks initiated by the controller, such as volume resizing, application export, etc.)

DC Manager—data center manager (preferably not required for Nimbus)

Repository—data repository (preferably not required for Nimbus)

Scheduler—data center and grid scheduler (preferably not required for Nimbus)

Grids—grids distributed to multiple data centers; each data center may have one or more grids All or selected components of CUI and KERNEL may be configured or designed as applications running on a "core" grid. In one embodiment, account shells (Shell(s)) may be intended to be active only while someone is logged in on the account. In other embodiments, account shells may be kept running at all or selected times (e.g., with resources paid for by the user's monthly account fees).

Distributed Application Architectures

At least one example embodiment described herein comprises an application model, a visual method and a system for rapid delivery of distributed applications. In at least one embodiment as described herein, the phrase "inventive system" refers to an example embodiment and/or to alternative embodiments described or referenced herein.

1. Application Models

In at least one embodiment, the application model defines several abstractions which, taken together, make it possible to express the structures and behavior of complete distributed applications. In at least one embodiment, those abstractions can be grouped in the following way: virtual resources, virtual appliances, composite appliances, catalogs of appliances, and applications.

Virtual Resources

The present invention uses resource virtualization to abstract the underlying hardware system and to make it possible to define the rest of the application in a hardware-independent way. At least one embodiment described herein defines various types of virtual resources, such as, for example: virtual machines, virtual volumes and virtual network interfaces.

Figure 30:
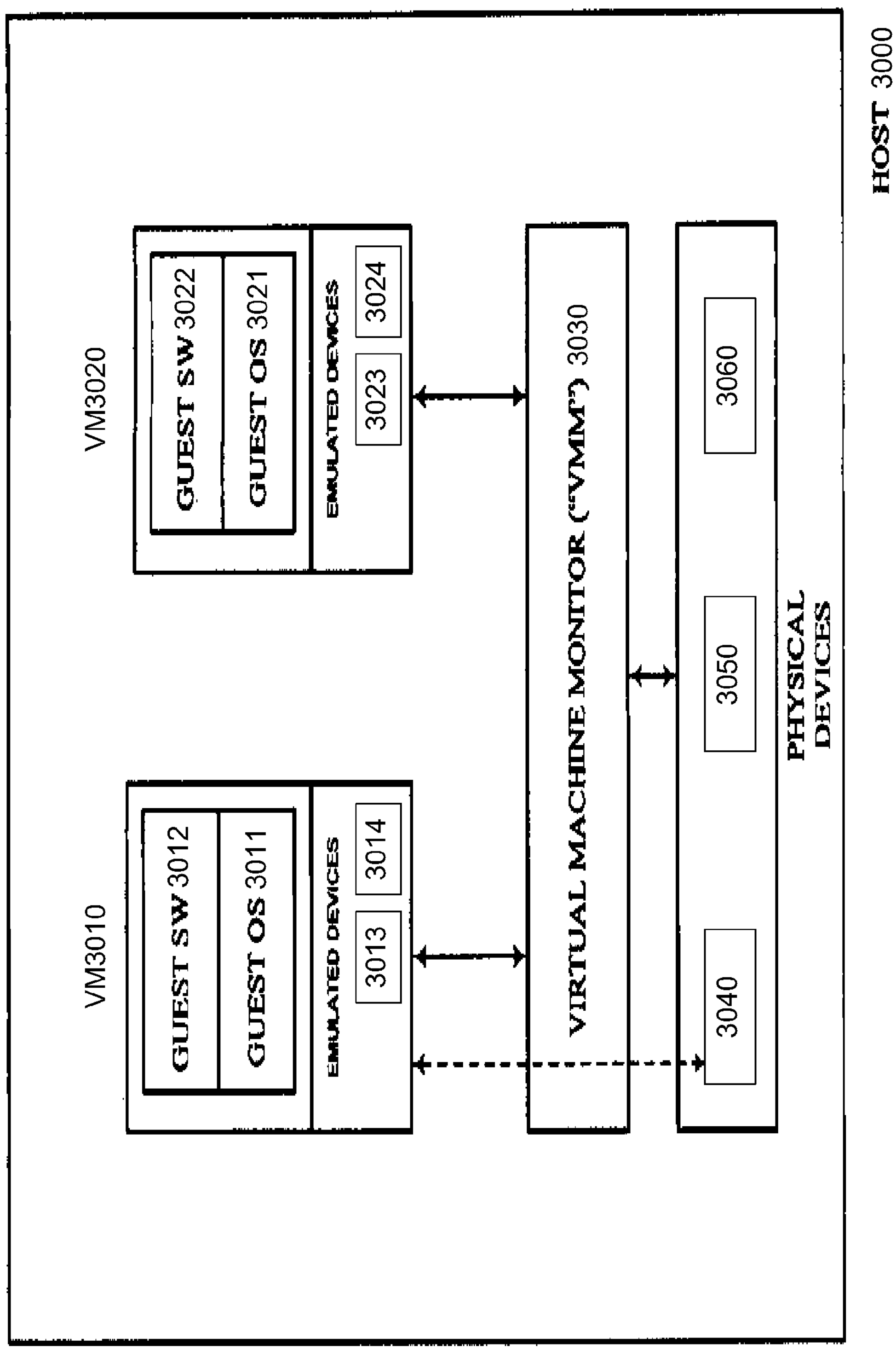
FIG. 30 illustrates an example embodiment of a virtual machine manager.

In an example embodiment described herein, the hardware system comprises computing and/or storage nodes interconnected through a suitably fast network, with at least one node acting as a system controller. Each node on the network preferably exposes one or more pools of virtual resources, one pool for each resource type. For each resource type, the system controller aggregates multiple discrete resource pools, exposed by the various nodes in the system, into a single, distributed resource pool. As a result, there is a single system-wide resource pool for each type of virtual resource. Virtual resources are allocated/created from their respective system pools and carry a system-wide identification which makes it possible to access a given instance of a virtual resource in a uniform fashion independent of where the resource is actually located. In at least one embodiment, at least some virtual machines may be implemented by a prior art virtual machine management system. FIG. 30 illustrates an example embodiment of an architecture of a virtual machine management system, in which a virtual machine monitor 3030 partitions a physical host 3000 into multiple virtual machines, such as the virtual machines 3010 and 3020, and manages the access from virtual devices 3013, 3014, 3023 and 3024 to physical devices 3040, 3050 and 3060. Each virtual machine is capable of booting a general-purpose operating system, such as 3011 and 3021, and any other software that it may be configured to run.

Most virtual machine managers virtualize access to at least two types of peripheral devices, namely network interfaces and block storage devices. When configuring an individual virtual machine, one can specify a set of virtual network devices and a set of virtual storage devices for that virtual machine, and define how those virtual devices should be mapped to the actual physical devices of the host. In addition, some virtual machine managers make it possible to map a virtual device of a given virtual machine to a logical device (network interface or disk volume) implemented by an operating system in another virtual machine. Virtual machine managers also allow individual virtual machines to be migrated from one host to another, transparently to the software that runs inside the virtual machine. An example of such prior art virtual machine manager is Xen, described in [Xen].

In the present invention, virtual machines are assigned a set of execution attributes that determine the minimum and maximum amounts of processing power, memory and network bandwidth that can be allocated to a given instance of a virtual machine, as well as to permit or prohibit the migration of the virtual machine.

Virtual storage volumes are logical block devices exposed by one or more hosts on the system and accessible from virtual machines running on the same or on other hosts. Virtual volumes are persistent, named objects, the size of which is defined at the time of creation and which reside on the system until explicitly destroyed. In an example embodiment, a virtual volume defined and exposed by one node is accessible from any node in the system, thereby allowing a virtual machine that uses the volume to be migrated freely to any node. One way to implement virtual volumes is by configuring [NBD] so that each individual virtual volume is stored in a file on one of the hosts, shared on the network as an NBD volume and accessed from the other hosts using the NBD client.

In an example embodiment, a virtual volume is typically accessed exclusively by a single virtual machine. This makes it possible and desirable to cache volume contents aggressively on the host on which the virtual machine accessing the volume is being executed. Such caching is easily accomplished, for example, by layering on top of the NBD client a block device driver that uses a file on a local physical disk to store copies of blocks recently accessed by the virtual machine.

Another aspect described herein is the ability to create multiple instances of the same virtual volume. Those are useful whenever there is a need to share a large set of data among multiple virtual machines in such a way as to permit each virtual machine to make relatively small number of modifications to the common set of data for its own use. Instantiable virtual volumes can be implemented by simply replicating the common volume for each virtual machine.

In an example embodiment, however, an instantiable volume is implemented by a combination of a "master" virtual volume which is common to all instances and contains the common data, and a "differential" virtual volume for each virtual volume instance, which accumulates the modifications made to the specific instance. The master volume and the differential volume are presented to the client virtual machine as a single block device, for example, by layering an appropriate block device driver over an NBD client that can access both virtual volumes.

Figure 31:
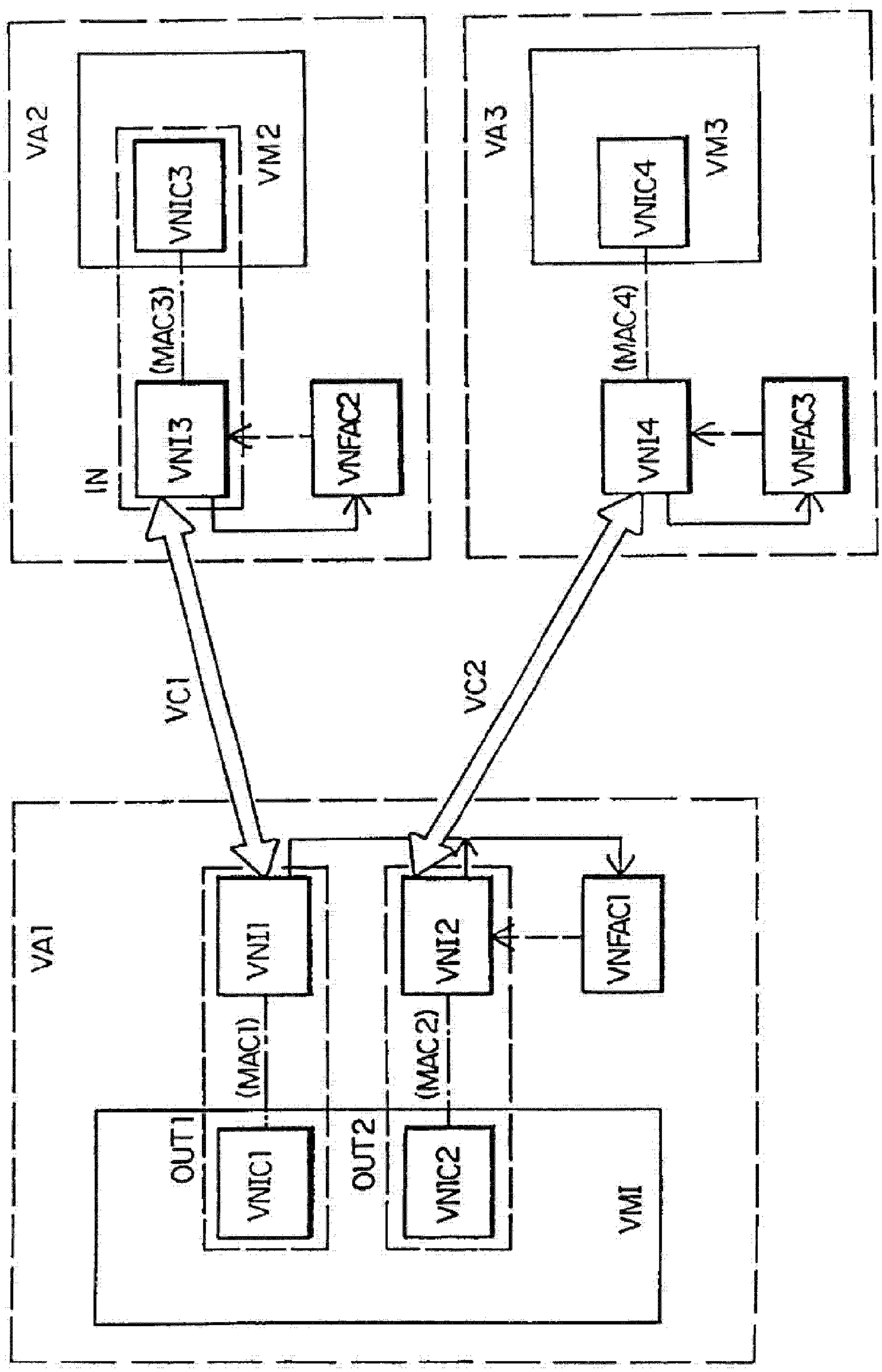
FIG. 31 illustrates an example embodiment of a virtual network interface.

FIG. 31 illustrates the inventive virtual network interfaces provided by the present invention. Virtual network interfaces are used to abstract the structure of the network interconnect inside the distributed application. A pair of virtual network interfaces, such as VNI1 and VNI3, is used to create a "virtual wire" between virtual network adapters vNIC1 and vNIC3, which belong to virtual machines VM1 and VM2, respectively. The virtual wire operates in a manner equivalent to a cross-over cable that connects two physical network interface cards directly: it transfers packets from one of the cards to the other and vice-versa.

In an example embodiment, virtual network interfaces are implemented by combining two types of objects, a virtual interface factory, such as VNFAC1, and a virtual interface instance, such as VNI1. The virtual interface factory is preferably attached to each virtual machine and creates one virtual interface instance for each virtual network adapter configured on its virtual machine. The factory configures each virtual interface instance with the MAC address of its respective virtual network adapter, thereby allowing the instance to intercept all outbound traffic from that adapter. The virtual interface instance VNI1 is also configured with information sufficient to establish connection with its counterpart, the virtual interface instance VNI3 using the physical network available in the hardware system. VNI1 intercepts outgoing traffic from vNIC1 and forwards it to VNI3 which channels the packets into vNIC3, optionally modifying packet headers to support the tunneling abstraction. Traffic in the opposite direction is handled the same way.

Depending on the physical network used, virtual wire VC1 can be implemented by tunneling application traffic (packets) between two virtual network interfaces through a TCP connection, UDP datagrams, InfiniBand reliable connection, or as direct memory-to-memory transfer whenever both VNI1 and VNI3 happen to be located on the same host, all of which is completely transparent to the communicating virtual machines VM1 and VM2. Indeed, it is possible to move the virtual wire VC1 from, for example, a TCP connection over Gigabit Ethernet, to a reliable connection over 10 Gigabit InfiniBand on the fly, transparently to the communicating virtual machines.

Virtual Appliances

Figure 32:
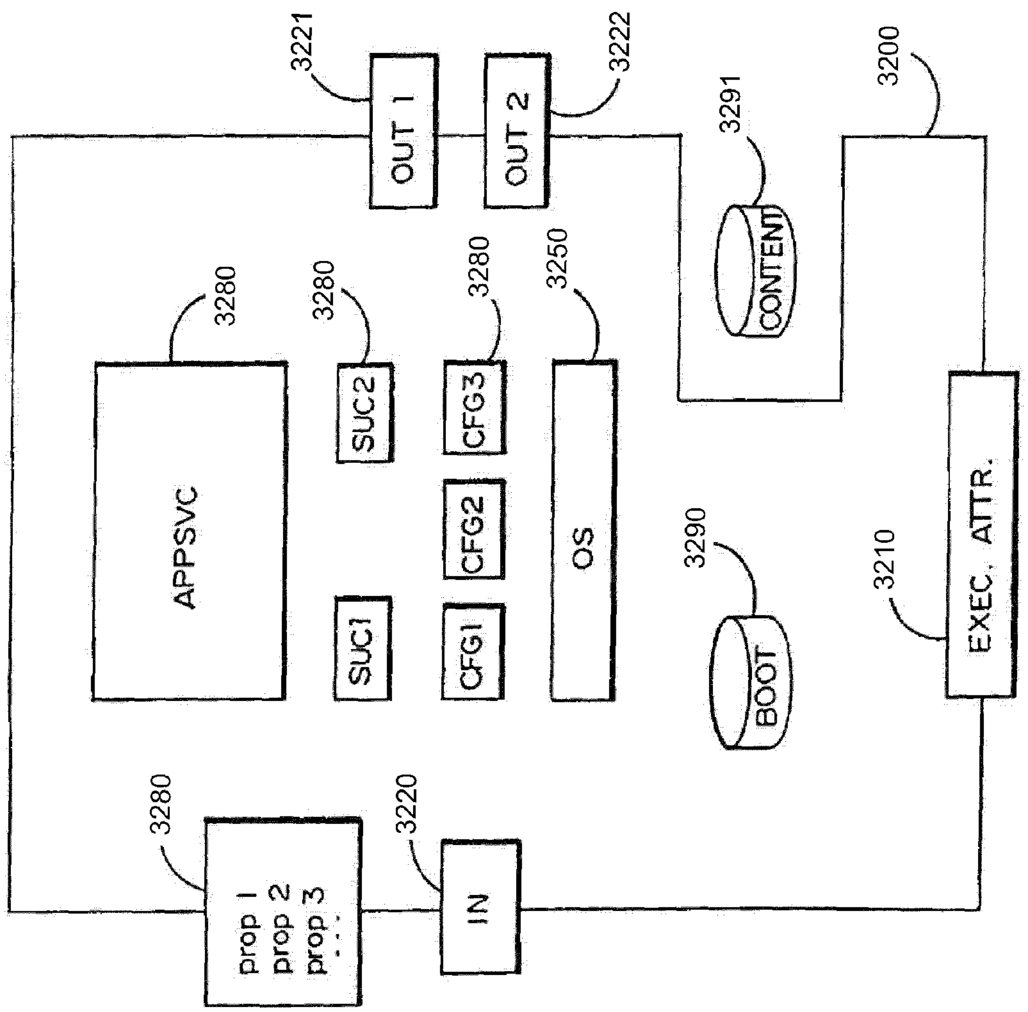
FIG. 32 illustrates an example embodiment of a virtual appliance.

FIG. 32 illustrates the inventive virtual appliance. The virtual appliance 3200 comprises a boundary, boot volume 3240, and interior. The boundary comprises the execution attributes 3210, the terminals 3220, 3221 and 3222, the properties 3230, the content volume 3241. The interior comprises operating system 3250, configuration files 3280, software services 3260 and the application service 3270. In an example embodiment, virtual appliances are defined by building a descriptor such as the descriptor 700 illustrated in FIG. 7 of U.S. Pub. No. 20070078988.

In an example embodiment, virtual appliances are created by first defining a virtual appliance class using descriptor similar to 700 and then creating one or more virtual appliance instances that execute on the target system. The class is used as a template for creating instances.

Figure 33:
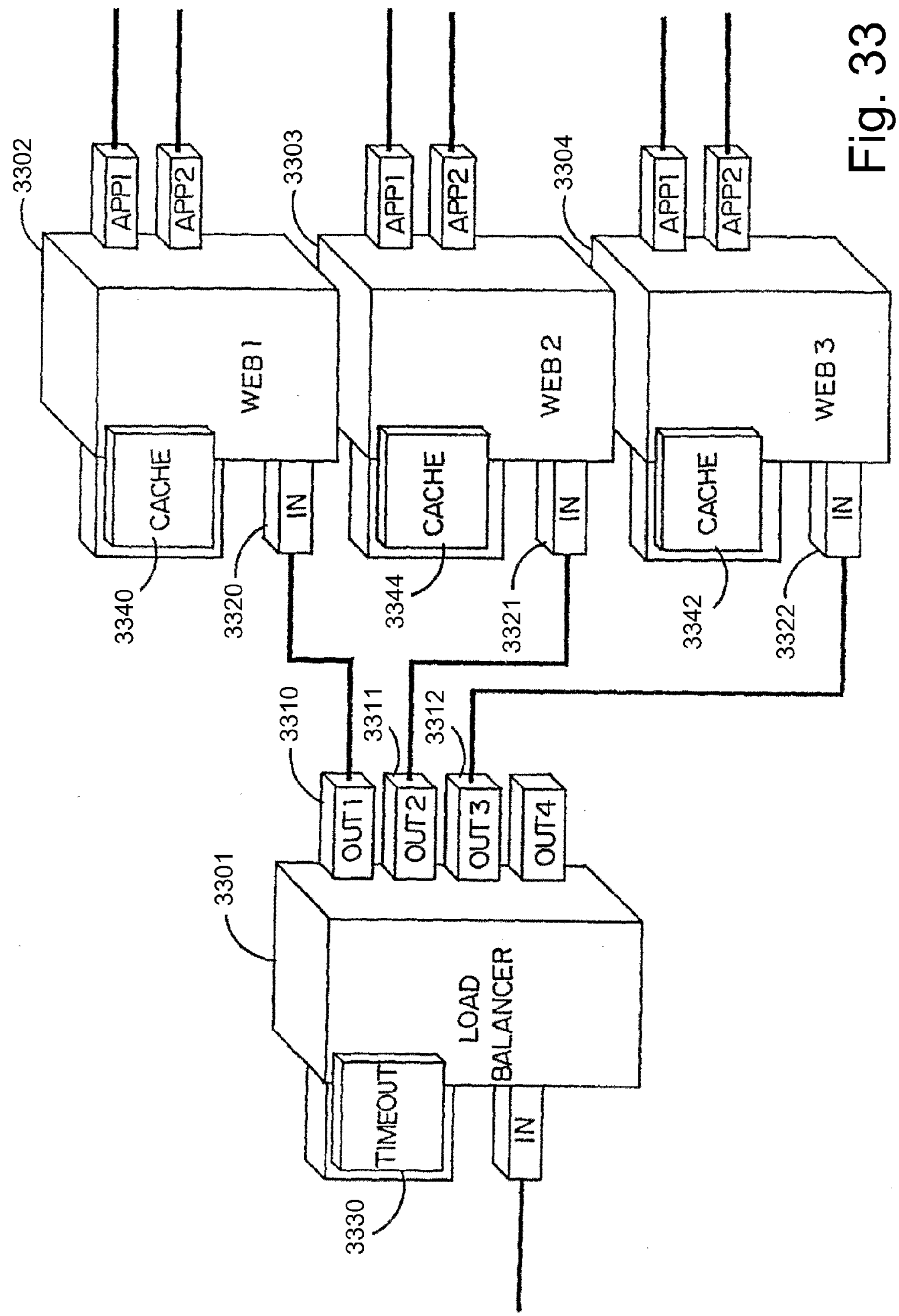
FIG. 33 illustrates an example embodiment of an instantiation of an application which has been implemented using a plurality of different virtual appliances.

FIG. 33 illustrates the process of creating multiple virtual appliance instances from one class. To create the instance 3350, the system first creates a virtual machine with one virtual network adapter for each terminal, such as 3381 and 3382, and an instance of a virtual network interface for each of the adapters. In addition, the system creates one virtual block device for each volume 3360.

The system next creates a virtual volume instance 3360 by either replicating the class volume 3310 or by creating a differential volume using the class volume 3310 as a master, as described above, and binds it to the corresponding block device created above.

The virtual machine of the instance is created using the specific values assigned to the execution attributes. In addition, the instance is configured with the values 3370 of the properties 3320, preferably by modifying the configuration files 3351 residing on the volume 3360. Since volume 3360 is an instance of the master volume 3310, the modifications are private to the instance 3350.

The system then proceeds to execute the virtual machine, resulting in the booting the operating system 3352 and starting the various services 3353.

The inventive process for defining virtual appliance classes and instances makes it possible to separate (a) the information and configuration that are common to all virtual appliances of a given class, such as the operating system and the application service code, and the configuration required to make them work together; and (b) the configuration and connection data that are specific for each instance of the virtual appliance based on its role in the distributed application.

Properties of Virtual Appliances

Unlike execution attributes, the set of which is preferably common to all classes of virtual appliances, in practice, each class of virtual appliances would have configuration parameters that are specific to the function and the implementation of the class. The present invention provides a mechanism for exposing the desired set of such configuration parameters to be modified by the application designer through a universal property interface modeled after properties of software components (such as Microsoft ActiveX controls).

With the inventive property mechanism, the designer of a virtual appliance class defines the set of properties 3320, preferably by defining the name, data type and default value of each property as part of the class descriptor. In addition, within the same descriptor, the virtual appliance designer specifies the names of one or more configuration files 3351, into which the values of the properties need be transferred at the time of instance creation.

Figure 34:
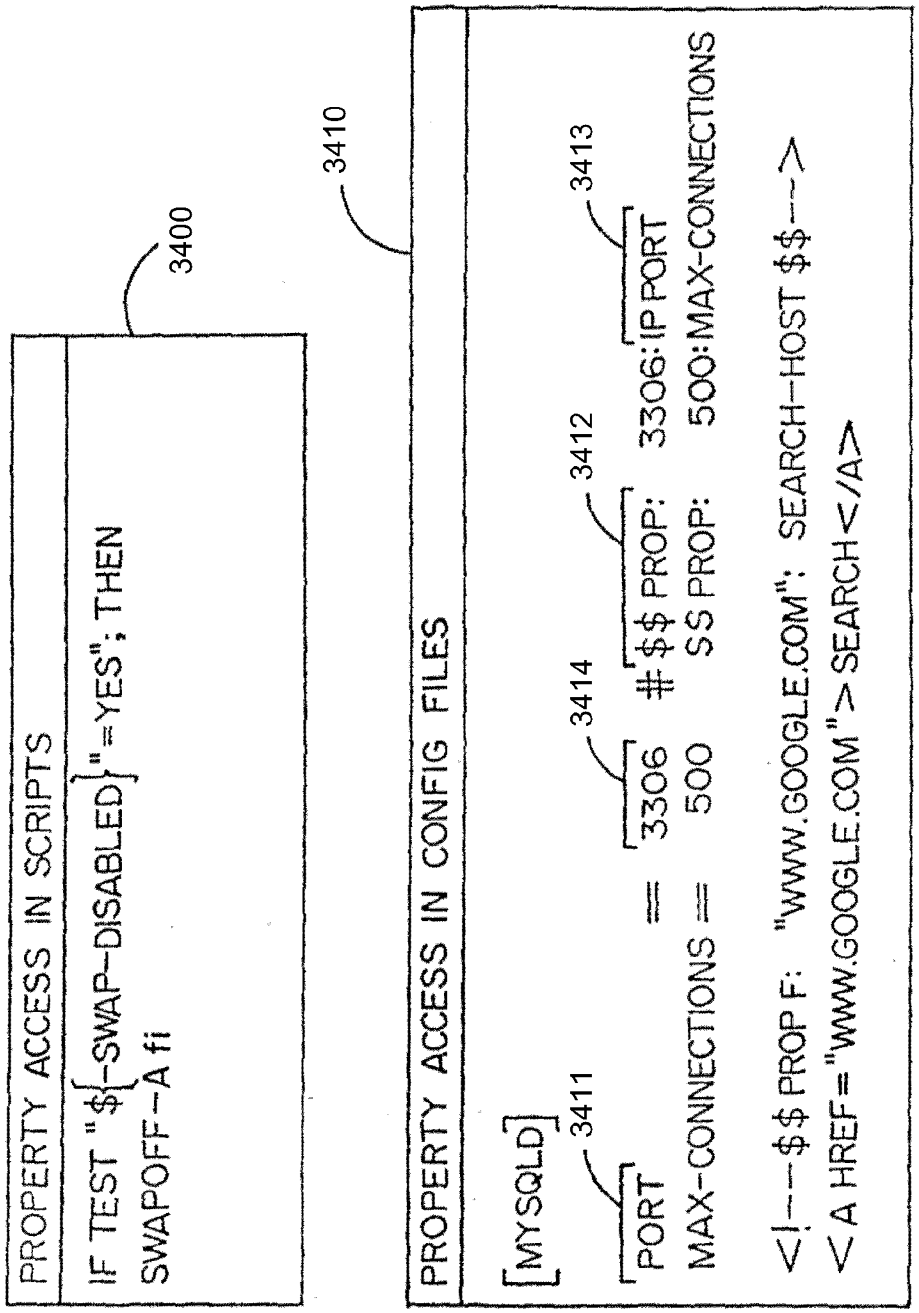
FIG. 34 illustrates an example embodiment of a property mechanism for virtual appliances.

FIG. 34 illustrates an example embodiment of a mapping of virtual appliance property values into configuration file settings and scripts that execute inside an instance of a virtual appliance. In the case of scripts 3400, for each property defined in the appliance class an example embodiment provides an environment variable named after that property and initializes such variable to the value of the property with which the instance was configured. In the case of a text-based configuration file 3410, a parameter 3411 is set to a specific value 3414. To map a property of the appliance to the parameter 3411, the designer of the appliance adds a comment to the configuration file with a tag 3412, identifying the appliance property name 3413, which is to be mapped to the parameter 3411. This is sufficient to cause the system to replace the value 3414 with the value of the property 3413 as set on the appliance instance.

Terminals of Virtual Appliances

In order to visually build structures of virtual appliances, the present invention defines the notion of terminals as connection points that represent endpoints for logical interactions between appliance instances. The inventive terminals are designed so that already existing software packages used inside virtual appliances can communicate through terminals without requiring modifications.

With reference to FIG. 32, a terminal could be an input, such as the input 3220, or an output, such as the outputs 3221 and 3222. An input terminal is a terminal for accepting network connections; an output terminal is a terminal for originating network connections. With respect to the flows of requests and data, both types of terminals allow bi-directional transfers. A terminal preferably comprises a name, a virtual network adapter and a virtual network interface.

When an output terminal of one virtual appliance instance is connected to an input terminal of another instance, the system creates a virtual wire between their respective virtual network interfaces, and assigns virtual IP addresses to both ends of the connection.

With reference to FIG. 31, the virtual appliance VA1 has a virtual machine VM1 and an output terminal OUT1, comprising vNIC1 and VNI1. This terminal is connected to the input terminal IN of the virtual appliance VA2 through the virtual wire VC1. Whenever the software running inside VM1 attempts to resolve the name of the output OUT1 as a network host name, the inventive system will provide it with the virtual IP address assigned to the opposite end of the virtual wire VC1 which is connected to the terminal IN. This has the effect of binding the network host name "OUT1" in VA1 to the IP address of the terminal IN of VA2.

Assuming that in the virtual machine VM2 of the appliance VA2, a software service is listening on a socket for incoming TCP/IP connections, an attempt to establish a TCP/IP connection to host name "OUT1" from inside VM1 will result in the connection being established with the software running inside VM2, with all traffic passing through the virtual wire VC1.

Volumes of Virtual Appliances

Each instance of the inventive virtual appliances has at least one volume from which it boots operating system and other software. These volumes may be provided as part of the class definition of the appliance and instantiated for each virtual appliance instance. In many cases, virtual appliances may have additional volumes that are not part of the class definition but are explicitly configured on each instance of the virtual appliance.

With reference to FIG. 32, the boot volume 3240 may contain software and configuration necessary to boot a Linux operating system and run an Apache web server; this volume is part of the class definition and is instantiated for each instance of the appliance 3200. The volume 3241 may contain data specific to a given web site, for example, HTML files, images and JavaScripts.

While the class definition for appliance 3200 includes a reference to the specific volume 3240, it only defines a placeholder for the volume 3241, indicating that each instance of the appliance 3200 may be explicitly configured with a reference to such volume.

Instantiating the appliance 3200 and configuring the instance with a reference to the volume 3241 has the effect of producing an instance of an Apache web server that serves the particular web site the content of which is located on volume 3241. In addition, defining a property on the appliance 3200 through which the appliance can be configured with a directory name on the volume 3241 from which it would access the content allows multiple different instances of the appliance 3200 to be configured with the same volume 3241 but serve different content located in different directories on the volume.

The same pattern can be applied to design a generic J2EE server appliance that can be configured with a volume containing the EJB code packages for a particular application function, or a generic database server configured externally with a volume containing a specific database. In fact, using the combination of application volume plus directory path property, as described in the paragraph above, makes it possible to combine static content, code and data of the application on a single application volume which makes the application easier to modify and maintain.

Structures of Virtual Appliances

The inventive virtual appliances can easily be combined to form structures that perform advanced application functions. Assuming that all required appliance classes already exist, defining such structure involves three general steps: defining the set of instances; providing the desired configuration values for attributes, properties and volumes of each instance; and defining the connections between their terminals.

FIG. 33 illustrates a presentation tier of a web application implemented as a structure of virtual appliances. The structure comprises one instance of a load balancer appliance 3301, and three instances of a web server appliance, the instances 3302, 3303 and 3304. The outputs 3310, 3311 and 3312 of the load balancer 3301 are connected to the inputs 3320, 3321 and 3322 of the three web server instances, respectively. In addition, the load balancer 3301 is parameterized with a value for its TIMEOUT property 3330, and the web server instances are parameterized with a cache size value for their CACHE properties 3340, 3341 and 3342.

Arbitrarily complex structures of virtual appliances can be described in a uniform way by capturing the set of instances that participate in them, configuration parameters for each instance and the connections between their terminals. This allows the inventive system to instantiate such structures automatically, by interpreting such structure descriptions, instantiating virtual appliances, configuring them with the provided values and establishing virtual wires through which the appliances could interact.

To assist the design of appliance structures, it is preferable that each described instance is assigned a human-readable name that identifies the role that such instance plays within the structure.

Composite Appliances

Since the inventive system can easily instantiate structures of virtual appliances on demand and in a uniform way, it is now possible to define a new, inventive type of virtual appliances called Composite Appliances. A composite appliance comprises a boundary and an interior. The boundary of a composite appliance is defined in the same way as the boundary of a regular virtual appliance, and the interior of a composite appliance comprises a structure of virtual appliances.

Figure 35:
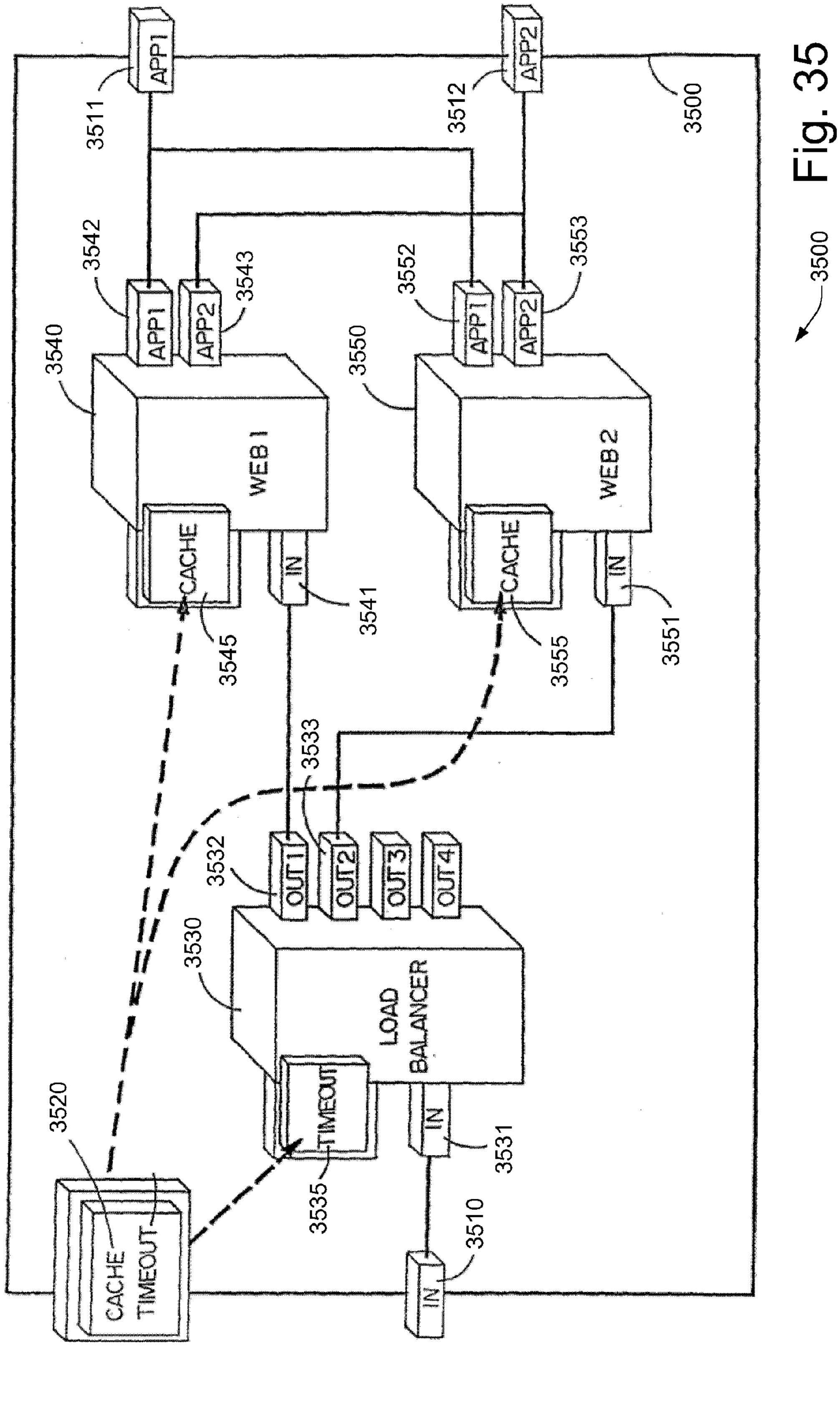
FIG. 35 illustrates an example embodiment of a composite virtual appliance.

FIG. 35 illustrates the inventive composite virtual appliance. It defines a new, composite appliance class 3500 that implements a scalable web tier of a distributed application as a single appliance. The boundary of the appliance 3500 comprises an input terminal 3510 and two output terminals 3511 and 3512, as well as properties 3520 and 3521. The interior of the appliance 3500 comprises the load balancer instance 3530 and two instances of a web server, the instances 3540 and 3550. The input terminal 3510 is connected to the input terminal 3531 of the load balancer; the outputs 3532 and 3533 of the load balancer are connected to the input terminals 3541 and 3551 of the web servers 3540 and 3550, respectively. The outputs 3542 and 3552 of the web servers are connected to the output 3511 of the composite; while the outputs 3543 and 3553 are connected to the output 3512.

Furthermore, property 3521 of the composite is redirected to the property 3535 of the load balancer 3530, while the property 3520 of the composite is redirected to the properties 3545 and 3555 of the web servers.

The resulting composite appliance 3500 can be used in any structure or application in the place of a web server such as 3540, without having to know anything about its interior or even the fact that it is a composite appliance. Unlike the web server 3540, it will deliver increased performance and increased resilience to hardware failures (since it can operate with one of the web servers 3540 or 3550 having failed), without increased visible complexity in the target application.

An example embodiment of a text descriptor form of a composite appliance (e.g., similar to the composite appliance 3500) is illustrated, for example, at FIG. 14 of U.S. Pub. No.

20070078988. The descriptor preferably assigns a name to the appliance class, identifies properties, terminals and volumes visible on the boundary of the appliance, lists the subordinate instances that form the structure of the appliance, assigning a name to each instance, identifying the class of the instance, and configuring each instance by assigning values to one or more properties, attributes and/or volumes; and describes the connections between terminals of subordinate appliances, as well as between the terminals defined on the boundary of the composite appliance and terminals of its subordinates.

In particular, an example embodiment of a descriptor provides a simple way to "redirect" a property of the composite appliance to one or more of its subordinates. For example, the property "cache_sz" of the web_tier composite appliance (assembly) is redirected to the property "cache_sz" of its subordinates "web1" and "web2" by means of specifying "$.cache_sz" in place of an explicit value in the configuration section of each of those subordinates. This has the effect of configuring each of the web1 and web2 subordinates with the actual value with which the web_tier composite is ultimately configured in the target application.

To implement support for composite appliances, the inventive system preferably implements a property mechanism that redirects properties of the composite to one or more properties of its subordinate instances, by redirecting configuration values set on an instance of a composite appliance to properties of the appropriate subordinates, as defined by the interior structure; and a terminal mechanism that forwards the configuration information required to create virtual wires received by the terminals of the composite appliance to the terminals of the appropriate subordinates to which they are connected. Such mechanisms can be implemented by the system runtime support similar to [XDL] or, preferably, by a structure linker utility that resolves property and terminal forwarding references prior to instantiating the application.

Catalogs and Applications

The present invention defines a way to package multiple classes of virtual appliances into class libraries called Catalogs. The catalogs can be used in multiple applications.

Each virtual appliance class preferably comprises a class descriptor and one or more volume images referenced by the descriptor. Each composite appliance class preferably comprises a class descriptor similar to the class descriptor of the regular virtual appliance classes and an interior descriptor that captures the structure that implements the composite.

A catalog preferably comprises a catalog package descriptor that identifies the classes included in the catalog and the class descriptors, volume images and interior descriptors of those classes. A catalog can be implemented as a shared directory on a network in which all descriptors and volume images reside. Alternatively, a catalog may be exposed through a web or ftp interface on the Internet.

Figure 36:
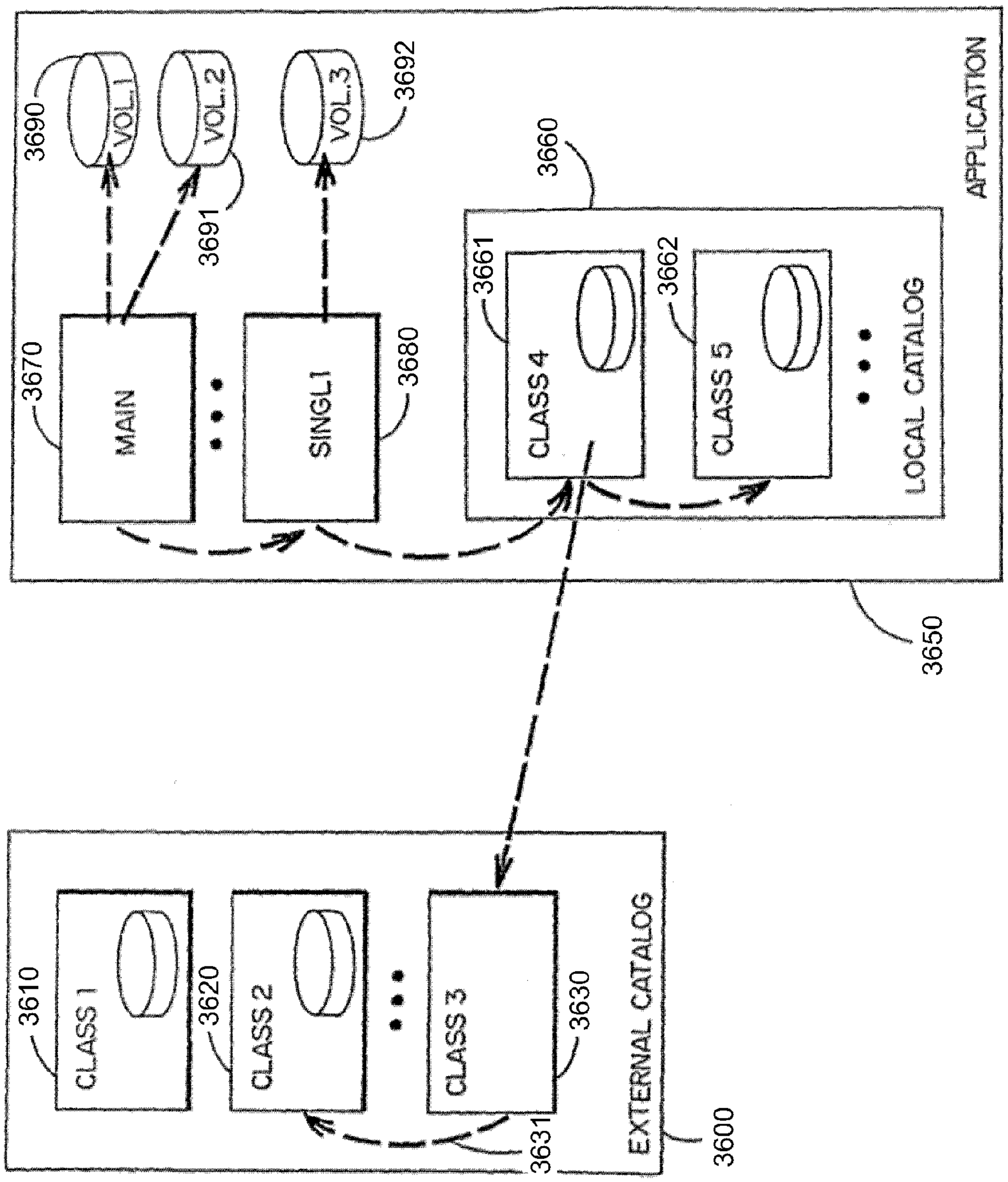
FIG. 36 illustrates an example embodiment of a structure of a distributed application.

FIG. 36 illustrates the inventive catalog structure. It includes the external catalog 3600, comprising classes 3610, 3620 and 3630. The classes 3610 and 3620 are regular virtual appliances and contain no references to other classes. Unlike them, the class 3630 is a composite virtual appliance and contains at least one instance of the class 3620 and, therefore, has a reference 3631 to the class 3620.

Classes included in catalogs preferably have names that are unique within the catalog. When a class makes a reference to another class contained within the same catalog, the name of that class is sufficient to resolve the reference. Whenever a class has a reference to a class belonging to another catalog, the name of the catalog is preferably pre-pended to the name of the class to form a name that is unique within the inventive system.

FIG. 36 also illustrates the structure of the inventive application. The application 3650 is described as a package that comprises a local catalog 3660, a MAIN singleton class 3670, and another singleton class 3680, as well as the application volumes 3690, 3691 and 3692. The local catalog 3660 is a catalog containing the classes 3661 and 3662 which are specific to the application 3650 and are not intended to be used outside of it.

The present invention defines a singleton class as a class of which only a single instance may be created. Singletons may not exist outside of the scope of an application and cannot be included in shared catalogs. Each application preferably has at least one singleton, the MAIN 3670, which includes the top-level structure of the application. In addition to the MAIN singleton, other singletons can be used to define subsystems of the application that are not intended to be instantiated by design. All singletons in an application preferably reside directly in the application package and outside of the local catalog.

Each application preferably contains one or more virtual volumes that are not directly associated with any virtual appliance class. Such volumes may be used to store application-specific content, code packages, libraries and databases, in a layout convenient for access by the operator and are bound by configuration to virtual appliance instances that require access to such data.

Using the Application Model

The abstractions defined in the application model are sufficient to describe constructively the structure of an arbitrary distributed application without references to the hardware system on which it would execute, and without explicit dependencies on the actual software functionality encapsulated in each of the virtual appliances. Moreover, the structure and configuration of the application defined in the terms of the application model can be easily expressed through a set of static descriptors using a structure descriptor language such as XML. Various example embodiments of structure description language are illustrated, for example, in FIG. 7 and FIG. 14 of U.S. Pub. No. 20070078988. In at least one embodiment, as a structure description language, this language may be semantically equivalent to XML but is less verbose and more suitable for direct editing by humans.

Using this language, an arbitrarily complex distributed application can be described in a set of text files, such as, for example, one or more of the following (or combinations thereof): (1) virtual appliance descriptors; (2) composite appliance boundary descriptors; (3) composite appliance interior (assembly) descriptors, and (4) package descriptors. In at least one embodiment, this set of descriptors, together with the images of class volumes and application volumes, is sufficient to instantiate and execute the application on any hardware system that supports resource virtualization and other services defined by the present invention.

2. Example Visual User Interfaces

Although it is possible to practice the present invention by expressing the application design directly in a structure description language using text editing tools, one example embodiment of a method of practicing at least one embodiment described herein is to design, implement, integrate and deploy applications in a visual manner. This takes full advantage of the fact that all abstractions defined in the application model—virtual appliances, structures of appliances, composite appliances and whole applications—are easy to visualize and most operations with them are easy to implement as visual operations on a computer user interface.

This section describes an example embodiment of a user interface for visualizing distributed applications and operations on them. The phrase "the user can", "the editor allows the user to", and similar phrases, throughout this document, are used to also denote that "the editor has means to" or "the system has means to", as appropriate in context.

Overview

The primary functionality of the user interface is implemented by an application editor that makes it possible to create, edit and save the descriptor files that comprise a distributed application. In at least one embodiment, the editor is preferably implemented as a web-browser based user interface, allowing access to the editing functionality from any workstation having network connection to the inventive system. An example embodiment of an application editor with a distributed e-commerce application displayed on the canvas is illustrated, for example, in FIG. 20 of U.S. Pub. No. 20070078988.

Even though the editor preferably operates in a browser, its user interface preferably looks, feels and behaves as a desktop windowed application. The visual layout and behavior of its user interface is preferably similar to stencil-and-canvas drawing tools, similar to Microsoft Visio, Kivio for Linux, Corel Draw, and others, and is further specialized to easily draw and connect structures of components with terminals.

In at least one embodiment, the property sheet screens and behavior of the editor may be similar to most desktop windowed applications, such as Microsoft Windows Explorer property sheets and follow similar visual design guidelines.

At user's option, different scopes (e.g., composite appliances) of the application can be either opened in different browser windows or may replace the content in the same window. The editor preferably supports both visualization options.

Most operations in the editor may be implemented so that they can be applied to a single component or to a selected set that contains multiple components. Such operations preferably include at least drag and move on the canvas; cut, copy and delete; and modifications achieved through property sheets.

The windows displayed by the editor have titles that preferably contain the name of the component being edited, the type of editor and the name of the application. It is also preferable that the editor performs basic file locking on descriptor files on which it presently operates, similar to the locking schemas employed typically by text editors, such as the "vi" editor in Linux. This allows multiple users to safely view and/or edit one and the same application.

The editor preferably does not save any modifications to the application made by the user until the user explicitly chooses a "save" operation. If, while navigating through the application, the user tries to close a window or navigate away from the modified component, and changes would be lost, the editor preferably prompts the user, giving him an option to save or discard the changes.

The editor preferably implements a different screen for each type of entity being edited. These screens preferably include: a list of available applications, a virtual appliance editor, a composite appliance boundary editor and an assembly (interior) editor. In addition, the editor preferably allows visual operations between entities, such as dragging virtual appliances from a catalog onto the application canvas and vice-versa.

The Application List

The application list is preferably the first screen that the user sees after logging in. This screen preferably contains the list of applications available for editing and provides the ability to select and open for editing or viewing one of these applications. In addition, the screen preferably provides ability to execute certain actions over whole applications, such as creating a new application, deleting a whole application, renaming an application, etc.

Each entry in the application list preferably includes the name of the application, a human-readable description and a unique identifier.

The Virtual Appliance Editor

Figure 37:
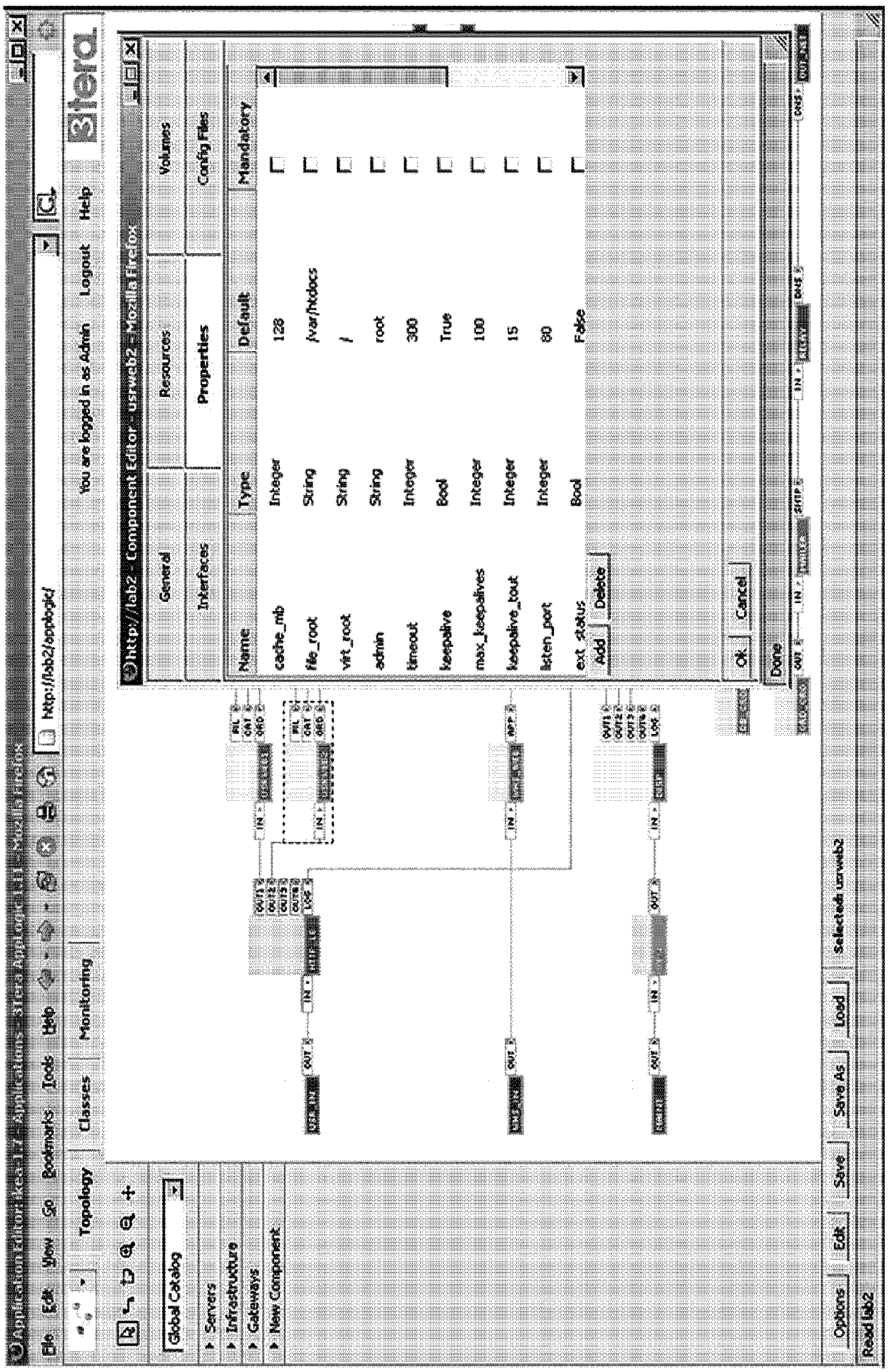
FIG. 37 illustrates an example embodiment of a user interface for defining virtual appliances.

The virtual appliance editor (also known as the component editor) is preferably a property sheet window for editing virtual appliance classes. All information available in this editor is obtained from and stored in the component descriptor file of the edited virtual appliance class. The appearance of the editor is preferably distinctly different from other property sheets, especially from the instance settings property sheet of the assembly editor. FIG. 37 illustrates an example embodiment of a visual interface of the virtual appliance editor.

The virtual appliance editor preferably displays a preview of the appliance's graphical shape, showing the correct size and color, as well as the terminals, their names and positions. It is preferred that the editor opens in read-only mode for all appliance classes except singletons included directly in the application package.

The virtual appliance editor preferably comprises the following sections, with each section implemented as a separate property sheet tab: a general section, an interfaces section, a volumes section, a resources section, a properties section and a configuration files section.

The general tab preferably contains common class attributes, as well as some visual attributes. An example of the fields available through this section includes the class name, a description, operating system type, whether instances of this class can be migrated live from one server to another, as well as visual shape, size and color.

The interfaces tab preferably allows the user to view, edit and create the set of virtual appliance interfaces, including both terminals and virtual network adapters. It preferably displays a list of terminals showing, for each terminal, its name, direction (input or output), communication protocol for connections on that terminal and a "mandatory" attribute that defines whether the terminal may be connected in order for the appliance to operate. For "raw" virtual network adapters—those that are not associated with a terminal—the editor may allow defining and editing the MAC address.

Using the interfaces tab, the users can add, delete or rename terminals in the list. The terminal's position, such as the side of the component's shape on which the terminal appears, and its order among other terminals on that side, may be editable as well. The editor preferably allows the user to insert gaps between terminals, so that terminals can be visually grouped, as convenient.

The volumes tab preferably defines the set of volumes to be used by instances of the virtual appliance class being edited. The list includes both class volumes, which are to be instantiated with the appliance, and placeholders for application volumes, which are to be parameterized on each instance of the appliance. For each volume, the editor preferably allows the user to define a logical name that determines the role of the volume within the appliance, a mount path under which this volume will be visible to the software inside of the appliance, and a boot attribute defining whether this volume is the boot volume for the appliance. The user can add, delete and rename volumes in the volume list.

In addition, the volumes tab preferably allows the user to define a variety of attributes for each volume. Such attributes may include class vs. placeholder, a "mandatory" attribute for placeholders that defines whether the appliance may be parameterized with a valid volume in order to operate. In addition, the editor preferably makes it possible to restrict the access of the appliance instances to a given volume to read-only access, as well as to express constraints, such as "high-bandwidth access" and "local access only" that allow the inventive system to optimize the placement of the volumes and virtual machines that comprise appliance instances.

The resources tab preferably allows the user to set minimum and maximum values for each hardware resource required to execute an instance of the virtual appliance. Such resources include at least CPU time, memory size and network bandwidth. The system can use these values to ensure that sufficient resources are available for each virtual appliance instance, as well as to prevent any particular instance from depriving the rest of the executing instances of any particular resource.

The property tab preferably allows the user to define, view and edit the list of properties made available on each instance of the edited virtual appliance class. It preferably contains a list of properties, specifying for each property its name, data type, whether setting this property is preferred on each instance, a default value, and optionally, constraints, such as range for integer properties, maximum length for strings, and enumerated list of allowed values. The user can add, delete and rename properties on the list, as well as edit any of the attributes of each property.

The configuration files tab preferably lists the set of configuration files contained within the virtual appliance to which property values are to be applied at instantiation. For each configuration file, the tab preferably includes the logical name of the volume (as defined in the volumes tab) on which the file is to be found, the path of the file relative to the specified volume, and additional information, if needed, such as special character escaping rules for that file. The user preferably can add and delete configuration files, and edit the information for each file.

The Composite Appliance Boundary Editor

The boundary editor is preferably a property sheet that allows the user to define the boundary and other elements of a composite appliance that are not related to appliance's interior structure. This editor is visually and semantically similar to the virtual appliance editor, except that it operates on composite appliances.

The editor preferably operates in read-only mode for all classes except singletons included directly in the application package, and is preferably divided into several sections (tabs).

The general tab contains common class attributes, as well as visual attributes. Those preferably include the class name, a description, shape color, size and style.

The terminals tab preferably allows the user to view, define and edit the set of terminals exposed on the boundary of the composite appliance. It preferably contains a list of terminals, including, for each terminal, its name, direction (input or output), and a "mandatory" attribute. The user can add, delete and rename terminals, as well as edit the data related to each terminal. The terminal's visual position on the appliance shape, such as side and order of terminals, can be edited as well; gap insertion is preferably supported if it is supported for virtual appliances.

The properties tab preferably allows the user to define the set of properties that is to be exposed on the boundary of the composite appliance. It preferably includes a list of properties, defining, for each property, name, default value and an optional "mandatory" attribute. The user can add, delete and rename properties, as well as edit data related to each property.

The volumes tab allows the user to define a set of volume placeholders that can be configured with references to application volumes on the boundary of the instances of the edited composite appliance class. For each volume placeholder, the tab preferably provides name, an optional "mandatory" attribute, as well as other attributes, such as shared or read-only. As in other tabs of this editor, the user can add, rename, delete or edit list elements.

The Assembly Editor

The assembly editor is the main screen of the application editor. It allows users to view and edit the interior structures of composite appliances. This includes adding or removing subordinate instances, configuring each of those instances, and creating the structure by interconnecting their terminals. In addition, the assembly editor preferably supports the ability to customize virtual appliance classes in a convenient visual way. To achieve these functions, the assembly editor preferably provides the means for opening the other editors, such as the virtual appliance editor, the boundary editor, etc.

In at least one embodiment, the assembly editor provides a drawing canvas on which appliance instances, virtual or composite, are configured and assembled into structures. The editor preferably includes one or more palettes that make it possible to select the classes of virtual appliances to be included in the structure from a catalog, recycle bin, etc.

To create an instance, the user preferably selects an appliance class from a palette and drags it onto the canvas. If the selected class is a virtual or composite appliance, the editor will create an instance of that class. If a special "blank" class is selected, the editor will preferably create a new singleton class and place it directly in the application package; as well as create an instance of this class. In addition, the editor will generate automatically a name for the instance and/or, optionally, for the singleton, so that the name is unique within the structure being edited.

The editor preferably displays each instance as a rectangular shape with attached terminals. The color, style and size of the shape, as well as the positions of the terminals, are as specified when defining the virtual appliance class to which this instance belongs.

For each instance, the editor preferably displays the class name within the body of the instance, the instance name outside of the body, the name and direction of each terminal within the terminal, and zero or more selected attributes that apply to this appliance.

Once an instance is created on the canvas, the editor allows the user to drag it freely around the canvas, changing its position, and preferably preventing the user from placing it directly over another instance.

The terminals of the instance can be connected by preferably clicking on one of the terminals and dragging a connection to the other terminal. In at least one embodiment, the editor preferably allows output terminals to be connected only to input terminals and input terminals only to output terminals. Each output is preferably connected to only one input, while many outputs can be connected to the same input.

Whenever multiple outputs are connected to the same input, the resulting connections may be joined visually as close to the outputs as possible to prevent clutter.

The editor routes connections automatically by default, and preferably allows the user to re-route any connection manually by dragging moveable lines and corners of connections, and by adding or deleting line segments.

The editor allows the user to select one or more instances and apply various operations to them. Whenever a selected instance or group is moved, their connections are preserved as much as possible; this includes preserving all connections between the selected instances, and re-routing any connections from a selected instance to a non-selected instance.

Figure 17:
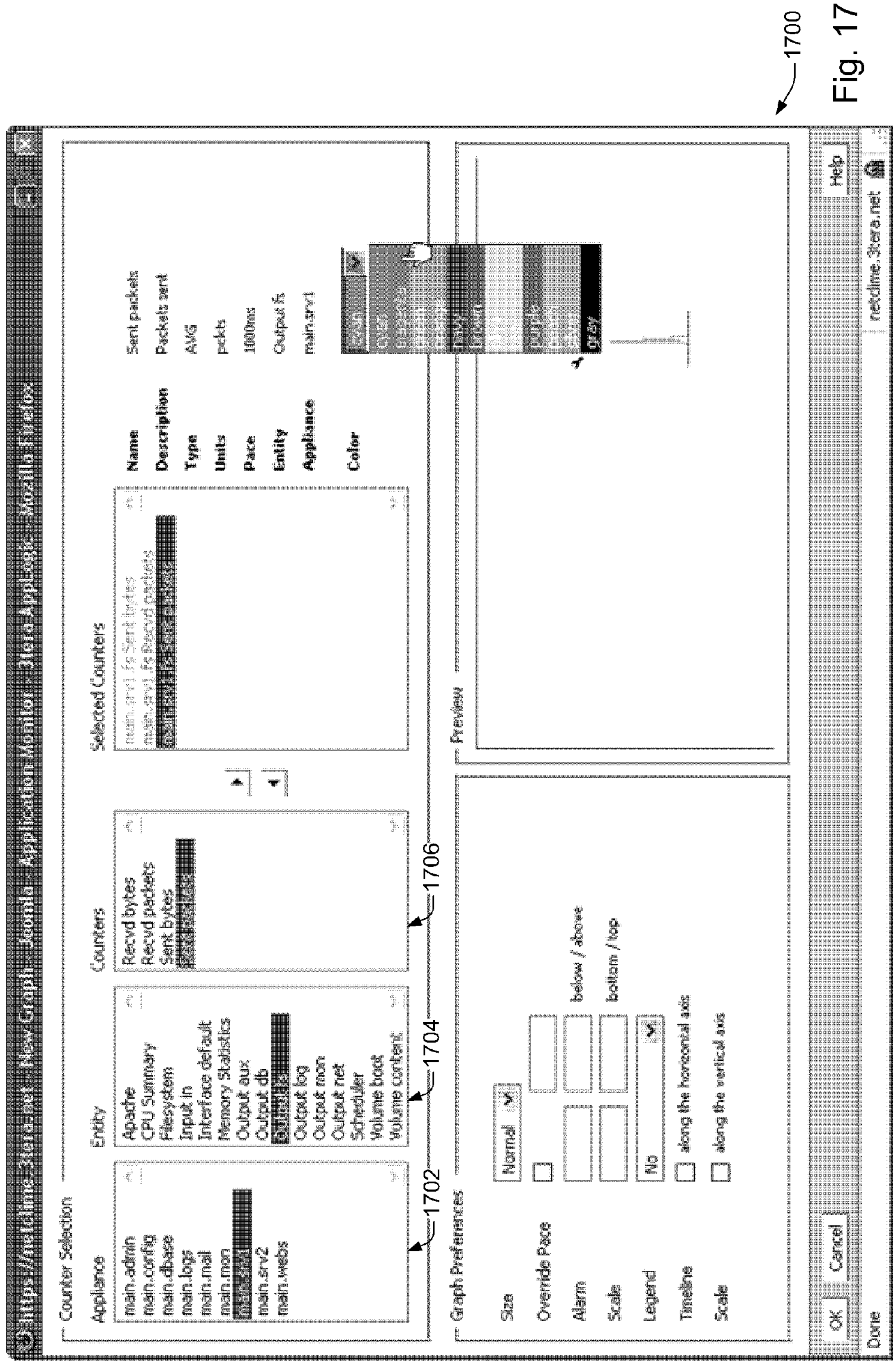

An example embodiment of the interior of a composite appliance "Web Tier" opened in the assembly editor is illustrated, for example, in FIG. 17 of U.S. Pub. No. 20070078988. In at least one embodiment, the terminals of the composite appliance may be visualized on the canvas as small, pseudo-appliances, with one terminal each, indicating the name and direction of the respective terminal, and can be connected to the interior structure.

In addition to instances, terminals and connections, the user can preferably add text box annotations on any place on the canvas. The editor will preserve such annotations as comments in the structure describing the appliance interior.

The editor preferably allows the following operations over selected appliance instances: cut, copy, paste, view/edit class boundary, view/edit class interior (for composite appliances), configure instance, and branch class. Those operations may be selected by a right-button click on the instance shape, which opens a context menu and selecting the desired operation from the menu. The semantics of the cut, copy and paste operations are the same as in any windowed editor; viewing class boundaries and/or interiors is accomplished by starting the appropriate editor over the class of the selected instance. Configuring instances is accomplished by displaying a special instance settings property sheet that is preferably part of the assembly editor and displays and modifies data within the same structure descriptor.

Catalog Palettes

The visual editor preferably provides a set of palettes, one for each catalog made available to the user. The user is preferably able to select a subset of catalogs to be displayed at any time. Each palette displays an icon for each appliance class found in the respective catalog, with the icon visually resembling the shape of the component as much as possible. The icons displayed may be grouped by category of appliance they represent, such as servers, infrastructure, gateways, load balancers, etc.

Dragging an icon from the catalog onto the canvas preferably has the effect of including a new instance of the selected class into the edited structure. Dragging a special "blank" appliance or a "blank" composite appliance from the palette preferably creates a singleton class included directly in the application package, and an instance of this class included into the edited structure.

A right-button mouse click on an icon in the catalog preferably opens a menu that gives the user options, such as deleting or renaming the class, creating an instance of the class (same as drag to canvas), copying the class, moving the class to another catalog or converting it to a singleton, viewing the appliance boundary and interior (if the appliance is a composite). In addition, double-clicking on an appliance icon in the catalog palette preferably opens up the respective editor to display detailed boundary information about that class.

Class Branching

Branching a class involves creating a copy of the class of the selected instance, designating such copy as a singleton class, placing the singleton class directly in the application package, and changing the class of the selected instance to the new singleton class. Branching creates a tightly coupled pair comprising an instance and a singleton class, which can be edited as single entity.

Adding a Class to a Catalog

To add a new class to a catalog, the user preferably converts a singleton into a class. To do this, the user selects the instance of the singleton on the canvas and drags it into the desired catalog's palette. The editor then creates the appropriate class within the catalog structure, copies and/or moves all class data and volumes into the catalog, and preferably deletes the singleton. In addition, the instance that was selected to initiate the operation is preferably removed from the structure.

Instance Settings

The instance settings property sheet allows users to configure a subordinate instance in a structure of virtual appliances. Unlike in appliance and boundary editors, in which changes apply to the all future instances of the edited class, instance settings apply only to the selected instance. Instance settings override any default values specified in the class.

In any place within the instance settings property sheet where the user is expected to input a specific value, the editor allows the user to specify a "reference" to a property of the composite that contains that instance. If such reference is specified, the system will substitute it at the appropriate time with a value assigned directly or indirectly to the respective property of the composite. This makes it possible to "redirect" a property, attribute or volume of the composite instance to one or more properties, attributes or volumes of its subordinate appliances.

The instance settings may be divided into several sections (tabs).

The attributes tab contains the instance name, as well as a set of attributes that apply to that instance. The tab preferably includes the class name and may include optional attributes, such as a start order, migrateable, standby, etc.

The resources tab preferably makes it possible to override the resource constraints specified in the class of the virtual appliance to further reduce the range of resources available to the particular instance, if desirable.

Figure 18:
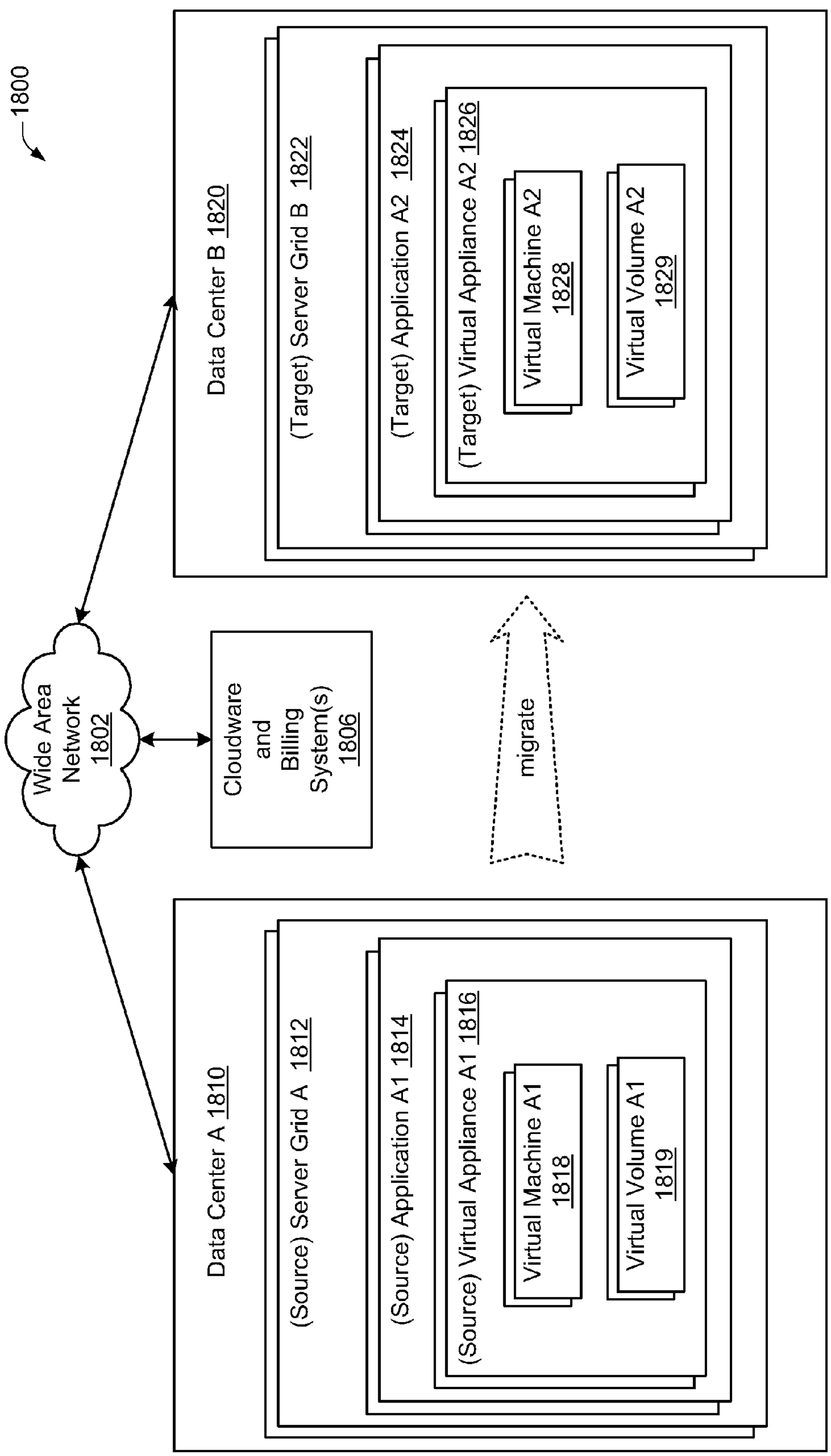
FIG. 18 shows an example embodiment of a geographically distributed cloud computing network 1800.

FIG. 18 of U.S. Pub. No. 20070078988 illustrates an example embodiment of a design of the instance settings volumes tab. It allows the user to configure the instance, so that it can access a specific application volume. To achieve this, the instance is preferably configured with the name of the desired application volume.

Figure 19:
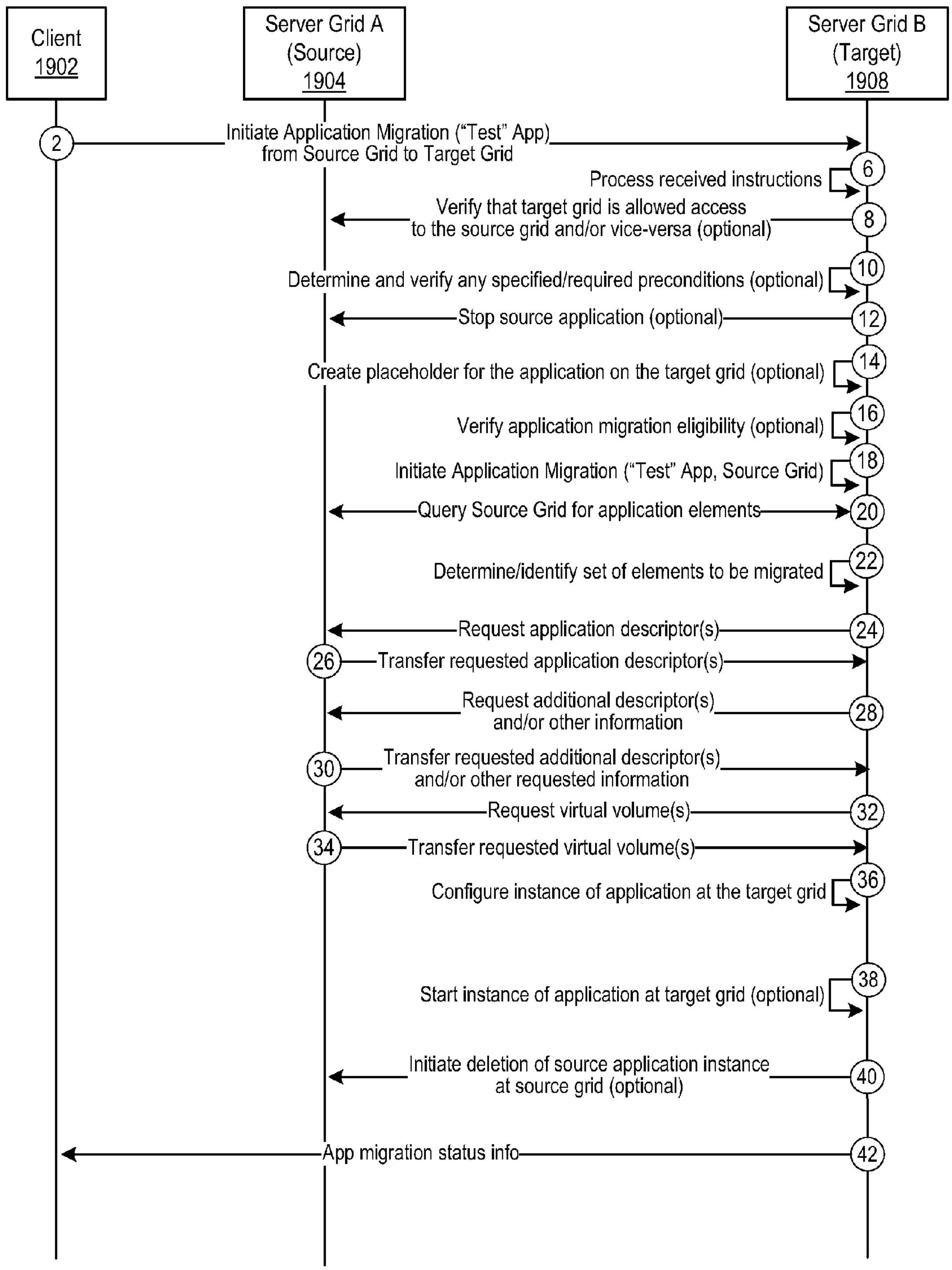
FIG. 19 shows an example embodiment of an interaction diagram illustrating an example of a distributed application migration procedure between two geographically distributed server grids.

FIG. 19 of U.S. Pub. No. 20070078988 illustrates an example embodiment of a design of the instance settings properties tab. It allows the user to set property values that configure and specialize the instance for its role within the structure. For each property defined on the class, the user may view the default value, if any, and override it if desired. In addition, the user may select one or more properties and their values to be displayed by the editor in the vicinity of the instance's shape on the canvas, thereby improving the readability of the diagram.

Application Configuration

In addition to editing various sub-entities within the application, the visual editor preferably allows users to define application-level configuration parameters that can be used to modify the behavior of the application as a whole, bind it to a particular hardware configuration, etc.

The application configuration property sheet is preferably divided into several sections (tabs).

The general tab describes the application as a whole, including name, version, human-readable description, comments, unique ID, etc.

The application resources tab defines a subset of the hardware resources within the inventive system that are to be assigned to the given application. The tab preferably contains two general groups of fields, one for hardware resources, and the other for IP network settings.

Hardware resources may be specified in terms of number of CPUs, total amount of memory and bandwidth to be committed to the application. In some embodiments of the system, it may be preferable to specify the hardware resources in an alternative fashion, such as total number of servers assigned to the application or a list of specific servers designated to run it.

The IP network settings group preferably defines the range of IP addresses to be allocated for internal use by the inventive system when running this application.

The property tab is preferably similar to the instance settings property tab discussed above, and makes it possible to configure the application as a whole in a manner similar to configuring any other composite appliance.

The application volumes tab preferably enables the user to create and manage a set of application volumes associated with the given application, assign their names and sizes, and configure the application in using them. The user can add, rename and delete volumes; and assign reference to volumes to volume placeholders exposed on the boundary of the application in a manner preferably similar to configuring any other composite appliance.

3. Example Visual Method

The present invention teaches a visual method for rapid design, construction and deployment of distributed applications using the application model and visual interface described herein. In this section, we will discuss in more detail the basic steps required for practicing this method. Those steps comprise creating a virtual appliance, assembling a composite appliance from existing appliances, creating a new appliance class in a catalog and creating the application. In addition, this section covers related topics such as troubleshooting applications designed with the inventive system and monitoring their execution.

Creating a Virtual Appliance

To create a new virtual appliance using the inventive system the user preferably opens the application editor and drags a blank virtual appliance onto the editor canvas. This creates a new, automatically named singleton class and an instance of that class. The user then selects the new instance and opens the virtual appliance editor on its class.

Using the virtual appliance editor, the user defines the new virtual appliance by specifying appropriate class name, and a set of properties, terminals, interfaces and volumes. In addition, the user selects appropriate values for hardware resources, properties and execution attributes that will be used as defaults for new instances of this class.

Through the application settings screen, the user creates one or more application volumes that will be later used as class volumes for the new virtual appliance and then installs or copies the desired combination of operating system, add-on software packages and configuration data for the appliance. The user further configures the various software packages that may operate together inside the appliance in accordance with their documentation. In addition, the user selects configuration files and parameters within them that are to be exposed for configuring the virtual appliance and maps them to properties using one of the property mechanism methods described herein.

Further, the user configures the software packages within the appliance to use the names of the terminals defined on the boundary of the appliance. If the appliance does not have multiple input terminals with the same protocol, the software within the appliance is configured to listen for incoming network sessions in the conventional way (e.g., by port number only). If two or more input terminals are defined with the same protocol, for each such terminal, the user has to configure the software so that it will listen for network sessions using the name of the desired terminal as a network host name.

For output terminals, the user configures the appropriate software packages as if the name of the respective output terminal was the name of a remote network host to which the package is expected to establish a communication session.

Once configured, the volumes are bound to the appliance being created by opening the instance settings property sheet on the appliance instance and configuring each volume placeholder with the name of its respective application volume.

Creating a Composite Appliance

To create a composite appliance, the user drags a blank composite appliance onto the editor canvas, thereby creating a singleton composite class with an automatically generated name and an instance of that class. The user then selects the newly created instance and opens the boundary editor on its class.

Using the boundary editor, the user defines the new class by selecting an appropriate name for it, and defining its terminals, properties and volume placeholders, as desired.

The user then proceeds to edit the interior of the new class, by selecting the instance and choosing the "edit interior" option from the context menu. A new editor window opens providing a canvas for defining the interior, on which the terminals of the composite have already been placed.

The user creates the desired structure, by: (a) adding appliance instances by selecting appropriate appliance classes from a catalog and dragging them on the canvas, (b) configuring each instance through the instance settings property sheet, and (c) connecting the terminals of the instances and the terminals of the composite into the desired structure. Note that within the interior, an input terminal of the composite behaves as an output (e.g., it is connectable to exactly one input of a subordinate appliance), and an output terminal of the composite behaves as an input (e.g., multiple outputs of various subordinates may be connected to it).

Wherever desired, the user redirects properties and/or volumes of the composite to properties and/or volumes of one or more subordinates, by referencing them in configuration of the instance settings of the subordinates as described above.

Creating a Catalog Class

Once a virtual appliance or a composite appliance is created on the canvas, it can be dragged onto one of the available catalogs to create a catalog class from which multiple instances can be created. The act of dragging the appliance onto the catalog converts the singleton into an identically named catalog class, includes that class in the package of the desired catalog, and deletes the instance used to create and edit the new appliance.

In the process of creating a new catalog class, application volumes that are configured as class volumes of the new class, are converted into instantiable class volumes by the inventive system and removed from the list of application volumes accessible by the user.

Creating an Application

The inventive system preferably implements an application as a combination of a package descriptor, a singleton composite appliance named "MAIN", and an optional catalog. Assuming that all required appliance classes already exist in one or more available catalogs, assembling the application is equivalent to creating the interior of the MAIN composite.

The MAIN composite preferably has no terminals, since the application is expected to interact with the rest of the computer network through one or more virtual network adapters defined on one or more instances of virtual appliances included in the application. Such interactions may be carried out by means of standardized input and output "gateway" appliances, thereby isolating most of the application from having to know the details and settings of such interactions.

The act of creating an application in general comprises an iterative process that combines top-down decomposition of the desired functionality into subsystems, which are expressed as composite appliances, with the bottom-up assembly of subsystems and other composites from available appliance classes. In the process, it may be discovered that creating a new virtual appliance class is required to best express a sub-function of a given subsystem; in this case the appropriate class is created either from scratch or, more often, by branching and customizing an existing appliance class.

The design of the new application is complete when the MAIN singleton is fully assembled and all subordinates included in it exist and are properly configured. As soon as this stage is achieved, the application is immediately ready for execution on a target hardware system: the set of descriptors and volumes that comprises the application designed as the present invention teaches contains all necessary software packages, data, configuration parameters and structural information required to create a running instance of the application under the control of the inventive system.

It is important to realize that the user does not have to wait until the target application is fully elaborated before running it: any subset of the application, being it a single virtual appliance, an incomplete structure of virtual appliances, a finished application subsystem such as a database cluster or a web tier, or an application that is not completely configured, can be started on the inventive system subject only to the software packages included in the existing virtual appliances having sufficient configuration and connectivity to operate.

Considering that the application is a hierarchical structure of composite appliances and is itself a composite appliance, it is beneficial to design the application so that any properties, volumes or attributes that may be desired to change when deploying the application on different systems and locations, are exposed as properties, volumes and attributes of the application (e.g., of the MAIN composite). This makes the whole application, no matter how large and complex, configurable and deployable as easy as a single virtual appliance.

Troubleshooting and Monitoring

When executing an application built using the present invention the inventive system constructs the running image of the application from virtual resources, using structural and configuration information captured in virtual appliances and composites. This way of deploying and executing applications has a significant added benefit in that all structural information captured throughout design and development is available to the system at run time. This makes it easy to correlate monitoring data captured as the application runs with the logical structure of the application, and significantly simplifies the process of troubleshooting and tuning applications and monitoring the execution in production by making it intuitive.

Figure 38:
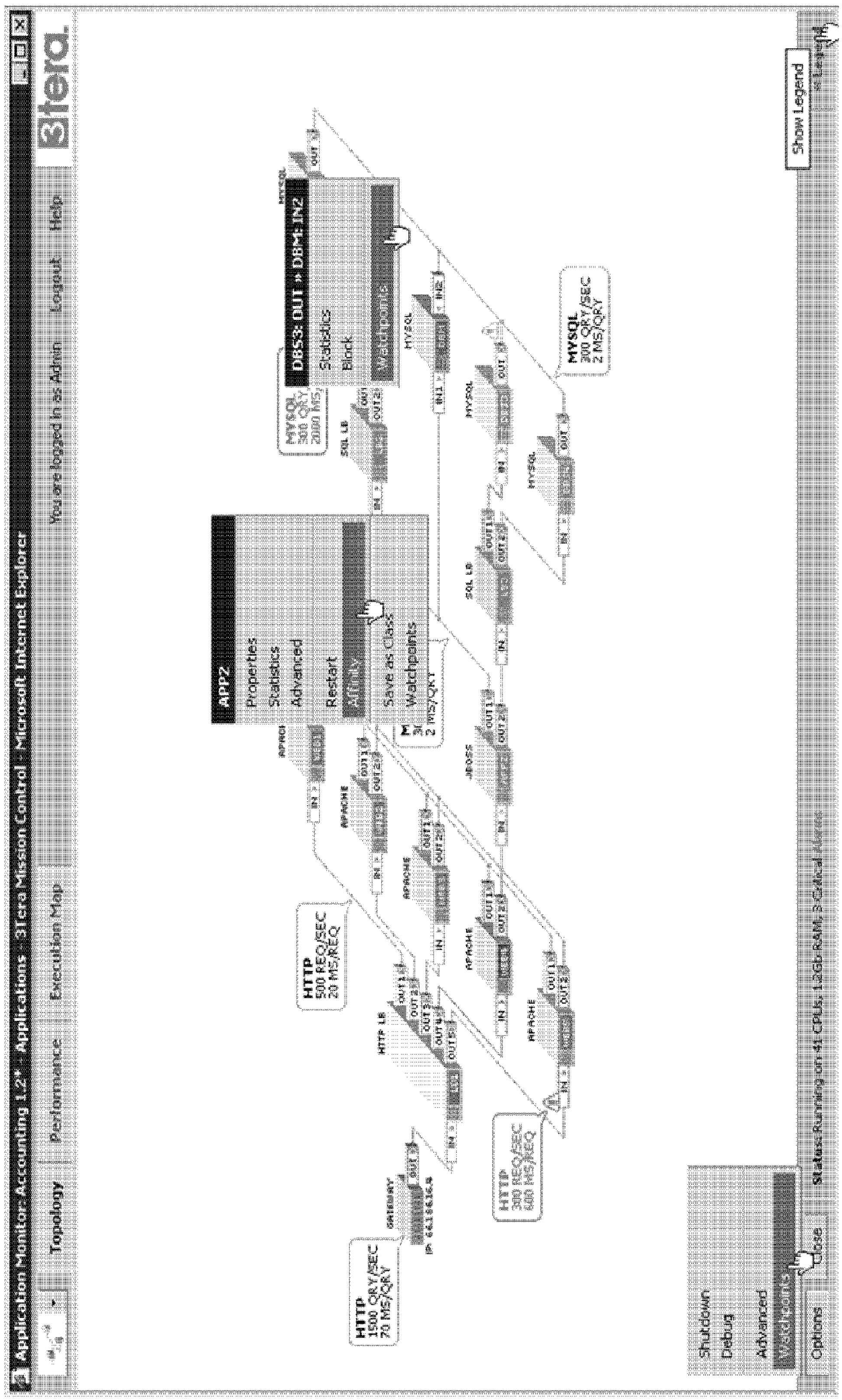
FIG. 38 illustrates an example embodiment of a user interface for application monitoring.

FIG. 38 illustrates the monitoring and troubleshooting user interface in an example embodiment. Typically, each virtual appliance is dedicated to serving a particular function within the application; monitoring the resource usage of the appliance, such as CPU load, memory and bandwidth, provides an excellent indication about the operation of that function. Similarly, it is easy to design virtual appliances so that each terminal represents a distinct incoming or outgoing logical interaction; the result of such design being that most, if not all, connections within the application structure represent distinct logical interactions between different functions in the application. Since each terminal is preferably constrained to a specific connection and protocol type, it is easy to interpret the traffic along any connection to determine key characteristics such as requests per second and response time per request. All of this monitoring data pertains to individual virtual appliances, connections or terminals, and can be easily overlaid on the visual layout of the application structure. As a result, the inventive system presents the user with a live view of the application design, reflecting the state, the load and communication patterns of the application as they develop.

The inventive system also provides easy means to define thresholds of normal behavior on appliance instances and connections, and detect and display abnormal behaviors on the visual layout of the application. This enables the user to formulate and execute corrective actions directly in the terms of the application logic rather than having to continuously translate such actions into the terms of the physical infrastructure on which the application executes.

Change Management and Version Control

One of the problems that is exceedingly difficult to resolve within the prior art systems is the ability to capture and manage the full set of configuration and other changes affected on a running application, the effect of which is that the user is often unable to roll back to a "last known good" state of the application. This problem becomes especially acute when the application is large enough to require multiple people to administer, tune and troubleshoot the system. The existing approach to solving this problem is to introduce restrictive processes and complex change management systems which often aggravate the situation by adding significant complexity.

The present invention enables a simple and effective approach to change management in distributed applications by making it possible to apply technology that is well understood and proven over decades of use to the problem. The inventive system captures the complete structure and configuration of the application, including installed images of operating systems, application software, configuration files, network settings, scripts and user data, sufficient to execute the application on any instance of the inventive system, and retains this data in the form of collection of text files (descriptors) and logical volume images. This makes it possible to use a commercial version control system developed for use in software code development, such as ClearCase or Microsoft Visual SourceSafe, to effectively implement version control of distributed applications during design and development, as well as for change management in the later stages of application delivery and deployment.

Summary

The disclosed visual method makes it possible to construct distributed applications of arbitrary complexity by visually defining a model of the target application that is simple and yet sufficiently complete to allow the inventive system to deploy and execute the application on a variety of target hardware without any further human intervention. This greatly simplifies all activities related to designing, constructing, deploying and managing large distributed applications by eliminating the need for constant manual translation from application logic to hardware configuration and vice-versa.

4. Example System Embodiment

The present invention includes a system that implements the necessary support for the abstractions defined in the application model and for practicing the visual method. In addition, the system provides runtime support for deploying, executing, monitoring and managing applications constructed as the present invention teaches.

Architecture

Figure 39:
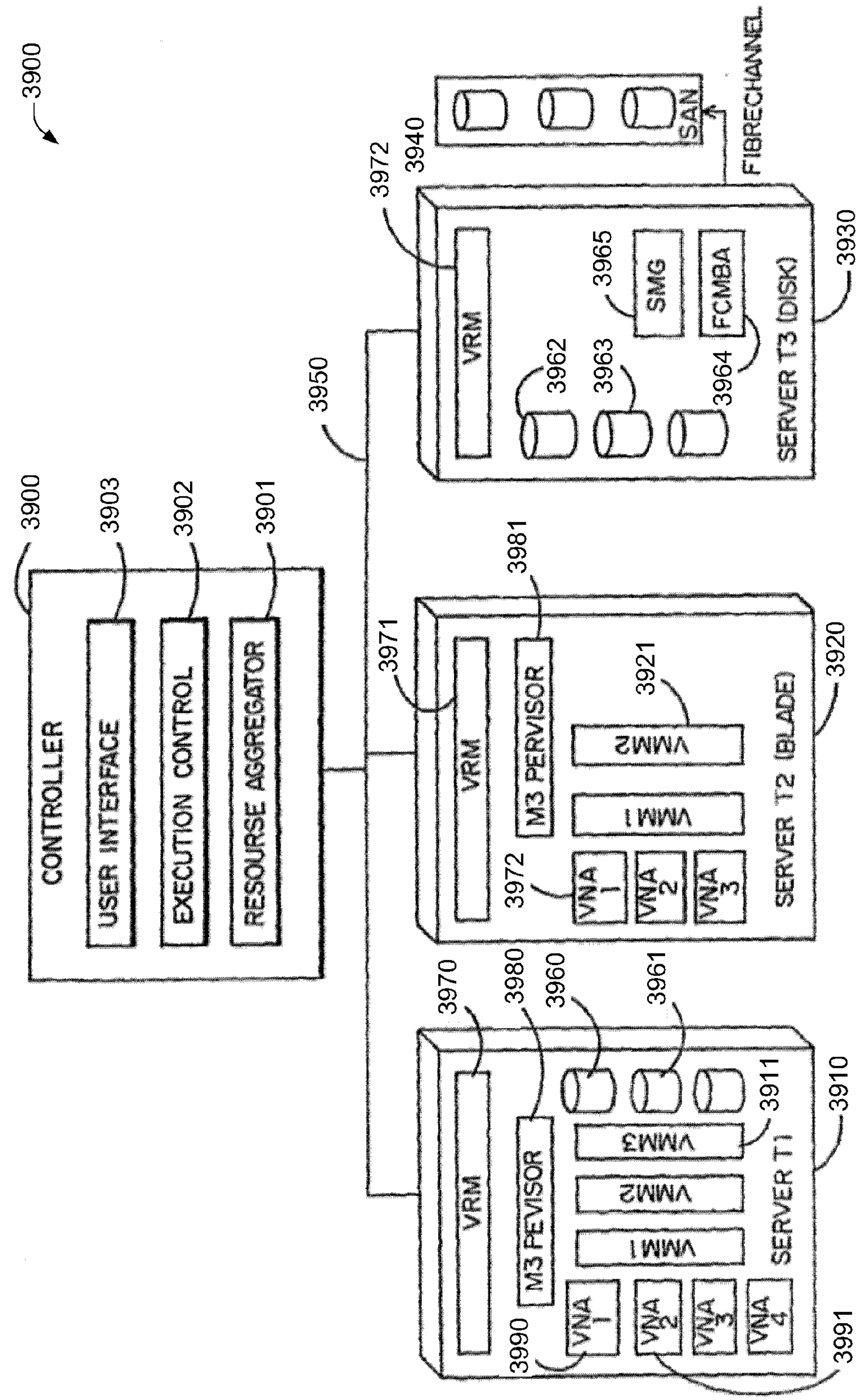
FIG. 39 illustrates an example embodiment of a portion of a system architecture which may be used for implementing various aspects described herein.

FIG. 39 illustrates the architecture of the inventive system. The system comprises a system controller 3900 and one or more servers 3910 and/or one or more server blades 3920. In addition, the system may include a storage area network (SAN) 3940, in which case one or more of the servers, such as the servers 3930 would act as gateways providing access to the SAN 3940 for the rest of the system. All nodes in the system are interconnected through the network 3950 which is assumed to have sufficient bandwidth to carry the operation of the system. The servers 3910 may have hard disks or other storage media attached to them, while the server blades 3920 may be diskless.

In another embodiment described herein, all elements of the inventive system reside on a single server such as 3910, and use the storage attached directly to the server.

Servers 3910 and blades 3920 are configured to boot a suitable host operating system and a virtual machine manager 3980 or 3981, which enables them to be partitioned into multiple virtual machines 3911. In addition, those servers are configured to execute a virtual resource manager 3970 or 3971, which interacts with the controller 3900. The inventive virtual resource manager implements support for virtual network interfaces 3990 and 3991, and for virtual storage volumes 3960 and 3961, sufficient to implement the application model. In addition, each virtual resource manager 3970 controls its local virtual machine manager 3980 and extends its functionality as may be necessary to provide sufficient support for the application model.

In the configuration shown for the server 3910, the virtual resource manager 3970 makes the hardware resources of the server available to the controller 3900 as three distinct pools of virtual resources, including virtual machines 3911, virtual network interfaces 3990 and virtual volumes 3960. The server blade 3920 has no storage and so the virtual resource manager 3971 is configured to make its resources available to the controller 3900 as two pools of virtual resources: virtual machines 3921 and virtual network interfaces 3922.

Unlike servers 3910 and blades 3920, the servers 3930 are configured to provide access only to the storage resources of the SAN 3940. Accordingly, they do not have a virtual machine manager and their local virtual resource manager 3972 interfaces with a suitable SAN management system 3963 to provide a pool of virtual volumes 3960 and 3963 which are physically located on the SAN 3940 and accessed via a FibreChannel interface 3964.

The controller 3900 can access all servers 3910, 3920 and 3930 over the network 3950 and can, therefore, create, control and access virtual machines, virtual volumes and virtual network interfaces, as applicable, on any and all of the above servers. The controller includes a resource aggregator 3901, an execution control module 3901 and a user interface system 3903.

The resource aggregator 3901 provides unified access to the virtual resources exposed by the servers 3910, 3920 and 3930, creating thereby three uniform distributed and scalable pools of virtual resources, one for each type of resource. The resource aggregator preferably abstracts the actual location (e.g., server) on which each instance of a virtual resource resides from the rest of the controller, and also preferably manages the creation of such resources, determining on which server to create each particular resource instance and interacting with that server to this purpose.

The execution control module 3902 uses the resource aggregator 3901 to create, access and manage virtual resources. It provides runtime support for the application model allowing virtual appliances to be instantiated, configured, interconnected, started, executed, migrated from one server to another and monitored. In addition, the execution control module provides the necessary support for composite appliances and applications.

During the execution of an application, the execution control module 3902 may further interface with external software, making such application available for management by conventional data center management software, and forwarding alerts and other events related to the running application to such software.

The user interface system 3903 has two key functions: (a) it implements command line and visual interface to the execution control module and the rest of the inventive system, and (b) it implements the visual user interface (editors) for practicing the method taught by the present invention.

Example Embodiments of Cloudware Architecture Entities

Figure 2A:
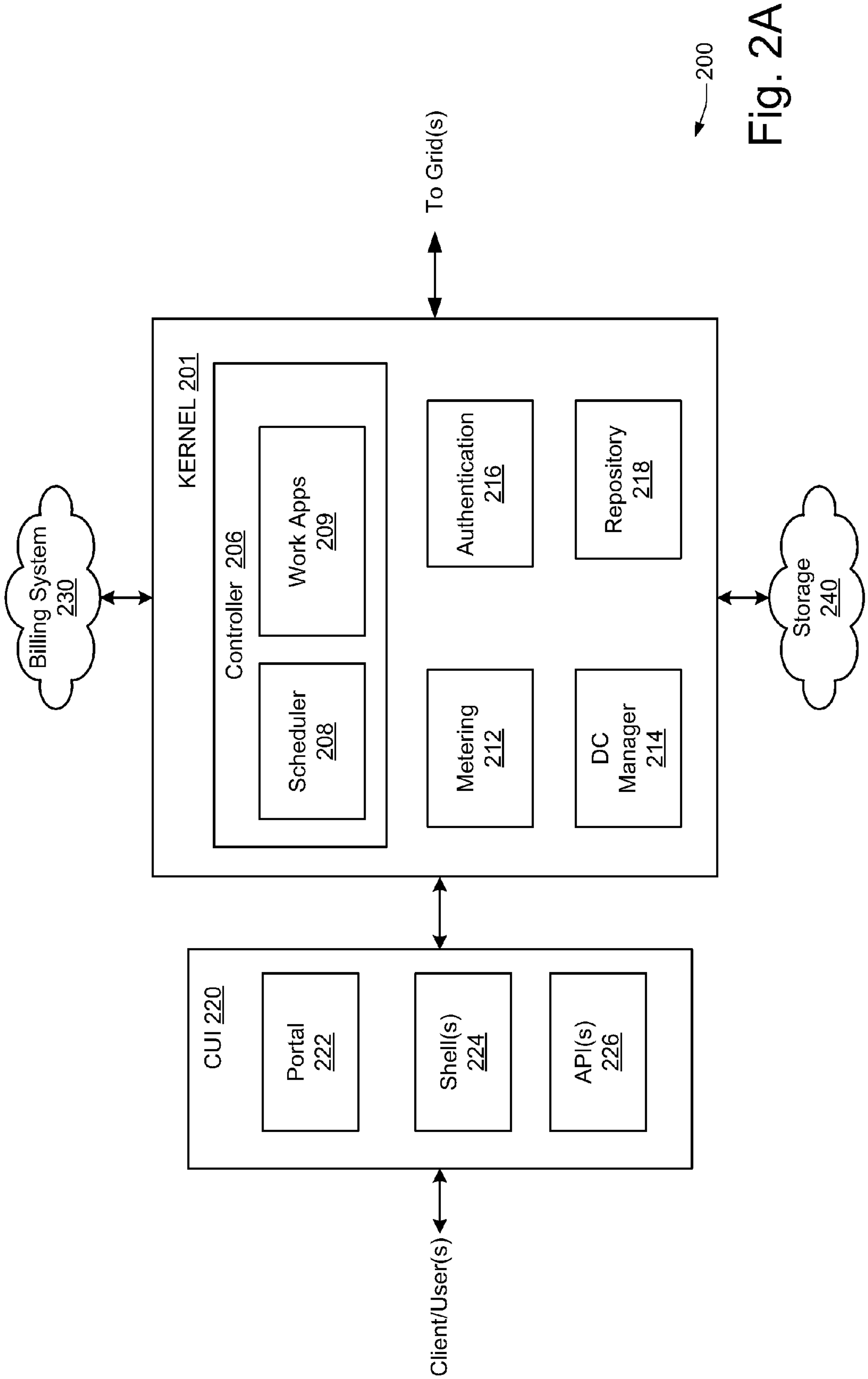
FIG. 2A shows an example embodiment of a Cloudware System 200 which, for example, may be used to provide various types of Cloudware-related functionality described herein.

FIG. 2A shows an example embodiment of a Cloudware System 200 which, for example, may be used to provide various types of cloudware-related functionality described herein. For purposes of illustration, various components illustrated in the Cloudware System 200 of FIG. 2A may be described.

CUI: Cloudware User Interface (CUI 220) Subsystem

The Cloudware User Interface subsystem provides interface to the Cloudware service. The interface may be both for human users and for programmatic use.

As shown in the example of FIG. 2A, the CUI subsystem 220 comprises the portal application (e.g., Portal 222), the account shells (e.g., Shell(s) 224) and the API gateway(s) (e.g., API(s) 226).

In at least one embodiment, the Portal application provides the common, non-account-specific portion of the Cloudware web site. Its functionality comprises: service home page, new user registration, account creation and management, billing, service login, forums, documentation, support helpdesk, corporate site and brochures, etc. In addition, the portal application may also be responsible for activating account shells, for example either at account creation and during login. Portal makes Shell(s) instances and may also make instances of API(s).

In at least one embodiment, the Shell(s) account shell provides the account user interface, including list of applications, infrastructure editor, monitoring, application and appliance control, etc—pretty much the current grid controller user interface of AppLogic™. The Shell(s) application may be named this way due to its similarity to a "shell/desktop" in a traditional computer operating system—this may be the face of the "global computer" for any particular user. The Shell(s) application may be designed to be instantiated per account (one instance per account); other options obviously include one Shell(s) app for the service (maybe scalable), as well as one Shell(s) instance per user login (like a shell in a traditional OS). Shell(s) ideally provides both GUI and text-based shell.

In at least one embodiment, the API(s) gateway provides programmatic access to Cloudware services. It provides more or less the same set of services and functions as the Shell(s), allowing programmatic access/control to the same functions that humans use the Shell(s) shell to achieve. The API(s) gateway provides a web-services interface (e.g., via SOAP).

In at least one embodiment, the CUI subsystem may also be responsible to ensure a secure and authenticated channel between arbitrarily located end-user (e.g., anywhere on the Internet or in a organizational network) and the Cloudware service. In one embodiment, the intended measures may include, but are not limited to, one or more of the following (or combinations thereof):

- Normal web pages for the unauthenticated access (e.g., portal only)—main site, corporate site, brochures; possibly forums and documentation, as well as any other public, non-sensitive areas of the service (of course, any modifications may require proper security and authentication)
- Secure Sockets Layer-based (SSL or TLS, as defined, for example, by IETF RFC4346) connection security for all or selected secure portal pages (login, account/billing info, etc.) as well as all or selected pages of the account shell(s). Server-side certificates signed by a well-known authority can be used to mitigate the dangers of man-in-the middle and similar attacks. Wildcard SSL certificates can be used, for example, to protect the Shell(s) pages (otherwise, there may be a need for a separate certificate issued by a known authority for each instance of Shell(s)—which may not be cost-effective and may delay account creation until a trusted cert can be issued; another option may be to provide signed certifications ("certs").
- SSL-based security for the API(s) gateway functions—all or selected programmatic interactions with the Cloudware service may occur over SSL. At least server-side certs may be used. Client-side certs may also be used instead of user name and password.
- Secure shell (SSH, as defined by IETF RFC4252) connections may be used for the text-based shell provided by Shell(s). All or selected SSH connections may preferably use SSH key-based authentication instead of user names and passwords. Text-based shell(s) may also be provided via a web browser, for example, using the AppLogic web-based shell.

In at least one embodiment, the CUI subsystem may not require persistent state (except, possibly cached data). It also may not drive composite operations—for example, application migration may be handled by the kernel, with the CUI initiating and then reporting progress of the operation. The Cloudware service may be fully operational if the CUI subsystem may be inoperative for short periods of time—for example, everything may work except it may not be controllable (e.g., temporarily).

In at least one embodiment, the CUI subsystem works as a set of AppLogic applications on one or more grids, in one or more data centers.

KERNEL: Cloudware Kernel

In at least one embodiment, the Cloudware Kernel subsystem may provide core controlling functionality of Cloudware. For example, in one embodiment, it may be responsible for performing all or selected operations that define various Cloudware services/resources.

As shown in the example of FIG. 2A, the KERNEL subsystem comprises the service controller (e.g., Controller 206), metering system (e.g., METER 212), authentication service (e.g. Authentication 216), data center manager (e.g., DC Manager 214), and repository (e.g., Repository 218).

In at least one embodiment, the Repository stores all or selected metadata for the Cloudware service, such as, for example, one or more of the following (or combinations thereof): account structure, users and their permissions, applications, catalogs, etc. It may be a hierarchical repository, organized by entity, as described elsewhere in the Cloudware docs. Repository may be highly available and replicated geographically for disaster recovery. The Cloudware service can survive Repository restart with only temporary loss of controlling services and without impacting running applications (this may also be true for other subsystems and/or components of Cloudware described herein). In at least one embodiment, the Repository may be implemented using an lighweight directory access protocol (LDAP) implementation, such as OpenLDAP (at www.openldap.org), including its directory replication mechanisms for achieving redundancy and geographic distribution.

In at least one embodiment, the DC Manager 214 may be responsible to manage the set of data centers and grids in them, as well as their relationships, associated resources (such as IP addresses), and metadata (e.g., resource prices and costs). It aggregates the multiple data centers and grids, and provides a secure and reliable channel to them. All or selected interactions except volume transfers may pass through the DC Manager. DC Manager may be configured or designed to not store persistent data. In such embodiments, DC Manager may use the Repository for all or selected storage needs (including storage of transient states).

In at least one embodiment, the metering system 212 may be responsible for tracking all or selected resource usage, such as, for example, one or more of the following (or combinations thereof): CPU time, memory, storage, bandwidth, licensed appliances, etc. The metering system may also be operable to timely (e.g., real time) report resource usage information to billing system 230.

In at least one embodiment, the authentication service 216 may be responsible for authenticating users as well as Cloudware entities. In one embodiment, authentication provides authentication services for logging in users. Optionally it also manages the user and account relationships in a directory service. Further, Authentication provides secure authentication between Cloudware subsystems and components, including between components that may be geographically distributed and may need to communicate securely over public/insecure networks. Authentication allows for maintaining a single, unified user login across all or selected content and services of AppLogic, so that users authenticate once and obtain access to all or selected aspects of their accounts, such as, for example: applications, billing, forums, helpdesk, etc.

In at least one embodiment, the service controller 206 may be responsible for controlling various aspects relating to Cloudware resources/services/information. In one embodiment, it may implements all or selected operations and may provide the abstraction/entities defined by Cloudware. It may use other services to perform their appropriate functions, and may also use grids to operate and/or manage applications.

As shown in the example of FIG. 2A, Controller 206 comprises various subsystems such as, for example, one or more of the following (or combinations thereof):

- Worker Apps (209) —worker applications array. Worker Apps may be an internal AppLogic application that the controller starts to perform specific operations that take long time and require a lot of resources (e.g., volume copy, migration, etc.) Worker Apps actually represents a set of different application templates; Controller provisions the particular one it needs for the task and destroys it upon completion. It may also be possible to maintain a pool of pre-provisioned Worker Apps applications that Controller can allocate for tasks that it needs to perform. (This concept may be akin to the "helper" applications used in AppLogic Dynamic Appliances.) In one embodiment, the Worker Apps applications may not be visible/controllable/accessible to end-users directly. However, resources used by such internal worker applications may be preferably accrued to the user (definitely network transfer, possibly CPU/memory)

- Scheduler (208)—application scheduler. Scheduler determines where an application may be placed—in which data center and on which grid—based on account preferences, user location, application configuration, resource settings, data center/grid capabilities and available/spare capacity. Scheduler does not deal with scheduling within a grid—that function may be responsibility of the grid itself (the same way as scheduling within a server may be responsibility of the server itself).
- Grid Controller(s) (not shown)—operable to manage one or more grids in the Cloudware network and/or Cloudware resources and/or services associated with such grids. In at least one embodiment, at least some grid controllers may reside locally at the same data center(s) as the grid(s) which they control. In at least one embodiment, portions of functionality of the Grid Controller(s) may be incorporated into DC Manager 214.

In at least one embodiment the KERNEL subsystem may be highly available and replicated for disaster recovery. The applications running on the Cloudware service may be fully operational if the KERNEL is down for short periods of time—everything may work except it may not be controllable and some aspects of high availability may be delayed until the KERNEL subsystem is restored. In one embodiment, the KERNEL subsystem works as a set of AppLogic applications on one or more grids, in one or more data centers.

Grids

Cloudware preferably operates end-user applications on a set of grids (e.g., AppLogic™-based utility computing grids) located in multiple data centers. Each data center may have one or more grids, possibly with different dimensions (e.g., ratio of CPU cores to memory; size of storage per server, etc.)

In addition to using grids for operating the end-user applications, Cloudware may use grids to host the Cloudware-specific components themselves—such as, for example, the CUI and KERNEL subsystems of the Cloudware System 200. It may also be possible to operate the external services or portion thereof on grids. In one embodiment, the grids used by Cloudware and/or Cloudware System for its operation may not be among the grids that Cloudware would schedule end-user applications. This allows the Cloudware service to be maintained with minimal impact on the end user applications.

Cloudware may eventually operate grids running different versions of utilizing computing grid software such as AppLogic™. It may also be possible and likely to have grids with different versions in the same data center, as well as to have a single account that runs applications on grids with different versions concurrently (e.g., one app on AppLogic 2.5, another on 2.6).

To arrange for such flexibility, Cloudware components use loose coupling for their interfaces, especially for the interface between the Cloudware KERNEL and the grids on which user applications operate. In one embodiment, this interface may be implemented using Simple Object Access Protocol ("SOAP") based functionality, and may fully utilize the flexibility provided by SOAP (including, for example, optional fields, must-understand attributes, forwarders, etc.).

Other Entities/Services

In at least one embodiment, the Cloudware System may include (and/or utilize) other external services to provide functions which, while not specific to Cloudware, may be preferable for its operation. Examples of such other services include one or more of the following (or combinations thereof), which,:

- A billing system (e.g., 230), which keeps user's (account's) billing information, history; issues invoices and facilitates money transfers: charging users for monthly and usage fees through a variety of mechanisms—credit card, account sweeps, etc. It also allows for manual adjustments, such as service credits and manual payments. In one embodiment, the billing system also facilitates charging license fees, as well as crediting accounts with licensed appliance usage fees, paying hosting providers for the resources they provide in the service based on actual usage, etc. The billing system includes at least an account/user portal (e.g., for the user to keep his/her information up-to-date, make payments, review invoices and payment history), as well as an accounting portal (e.g., for the Cloudware operator); in addition, it may have a provider portal (e.g., which may be used by hosting providers, appliance/application providers and other service providers to access their billings).
- A globally accessible data storage system (e.g., 240), which keeps large pieces of data that may be desirable to be accessible to one or more accounts. In one embodiment, this may include the class volumes of catalog appliances—those may be treated by the service controller and the grids as a resource storage. In one embodiment, the storage system may be a BLOB store—it has no notion of what it stores—just a bunch of globally accessible and persistently/uniquely identifiable binary blocks (BLOBs). Cloudware may work with multiple such systems concurrently, for example, Amazon S3 and The Grid Layer's DynaVol; Grids can also be used as a storage system.

In at least one embodiment, the Cloudware System may include (and/or may be communicatively coupled to) a licensing management system (not shown) which, for example, may be operable to perform one or more of the following functions:

- Automatically acquire, monitor, and/or manage (e.g., on behalf of Cloudware System users) third-party licenses relating to use of third-party applications, virtual appliances, templates, virtual machines, virtual volumes, utility computing resources, services, etc.
- Automatically monitor and/or manage billing and/or payment activities (and relating billing/invoicing information) relating to the acquisition and/or use of third-party licenses relating to use of third-party applications, virtual appliances, templates, virtual machines, virtual volumes, utility computing resources, services, etc.
- Automatically track and report (e.g., to the user and/or third party licensing entity) usage information relating to the usage of licensed products (and/or services) by applications running at one or more different server grids.
- Etc.

For example, in one example situation where a user has designed a distributed application which includes use of a virtual appliance which has been published by a third-party publisher, and the user desires to acquire a license from the third-party publisher in order to access additional features of the virtual appliance, the Cloudware System may be operable to acquire (e.g., at the request of the user) the desired license(s) from the licensing entity (e.g., third-party publisher) on behalf of the user, and may be operable to coordinate and/or manage all billing/payment activities (e.g., relating to the acquired license for the virtual appliance) without the user ever having to deal directly with the third-party publisher/licensing entity. Additionally, the Cloudware System may further be operable to track and report (e.g., to the user and/or third party licensing entity) usage information relating to the usage of the licensed virtual appliance by the user's application, which may be running at one or more different server grids.

According to different embodiments at least a portion of the other services described above may be implemented as internal services (e.g., internal to the Cloudware system/network) and/or as external services (e.g., external to the Cloudware system/network).

According to specific embodiments, in order to implement or provide functionality relating to one or more of the Cloudware-related features described herein, it may be preferable to incorporate various types of changes/modifications to virtualization software such as AppLogic™. Examples of preferred changes/modifications may include, but are not limited to, one or more of the following (or combinations thereof):

- Bandwidth metering (transfer).
- Automatic IP address assignment and transfer.
- Passive volume access without controller mounts (e.g., via filer application).
- Web services interface to the grid.
- 64-bit support.
- Solaris and windows support.
- Broadcast and multicast support.
- Support for single-command class and catalog migration.
- Global access to appliance and/or application catalogs which, for example, may be consistent across all (or selected) grids of the Cloudware network, and may be implemented using a centralized repository. In one embodiment, the centralized catalogs may be implemented as a Cloudware resource which may be accessible by all or selected Cloudware entities.
- Centralized Cloudware portal/CUI (e.g., which may not be dependent upon or does not vary based individual grids) which may be operable to provide a unified view of the entire Cloudware network.
- Arbitrage mechanism (e.g., included as part of controller 206 functionality) for arbitrating among the needs (e.g., resource needs) of the various different Cloudware grid networks as well as the needs of the Cloudware System.

FIG. 3 shows an example embodiment of a graphical user interface (GUI) 300 which may be used for implementing various Cloudware related aspects/features. In at least one embodiment, GUI 300 may be implemented as a web page which may be accessible to users via conventional Web browsers such as Microsoft Internet Explorer, Mozilla Firefox, etc.

In the example of FIG. 3, GUI 300 may correspond to a data center operator (DCO) profile page which may be associated with a particular DCO, namely NetClime, Inc. According to specific embodiments, the DCO profile page may be accessible to various entities or Cloudware customers such as, for example: data center operators (e.g, employees/agents of the DCO), end users, publishers (e.g., publishers of applications, appliances), etc. In the example of FIG. 3 it may be assumed that a DCO employee has logged into the Cloudware System, and that at least a portion of the content of DCO profile page 300 has been dynamically generated for that particular DCO employee.

As shown in the example of FIG. 3, DCO profile page 300 includes a variety of different types of content which may be related to or associated with NetClime's data center. Examples of such content may include, but are not limited to, one or more of the following (or combinations thereof):

- Content (e.g., 302) relating to the DCO's company profile information.
- Content (e.g., 304) relating to an overview of the DCO.
- Content (e.g., 306) relating to reviews and/or ratings that others provide for the DCO and/or DCO's data center.
- Resource metering content (e.g., 308) relating to the DCO's resources/operations. For example, such resource metering content may include one or more of the following (or combinations thereof):
  - Information (e.g., 308*a*) relating to the DCO's currently available and/or total available resources (such as, for example, computing resources, storage resources, bandwidth resources, etc.).
  - Information (e.g., 308*b*) relating to histories of available resources at the DCO over one or more time intervals (e.g., daily, weekly, monthly, yearly, average, min, max, etc.). For example, as illustrated in the example of FIG. 3, graphical data may be used to convey a running history of the DCO's computing, storage and bandwidth resources of its data center over the past 7 days.
- Content (e.g., 310) relating to various online forums. In at least one embodiment, at least a portion of the forums may relate to products and/or services provided by the DCO. In some embodiments, other portions of the forms may relate to topics which the DCO (and/or agents of the DCO) has subscribed to an/or selected for monitoring.
- Content (e.g., 312) relating to the DCO's various account settings such as, for example, billing history, billing information, account options, etc. In at least one embodiment, some or all of the DCO's account settings content may be flagged as private, and only viewable to authorized DCO employees/agents.
- Content (e.g., 314) relating to various types of network accessible virtual appliances and/or applications such as, for example, one or more of the following (or combinations thereof): application catalogs 314*a*, applications 314*b*, appliance catalogs 314*c*, appliances 314*d*, etc.
- Content (e.g., 316) relating to various user (e.g., 316*b*) and/or user accounts (e.g., 316*a*). In at least one embodiment, the account content 316*b* may include user account information relating to accounts created for users who may be authorized by the DCO to have various types of privileges/access.
- Content (e.g., 318) relating to messages associated with the DCO and/or associated with one or more DCO employees/agents.

In at least one embodiment, the content 302-318 may be editable by the account owner, so that the account owner can modify what appears on the profile page 300 for the account owner, as well as for other users of the service.

In at least one embodiment, a data center may have a plurality of different types of resources associated therewith. Examples of such resources may include, but are not limited to, one or more of the following (or combinations thereof):

- CPU resources;
- Storage resources;
- Bandwidth resources;
- Lookup access resources;
- Directory listing resources;
- Data transfer resources;
- Transaction resources (e.g., number of transactions performed);
- Premium bandwidth and/or transfer resources;
- Virtual Private Network (VPN) resources;
- Data backup resources;
- Load balancing resources;
- etc.

In some embodiments, the DCO may charge their customers on a per-resource basis, wherein a customer may be charged fees based on the various resources which that customer uses. For example, in one embodiment, a customer may be charged a separate fee each time the customer (or the customer's application, which may be being hosted at the data center) makes use of one or more specified data center resources. According to different embodiments, the pricing structures of various fees for data center resource utilization may be based upon a variety of different criteria such as, for example, one or more of the following (or combinations thereof):

- Time based fees, such as, for example, charges for use of a resource (or given group of resources) for a specified time period (e.g., $1 for every 1 CPU-hour of use);
- Quantity based fees, such as, for example, charges for use of a resource (or given group of resources) for a given quantity (e.g., $1 for every 1 GB of data transfered);
- Operation based fees, such as, for example, charges for one or more operations and/or transactions relating to a given resource (or given group of resources) (e.g., $1 for every data base access request, $1 for every n transactions performed, etc.);
- One-time fees, such as $100 for using a service (e.g., for a given time period such as, for example, a particular month);
- Per-seat fees, such as $1 for each user accessing the service (e.g., management and monitoring services);
- Reservation based fees, such as, for example, charges to ensure a minimum resource availability (e.g. $1000 per month to ensure the ability to access up to 20 CPUs simultaneously at any time);
- License fees for software that the DCO makes available to customers running in their datacenter (e.g., Microsoft Windows licenses, published appliance and application licenses), including special pricing that may be arranged by the DCO for its customers (e.g., lower price than the typical or retail published price of the software (e.g., appliance and/or applications);
- etc.

In some embodiments, a DCO may group different resources together to offer one or more bundled groups of resources for specified fees. In one embodiment, a packaged or bundled group of resources may be referred to as a "virtual resource bundle" (VRB). For example, in at least one embodiment, a DCO may offer a customer (e.g., for a specified fee) a virtual resource bundle which, for example, may include: 1 CPU, 1 GB RAM, 250 GB storage, and 125 Mbps bandwidth. Rather than charging the customer individually for each type of resource in the virtual resource bundle, the customer may be presented with a single fee arrangement for use of the entire virtual resource bundle (e.g., for a specified duration of time).

One example of a virtual resource bundle is a BCU. In one embodiment, the term BCU may refer to a "basic computing unit." In one embodiment, a BCU may be defined as having a fixed or predetermined amount of computing resources. For example, in one embodiment, a BCU may be defined to include a CPU core (e.g., the equivalent of a 1.86 MHz single core CPU) and RAM (e.g., the equivalent of 1 GB RAM). In other embodiments, a BCU may be defined to include other combinations of resources such as, for example, one or more of the following (or combinations thereof): CPU(s), RAM, storage (e.g., 250 GB disk storage), bandwidth (e.g., 500 GB transfer), etc.

In at least one embodiment, different portions of the resource metering content (e.g., 308) may represent different types of DCO resources such as, for example, one or more of the following (or combinations thereof):

- DCO resources available to a specific user;
- Max/Min DCO resources available;
- Current DCO resources available;
- DCO resources which may be subscribed or allocated to a specific user;
- DCO resources for which a specific account or user is currently subscribed;
- DCO resources currently in use by a specific account's or user's applications;
- Bandwidth and latency characteristics of DCO's connections to other datacenters and to the Internet, or to specific locations of interest (e.g., target customer area for a particular account);
- Historical data (e.g., for a given time period such as, for example, a day, month, year, etc.) of the above;
- Accumulated usage of DCO's resources—total for the DCO as well as for particular account
- Etc.

In at least one embodiment, all or selected portions of the resource metering content (e.g., 308, 308*a*, 380*b*) may relate to a variety of different data center resources which may be used for hosting distributed applications which are implemented across multiple machines and/or across multiple nodes of the data center. Additionally, as illustrated in the example of FIG. 3, the data center resource metering content may be displayed to a user via a graphical user interface.

In at least one embodiment, one or more application catalogs (e.g., 314*a*) and/or applications (e.g., 314*b*) may be published (e.g., for display on DCO profile page 300) by the DCO, by user(s), and/or by appliance publishers (e.g., which have an affiliation or relationship with the DCO). In at least one embodiment, one or more application catalogs may include pre-configured sets of applications (e.g., organized according various criteria such as, for example, theme, functionality, etc.) for use in designing and/or implementing distributed applications, for example. In one embodiment, application content portion 314*b* may be operable to display a customized list of user selected/preferred applications.

In at least one embodiment, one or more appliance catalogs may include pre-configured sets of appliances for use in designing and/or implementing distributed applications, for example. In at least one embodiment, content/information relating to one or more of the appliance catalogs may be globally accessible, for example, via the Cloudware System and/or WAN. For example, in at least one embodiment, the appliance catalogs (and related content) may be stored in a centralized location, which may be accessible to all (or selected) data centers and/or users (e.g., via the Cloudware System). Accordingly, in at least one embodiment, the appliance catalogs which may be accessible via different data centers may be standardized across the multiple different data centers.

In one embodiment, the content/relating to one or more appliance and/or application catalogs may be available globally using one or more of the following approaches:

- a distributed global store, such as, for example via the use of a dispersed storage technology such as www.cleversafe.org, a peer-to-peer file sharing network such as Bittorent, a global file system such as Google's Global File System or RedHat GFS, and/or a cloud storage service such as Amazon S3;
- a content delivery network (such as, for example, Akamai or Limelight Networks);
- global distributed cache;
- combinations thereof;
- etc.

In at least one embodiment, appliances that are recently used on a particular grid or datacenter may be cached on that grid or datacenter; appliances may be cached in a datacenter either on demand (e.g., when a first application tries to use the appliance) or pushed to the datacenter when the appliance becomes available. The delivery and caching of catalog appliances and applications may be preferably handled using a common approach.

In one embodiment, appliance content 314*d* may be operable to display a customized list of user selected/preferred appliances.

In at least one embodiment, one or more of the forums (or portions thereof such as, for example, forum threads, forum topics, etc.) may be organized around various types of infrastructure (such as, for example, cloudware related infrastructure, AppLogic™ related infrastructure, etc.). Other examples of such infrastructure may include, but are not limited to, one or more of the following (or combinations thereof):

one or more different appliances;
one or more different applications;
one or more different data centers;
one or more different DCOs;
one or more different appliance publishers;
one or more different subscribers
etc.

For example, in one embodiment, a user may click (e.g., right click) on an icon of a specific application or appliance in order to access one or more specific forums relating to that specific application/appliance. In one embodiment, when a user clicks on the icon of a particular application or appliance, the user may be presented with a menu for accessing one or more online forums which may be related to the selected application/appliance. One benefit of this approach may be that the user can submit the question or feedback directly with the entity to which it applies (and/or who is responsible for servicing such questions and/or feedback), without having to figure out which company published or supports the entity.

Figure 4:
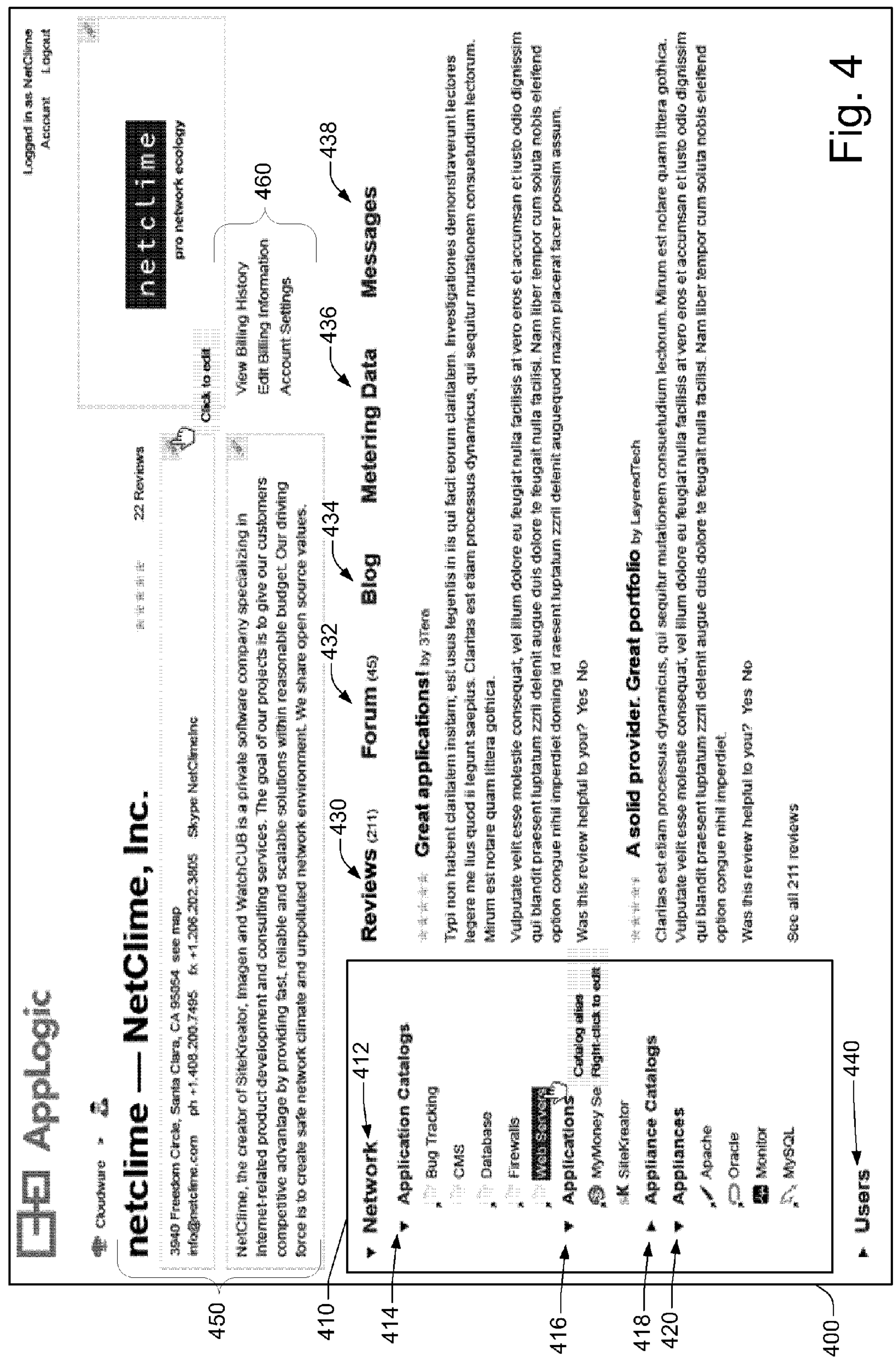
FIG. 4 shows an example embodiment of another graphical user interface (GUI) 400 which may be used for implementing various Cloudware related aspects/features.

FIG. 4 shows an example embodiment of another graphical user interface (GUI) 400 which may be used for implementing various Cloudware related aspects/features. In at least one embodiment, GUI 400 may be implemented as a web page which may be accessible to users via conventional Web browsers such as Microsoft Internet Explorer, Mozilla Firefox, etc.

In the example of FIG. 4, GUI 400 may correspond to a profile edit page relating to data center operator (DCO) such as, for example, NetClime, Inc. According to specific embodiments, the DCO profile edit page may be accessible to various users (e.g., selected DCO employees/agents) who may be provided with sufficient authorization/privileges to access the DCO profile edit page.

In the example of FIG. 4 it may be assumed that a DCO employee has logged into the Cloudware System, and that at least a portion of the content of DCO profile edit page 400 has been dynamically generated for that particular DCO employee.

As shown in the example of FIG. 4, DCO profile edit page 400 includes a variety of different types of content which may be related to or associated with NetClime's data center. Portions of the content illustrated in the example DCO profile edit page of FIG. 4 may be similar to corresponding portions of content illustrated in the example DCO profile page 300 of FIG. 3, and therefore will not be described in greater detail.

As illustrated in the example of FIG. 4, various portions of content (e.g., 450) illustrated in the example DCO profile edit page of FIG. 4 may be edited and/or modified by an appropriate user (such as, for example, a DCO employee/agent).

In one embodiment, the content of FIG. 4 may be an alternative representation of the content of FIG. 3.

In some embodiments, other portions of content (e.g., 410, 440, 430-438, etc.) may also be edited and/or modified by an appropriate user. For example, in at least one embodiment, a NetClime employee/agent may be given permission to perform a variety of different editing operations such as, for example, one or more of the following (or combinations thereof):

editing/modifying the display and/or access to various application content (e.g., 416);
editing/modifying the display and/or access to various appliance content (e.g., 420);
editing/modifying the display and/or access to content relating to various user accounts (e.g., 440);
editing/modifying the display and/or access to review content (e.g., 430), which, for example may be related to the DCO;
editing/modifying the display and/or access to forum content (e.g., 432), which, for example may be related to the DCO;
editing/modifying the display and/or access to blog content (e.g., 434), which, for example may be related to the DCO;
editing/modifying the display and/or access to resource metering content (e.g., 436), which, for example may be related to the DCO;
editing/modifying the display and/or access to message content (e.g., 438), which, for example may be related to the DCO;
etc.

Figure 5:
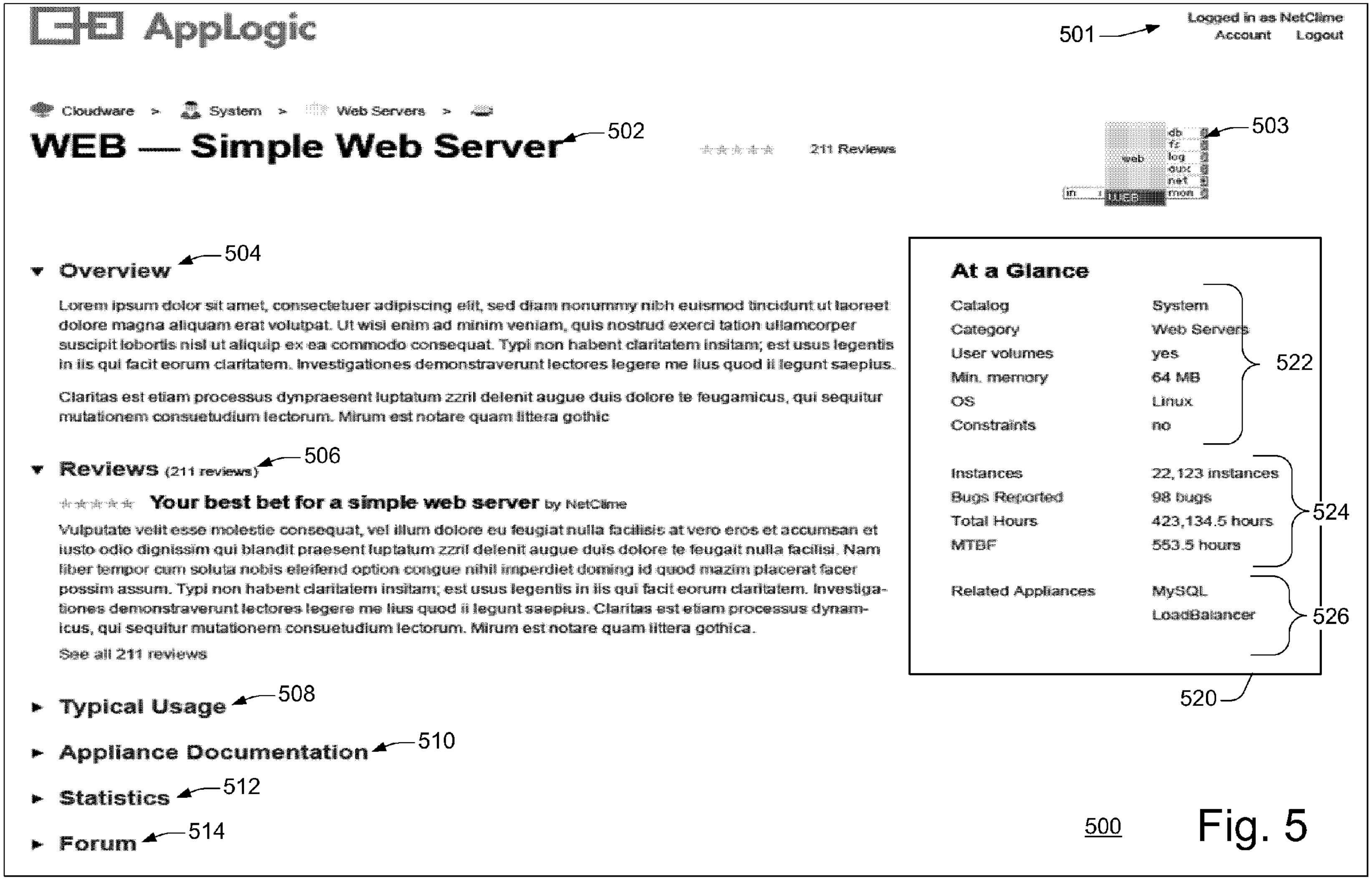
FIG. 5 shows an example embodiment of another graphical user interface (GUI) 500 which may be used for implementing various Cloudware related aspects/features.

FIG. 5 shows an example embodiment of another graphical user interface (GUI) 500 which may be used for implementing various Cloudware related aspects/features. In at least one embodiment, GUI 500 may be implemented as a web page which may be accessible to users via conventional Web browsers such as Microsoft Internet Explorer, Mozilla Firefox, etc.

In the example of FIG. 5, GUI 500 may correspond to a virtual appliance profile page which is associated with a given virtual appliance. Examples of various virtual appliances may include, but are not limited to, one or more of the following (or combinations thereof):

Apache Web Server
MySQL Database Server
Postgres SQL
Microsoft SQL Server
Oracle 10g
Generic TCP/UDP Load Balancer
HTTP Load Balancer
HTTPS Load Balancer
Database Load Balancer
Asterisk Telephony Engine
Network Gateway
Virtual Private Network
Network Attached Storage (NAS)
JBOSS J2EE Application Server
Tomcat Application Server
WebLogic Application Server
WebSphere Application Server
Terracotta Java Cluster
Microsoft Internet Information Server (IIS)
Microsoft .NET Server
Intrusion Detection Appliance
Backup Dynamic Appliance Migration Dynamic Appliance
SLA Dynamic Appliance
WAN Network Configurator Appliance
VLAN Configurator Appliance
Firewall Configurator Appliance
etc.

In the example of FIG. 5, it is assumed that virtual appliance profile page 500 is associated with a Simple Web Server virtual appliance, which, for example, may provide functionality for implementing a Web Server application.

Various examples of different virtual appliances are discussed in greater detail in U.S. patent application Ser. No. 11/522,050, by Miloushev et al., entitled "APPARATUS, METHOD AND SYSTEM FOR RAPID DELIVERY OF DISTRIBUTED APPLICATIONS," previously incorporated herein by reference. According to different embodiments, an entity which creates a customized virtual appliance may publish the customized virtual appliance (and/or other information relating to the customized virtual appliance) to one or more Cloudware Appliance catalogs.

According to specific embodiments, the virtual appliance profile page may be accessible to various entities or Cloudware customers such as, for example: data center operators (e.g, employees/agents of the DCO), end users, publishers (e.g., publishers of applications, appliances, etc.), etc. In the example of FIG. 5 it is assumed that a user (e.g., user=NetClime as illustrated at 501) has logged into the Cloudware System, and that at least a portion of the content of virtual appliance profile page 500 has been dynamically generated for that particular user.

As shown in the example of FIG. 5, virtual appliance profile page 500 includes a variety of different types of content which may be related to or associated with the particular virtual appliance (e.g., Simple Web Server virtual appliance). Examples of such content may include, but are not limited to, one or more of the following (or combinations thereof):

- Content (e.g., 502) relating to a name of the virtual appliance.
- Content (e.g., 503) relating to a graphical representation of the virtual appliance.
- Content (e.g., 504) relating to an overview of the virtual appliance.
- Content (e.g., 506) relating to reviews and ratings of the virtual appliance.
- Content (e.g., 508) relating to typical usage of the virtual appliance (which, for example, may include various descriptions and/or drawings relating to the virtual appliance).
- Content (e.g., 510) relating to other documentation which may relate to the virtual appliance (such as, for example, software installed in the virtual appliance, list of attributes and properties, resource requirements for usage, etc.).
- Content (e.g., 512) relating to various statistics associated with the virtual appliance (such as, for example, number of copies in use, average/min/max resources provisioned, MTBF, average downtime, etc.).
- Content (e.g., 514) relating to various online forums. In at least one embodiment, at least a portion of the forums may relate to aspects/features of the virtual appliance.
- Other types of content (e.g., 520) relating to the virtual appliance.

In at least one embodiment, the virtual appliance profile page 500 may include a summary portion (e.g., 520) which may include content which provides a summary of various aspects and/or features relating to the virtual appliance. Such summary content may make it easier for users to choose an appliance and/or to dynamically compare features of similar type appliances. For example, as shown in the example of FIG. 5, summary portion (e.g., "At A Glance") 520 may include a variety of different types of information relating to the virtual appliance such as, for example, one or more of the following (or combinations thereof):

- Documentation information (e.g., 522) relating to the virtual appliance. In at least one embodiment, portion(s) of the documentation information may also be accessible under the Appliance Documentation (510) portion and/or other portions of the virtual appliance profile page 500. In at least one embodiment, at least a portion of the documentation information may be provided by the creator of the virtual appliance and/or may be automatically determined and/or provided by the Cloudware System. In the example of FIG. 5, the appliance documentation information indicates that the virtual appliance has the following properties/characteristics:
  - Catalog type=System
  - Category type=Web Servers
  - User Volumes are required to be provided (e.g., by a user who wishes to instantiate an instance of this virtual appliance)
  - Minimum memory requirement=64 MB
  - Compatible operating systems=Linux
  - Additional constraints=no
- Appliance Usage Statistical Information (e.g., 524) relating to usage statistics relating to the virtual appliance. In at least one embodiment, at least a portion of the virtual appliance uses statistics information may be automatically determined, tracked, generated and/or provided by the Cloudware System. In the example of FIG. 5, the virtual appliance uses statistics information may include, but are not limited to, one or more of the following (or combinations thereof) properties/characteristics:
  - Information relating to instances of the virtual appliance implemented at the Cloudware network. In one embodiment, this information may include a current, real-time number of instances of the virtual appliance which are currently instantiated at all (or selected) data centers of the Cloudware network (e.g., total current number of instances of the virtual appliance=22,123 instances).
  - Information relating to bugs which may be associated with the virtual appliance. In one embodiment, this information may include a current, real-time number of total bugs which have thus far been reported in connection with the virtual appliance at all or selected data centers of the Cloudware network (e.g., total current number of reported bugs relating to the virtual appliance=98 bug reports).
  - Information relating to runtime hours of the virtual appliance implemented at the Cloudware network. In one embodiment, this information may include a current, real-time number of total runtime hours of all instances of the virtual appliance which are (or may be) instantiated at all (or selected) data centers of the Cloudware network (e.g., current cumulative total runtime hours of the virtual appliance=423,134.5 hours).
  - Mean time between failure (MTBF) information relating to one or more estimated or calculated value(s) representing a MTBF for the virtual appliance. In at least one embodiment, the Cloudware System may be operable to track operational data (e.g., including failure data) relating to all (or selected) instances of the virtual appliance at all (or selected) data centers of the Cloudware network, and may be further operable to use at least a portion of the operational data to dynamically and/or automatically calculate or determine a current MTBF value for the virtual appliance. For example, as illustrated in the example of FIG. 5, the current estimate of the MTBF value for an instance of the Simple Web Server virtual appliance is 553.5 hours (e.g., meaning that, on average, it is anticipated that a failure may occur for an instance of this virtual appliance about once every 553.5 hours).

Related Appliance/Application Information (e.g., 526) relating to other appliances and/or applications which may be related to or associated with the virtual appliance. In at least one embodiment, at least a portion of the related appliance/application information may be automatically determined, tracked, generated and/or provided by the Cloudware System. For example, in at least one embodiment, the Cloudware System may identify different instances of the virtual appliance running at one or more data centers of the Cloudware, and may analyze various types of connectivity information relating to the various virtual appliance instances. For example, in at least one embodiment, the Cloudware System may identify other appliances which are connected to different instances of the virtual appliance, and/or may identify patterns of connectivity, such as, for example, which of the other appliances are most commonly connected to a given instance of the virtual appliance. Based on this analysis, the Cloudware System may automatically and/or dynamically generate information (e.g., 526) relating to other appliances and/or applications which may be typically related to or associated with the virtual appliance. For example, in the example of FIG. 5, it is assumed that the appliances MySQL and LoadBalancer are most commonly connected to (or used in association with) instances of the Simple Web Server virtual appliance. Accordingly, in at least one embodiment, the appliances MySQL and LoadBalancer may been identified at 526 as being related to the Simple Web Server virtual appliance.

According to one embodiment, all or selected portions of the information and/or content provided in summary portion 520 may be automatically updated in real-time. In other embodiments, all or selected portions of the information and/or content provided in summary portion 520 may be automatically updated at periodic intervals (e.g., daily) and/or upon user request.

In at least one embodiment, a user may access the virtual appliance profile page GUI 500, for example, by clicking (e.g., right clicking) on an object or image representing the virtual appliance (such as, for example, graphical image 503) which, for example, may be displayed in one or more other GUIs described or referenced herein.

It will be appreciated that one unique feature of the Cloudware network is the ability of the Cloudware System to monitor, track, analyze, and/or process (e.g., in real-time) various types of operational and/or configuration information relating to all (or selected) instances of virtual appliances and/or applications across all (or selected) data centers of the Cloudware network.

Another unique aspect is the ability of the Cloudware System to automatically and/or dynamically generate (e.g., in real-time) compiled information/content (such as, for example, Appliance Usage Statistical Information, Related Appliance/Application Information, etc.) relating to various virtual appliances, applications and/or other aspects relating to the global Cloudware network. In at least one embodiment, such compiled content may be based, at least in part, upon actual or existing uses of virtual appliances and/or applications across all (or selected) data centers of the Cloudware network.

For example, according to various embodiments, the Cloudware System is able to analyze various types of operational and/or configuration information relating to all (or selected) instances of virtual appliances and/or applications across all (or selected) data centers of the Cloudware network, and is further able to use the analyzed information to automatically and dynamically generate one or more of the following (or combinations thereof) types of information (which, for example, may correspond to real-time information):

Information relating to a current number of instances of a given virtual appliance (or a given application) which are currently instantiated at all (or selected) data centers of the Cloudware network;

Information relating to a number of total bugs which may be reported in connection with a given virtual appliance (or a given application) at all or selected data centers of the Cloudware network;

Information relating to a current number of total runtime hours of all (or selected) instances of a given virtual appliance (or a given application) which are (or may be) instantiated at all (or selected) data centers of the Cloudware network;

Mean time between failures (MTBF) information relating to a current MTBF value for a given virtual appliance (or a given application) based on historical usage data from all or selected data centers of the Cloudware network;

Related Appliance/Application Information (e.g., 526) relating to other appliances and/or applications which may be identified (e.g., based on existing usage statistics/patterns/analysis) as having a relationship or association with the virtual appliance. For example, this may include appliances that are typically used in conjunction with the particular appliance (e.g., a MySQL database server, a load balancer, a firewall, etc.). In one embodiment, the content may further provide information on how related appliances are typically connected: for example, that the MySQL virtual appliance is frequently connected to the WEB server virtual appliance by having WEB servers's DB terminal connected to MySQL's IN terminal. In at least one embodiment, this information can be further used when creating infrastructures for an application, by automatically placing, or proposing to place the related appliance and connect it as it is most frequently connected (and/or based on various other selected criteria).

Information relating to types and/or quantities of resources (e.g., number of CPUs, memory size, number and sizes of storage volumes, etc.) typically used and/or provisioned for one or more selected virtual appliances and/or applications. In at least one embodiment, such information may be based, at least in part, upon actual or existing uses of virtual appliances and/or applications across all (or selected) data centers of the Cloudware network. Such information may also be represented in a graphical form, as well as include details, such as resource distributions by count (e.g., that 50% of appliance instances use between 256 and 512 MB RAM, while 10% of instances use above 2 GB RAM).

Information relating to examples of actual or real-time usage of various virtual appliances and/or applications which are (or may be) instantiated at one or more data centers in the Cloudware network.

Information relating to start/stop time of one or more selected virtual appliances and/or applications.

Information related to frequency of available updates or new versions of the appliance; information related to activity on the forums and other aspects of the appliance, such as, for example, to allow users to evaluate the available level of support for the appliance;

etc.

FIG. 6 shows an example embodiment of another graphical user interface (GUI) 600 which may be used for implementing various Cloudware related aspects/features. In at least one embodiment, GUI 600 may be implemented as a web page which may be accessible to users via conventional Web browsers such as Microsoft Internet Explorer, Mozilla Firefox, etc.

In the example of FIG. 6, GUI 600 may correspond to a virtual appliance expanded profile page which is associated with a given virtual appliance. In the example of FIG. 6, it is assumed that virtual appliance expanded profile page 600 is associated with a Simple Web Server virtual appliance, which, for example, may provide functionality for implementing a Web Server application. Accordingly, in at least one embodiment, at least a portion of the content of the virtual appliance expanded profile page 600 of FIG. 6 may be similar to the content of virtual appliance profile page 500 of FIG. 5.

According to specific embodiments, the virtual appliance expanded profile page may be accessible to various entities or Cloudware customers such as, for example: data center operators (e.g, employees/agents of the DCO), end users, publishers (e.g., publishers of applications, appliances, etc.), etc. In the example of FIG. 6 it is assumed that a user has accessed the Cloudware System, and that at least a portion of the content of virtual appliance expanded profile page 600 has been dynamically generated for that particular user.

As shown in the example of FIG. 6, virtual appliance expanded profile page 600 includes a variety of different types of content which may be related to or associated with a given customized virtual appliance (e.g., Simple Web Server virtual appliance). Examples of such content may include, but are not limited to, one or more of the following (or combinations thereof):

Content (e.g., 602) relating to a functional overview of the virtual appliance.

Content (e.g., 610) relating to boundary information which may be associated the virtual appliance. In at least one embodiment, at least a portion of the boundary information may include functional specification information relating to the virtual appliance.

Content (e.g., 616) relating to memory usage details of the virtual appliance.

Content (e.g., 617) relating to content setup details and/or share file storage details associated with the virtual appliance.

Content (e.g., 618) relating to typical or recommended usage details associated with the virtual appliance.

Other types of content (e.g., 619) relating to the virtual appliance such as, for example, notes, links, etc.

In at least one embodiment, the boundary content 610 may include one or more of the following type of information (or combinations thereof):

Resource information (e.g., 612) relating to various resource usage recommendations and/or requirements associated with the virtual appliance. For example, in at least one embodiment, at least a portion of the resource information may include MAX, MIN and/or DEFAULT parameters relating to various types of resources associated with the virtual appliance such as, for example, one or more of the following (or combinations thereof): CPU resources, memory resources, bandwidth resources, storage resources, interface resources, etc.

Terminal information (e.g., 614) relating to various types of terminals (and/or related parameters) associated with the virtual appliance. For example, in at least one embodiment, at least a portion of the terminal information may include descriptive information (such as, for example, Terminal Name, Terminal Direction, Terminal Protocol, Terminal Description/Functionality, etc.) relating to various types of terminals and/or interfaces associated with the virtual appliance.

Property information relating to the various configurable properties associated with the virtual appliance. For example, in at least one embodiment, this information may include descriptive information, such as, for example, Property Name, Property Type (string, numeric, IP address, etc.), Description, Default Value, Constraints (e.g., such as whether the property is Mandatory, Read-only, etc.).

Volume information relating to the various volumes associated with the virtual appliance. Such information may include volume name, description, size and file-system type constraints, etc.

Statistics Counters relating to the various performance and operation statistics counters provided by the appliance to aid monitoring, performance tuning and troubleshooting, for example. Such information may include, for example, counter name, description, unit of measure, frequency of updates, etc.

In one embodiment, the virtual appliance expanded profile page 600 may include usage details, such as the memory usage content (616), setting up the content and shared file storage (617), etc.

In at least one embodiment, the page 600 may include detailed typical usage info (618) which provides example usage of the appliance in various application use cases. This information may include, for example, graphical representation of the infrastructure of such application, textual description of the purpose and specialization of the usage case, as well as details on the role, configuration and/or limitations of the appliance in such use case.

In one embodiment, the page 600 may include additional notes (619), as well as links and references to other appliances and other documents that may be useful in conjunction with the appliance. For example, such documents may include the documentation of the application software used in the appliance (e.g., http://httpd.apache.org) and the standards supported by the appliance (e.g., HTTP 1.1).

In at least one embodiment, the virtual appliance expanded profile page 600 may include a summary portion (e.g., 620) which may include content which provides a summary of various aspects and/or features relating to the virtual appliance. For example, as shown in the example of FIG. 6, summary portion (e.g., "At A Glance") 620 may include a variety of different types of information relating to the virtual appliance such as, for example, one or more of the following (or combinations thereof):

Documentation information relating to the virtual appliance. In at least one embodiment, at least a portion of the documentation information may be similar to portion(s) of the documentation information (522) described in the example embodiment of FIG. 5.

Appliance Usage Statistical Information (e.g., 624) relating to usage statistics relating to the virtual appliance. In at least one embodiment, at least a portion of the Appliance Usage Statistical Information may be similar to portion(s) of the Appliance Usage Statistical Information (524) described in the example embodiment of FIG. 5. In the example of FIG. 6, the virtual appliance uses statistics information may include, but are not limited to, one or more of the following (or combinations thereof) properties/characteristics:

- Information relating to instances of the virtual appliance implemented at the Cloudware network.
- Information relating to bugs which may be associated with the virtual appliance.
- Information relating to runtime hours of the virtual appliance implemented at the Cloudware network.
- Mean time between failure (MTBF) information relating to one or more estimated or calculated value(s) representing a MTBF for the virtual appliance.
- User rating information relating to the virtual appliance.
- User review information relating to the virtual appliance.
- Discussion forums or topics relating to the virtual appliance.
- etc.

Related Appliance/Application Information relating to other appliances and/or applications which may be related to or associated with the virtual appliance. In at least one embodiment, at least a portion of the Related Appliance/Application Information may be similar to portion(s) of the Related Appliance/Application Information (526) described in the example embodiment of FIG. 5.

According to one embodiment, all or selected portions of the information and/or content provided in summary portion 620 may be automatically updated in real-time. In other embodiments, all or selected portions of the information and/or content provided in summary portion 620 may be updated at periodic intervals.

In at least one embodiment, a user may access the virtual appliance expanded profile page GUI 600, for example, by clicking (e.g., right clicking) on an object or image representing the virtual appliance which, for example, may be displayed in one or more other GUIs described or referenced herein.

FIG. 7 shows an example embodiment of a graphical user interface (GUI) 700 which may be used for implementing various Cloudware related aspects/features. In at least one embodiment, GUI 700 may be implemented as a web page which may be accessible to users via conventional Web browsers such as Microsoft Internet Explorer, Mozilla Firefox, etc.

In the example of FIG. 7, GUI 700 may correspond to a user dashboard page which is associated with a particular Cloudware user (or customer). For example, as shown at 701 in the example of FIG. 7, the current logged in user's ID is "Joe User".

According to specific embodiments, the user dashboard page may be accessible to various entities or Cloudware customers such as, for example: data center operators, end users, publishers (e.g., publishers of applications, appliances), etc. In the example of FIG. 7 it is assumed that a user (e.g., Joe User) has logged into the Cloudware System, and that at least a portion of the content of user dashboard page 700 has been dynamically generated for that particular user.

As shown in the example of FIG. 7, user dashboard page 700 includes a variety of different types of content which may be related to or associated with one or more applications which Joe User is running on the Cloudware network.

Examples of such content may include, but are not limited to, one or more of the following (or combinations thereof):

System status content (e.g., 702) relating to one or more applications (e.g., associated with the user and/or associated with the organization/account which the user belongs to) which are running on the Cloudware network. According to different embodiments, the system status content may include a variety of different types of information such as, for example, one or more of the following (or combinations thereof):

- User-related Application Information relating to one or more applications which are currently active or running in the Cloudware network (e.g., 9 applications currently running in Cloudware network which are associated with the user).
- User-related Cloudware Resource Information relating to resources used by one or more of the user's applications at one or more data centers in the Cloudware network. For example, in one embodiment, the user-related cloudware resource information may include aggregated values relating to various types of resources used by one or more of the user's applications at one or more data centers in the Cloudware network. Examples of such User-related Cloudware Resource Information may include, for example: current (or real-time) total BCU resources being used, current (or real-time) total storage resources being used, current (or real-time) total bandwidth resources being used, etc.
- System status information relating to the operational status of one or more user-related applications implemented in the Cloudware network.

Data Center Content (e.g., 704) relating to various data centers which are part of the Cloudware network. In at least one embodiment, the data center content may include a variety of different information such as, for example, one or more of the following (or combinations thereof):

- Information relating to data center locations. For example, as illustrated in the example of FIG. 7, different graphical objects (e.g., 704_a_, 704_b_) may be used to represent different geographic data center locations throughout the global Cloudware network.
- Information relating to data center resources. For example, as illustrated in the example of FIG. 7, different graphical objects (e.g., 704_a_, 704_b_) may have different characteristics (e.g., shapes, sizes, colors, etc.), which, for example, may be used to represent relative resource availability at different data center locations throughout the global Cloudware network. For example, in one embodiment, the relatively larger size of object 704_b_ as compared to object 704_a_ may indicate that the data center associated with object 704_b_ has relatively more resources available to the user than the data center associated with object 704_a_. Alternatively, in other embodiments, different graphical objects (e.g., 704_a_, 704_b_) may have different characteristics (e.g., shapes, sizes, colors, etc.), which, for example, may be used to represent the relative resources utilized by the user's various applications at different data center locations throughout the global Cloudware network. For example, in one embodiment, the relatively larger size of object 704_b_ as compared to object 704_a_ may indicate that more resources are being utilized by the user at the data center associated with object 704*b* than the resources being utilized by the user at data center associated with object 704*a*.

- Information relating to data center status. For example, different graphical objects (e.g., 704*a*, 704*b*) may have different characteristics (e.g., shapes, sizes, colors, etc.), which, for example, may be used to represent the operational status of applications running at different data center locations throughout the global Cloudware network. For example, in one embodiment, a data center object represented in the color green may indicate that all systems and applications are functioning normally; a data center object represented in the color yellow may indicate that some systems and/or applications have experienced errors in the past 24 hours; and a data center object represented in the color red may indicate that one or more systems and/or applications are not functioning normally. In at least one embodiment, the user may select (e.g., click on) a specific data center object (e.g., 704*a*) to access additional information (e.g., resource information, status information, services, fees, etc.) relating to that data center. For example, in the example of FIG. 7, it is assumed that data center object 704*a* is represented using a red color, and that the user has clicked on (or hovered a pointer over) object 704*a* in order to access additional information relating to the data center status which, in this example, indicates that an application error has currently been detected at the data center relating to a "bugtracker2" application running at that data center.
- Information relating to the status of one or more of the user's applications which are implemented at one or more data centers in the Cloudware network.

Message Content (e.g., 706) relating to various types of messages which may be of interest to the user. In at least one embodiment, various messages may be generated by various entities of the Cloudware network such as, for example: the Cloudware System, DCOs, applications, users, and/or other entities of the Cloudware network. In at least one embodiment, at least a portion of the messages may relate to various types of subject matter such as, for example, one or more of the following (or combinations thereof):

- User related subject matter.
- Application related subject matter (e.g., relating to one or more of the user's applications which are running on the Cloudware network).
- Data center related subject matter.
- Virtual appliance related subject matter (e.g., relating to one or more virtual appliances associated with one or more of the user's applications which are running on the Cloudware network).
- Sales and/or support requests originated by the user or the user's account
- Other subject matter which may be of interest to the user and/or related to the user's activities in the Cloudware network.
- etc.

Content (e.g., 716) relating to various types of network accessible virtual appliances and/or applications such as, for example, one or more of the following (or combinations thereof):

- application catalogs
- applications
- appliance catalogs
- appliances
- service catalogs and/or services available to the user
- etc.

Content (e.g., 720) relating to various types of actions and/or operations which may be initiated by the user via GUI 700. For example, according to different embodiments, user dashboard page 700 may provide functionality for enabling the user to initiate various actions or operations such as, for example, one or more of the following (or combinations thereof):

- Creating new applications;
- Starting or running application(s).
- Stopping application(s).
- Placing selected applications in standby mode.
- Looking up application and/or virtual appliance documentation.
- Logging into selected applications.
- Monitoring selected applications/virtual appliances.
- Updating or monitoring the states of selected applications/virtual appliances.
- Editing or modifying selected applications/virtual appliances.
- Viewing or editing the application's infrastructure;
- Reviewing application's log
- Logging into an application or application's management interface
- Reserving resources for an application prior to starting it;
- Configuring an application (configuring parameters, assigning resources, location, etc.);
- Renaming, copying and/or deleting the application;
- Exporting an application (e.g., for backup or deployment outside of Cloudware)
- Importing an application (e.g., from backup)
- Migrating the application between grids or datacenters, so that a more appropriate location can be used (e.g., cheaper, better quality, closer to user's locality, resource availability, etc.)
- Publishing an application so that other users and accounts can create instances of it (free or for-pay);
- Creating an instance (provisioning) of a published application;
- Promoting an application instance into an application template, so instances of that template can be easily provisioned;
- Performing various other operations over whole applications;
- Reading messages received through the service;
- Viewing application's resource usage, estimated resource usage and charges;
- Viewing the amount of license and usage fees accrued to user's account for resources, applications and/or appliances published by the user or user's account;
- etc.

Content (e.g., 710) for enabling the user to access various types of application and/or virtual appliance information.

Content (e.g., 712) for enabling the user to access various types of network information (such as, for example, various types of information relating to the Cloudware network and/or its resources). Examples of various types of network information may include, but are not limited to, one or more of the following (or combinations thereof): users, data centers, DCOs, people, publishers, organizations, applications, virtual appliances, catalogs, etc. Additional details relating to various types of network information which may be accessed by the user are further described with respect to FIG. 12.

Content (e.g., 714) for enabling the user to access various types of messages and/or message related functionality. Additional details relating to messages and/or message related functionality which may be accessed by the user are further described with respect to FIG. 12.

Content (e.g., 750) relating to various applications which may be instantiated at the Cloudware network. For example, as illustrated in the example of FIG. 7, region 750 of the GUI 700 may include graphical objects (e.g., 750*a*, 752*a*, 752*b*, 752*c*, etc.) and/or associated text which may be used to represent different instances of applications which may be instantiated at one or more data centers of the Cloudware network. In at least one embodiment, the user may modify or arrange the display of the application objects (e.g., in region 750) as desired. In at least one embodiment, as shown, for example, at 752, various different application objects (e.g., 752*a*, 752*b*, 752*c*) may be grouped together (e.g., via user manipulation and/or via automated mechanisms). In at least one embodiment, different graphical objects (e.g., 750*a*, 752*a*, 752*b*, 752*c*) may have different characteristics (e.g., shapes, sizes, colors, graphics, text, images, etc.), which, for example, may be used to indicate various properties of the various applications such as, for example, one or more of the following (or combinations thereof):

- Application type (e.g., application category type).
- Application name.
- Application status (e.g., normal, stopped, standby, error, initializing, requires manual intervention, etc.).
- Application runtime (e.g., cumulative runtime since application was instantiated and started);
- Application owner (e.g., whether started by the current user or by another user with permissions on the account)
- Application availability to the user: whether the user has permissions to perform various actions, such as start/stop/view/change/manage the application; whether the application is currently in use by another user;
- Application resource usage,
- Available disk space;
- Application load in absolute terms (e.g., 4.5 CPU load) and compared to available resources (60% load)
- etc.

Content (e.g., 730) relating to searching/filtering functionality which, for example, may be operable to enable the user to initiate and/or perform searches/filtering for various types of applications using a variety of different search/filtering criteria such as, for example, one or more of the following (or combinations thereof):

- Application state criteria (e.g., 730*a*), such as, for example: stopped, running, in error, etc.
- Keywords criteria (e.g., 730*b*)
- Time started
- Resource usage (e.g., above 3 CPU, less than 200 MB RAM, more than 1 TB disk storage, etc.)
- Resource utilization (e.g., above 80%)
- Application name or catalog template name (e.g., TWiki)
- Name of appliance used in the application (e.g., MYSQL)
- Location where the application is running (e.g., Tokyo)
- Various types of resource criteria and/or constraints (e.g., 730*c*)
- Combination of multiple criteria using boolean operators such as, for example, AND, OR, NOT, etc. (e.g., State=Running AND (BCU>40R Utilization>80%))
- etc.

Figure 8:
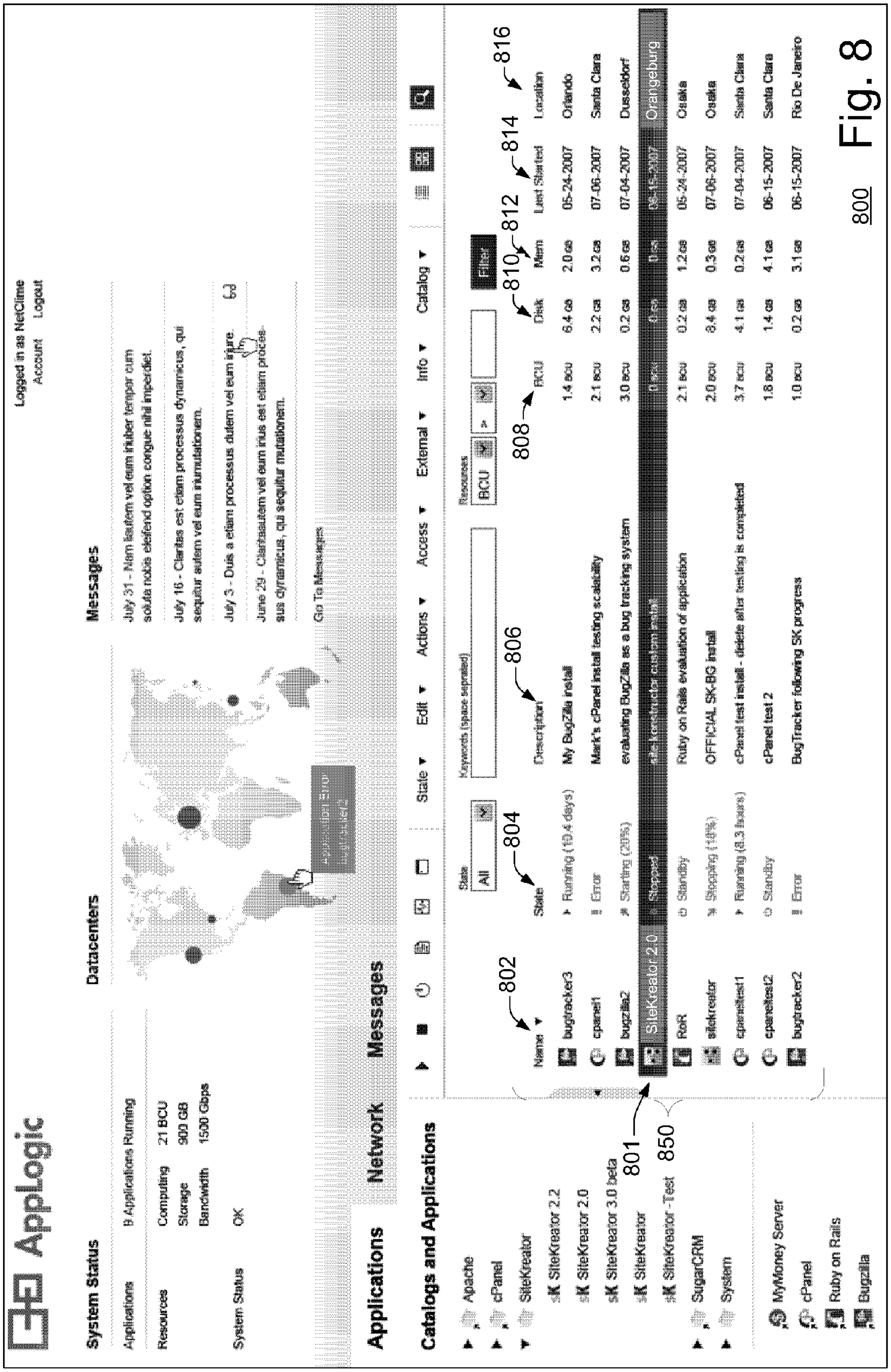
FIG. 8 shows an example embodiment of graphical user interface (GUI) 800 which may be used for implementing various Cloudware related aspects/features.

FIG. 8 shows an example embodiment of graphical user interface (GUI) 800 which may be used for implementing various Cloudware related aspects/features. In at least one embodiment, GUI 800 may be implemented as a web page which may be accessible to users via conventional Web browsers such as Microsoft Internet Explorer, Mozilla Firefox, etc.

In the example of FIG. 8, GUI 800 may correspond to an alternate embodiment of a user dashboard page which is associated with a particular Cloudware user (or customer).

According to specific embodiments, the user dashboard page may be accessible to various entities or Cloudware customers such as, for example: data center operators, end users, publishers (e.g., publishers of applications, appliances), etc. In the example of FIG. 8 it is assumed that a user has logged into the Cloudware System, and that at least a portion of the content of user dashboard page 800 has been dynamically generated for that particular user.

As shown in the example of FIG. 8, user dashboard page 800 includes a variety of different types of content which may be related to or associated with one or more applications which the user is running on the Cloudware network. Examples of such content may include at least a portion of the various content previously described and illustrated with respect to FIG. 7.

As illustrated in the example embodiment of FIG. 8, portion 850 of the GUI 800 may include different types of content relating to various applications which may be instantiated at the Cloudware network. In the particular example of FIG. 8, region 850 includes an application information table which provides various types of information relating to different instances of applications which may be instantiated at one or more data centers of the Cloudware network.

In at least one embodiment, the user may modify or arrange the display of the application objects (e.g., in region 850) as desired. For example, in one embodiment, the user may elect to display and/or sort the information displayed in the application information table according to various criteria such as, for example, one or more of the following (or combinations thereof):

- application name (e.g., 802)
- application state (e.g., 804)
- application description (e.g., 806)
- various types of application resource criteria such as, for example, one or more of the following (or combinations thereof):
  - BCU usage criteria (e.g., 808)
  - storage/disk usage criteria (e.g., 810)
  - CPU usage criteria (e.g., allocated and/or actual load)
  - memory usage criteria (e.g., 812)
  - time-related criteria (such as, for example, date/time application was last started, e.g., 814)
  - location criteria (e.g., location of the data center(s) hosting the application)
  - name of application template used to create the application
  - user information (e.g., identity of user who last started or last modified the application; identity of user that is currently modifying or managing the application)
  - etc.

In at least one embodiment, a user may select a record or entry (e.g., 801) in the application information table in order to access additional information relating to the application associated with the selected entry. Thus, for example, in one embodiment, a user may select entry 801 of the application information table in order to access additional information/features associated with the SiteKreator 2.0 application which, for example, is instantiated in the Orangeburg data center. Examples of the various types of additional information/features which may be accessed by the user are illustrated, for example, in FIGS. 9-11 of the drawings.

Figure 9:
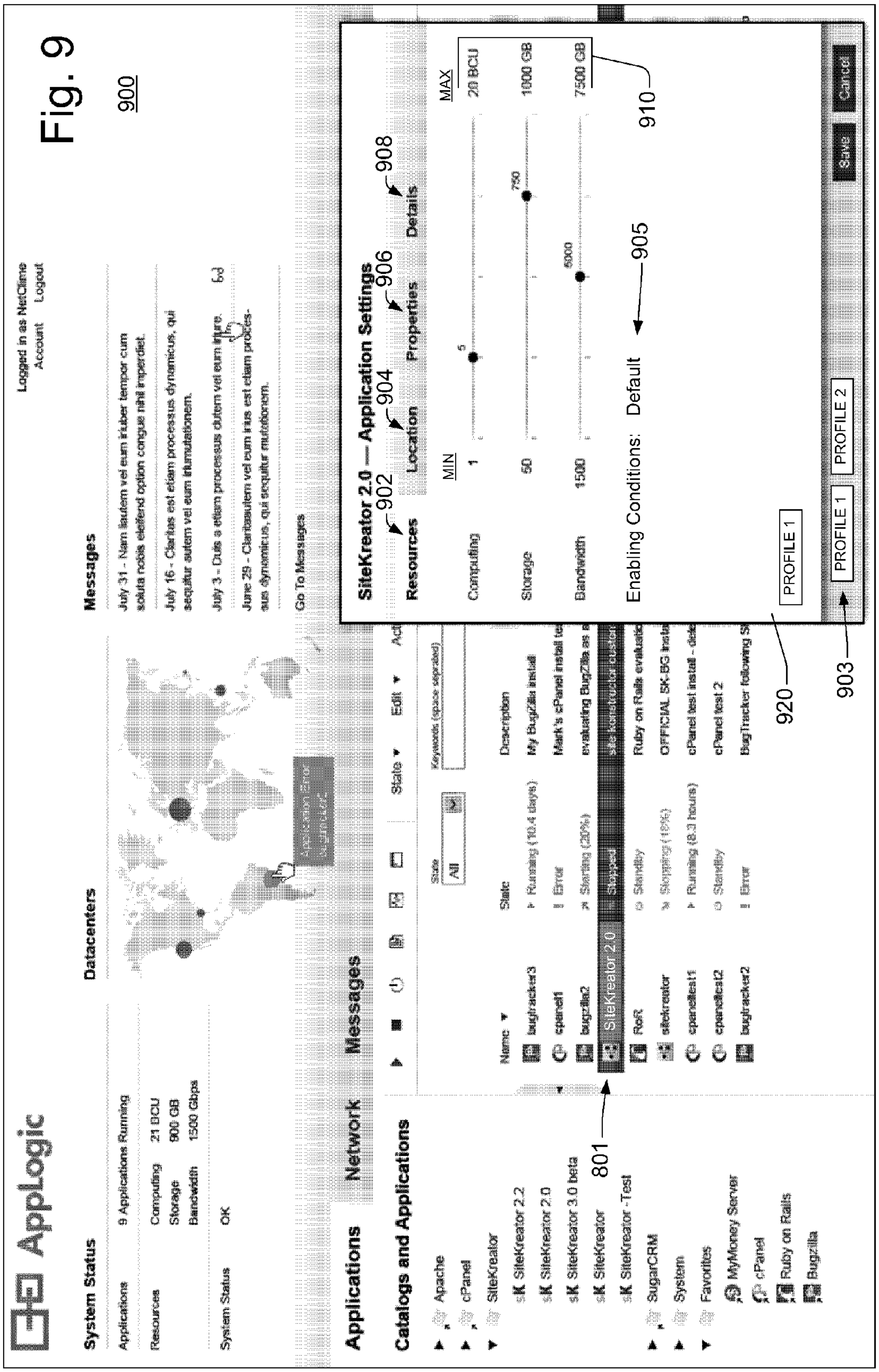
FIG. 9 shows an example embodiment of graphical user interface (GUI) 900 which may be used for implementing various Cloudware related aspects/features.

FIG. 9 shows an example embodiment of graphical user interface (GUI) 900 which may be used for implementing various Cloudware related aspects/features. In at least one embodiment, GUI 900 may be implemented as a web page which may be accessible to users via conventional Web browsers such as Microsoft Internet Explorer, Mozilla Firefox, etc.

In the example of FIG. 9, it is assumed that GUI 900 includes various types of content and/or features which are similar to the content/features described previously with respect to GUI 800 of FIG. 8.

Additionally, in the example of FIG. 9, it is assumed that a user has selected entry 801 of the application information table in order to access additional information/features associated with the SiteKreator 2.0 application which, for example, is instantiated in the Orangeburg data center.

As illustrated in the example embodiment of FIG. 9, when the user selects entry 801 of the application information table, a secondary GUI (e.g., Application Settings GUI 920) is displayed to the user which enables the user to access and/or modify various settings relating to the selected application instance such as, for example, one or more of the following (or combinations thereof):

- Resource settings (e.g., 902)
- Location settings (e.g., 904)
- Property settings (e.g., 906)
- Advanced resource settings (e.g., minimum/maximum resource ranges, defaults, disk storage capacity, bandwidth, etc.)
- Application details (e.g., application name, description, tag fields, billing codes, unique ID, application group/category name, etc.)
- Application control settings (e.g., field engineering code, debug/normal start mode, custom boot timeout values, appliance class/catalog version selections)
- Application notes and documentation
- Other details/settings associated with the selected application (e.g., 908)

In the example of FIG. 9, it is assumed that the user has elected to access and/or modify various resource settings relating to the selected application instance (e.g., SiteKreator 2.0 application corresponding to entry 801 of the application information table).

As illustrated in the example embodiment of FIG. 9, the resources portion (e.g., 902) of the Application Settings GUI 920 may include various types of content (e.g., 910) relating to different types of resources (and their current parameter values) associated with the selected application instance. Examples of such resource types may include, but are not limited to, one or more of the following (or combinations thereof):

- computing resources (e.g., CPU, memory and/or BCU)
- storage resources
- bandwidth resources
- disk storage resources;
- etc.

In at least one embodiment, the displayed resource information (e.g., 910) may include one or more of the following types of information (or combinations thereof):

- Information relating to minimum and/or maximum parameters for a given resource type (e.g., Min computing resource=1 BCU, Max computing resource=20 BCU). In at least one embodiment, the Min/Max resource parameter values may be automatically and/or dynamically determined by the Cloudware System, for example, based on real-time resource availability data associated with the data center(s) which is currently hosting the selected application instance.
- Information relating to the current parameter value for a given resource type (e.g., current computing resource for selected application instance=5 BCU)
- Information related to desired parameter value(s) for a given resource type (e.g., desired to change the current value of 5 BCU to 6 BCU)
- Information relating to recommended parameter value(s) for a given resource type (e.g., based on typical usage or based on application's load)
- Information relating to peak and/or average load values (e.g., as measured during application's execution)
- etc.

In at least one embodiment, the user may use the GUI 920 to adjust or modify the settings of one or more resource types (e.g., by increasing or decreasing their current parameter values) in order to cause the identified resource types to be dynamically changed to a new parameter value as specified by the user. Thus, for example, in one embodiment, if the user desired to increase the computing resources associated with the selected SiteKreator 2.0 application instantiated in the Orangeburg data center from 5 BCU to 10 BCU, the user may input the new desired computing resource parameter of 10 BCU (e.g., by sliding the computing resource button from 5 to 10), and click "save". Thereafter, the Cloudware System may processes the user's resource modification instructions, and initiate appropriate actions to automatically and dynamically modify the computing resources associated with the identified SiteKreator 2.0 application instantiated in the Orangeburg data center in accordance with the user's instructions.

In at least one embodiment, GUI 920 may be operable to allow the user to create multiple different application setting profiles (e.g., 903) for a given application. Additionally, in some embodiments, GUI 920 may be operable to allow the user to define one or more conditions and/or events (and/or other criteria) (e.g., as shown at 905) which may automatically trigger the application of specific application setting profiles for the given application upon the occurrence of such events/conditions. For example, in one embodiment, the user may define a first application setting profile (e.g., Profile 1) to serve as the default profile under normal operating conditions, and may define a second application setting profile (e.g., Profile 2) to be implemented upon the occurrence of one or more specified events/conditions (such as, for example, the occurrence of a primary power failure at the data center where the application is instantiated; or, as another example, when the application needs additional processing capacity, for example, during specified peak hours and/or based on actual real-time requirements/needs.

Figure 10:
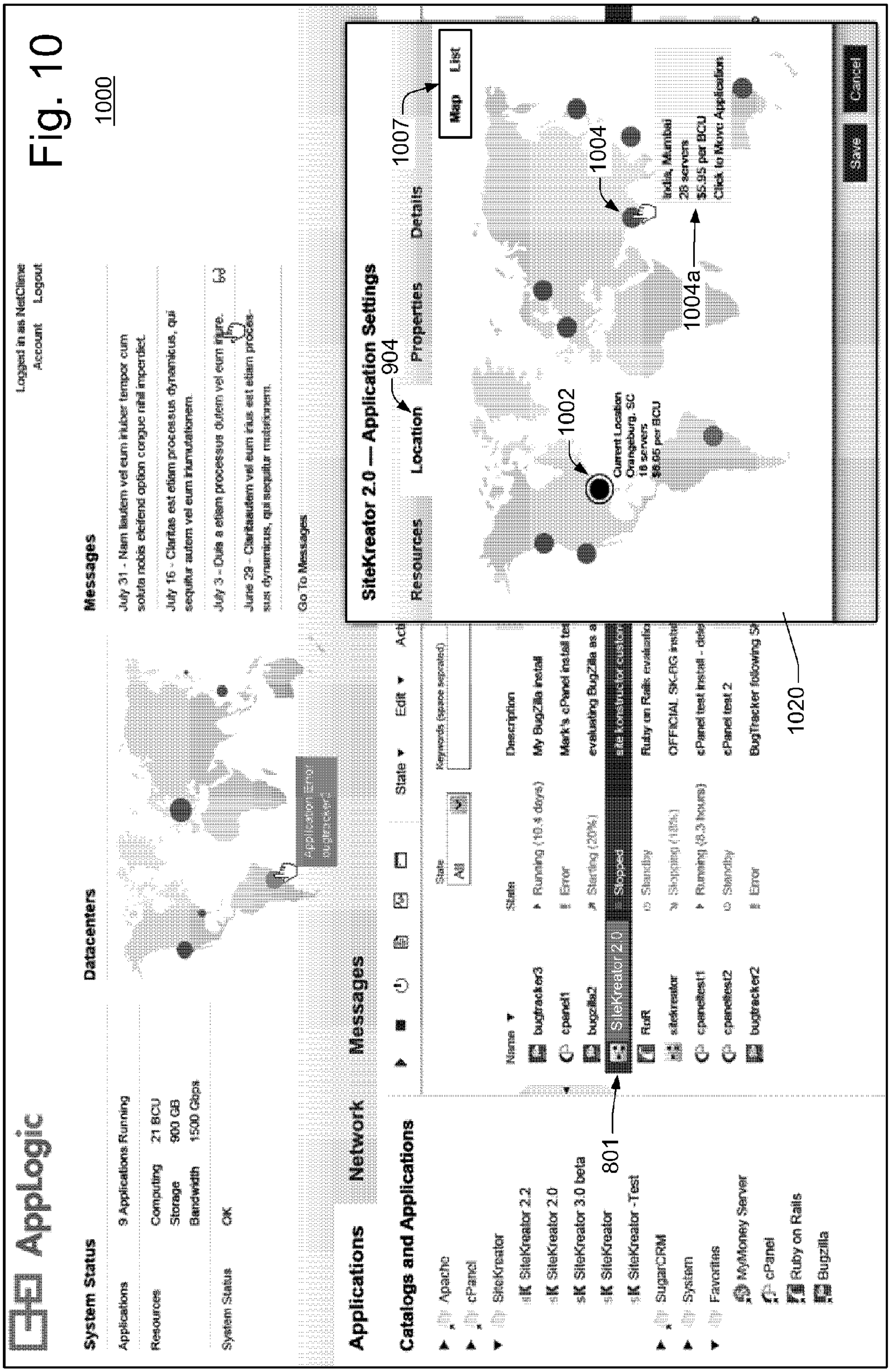
FIG. 10 shows an example embodiment of graphical user interface (GUI) 1000 which may be used for implementing various Cloudware related aspects/features.

FIG. 10 shows an example embodiment of graphical user interface (GUI) 1000 which may be used for implementing various Cloudware related aspects/features. In the example of FIG. 10, it is assumed that GUI 1000 includes various types of content and/or features which are similar to the content/features described previously with respect to GUI 900 of FIG. 9.

In the example of FIG. 10, it is assumed that a user has selected entry 801 of the application information table in order to access additional information/features associated with the SiteKreator 2.0 application which, for example, is instantiated in the Orangeburg data center. Additionally, it is assumed that the user has elected to access and/or modify various location settings relating to the selected application instance (e.g., SiteKreator 2.0 application corresponding to entry 801 of the application information table).

In at least one embodiment, when the user selects Location Tab 904, a secondary GUI (e.g., Application Settings GUI 1020) is displayed to the user which enables the user to access and/or modify various settings relating to the hosted location(s) of the selected application instance.

As illustrated in the example embodiment of FIG. 10, the location portion of the Application Settings GUI 1020 may include various types of content relating to different data centers of the Cloudware network, such as, for example, one or more of the following (or combinations thereof):

- Content relating to data center locations.
- Content relating to data center resources such as, for example, one or more of the following (or combinations thereof):
  - currently available resources
  - total resources operational in the data center
  - maximum/minimum CPU that can be allocated to a single appliance
  - maximum/minimum memory that can be allocated to a single appliance
  - ratios of CPU to memory available on the various grids in the data center
  - brand or class of hardware used in the data center
  - other characteristics of the resources available in the data center
  - etc.
- Content relating to costs associated with various data center resources, for example, one or more of the following (or combinations thereof):
  - price per BCU
  - price per CPU-hour, memory use ($/GB-hour), storage ($/TB-hour or $/TB-month), bandwidth/network transfer ($/GB)
  - resource price bundles available
  - prices for long-term resource reservation and for short-term (burst) use
  - additional discounts available (e.g., appliance and application license discounts available)
  - volume discounts available, promotions, etc.
- Content relating to ratings (e.g., customer ratings) of various data center.
- Content relating to data center operational statistics such as, for example, one or more of the following (or combinations thereof):
  - MTBF
  - mean data center uptime
  - mean data center down time
  - ping time data (e.g., from various different geographic locations)
  - mean data access time
  - network peering relationships and quality/tier of the network connections
  - data center class/tier (e.g., Tier 1 vs. Tier 2)
  - statistics on additional resource availability, e.g., number of times in the last day, week, month and/or year, when requests for additional resources could not be granted because there were no spare resources available
  - additional resource customer metrics, such as average customer retention time
  - statistics of customer service response times for various classes of support requests
  - infrastructure software brand and version for the grids and other resources used in the data center (e.g., AppLogic v.3.1.1, Cisco IOS12.3(1), etc.)
  - etc.
- Content relating to data center's service capabilities, such as link to the data center's specific terms of service and acceptable use policies; service level agreements available (including support response time commitments, uptime commitments, discounts for not meeting the service level agreements, etc.)
- Content relating to data center(s) which are currently hosting or running the selected application instance (e.g., the SiteKreator 2.0 application). For example, as illustrated in the example of FIG. 10, GUI 1020 includes graphical object 1002 which represents the data center (and associated location) which is currently hosting or running the selected application instance.
- Content relating to the recommended location for running the application (not shown), for example, based on application's resource requirements, traffic source, customer-specified objectives (quality, cost, communication latency, etc.);
- Content relating to other data centers in the Cloudware network.
- etc.

In at least one embodiment, GUI 1020 may show the available data centers in a list or table (not shown), and/or as a geographical map. It may also allow zooming in on specific regions, so that additional detail and resolution on the available data centers and their offerings (such as grids with different costs) may be selected by the user—similar in visual operation to speedtest.net, Google Maps, Google Earth, Microsoft Live Virtual Earth, etc.

In another usage example, the user may select the continent, zoom in to the country, state/city, further zoom on a particular data center, and/or the zoom on a section of the data center with specific characteristics, then select an individual grid on which the application runs or should run.

In some embodiments, GUI 1020 may additionally allow the user to specify filters (e.g., in account settings, permanently for the account; for a specific search; etc.) in order, for example, to select a subset of the available data centers based on some criteria, such as geographical area, service level agreement, CPU/memory ratio, price range, etc.

In some embodiments (not shown) GUI 1020 may also be operable to display various types of target user content one or more target user bases for whom the selected application may be targeted toward. Examples of such target user content may include, but are not limited to, one or more of the following (or combinations thereof):

- Mapping content relating to the locations and/or densities of one or more target user bases for which the selected application instance may be targeted toward.
- Ping time information or communication latency information (e.g., associated with one or more data centers) which may be generated, for example, based on portions of the target user base information.
- Bandwidth and other characteristics relevant to streaming audio, video and other content from and to the application.
- etc.

In at least one embodiment, different graphical objects (e.g., 1002, 1004) in GUI 1020 may have different characteristics (e.g., different shapes, sizes, colors, etc.), which, for example, may be used to represent different types of information which may be of use to the user, such as, for example, one or more of the following (or combinations thereof):

- Information relating to relative resource availability at different data centers throughout the global Cloudware network. For example, in one embodiment, the size of the data center object may be used to indicate the relative availability of resources at the corresponding data center.
- Information relating to relative resource costs/fees associated with different data centers throughout the global Cloudware network. For example, in one embodiment, the shape of the data center object may be used to indicate the relative estimated cost for hosting an instance of the selected application at the data center corresponding to that data center object.
- Information relating to the current location of the application. For example, additional graphics/objects (such as the circle around the dot of object 1002) may be used to indicate the location of the data center where the application resides (whether running or not), to be distinguished from all other data center locations. Other graphics and/or content may also be use to visually indicate various criteria. For example, in one embodiment, a padlock shape may be displayed next to a displayed application object to indicate a status of the application (such as, for example, the application cannot be moved). In one embodiment, star shaped icons displayed next to DC locations may indicate relative preferred DC locations (e.g., one-to-five stars as DC rating), one or more currency icons (e.g., $$$ or CC) may be used to indicate relative cost of running in a given data center, etc.
- Information relating to recommended or preferred data center locations for hosting an instance of the selected application. For example, in one embodiment, the color of the data center object may be used to indicate the relative preference for hosting an instance of the selected application at the data center corresponding to that data center object. According to different embodiments, the data center preference information may be based upon a variety of different criteria such as, for example, one or more of the following (or combinations thereof):
  - Criteria specified by the user
  - Criteria relating to data center resource availability
  - Criteria relating to data center operational statistics
  - Criteria relating to target users of the selected application
  - Criteria relating to the cost of running applications
  - Criteria related to the quality of service required by the selected application
  - Criteria related to government and other regulations affecting data privacy and acceptable use
  - etc.

In at least one embodiment, a user may select (e.g., click and/or mouseover) an object displayed in GUI 1020 in order to access additional information and/or features relating to the data center (or other entity) associated with the selected object, including cost and other data center characteristics discussed herein.

For example, as illustrated in the example embodiment of FIG. 10, when the user clicks on data center object 1004, the user may be presented with additional information (e.g., 1004*a*) relating to that data center. Additionally, in some embodiments, the user may be presented with an option to move or migrate the selected application from its current data center location (e.g., 1002) to the newly selected data center (e.g., 1004).

In at least one embodiment, user may only be allowed or in able to move or migrate applications which are owned by or managed by that user.

In at least one embodiment, GUI 1020 may also present the user with an option (e.g., via Map/List icons 1007) for displaying various content presented in GUI 1020 via a list or table. In another embodiment, GUI 1020 may present the user with other visual or graphical representations of the data center and location information (as well as other selected data center features, services, resources, attributes, etc.).

Figure 11:
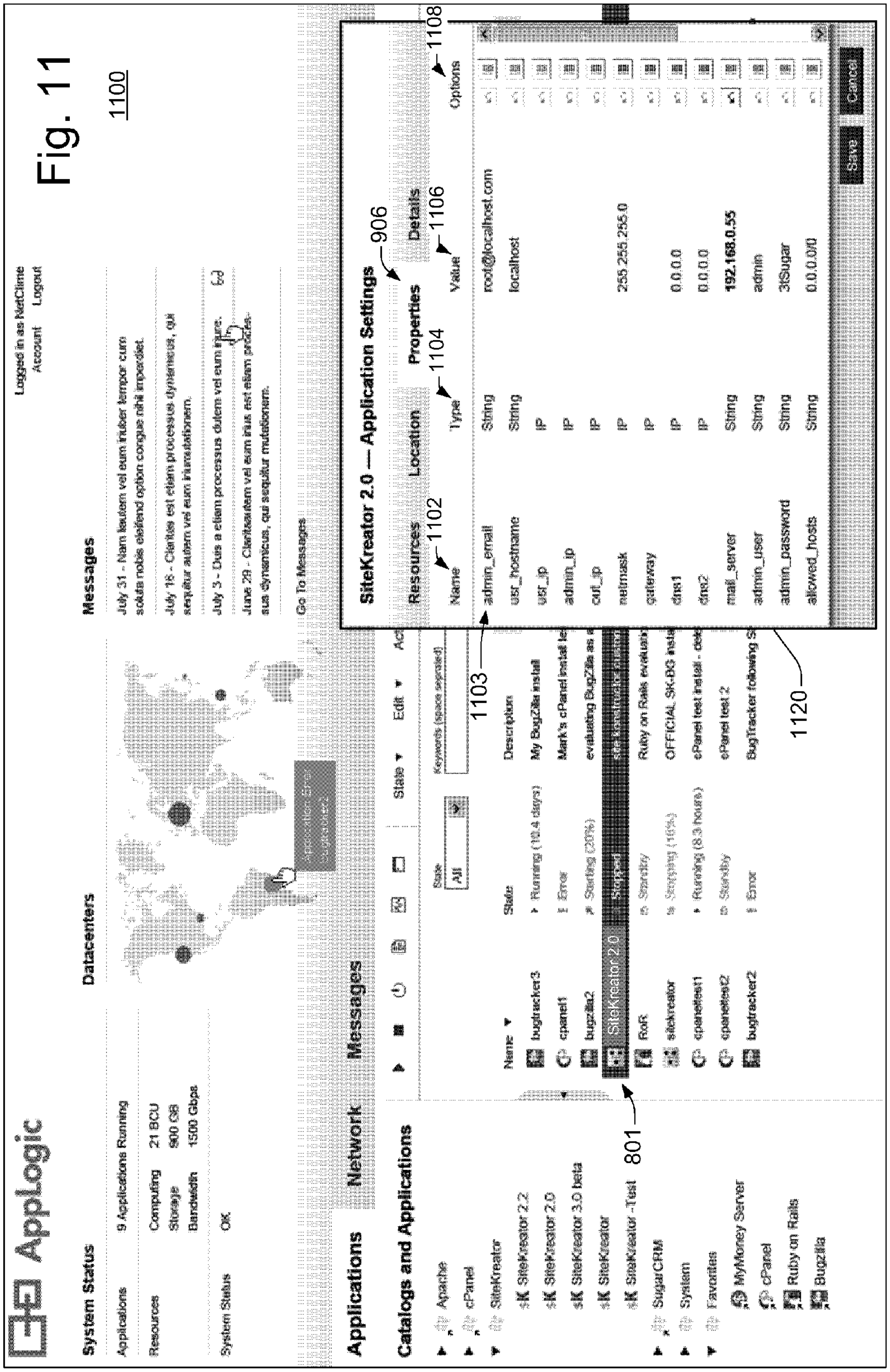
FIG. 11 shows an example embodiment of graphical user interface (GUI) 1100 which may be used for implementing various Cloudware related aspects/features.

FIG. 11 shows an example embodiment of graphical user interface (GUI) 1100 which may be used for implementing various Cloudware related aspects/features. In the example of FIG. 11, it is assumed that GUI 1100 includes various types of content and/or features which are similar to the content/features described previously with respect to GUI 900 of FIG. 9.

In the example of FIG. 11, it is assumed that a user has selected entry 801 of the application information table in order to access additional information/features associated with the SiteKreator 2.0 application which, for example, is instantiated in the Orangeburg data center. Additionally, it is assumed that the user has elected to access and/or modify various properties settings relating to the selected application instance (e.g., SiteKreator 2.0 application corresponding to entry 801 of the application information table).

In at least one embodiment, when the user selects Properties Tab 906, a secondary GUI (e.g., Application Settings GUI 1120) is displayed to the user which enables the user to access and/or modify various properties and/or other settings relating to the properties of the selected application instance. In at least one embodiment, GUI 1100 may enable a user to configure and/or assign various properties of the selected application before starting or re-starting an instance of the selected application.

As illustrated in the example embodiment of FIG. 11, the properties portion of the Application Settings GUI 1120 may include various types of content relating to different properties and/or parameters to be applied to a running instance of the selected application. In at least one embodiment, the user may update or modify at least a portion of the application properties/parameters via GUI 1100. Example of various different types of application properties and/or parameters are illustrated in the example of FIG. 11. Example of other types of application properties and/or parameters are described, for example, in U.S. patent application Ser. No. 11/522,050, by Miloushev et al., entitled "APPARATUS, METHOD AND SYSTEM FOR RAPID DELIVERY OF DISTRIBUTED APPLICATIONS," previously incorporated herein by reference.

Figure 12:
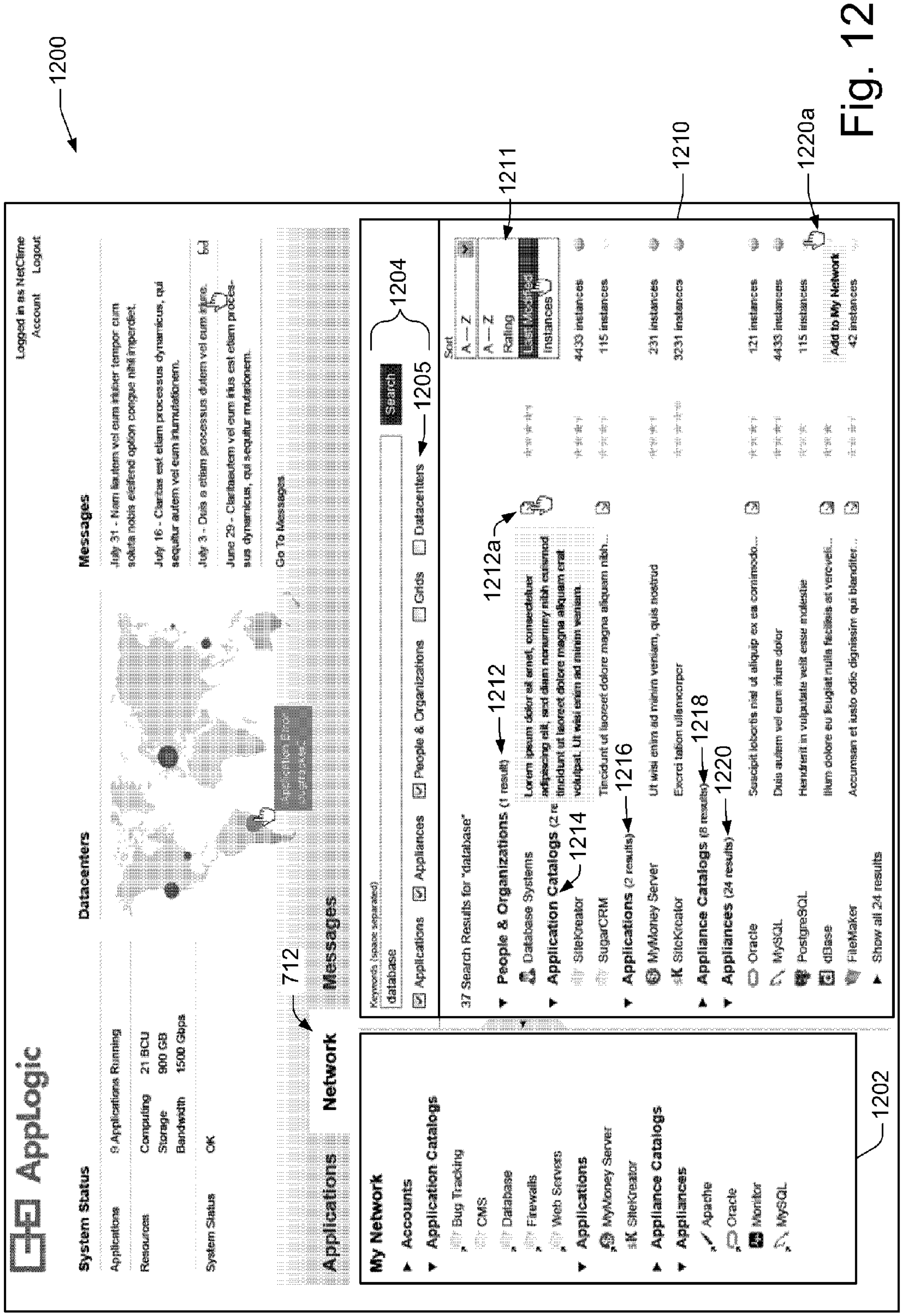
FIG. 12 shows an example embodiment of graphical user interface (GUI) 1200 which may be used for implementing various Cloudware related aspects/features.

FIG. 12 shows an example embodiment of graphical user interface (GUI) 1200 which may be used for implementing various Cloudware related aspects/features. In at least one embodiment, GUI 1200 may be implemented as a web page which may be accessible to users via conventional Web browsers such as Microsoft Internet Explorer, Mozilla Firefox, etc.

In the example of FIG. 12, it is assumed that GUI 1200 includes various types of content and/or features which are similar to the content/features described previously with respect to GUI 700 of FIG. 7. Additionally, it is assumed that the user has elected to access various types of Cloudware network related information, for example, by selecting the Network Tab 712.

In at least one embodiment, when the user selects Network Tab 712, GUI portion 1210 displays various types of content to the user for enabling user to access information and/were features relating to the Cloudware network such as, for example, one or more of the following (or combinations thereof):

- Content (e.g., 1212) relating to people and/or organizations (e.g., within the Cloudware network).
- Content relating to accounts on the Cloudware networks
- Content (e.g., 1214) relating to application catalogs.
- Content (e.g., 1216) relating to applications.
- Content (e.g., 1218) relating to appliance catalogs.
- Content (e.g., 1220) relating to appliances (e.g., virtual appliances).
- Content relating to grids (e.g., utility computing grids) in the Cloudware network.
- Content relating to data centers within the Cloudware network.
- Content relating to service catalogs (e.g., catalogs of services accessible to Cloudware users)
- etc.

Additionally, as shown in the example of FIG. 12, GUI portion 1210 may also include content (e.g., 1204) relating to searching/filtering functionality which, for example, may be operable to enable the user to initiate and/or perform searches/filtering using a variety of different search/filtering criteria such as, for example, one or more of the following (or combinations thereof):

- Keyword criteria
- Application criteria
- Appliance criteria
- People/Organization criteria
- Grid criteria
- Data Center criteria
- etc.

Additionally, as shown in the example of FIG. 12, GUI 1200 may also include content portion 1202, which, in at least one embodiment, may be operable to display dynamically generated, customized content relating to the user's preferred network resources and/or other information. In at least one embodiment, the user may browse through various content displayed in GUI portion 1210, and selectively add/delete/modify desired network content/resources to/from the user's customized (or personalized) network resource content portion 1202.

It will be appreciated that the various network resources which may be displayed in GUI portion 1210 and/or selectively add/deleted to/from the user's customized (or personalized) network resource content portion 1202 may include various different types of network resources which may aid or facilitate the user in implementing and/or performing various activities at the Cloudware network. As illustrated in the example of FIG. 12, examples of different types of network resources may include, but are not limited to, one or more of the following (or combinations thereof):

- Resources relating to people and/or organizations (e.g., within the Cloudware network).
- Resources relating to application catalogs.
- Resources relating to applications.
- Resources relating to appliance catalogs.
- Resources relating to appliances (e.g., virtual appliances).
- Resources relating to grids (e.g., utility computing grids) in the Cloudware network.
- Resources relating to data centers within the Cloudware network.
- Etc.

In one embodiment, the user can drag a resource found in the search results shown in content of GUI portion 1210 into his customized network content 1202. In one embodiment, this will make the selected resource (e.g., appliance, application, catalog, service, datacenter, etc.) available in user's "personalized" network, which may also able it to be more easily accessible for selection, for example, when the user is performing various other functions (e.g., creating new application instances from a catalog, editing application infrastructure, moving applications from one datacenter to another, etc.). In at least one embodiment, the Cloudware network may be configured or designed to allow the user to utilize only those entities which are part of the user's personalized network (sometimes referred to as "favorites"). In at least one embodiment, a user's personalized or customized network may include, for example, one or more of the following (or combinations thereof): lists of approved applications, lists of approved appliances and/or catalogs, lists of approved/preferred data centers, etc.

In at least one embodiment, the Cloudware network may be configured or designed to automatically analyze and select a preferred data center for placing (e.g., initial placement, or subsequent migration) a given application. In one embodiment, the Cloudware network may be operable to give preference to particular data centers which are part of the user's (or which are part of an account's) personalized network and/or may give preference to particular data centers which meet selection criteria specified by the user/account holder.

In at least one embodiment, a user can remove resources from his personalized network 1202, for example, by selecting them with the mouse and requesting a "remove" operation. In addition, in one embodiment, a resource may be removed by dragging the resource's icon (or other object representing the resource) out of the content 1202 and dropping it outside (e.g., dragging it back into GUI portion 1210).

In at least one embodiment, at least a portion of the various content provided in one or more of the GUIs illustrated in FIGS. 3-17 may be generated by the Cloudware System and/or may be accessed by a user via the Cloudware network.

In one embodiment, the content of GUI portion 1210 may also be made available as search results through general-purpose search engines such as Google, Yahoo and MSN Search, for users who are not logged in, or who do not even have an account with the Cloudware service. For example, in one embodiment the Cloudware System may publish profiles of the resources and/or content available at the Cloudware network (e.g., datacenters, accounts, catalogs, applications, appliances, services, etc.) as static web pages, and may submit them to search engines for indexing. This approach allows those who search for a particular solution (e.g., clustered MySQL) to find solutions available on the Cloudware service even if they themselves are not yet a Cloudware service member/user, thereby attracting additional customers and content providers to the services provided by or offered at the Cloudware network, as well as providing additional demographic data of those interested in a particular solution.

In one embodiment, the Cloudware System may further collect statistics on such searches and page hits, and provide suggestions for targeted ads. In at least one embodiment, the content published as static web pages and searchable on the web without customer login may be limited in certain ways, for example without links or details that are available only to logged in users (e.g., pricing info may be unavailable without knowing the type of customer: for profit, non-profit, reseller, academic).

Figure 13:
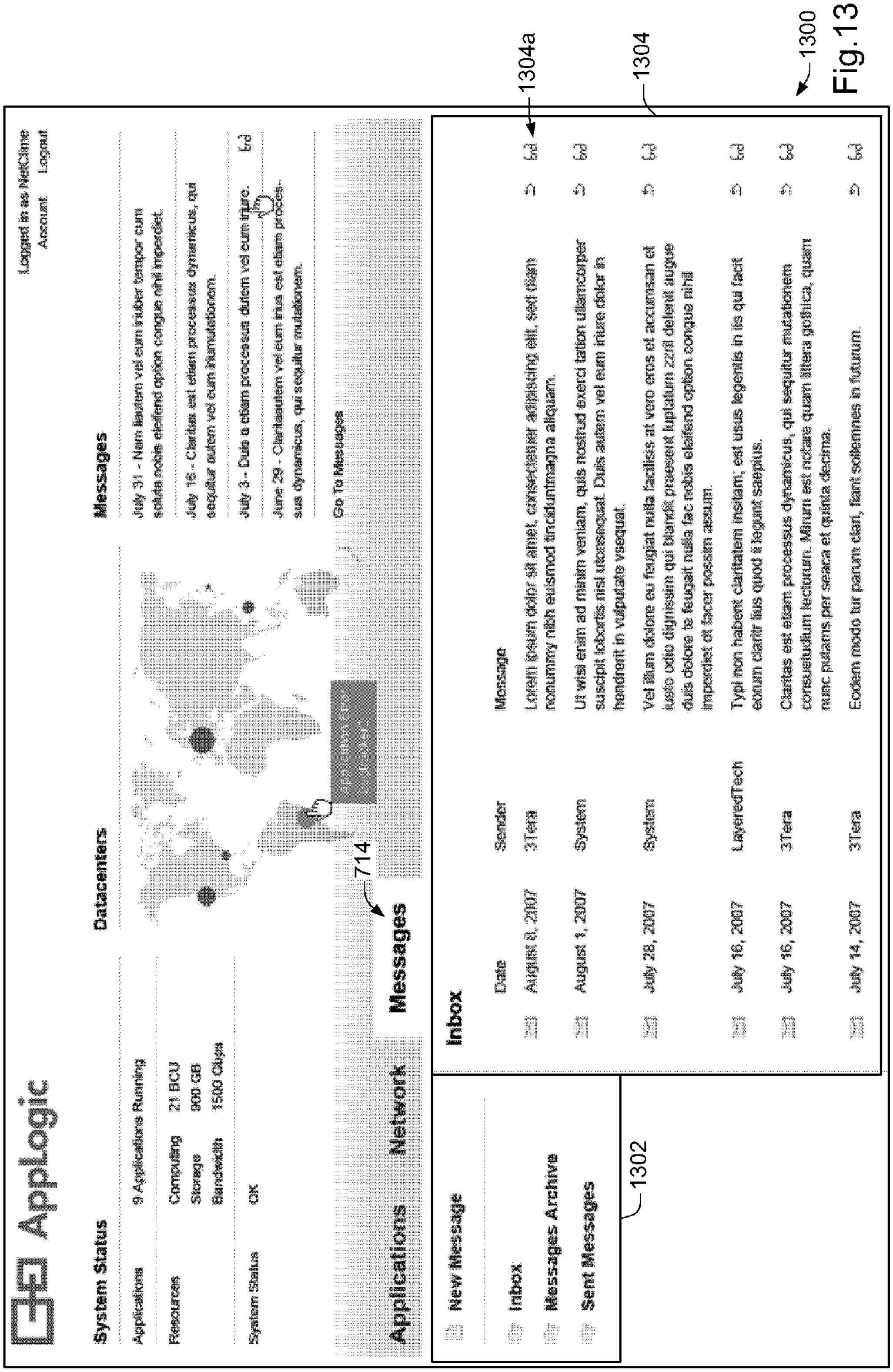
FIG. 13 shows an example embodiment of graphical user interface (GUI) 1300 which may be used for implementing various Cloudware related aspects/features.

FIG. 13 shows an example embodiment of graphical user interface (GUI) 1300 which may be used for implementing various Cloudware related aspects/features. In at least one embodiment, GUI 1300 may be implemented as a web page which may be accessible to users via conventional Web browsers such as Microsoft Internet Explorer, Mozilla Firefox, etc.

In the example of FIG. 13, it is assumed that GUI 1300 includes various types of content and/or features which are similar to the content/features described previously with respect to GUI 700 of FIG. 7. Additionally, it is assumed that the user has elected to access various types of Cloudware message related information, for example, by selecting the Messages Tab 714.

In at least one embodiment, when the user selects Network Tab 714, GUI portion 1304 displays various types of content to the user for enabling user to access various types of message related information and/or features such as, for example, one or more of the following (or combinations thereof):

- Messaging activity relating to various people and/or organizations (e.g., within the Cloudware network).
- Messaging activity relating to various application catalogs.
- Messaging activity relating to various applications.
- Messaging activity relating to various appliance catalogs.
- Messaging activity relating to various appliances (e.g., virtual appliances).
- Messaging activity relating to various grids (e.g., utility computing grids) in the Cloudware network.
- Messaging activity relating to various data centers within the Cloudware network.
- Messaging activity relating to other types of resources associated with the Cloudware network.
- Messaging activity relating to various network elements within the Cloudware network.
- Messaging activity relating to support requests submitted by the user or users of the account (organization)
- Messaging activity relating to outsourced projects (such as, for example, application/appliance development, management of application's operations, supporting customers, etc.) that are managed through the service
- Messaging activity from outside the Cloudware service that users may have subscribed to, including, for example, one or more of the following (or combinations thereof): usenet groups, XML feeds, Really Simple Syndication (RSS) feeds, Atom syndication feeds (see IETF RFC 4287), other content syndication and distribution systems, messaging systems, Instant Messaging (IM) systems (such as Skype, Jabber and AOL Messenger), news subscriptions, podcasts, blogs, forums, bulletin boards, etc.
- etc.

For example, in at least one embodiment, when a user utilizes a given resource of the Cloudware network (such as, for example, a given application, appliance, data center, etc.), the user may be eligible to subscribe to (and/or may be automatically subscribed to) receive messages relating to that particular resource. For example, in one embodiment, a user may be eligible to subscribe to (and/or may be automatically subscribed to) receive different messages relating one or more of the entities/resources included in the user's personalized and/or customized network resource list (e.g., 1202). This may allow the user to not have to determine which organization(s) publishes or maintains a given resource of the Cloudware network, while still allowing the user to receive messages and/or other information related to the resource. Additionally, in at least one embodiment, as the publisher of a given resource changes (e.g., upon acquisition) and/or as an application is moved to a different data center, the user's/account's subscription may be automatically updated (e.g., by the Cloudware System) to the new publisher, without requiring user interaction.

In at least one embodiment, messages relating to a given resource may be generated by various different entities such as, for example, users, the Cloudware System, publishers, DCO's, applications, appliances, grids, data centers, and/or other network entities.

In at least one embodiment, the Cloudware network may include a message distribution system which may include various functionality such as, for example, one or more of the following (or combinations thereof):

- functionality for managing subscriptions to various messaging services;
- functionality for generating messages relating to different types of subject matter;
- functionality for identifying content or subject matter relating to different messages;
- functionality for identifying appropriate recipients (e.g., subscribers/network entities) for receiving distribution of a given message;
- functionality for forwarding messages to appropriate recipients;
- etc.

For example, in one embodiment, a user may generate a message relating to a particular network element (such as, for example, a virtual appliance), and may send the message to the virtual appliance, whereupon the message may then be automatically distributed to subscribers of the virtual appliance. Such subscribers may include, for example, people and/or non-human network entities.

In at least one embodiment, a user may generate a message relating to a particular network element (such as, for example, a virtual appliance, an application, a grid or a data center), and may send the message to that element (or to the element's designated proxy), whereupon the message may then be automatically routed to the organization that provides support services for the selected element and/or for the user's account. In this way, the user may be spared the burden of performing various tasks such as, for example: separately searching for a support organization, figuring out whether his account has a set relationship with a support provider; determining which support provider supports the selected element, etc.

In some embodiments, the Cloudware System may further arrange for a payment scheme between the user and the service provider. For example, in one embodiment, no payment may be required if the account already has a support contract. Alternatively, one-time payments and/or per-incident payment may be arranged through the user's standard payment method(s), thus simplifying and accelerating user's support request(s).

In another embodiment, a message sent to a network element may also (or instead) be posted to a community bulletin board, so that information about the element may be shared seamlessly between those who use the element (e.g., tips, suggestions, use cases, success stories, etc.), thereby facilitating community-based support mechanisms.

Additionally, as shown in the example of FIG. 13, GUI portion 1304 may also include content relating to searching/filtering functionality which, for example, may be operable to enable the user to initiate and/or perform searches/filtering using a variety of different search/filtering criteria such as, for example, one or more of the following (or combinations thereof):

- Keyword criteria
- Application criteria
- Appliance criteria
- People/Organization criteria
- Grid criteria

- Data Center criteria
- Date criteria
- Read/unread messages
- Message importance criteria
- Overdue messages indication
- Messages without response
- Message thread
- etc.

In one embodiment, the messages shown in the content portion 1304 may be further grouped by search criteria, such as the list in the preceding paragraph. In addition, the content portion 1304 may further have action buttons, such as 1304, for replying to a message, for viewing a message and other message actions; message actions may include typical message actions available in e-mail and messaging systems (such as Microsoft Outlook, Mozilla Thunderbird, etc.).

Additionally, as shown in the example of FIG. 13, GUI 1300 may also include content portion 1302, which, in at least one embodiment, may be operable to display dynamically generated, customized content relating to the organization of messages and/or subscriptions relating the user's preferred network resources and/or other information.

In at least one embodiment, the content portion 1302, may provide a hierarchical list of folders in which messages may be organized. In the example of FIG. 13, the folders include and Inbox for organizing incoming messages, a Message Archive for organizing older archived messages, and a Sent Messages folder for organizing messages sent by the user and/or account. In addition, the content portion 1302 may include content related to actions that can be performed by the user, such as a New Message action that allows users to write and send a new message.

In one embodiment, the content portion 1304 may include messages from systems outside of the Cloudware network. Such systems may include, for example, RSS subscriptions, blog entries, podcasts and other subscriptions, news services, etc.

In at least one embodiment, at least a portion of the various content provided in one or more of the GUIs illustrated in FIGS. 3-17 may be generated by the Cloudware System and/or may be accessed by a user via the Cloudware network.

In one embodiment, the message content 1300 may also be made available through external systems, such as, for example, webmail (e.g., Google Gmail), social networks (e.g., Facebook), business systems (Plaxo, LinkedIn), RSS and other syndication feeds, etc. In one embodiment, the Cloudware network may provide gateways to off-Internet systems, such as, for example, Simple Message Service (SMS), fax, dial-up networks, bulletin board systems (BBS), etc.

FIG. 14 shows an example embodiment of a graphical user interface (GUI) 1400 which may be used for implementing various Cloudware related aspects/features. In at least one embodiment, GUI 1400 may be implemented as a web page which may be accessible to users via conventional Web browsers such as Microsoft Internet Explorer, Mozilla Firefox, etc.

In at least one embodiment, GUI 1400 may correspond to an infrastructure editor page which, for example, may be used to enable a user (and/or other entity) to create, configure, edit, and/or manage various appliances and/or applications. More specifically, in the example of FIG. 14, it is assumed that a user has accessed GUI 1400 (e.g., via the Cloudware network) in order to configure/edit a distributed application (e.g., 1420) which, for example, may be comprised of a plurality of different virtual appliances (e.g., 1422, 1424, 1426, etc.).

According to specific embodiments, the infrastructure editor page may be accessible to various entities or Cloudware customers such as, for example: data center operators, end users, developers, IT staff, system administrators, publishers (e.g., publishers of applications, appliances), etc. In the example of FIG. 14 it is assumed that a user has logged into the Cloudware System, and that at least a portion of the content of infrastructure editor page 1400 has been dynamically generated for that particular user.

As shown in the example of FIG. 14, infrastructure editor page 1400 includes a variety of different types of content which may be related to or associated with one or more applications and/or appliances. Examples of such content may include, but are not limited to, one or more of the following (or combinations thereof):

- Content (e.g., 1402) relating to properties of the infrastructure to be edited/managed. For example, as shown in the example of FIG. 14, infrastructure editor page 1400 is being used to access/edit/manage a portion (e.g., "Main" section) of a SugarCRM application.
- Content (e.g., 1410) relating to various types of network accessible virtual appliances and/or applications such as, for example, one or more of the following (or combinations thereof):
  - application catalogs
  - applications
  - appliance catalogs
  - appliances
  - services available to the application
  - documentation
  - support portal and information
  - development and integration services and/or offerings from various vendors (e.g., related to the content of page 1400)
  - training materials (e.g., documents, how-to's, videos, podcasts)
  - targeted advertisements and/or general advertisements
  - etc.
- Application/Appliance editor GUI (e.g., 1420) operable to allow a user to create, edit, and/or modify various features and/or characteristics associated with one or more applications and/or appliances.
- Content (e.g., 1404, 1406) relating to various types of actions and/or operations which may be initiated by the user via GUI 1400. For example, according to different embodiments, infrastructure editor page 1400 may provide functionality for enabling the user to initiate various actions or operations such as, for example, one or more of the following (or combinations thereof):
  - Starting or running application(s).
  - Stopping application(s).
  - Editing/modifying/defining application and/or appliance parameters, interfaces, etc.
  - Saving changes made to selected applications and/or appliances.
  - Looking up application and/or virtual appliance documentation.
  - Logging into selected applications.
  - Monitoring selected applications/virtual appliances.
  - Updating or monitoring the states of selected applications/virtual appliances.
  - Inspecting cost information associated with the application (e.g., estimates of past costs, and/or estimates of future costs)
  - etc.

In at least one embodiment, GUI portion 1420 may be operable to allow a user to create, edit, and/or modify various features and/or characteristics associated with one or more applications and/or appliances. For example, according to different embodiments, GUI portion 1420 may be operable to enable a user to perform a variety of different activities/operations such as, for example, one or more of the following (or combinations thereof):

- Adding/deleting/modifying various application resources (such as, for example, appliances, interfaces, connections, etc.).
- Adding/deleting/modifying/configuring various appliance resources (such as, for example, classes, objects, interfaces, connections, etc.).
- Logging into selected appliances and/or applications.
- Accessing additional content/information relating to selected appliances and/or applications.
- Accessing and/or editing selected appliance and/or application resources.
- Selecting appliance characteristics to be monitored (e.g., state(s), performance, etc.)
- Monitoring appliance characteristics
- Controlling individual appliances or group of appliances (e.g., start/stop/restart/configure, etc.)
- Inspecting logs associated with selected application(s), individual appliance(s) and/or selected groups of appliances
- Viewing documentation associated with the various application and/or appliance objects; requesting and receiving support and/or additional information about those objects (e.g., through the Cloudware network)
- Etc.

For example, in at least one embodiment, a user may click (e.g., right click) on an icon of a specific appliance (e.g., webserver virtual appliance 1422) in order to access various types of information/content relating to the selected appliance such as, for example, one or more of the following (or combinations thereof):

- Appliance overview content (such as that illustrated and described with respect to FIGS. 5 and 6, for example).
- Forums relating to the selected appliance.
- Messages relating to the selected appliance.
- Resource information relating to the selected appliance (such as that illustrated and described with respect to FIGS. 5 and 6, for example).
- Resource information relating to selected appliance(s) such as, for example, one or more of the following (or combinations thereof): CPU; BCU; memory; storage; network bandwidth; historical data; present/real-time data; configured and recommended values of resources; etc.
- Operations information relating to selected appliance(s), such as, for example, one or more of the following (or combinations thereof): state (running/stopped/in error), presence of expected and/or unexpected traffic, resource use, etc.
- Configuring monitoring parameters, alert thresholds, etc.
- Notes associated with the selected appliance, such as may be created and modified by developers, support, operators, etc.
- etc.

Similarly, in at least one embodiment, a user may click (e.g., right click) on a specific application (e.g., the "Main" section of the SugarCRM application as shown at 1420, or on other locations of the editor canvas) in order to access various types of information/content relating to the selected application such as, for example, one or more of the following (or combinations thereof):

- Application overview content (e.g., similar to that illustrated and described with respect to FIGS. 5 and 6, for example).
- Forums relating to the selected application.
- Messages relating to the selected application.
- Resource information relating to the selected application (e.g., similar to that illustrated and described with respect to FIGS. 5-13, for example)
- Operations and/or content similar to those illustrated and described with respect to FIG. 7, including but not limited to the content portion 720
- etc.

In one embodiment, when a user clicks or selects a given application or appliance, the user may be presented with a dynamically generated and/or customized menu for accessing various types of information/content relating to the selected application/appliance.

Figure 15:
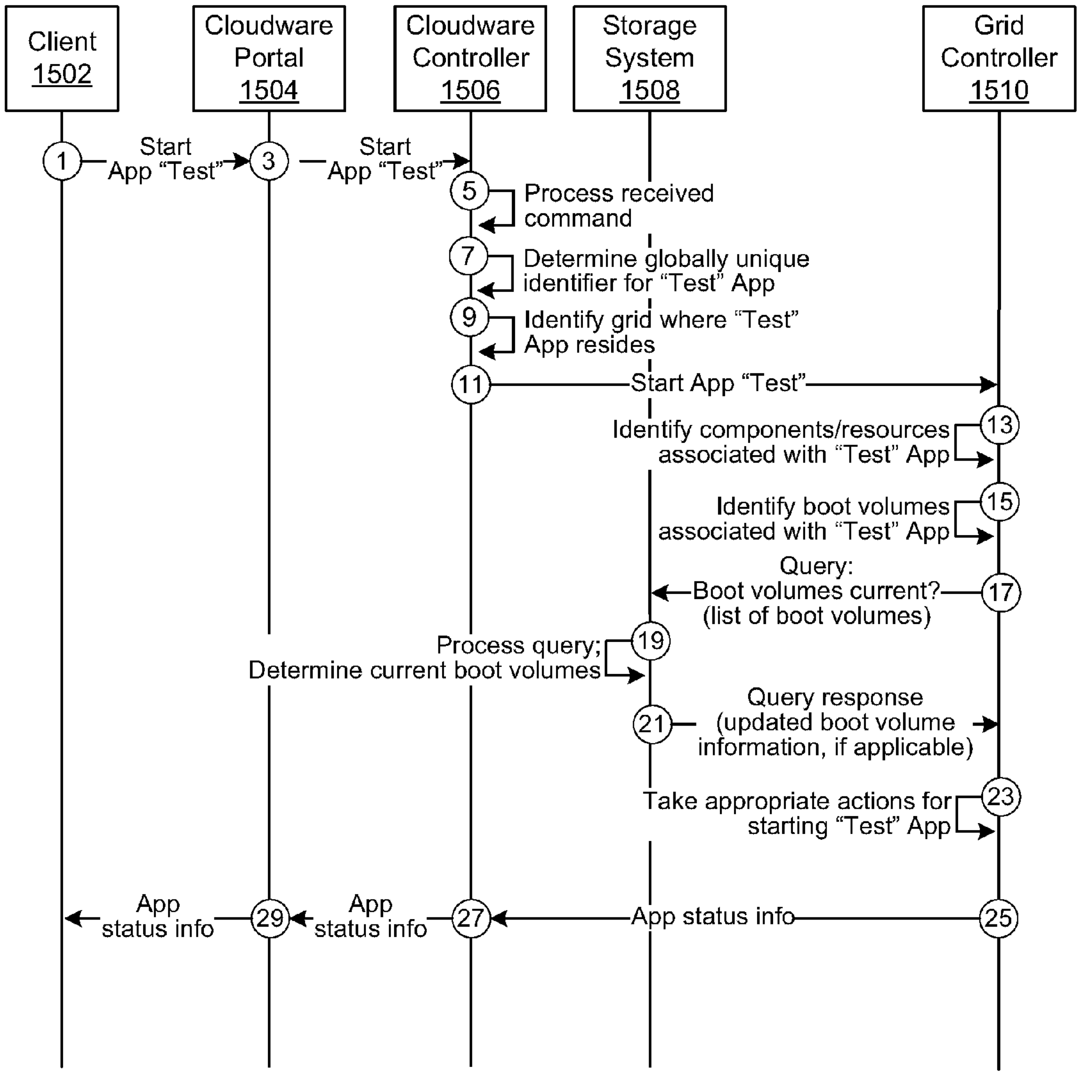
FIG. 15 shows a flow diagram illustrating various information flows and processes which may occur at or between various entities of the Cloudware network.

FIG. 15 shows a flow diagram illustrating various information flows and processes which may occur at or between various entities of the Cloudware network. In the example of FIG. 15, it is assumed that a user (e.g., accessing client computer system 1502) desires to start a running instance of a distributed application (e.g., "Test" application) which is hosted at a computer utility grid of a data center of the Cloudware network.

In this example, it is assumed that a user utilizes client computer system 1502 to access the Cloudware network. In one embodiment, client computer system 1502 may be implemented as a personal computer or workstation which is able to access the Cloudware network via the internet using, for example, conventional Web browsers such as Microsoft Internet Explorer or Mozilla Firefox. In at least one embodiment, client computer system 1502 may acquire access to the Cloudware network via a Cloudware portal system 1504. An example of a Cloudware portal system is described previously with respect to Cloudware User Interface 220 of FIG. 2A.

In the example of FIG. 15, it is assumed at (1) that the user initiates a Start Application (e.g., Start "Test" Application) request at client system 1502. In at least one embodiment, the Start Application request may be forwarded (3) to the Cloudware controller 1506 via the Cloudware portal 1504. An example of a Cloudware controller system is described previously with respect to Cloudware System controller 206 of FIG. 2A.

At (5) it is assumed that the Cloudware controller processes the received Start Application request. In at least one embodiment, the processing of the Start "Test" Application request may include performing one or more of the following operations (or combinations thereof):

- Determining (7) one or more globally unique identifier(s) associated with the "Test" application. For example, in one embodiment, if multiple DCs have a copy of the Test application to run for disaster recovery, each separate instance/copy of the Test application may have its own, respective, unique ID, so that each instance of the application can be controlled separately. In one embodiment, if one complex application (e.g., Test application) spans multiple DCs, then different portion(s) of the app may each have their own respective "section" ID.
- Determining if the user (e.g., the user requesting to start the application "Test") is authorized to perform this action.
- Determining a location (e.g., file location or URL) of the "Test" Application descriptor file(s) and/or associated instructions which may be used to create one or more running instances of the "Test" Application.

- Determining if the account (e.g., on behalf of which the user is starting the "Test") is current on its payment terms and/or resources for the application are authorized for the account.
- Identifying (9) one or more grid(s) where instances of the "Test" Application may be instantiated/started.
- etc.

In the example of FIG. 15, it is assumed that the Test Application is to be instantiated and started at a specific network grid which is managed by grid controller system 1510. In one embodiment where the specific network grid is located at a specific data center, the grid controller system 1510 may reside at the same data center (e.g., where the grid(s) it controls are located). In at least one embodiment, portions of functionality relating to the grid controller system 1510 may be incorporated into DC Manager of the Cloudware System, such as, for example, DC Manager 214 of FIG. 2A.

As shown at (11) the Cloudware controller 1506 may generate and send instructions to grid controller 1510 to initiate a running instance of the Test Application at the specified grid.

In at least one embodiment, if the Cloudware controller 1506 determines that the application should run on a different grid from the one it is currently assigned to, the Cloudware controller may initiate and complete a migration of the application to the target grid controller.

At (13) it is assumed that the grid controller 1510 processes the received Start Test Application instructions from Cloudware controller 1506. In at least one embodiment, the processing of the Start "Test" Application instructions may result in the grid controller 1510 performing one or more of the following operations (or combinations thereof):

- Identifying (13) various components/resources associated with the Test Application.
- Identifying the class associated with one or more components of the Test Application.
- Determining whether the information associated with each of the identified component classes is up-to-date.
- Identifying (15) one or more boot volumes which may be associated with the components of the Test Application.
- Determining (17) whether information associated with each of the identified boot volumes (associated with the Test Application) is current or up-to-date.
- etc.

For example, in at least one embodiment, in order to determine whether information associated with one or more of the identified boot volumes (associated with components of the Test Application) is/are current or up-to-date, the grid controller may query (17) storage system 1508 to verify and/or to provide a list of the current boot volumes and/or class information to be associated with components in the instance of the Test Application which is to be instantiated/started at the specified grid. An example of such a storage system is described previously with respect to storage system 240 of FIG. 2A.

In the example of FIG. 15, it is assumed that the boot volume query provided from the grid controller 1510 to the storage system 1508 includes a list of boot volumes which the grid controller has identified as the appropriate boot volumes to be associated with the components in the instance of the Test Application to be started at the designated grid. In some embodiments, the grid controller 1510 may send this query to the Clowdware Controller 1506, and the Clowdware Controller 1506 may be configured or designed to handle such requests/queries.

At (19) it is assumed that the storage system 1508 processes the Test Application boot volume query sent from the Cloudware controller. In at least one embodiment, the processing of the Test Application boot volume query may result in the storage system (and/or other entity of the Cloudware System) performing one or more operations, including, for example one or more of the following (or combinations thereof):

- Identifying and/or determining appropriate boot volumes to be associated with component instances in the Test Application.
- Analyzing the list of the Test Application component boot volumes provided by the grid controller.
- Generating updated boot volume information (when appropriate) in response to the boot volume query.
- Recording information (e.g., locally and/or remotely such as, for example, at the Cloudware Controller 1506) that the identified boot volumes are being referred to, for example, so that they will be kept longer.
- etc.

At (21) the storage system may generate and send a query response to the grid controller. For example, in one embodiment, the storage system (and/or Cloudware System) may verify that the list of Test Application boot volumes identified by the grid controller is current/up-to-date. In some embodiments, if it is determined that that the list of Test Application boot volumes identified by the grid controller is not current/up-to-date, the query response may include updated boot volume information which includes information relating to the current/up-to-date boot volumes which are to be associated with the Test Application. In addition, if the component class descriptors and/or the boot volumes are found to be out-of-date, the Grid Controller 1510 may identify and/or obtain the most current versions from the Storage System 1506.

At (23), the grid controller may take appropriate action(s) for starting a running instance of the Test Application at the designated grid. In at least one embodiment, the grid controller may utilize at least a portion of information provided in the query response to start the running instance of the Test Application.

In at least one embodiment, the grid controller may be operable to periodically determine and/or generate (25) application status information relating to one or more running applications (such as, for example, the Test Application). Further in at least one embodiment, at least a portion of the application status information may be forwarded (e.g., 27, 29) to the Cloudware system, client system, and/or other entities of the Cloudware network (and/or entities of external networks).

Other Cloudware Aspects/Features

In one embodiment, Cloudware may be defined as a global utility computing environment. For example, in one embodiment, a utility computing service running Cloudware may combine multiple AppLogic™-based grids into a single scalable, highly available computing cloud that may be used to run distributed Web 2.0 applications, for example. The individual grids that comprise the cloud can be located anywhere on the net and/or at various different geographic locations across the world, and may be managed by different hosting providers. Thus, for example, Cloudware may span continents and provide a truly global computing utility, which, for example, may be accessible with just a browser.

In one embodiment, customers may interact with a Cloudware-based service through a web portal and an account controller. The portal may be used to create and manage their accounts, track charges and make payments, browse and search the documentation, forums and catalogs of appliances and applications, view on-line tutorial sessions, open support tickets, etc. The account controller may be used to create, edit and run applications, create new appliances, publish appliances and applications, rate and review other publicly available appliances and applications, etc.

According to specific embodiments, Cloudware may be implemented via a system (e.g., Cloudware System) which may be operable to provision and run distributed applications. In one embodiment, each individual application instance may reside on a particular grid. In some embodiments, different instances belonging to the same customer account can run on different grids.

For example, in one embodiment, when a user provisions a new application instance from a catalog, or creates a new application from scratch, the Cloudware System may decide automatically on which grid the application may reside and run. In the case of geographically distributed cloud, the user may be asked to select preferred regions in which the application is to run (e.g. Western ONE, Texas, Germany, UK, etc.), and the Cloudware System may then automatically determine on which of the grids located in the selected region(s) to provision/create instances of the application. In one embodiment, all or selected applications of the same account running in the same datacenter may have access to a private virtual LAN (VLAN). According to different embodiments, communications which may be implemented on this VLAN may be free (or charged a fee), even between applications running on different grids.

In at least one embodiment, when the user needs to add resources to a running application (e.g., either by restarting the app, or by starting one or more standby appliances within it), the Cloudware System may first attempt to satisfy the request on the same grid on which the application is running. If that grid has sufficient resources, the request may be executed in a manner similar to the techniques described in U.S. patent application Ser. No. 11/522,050 (previously incorporated by reference).

However, if it is determined that the grid does not have sufficient resources, Cloudware may identify a nearby grid with sufficient resources to handle the request and take appropriate action to migrate the application to the identified grid. In one embodiment, migration to different grids within the same datacenter and/or different data centers may be handled with a minimal interruption of service. For example, in one embodiment, the total interruption of service may be substantially the same as the downtime which may occur when restarting the application on the same grid.

Applications as Appliances

In some embodiments, the definition of an application in AppLogic™ may be extended for Cloudware. In one embodiment, the Cloudware-based applications may have properties/characteristics similar to appliances: for example, in one embodiment, the users can instantiate applications by dragging them from a catalog onto a canvas and to configure, start, stop, logon and monitor applications with a single click from a right-button menu. One goal may be to eliminate completely the need to look inside the application: a customer who just wants to use an application, rather than modify/customize its structure or behavior, may be able to do so without even having to know what an infrastructure editor is and/or how to use it.

Marketplace for Appliances and Applications

In at least one embodiment, Cloudware supports a global repository of appliances and applications. Customers can create their own globally accessible catalogs, and publish both appliances and ready application templates in them. Cloudware supports paid appliances and applications with different payment models such as, for example, one or more of the following (or combinations thereof): one time charge per account, one time charge per instance, usage charge per instance, usage charge per resource use (bcu, storage, bandwidth), etc.

In one embodiment, when a user publishes an appliance or application for global access, he or she can also specify the license terms, pricing method, price, etc. For example, various pricing methods may include one or more of the following (or combinations thereof):

- one time fee for unlimited use in an account;
- daily, monthly or annual fee for unlimited use in an account;
- per instance-time (e.g., $1 per instance per hour), or by the max. number of instances running concurrently at any time during a period (e.g., $1 per instance per month);
- per amount of resources used by the appliance/application (e.g., $1 per GB of RAM assigned per hour, no matter how many instances may be using it; $1 per core; $100 per 1 TB of network transfer, etc.)
- per seat (user) in the account;
- volume discount scales (e.g., $1/instance for 1-10 instances; $0.90/instance for >10 instances);
- discounts or free use depending on the datacenter being used (e.g., if the publisher also operates a datacenter or promotes one);
- etc.

In at least one embodiment, when an user from another account decides to use a selected appliance or application (for example, by adding it into his network as described in FIG. 12), the user may be presented with the license agreement, pricing method, price, and/or other usage terms/conditions, and may be prompted to accept or agree to each of them. In one embodiment, once accepted, the user may utilize the selected resources (e.g., may create one or more running instances of the selected appliances/applications) throughout the Cloudware network. Ioe, the Cloudware System may bill the user based on his usage and/or other terms of the pricing model, and remit the collected amount to the publisher, possibly retaining a commission.

Through its metering system, Cloudware may provide detailed usage statements both to the users of published appliances, as well as to the publishers. Additional business opportunities may include, but are not limited to, one or more of the following (or combinations thereof): targeted advertising for published appliances (e.g., publisher pays for ads or clicks; ads may be selected based on criteria specified by publisher, such as use of similar or complementary application or appliance); etc.

Fully Featured API

The Cloudware account controller may implement a REST and/or SOAP API which may provide full access to all or selected capabilities available on a shell (e.g., command line shell, or GUI shell), including, for example, ability to create and start application instances, etc. In addition, the API may enable users to register handlers for receiving system events. In one embodiment, the API may be accessible via SSL from anywhere on the net, including from appliances that run in the Cloudware network on behalf of a specified account. This latter embodiment allows applications to self-manage and/or to manage other applications.

Support for Building Dynamic Global Services

In one embodiment, the user may also be able to convert an application into a service with terminals, and visually assemble a global web operation from instantiable services running in the Cloudware network. In one embodiment, the Cloudware service(s) may be AppLogic™ based application with a boundary that includes, for example, properties, terminals, proper life cycle, and/or other aspects for using the application as a component for building large-scale web systems. In particular, services may be fully dynamic—e.g., customers may be able to instantiate, configure and/or connect services on the fly, either using the visual tools and/or by invoking the API.

Utility Pricing Model

In at least one embodiment, a Cloudware service may have a very low entry barrier. For example, in one embodiment, customers may pay a monthly subscription fee (e.g., $19.95/month) plus the actual amounts of resources they have used during the month. Resources may be preferably metered and billed based on a unit called BCU ("basic computing unit").

For example, in one embodiment, one BCU may be equated to the following resources: 1 GB of RAM, 50% of a CPU and 20 GB of highly available storage. As an illustrative example, initial prices may be $0.10 per BCU/hr, $2 per month for each GB of additional storage and $0.20 per GB of network transfer. Transfer within the same datacenter may be free, transfer between datacenters (including migration and inter-application communications) may be billed.

The services and resources uses may also be billed using other methods, such as one or more of those described herein (including but not limited, per individual resource, bundles, pre-pay, etc.).

Additionally, according to different embodiments, monthly subscription fee(s) may be waived, coupons and discounts used (e.g., a coupon for 100 GB-hours of usage free of charge); and/or other types of e-commerce incentives may be applied.

According to different embodiments, the Cloudware server may be operable to provide one or more of the following features (or combinations thereof):

- Low entry barrier: a credit card, a browser, and $19.95/mo
- Self-serve operation via portal and visual user interface
- Utility-based pay as you go model
- Flexible resource allocation in ⅛ of a BCU increments
- From 1/16 of a CPU to 4 CPU per appliance instance
- High-performance persistent storage
- Guaranteed low latency within an application
- Native support for clustering and large-scale applications
- Redundant highly available storage
- Universal high availability for all or selected applications
- Built-in support for building fault-tolerant applications
- Visual application provisioning & management
- Visual application assembly
- Visual application monitoring
- Full control with only a browser
- Supports development within the Cloudware network
- Web services API
- Community exchange for prepackaged appliances and applications
- Marketplace for paid appliances and applications
- Statistics and ratings for published appliances and applications
- Open system connects Web 2.0 companies, hosting providers and/or independent software vendors (ISVs)
- Service may be scalable to 1,000,000 processors and more
- Seamless global operation
- Easy to migrate apps to virtual private datacenters or in-house
- Ability to seamlessly use shared grid datacenters (e.g., where a single grid can host applications of more than one account/user), virtual private datacenters (e.g., where a grid or a set of physical servers is dedicated to (or allocated for exclusive use to) a particular account/user and will not be shared by other accounts/users), in-house grids (e.g., owned and operated by the account) from the same account, etc.

Other Cloudware Features/Benefits/Advantages

According to different embodiments, it may be important to keep in mind other opportunities/benefits/features which Cloudware enables. Example of some opportunities/benefits/features are described below.

Cloudware may be architected for participation:

- It allows independent data center operators to build grids, register them with the service and start receiving customer workloads.
- It allows independent software vendors to build appliances and applications, publish them on the service and start receiving revenue and support requests as their appliances and applications are used.
- It allows Web 2.0 and SaaS companies to build and operate global online services without ever owning or operating hardware infrastructure The network effect in the system may be based on one or more of the following (or combinations thereof):

- the central repository of appliances and applications, which accumulates value (including reviews, ratings, reliability and usage stats, etc.)
- the central service manager which may be operable to track all or selected workloads and/or all or selected resources available for them, and may be further operable to create value by:
  - matching them to enable operation
  - monitoring them to restore operation after failure
  - creating views of selected statistics
  - allowing search of resources and workloads
  - etc This creates a system that may have exponentially increasing value for all or selected participants:

- The data center operators can make money with greatly reduced sales, marketing and support expense or expertise. In addition to providing resources for the system, data center operators can leverage system integrators, ISVs, support professionals who specialize in operating online services, and/or other services one needs to run an online service through the Cloudware service.
- In one embodiment, the ISVs may have access to a ready market to which they can publish their applications and/or appliances in a manner which is extremely easy to demo, test, evaluate, thereby reaching customers with greatly reduced costs of sales and marketing compared to traditional business models, even if their product itself does not lend itself to viral marketing. In addition to using the service directly, they can leverage system integrators, ISVs, support professionals who specialize in operating online services, and other services one needs to run an online service through the Cloudware service.
- The Web 2.0 and SaaS companies may end up with a complete solution for building and operating their online services. In addition to using the service directly, they can leverage system integrators, ISVs, support professionals who specialize in operating online services, and other services one needs to run an online service through the Cloudware service.

This creates a true utility bringing down the cost of doing business together for all or selected other groups, in which, for example, the Cloudware technology provider (such as, for example, 3TERA) owns the distribution network and the billing system.

One can, for example, run an auction to determine the cost of resources in any given geographical region. This can happen in real time, using a schema like the "clearinghouse auction" which establishes the median price using multiple bids and multiple requests. The resulting uniform price can be determined in real time, hour by hour, resulting in real-time optimization of resource usage. A secondary market can be created for futures, allowing customers to save money by buying capacity in bulk ahead of time, and allowing providers to optimize their loads by selling capacity ahead of time. Inevitably, the market may determine the fair price.

A customer may choose to run their database service in one place, where storage may be less expensive, and take advantage of the fact that front end apps can be moved easily from one place to another to leverage lower cost "offshore" (e.g. Canada, Mexico, Eastern Europe) resources to run the front end of their service.

In at least one embodiment, the resulting model may not be unlike Google, which brings together three parties—consumers, who search and read online content, advertisers who pay for ads, and content providers who serve ads on the content network. By sharing revenue with the content providers, Google increases their reach while remaining in control of the whole system as well as of the pricing on each individual ad.

In at least one embodiment, it may be preferable to create a critical mass of resources, customers and ISVs for the system to obtain sufficient momentum to self propagate. For example, in one embodiment, we may start by sharing revenue with data center operators who sign into the system (and/or who provide resources to the Cloudware network) in exchange for them assuming the risk of dynamic loads and part of the marketing budget. We can do this with commercial hosting provider partners (e.g. Layered Technologies, The Planet).

We can also leverage telecommunications providers facilities (e.g. AT&T, BT, Cable and Wireless) and enterprise data center outsourcers (e.g. Savvis, T-Systems, EDS, Perot, etc) for systems resources as well. This may create an initial resource base which may be broad enough to attract customers of various types and size. We may then bring appliances and application providers into the system, as well as system integrators and consultants.

It is also possible for system integrators, data center operators, ISVs, SaaS providers, enterprise data center outsourcers, system integrators, etc. to sell products and services from the system under their own brand.

In one embodiment, the legal foundation of this may be a consortium comprising 3TERA and/or selected data center operators. In some embodiments, the membership of the consortium may be expanded to include system integrators, ISVs, consultants, support professionals, enterprise data center outsourcers, and others. It may allow one to aggregate a common marketing budget and focus it on promoting the service.

Application Migration Between Geographically Distributed Grid Servers/Data Centers As described herein, one aspect disclosed herein relates to techniques and mechanisms for automatically migrating instances of distributed applications between geographically different server grids and/or data centers.

FIG. 18 shows an example embodiment of a geographically distributed cloud computing network 1800 which includes at least two different data centers (e.g., Data Center A 1810, Data Center B 1820) which are each deployed different geographic locations. For example, in one example scenario Data Center A may be physically deployed in California and Data Center B may be physically deployed in New York. In another example scenario, Data Center A may be physically deployed in Texas (USA) and Data Center B may be physically deployed in Tokyo (Japan).

As illustrated in the example embodiment of FIG. 18, Data Center A and Data Center B are each operable to communicate with each other via a wide area network 1802 (such as, for example, the Internet, a private network, etc.). In at least one embodiment, multiple different server grids from the different data centers may be linked together to form a virtual global server grid which may be used to facilitate utility computing for distributed applications.

As illustrated in the example embodiment of FIG. 18, the cloud computing network 1800 may include a Cloudware (and Billing) System 1806 having components and/or functionality similar to those described, for example, with respect to FIG. 2A.

For purposes of illustration, an example of an application migration procedure will now be described by way of reference to the example embodiment of the geographically distributed cloud computing network of FIG. 18.

In this particular example, as illustrated in the example embodiment of FIG. 18, it is assumed that Data Center A includes at least one server grid (e.g., Server Grid A 1812) which is configured or designed to enable utility computing for distributed applications (e.g., via the use of virtualized computing resources such as those described herein). Similarly, as illustrated in the example embodiment of FIG. 18, it is assumed that Data Center B includes at least one server grid (e.g., Server Grid B 1822) which is also configured or designed to enable utility computing for distributed applications.

In this particular example, it is assumed that an instance of a first distributed application (e.g., Application A1 1816) has been deployed by a user at Server Grid A. Further, it is assumed that Application A1 includes at least one virtual machine (e.g., Virtual Machine A1 1818) and at least one virtual volume (e.g., Virtual Volume A1 1819).

FIG. 19 shows an example embodiment of an interaction diagram illustrating an example of a distributed application migration procedure between two geographically distributed server grids. For purposes of illustration, the example embodiment of the application migration procedure of FIG. 19 will now be described by way of reference to the example embodiment of the geographically distributed cloud computing network of FIG. 18.

In this particular example, for purposes of illustration, it is assumed that a user (e.g., 1902) desires to migrate an instance of the Application A1 (e.g., identified as "Test" App) from Server Grid A to Server Grid B. Accordingly, in this example, Server Grid A may be referred to as the "Source Grid," Server Grid B may be referred to as the "Target Grid," Application A1 may be referred to as the "Source Application," and Application A2 may be referred to as the "Target Application."

As shown at (2) (FIG. 19), it is assumed that a user (e.g., 1902) accesses the target server grid (Server Grid B) in order to Initiate Application Migration of the identified application ("Test" App) from Source Grid 1812 to Target Grid 1822. In at least one embodiment, the user may log into the Cloudware System to obtain access to Server Grid B. In other example embodiments, the application migration procedure may be manually or automatically initiated by the Cloudware System, by one of the server grids (e.g., grid controller of Server Grid B) or by the application itself.

In at least one embodiment, one or more of the following entities may be involved in the migration of an application from the Source Grid to a the Target Grid:

Client (e.g., user)
Source Grid (Server Grid A)
Target Grid (Server Grid B)

Source Application—application residing on Source Grid that is to be migrated

Target Application—migrated application that will reside on the Target Grid

In at least one embodiment, a request, command or instruction for initiating an application migration may include one or more of the following types of information:

- source grid identifier information,
- source application identifier information (e.g., name, identifier),
- target grid identifier information,
- name/IP address of Target Grid (Server Grid B)
- name of application residing on the Target Grid (Server Grid B)
- (optional) new name of application on the Source Grid (Server Grid A)
- (optional) configuration parameters As shown at (6), Server Grid B may process the received command relating to the application migration task, and in response, may optionally perform one or more of the following operations (or combinations thereof):

- verify (8) that the target grid has access the source grid and/or vice-versa;
- determine and verify (10) any specified/required preconditions (e.g., verify that the target grid isn't already deploying an application with the same name/identifier as the source application, verify that the Source Application exists on Server Grid A etc.);
- stop (12) the source application (e.g., this may be desirable in situations not involving a live application migration);
- create (14) a placeholder for the application at the target grid (e.g., to prevent another entity from trying to create an application with the same name at the target grid while the migration is in process);
- verify (16) any legality and/or migration eligibility requirements/criteria (such as, for example, those relating to export control regulations, hardware/software compatibility restrictions, quota restrictions, legal or regulatory restrictions, application flagged as non-migratable, application currently locked at Server Grid A, etc.)

At (18) it is assumed that the Target Grid commences with the initiation of the application migration.

Accordingly, at (20) the Target Grid may query the source grid for information relating to the Source Application (and/or elements associated therewith). In response, the Source Grid may provide to the Target Grid various types of information relating to the identified.

At (22) it is assumed that the Target Grid uses a least a portion of the received Source Application information to determine and/or identify one or more set(s) of elements (relating to the Source Application) which are to be migrated to the Target Grid. For example, according to different embodiments, the different set(s) of elements may include, but are not limited to, one or more of the following (or combinations thereof):

- application descriptor(s) which identify the components (e.g., virtual appliances, etc) of the Source Application, and their associated connections, volumes, and/or configuration settings (e.g., properties, resources, etc)
- appliance classes that need to be migrated (e.g., which, for example, may be a part of the application and/or a part of a wider scope catalog)
- volumes that need to be migrated (e.g., volumes that hold application-specific data, which, for example, may be in addition to the volumes that will be migrated with the appliance classes/descriptors)

As shown at (24), the Target Grid may request the Source Application descriptor(s) from the Source Grid, and the Source Grid may respond by transferring (26) the requested application descriptor(s) to the Target Grid.

As shown at (28), the Target Grid may request additional descriptor(s) and/or other information relating to the Source Application, and the Source Grid may respond by transferring (30) the requested additional descriptor(s) and/or other information to the Target Grid.

In at least one embodiment, the Source Application descriptor(s), additional descriptor(s) and/or other information relating to the Source Application may include, but are not limited to, one or more of the following (or combinations thereof):

- a list of appliances that make up the Source Application;
- connections (e.g., virtual networks) between the appliances;
- set(s) of configuration parameters relating to one or more virtual components (e.g., virtual appliances, virtual machines, virtual volumes, etc.);
- one or more values of the configuration parameters;
- information relating to required resources for running the application at the server grid;
- allowed range of resources (e.g., min/max/default);
- parameters, boundaries;
- I/O points (e.g., web input point, FTP input point, etc.);
- class descriptors;
- package descriptors;
- security descriptors;
- version control descriptors;
- access control lists
- etc.

As shown at (32), the Target Grid may request virtual volume information from the Source Grid, and the Source Grid may respond by transferring (34) the requested virtual volume information to the Target Grid. In at least one embodiment, the virtual volume information may include, but are not limited to, one or more of the following types of information (or combinations thereof):

- class volumes (e.g., if any appliance classes were identified for migration)
- application-specific data volumes (e.g., a volume that belongs to application rather than a specific appliance (or appliance class) of the application);
- etc.

As shown at (36) the Target Grid may optionally configure the Target Application (e.g., which represents a substantially identical instance of the Source Application) at the Target Grid. For example, in at least one embodiment, the Target Grid may modify IP addresses (as needed to be compatible with Data Center B), resources, etc. In one embodiment, such configurations may be performed using the transferred application descriptor(s) and/or other migrated information. In at least one embodiment, such configurations may be performed during the process of migrating the application descriptor and/or other application related information.

As shown at (38) the Target Grid may optionally start the Target Application at the Target Grid. In at least one embodiment, this may be desirable in situations where conditions warrant the starting of the application at the Target Grid (such as, for example, in situations where an instance of the application has been migrated to the Target Grid in order to assist in responding to detected high traffic load conditions.

In at least one embodiment, the application migration procedure may be implemented as a live application migration procedure wherein the Source Application is running at the Source Grid and continues to run concurrently during the migration procedure. In at least some of these embodiments, multiple successive transfers of virtual volume information may be performed (e.g., using an incremental approach) in order, for example, to allow the current states of the virtual machine(s) of the Target Application to be substantially synchronized with the current states of the virtual machine(s) of the Source Application (running at the Source Grid).

As shown at (40) the Target Grid may optionally initiate deletion of the instance of the Source Application at the Source Grid (e.g., so that the migration procedure is implemented as a "move" rather than "copy").

In at least one embodiment, during the application migration procedure, the Cloudware System may optionally be involved with (and/or may optionally perform) one or more of the following (or combinations thereof):

- authenticating the entity which requests the migration;
- managing and/or coordinating one-way or mutual authentication and trust between the source and target grids;
- provide at least a portion of the requested application-related information (e.g., catalog classes, etc.) to the target and/or source grid(s);
- perform transaction monitoring (e.g., to effectively enable the entire application migration operation to be treated as a one big "atomic" transaction);
- manage and/or coordinate orchestration of the process of migration;
- manage and/or coordinate orchestration of recovery in case of a failure at either or both of the source/target grids during migration;
- track and/or manage billing records relating to the migration process (e.g., including, for example, coordination and/or verification of any required or desired pre-migration quotes and/or approvals);
- etc.

Cloudware—Grid API and Design Considerations

In one embodiment, the grid API may be based on the 3TERA shell of AppLogic™2.X grids.

C-Object Descriptor

Applications submitted to the grid via the REST and/or SOAP API (from the service manager) may be pre-compiled. The grid gets a "c-object" descriptor (compiled object descriptor), which may be a UDL file containing the flattened structure of the application (built & linked by the build system, but without resolving the volumes and assigning MAC/IP addresses—just doing the assembly compilation).

In the c-obj descriptor all or selected volumes may be provided as class volume references. It may be up to the grid to decide whether and when to instantiate a volume (this may be true both for appliance class volumes, as well as for application volumes coming the first time from an application class).

The grid gets the c-obj descriptor on application creation. The descriptor may be replaced one or more times using the application configure operation. On configure and/or activate, the grid may complete volume instantiation (incl. volprep), assign MAC/IP ADDRESSES and do volfix (note: volfix may not be needed if using an alternative configuration method, such as the DHCP/HTTP-based configuration introduced in AppLogic 2.3). The grid may internally create a qobj descriptor for its own controller.

The c-object descriptor preferably includes sufficient data to perform all or selected of the above without having to refer to catalog or classes.

Interfaces

The catalog and class entities may be deprecated. They may be still available at the shell level but may not be integrated with Cloudware and may not be exposed through the Representational State Transfer (REST) API.

A new entity, respool (resource pool), may be added.

Below is an example summary table of interfaces (objects) and methods.

| Object | Operations |
|---|---|
| grid | info, reboot, shutdown, config |
| server | list, info, reboot, shutdown, enable, disable |
| respool | list, info, create, destroy, adjust |
| application | list, info, create, destroy, rename, configure, clean, activate, deactivate, start, stop, restart, continue, export, import |
| component | list, info, start, stop, restart, continue |
| interface | list, info, enable, disable, reset |
| volume | list, create, destroy, info, set, rename, resize, copy, move, share, unshare, check, repair, migrate, clean, import, export |
| user | list, info, create, destroy, set |
| log | list, reset, mark |
| message | list, create, destroy, get, set |

Interface Details

Grid

The new config operation allows configuring grid's parameters. For example, in one embodiment, some or all of the same parameters that are configured though aldo may be exposed. In one embodiment, "aldo" may be implemented as a software package used in conjunction with AppLogic by various data center partners. Aldo may be installed by system operators on a server in the data center on the grid backbone, and may performs various operations on AppLogic like grid installs, adding and removing servers, etc.

In addition, bindings to outgoing requests/notifications may be configured through this operation. The operation allows setting multiple grid parameters with the same command:

grid config nfy_url=http://api.3tera.net/notify nfy_tout=120 dns1=10.0.0.9

In addition, grid config prints the full configuration (maybe except security sensitive parameters); --batch option may be supported, as may be the --stdin option, thus allowing exporting and importing the grid settings via UDL file.

Server

The reboot and shutdown operations may also be changed to use IPMI or similar remote power control mechanisms, where available. shutdown turns off power after the server shuts down successfully. reboot brings up a server from power down, and also does a powercycle if the server does not come back from a soft reboot. In addition, the reboot and shutdown operation preferably report these actions and intermediate results to the service controller, for example, so that Operations Dept can inspect and track down the reasons for which such operations were invoked, as well as to track downtime and service level agreement (SLA).

Respool

One preferred approach may be to have the respool not deal with a fragment list, but only with the total amount of various resources (but also include the size of the smallest fragment).

A resource pool on a grid may be defined as the following 3 elements:

- type: {storage, computing}
- size: total size of the pool, in GB for storage, in BCU for computing (or CPU/mem)
- min_frag: size of the smallest fragment in the pool (in the same units as the size field)

The info operation returns both the total size of the pool and the smallest fragment.

Resource pools can be used for individual applications (one app per pool) or for multiple apps (run multiple apps in the same pool). To be able to start an app on the grid, you do may need to have a pool.

To create a pool for a specific application, you may need to calculate:

the total amount of resources needed by the application
the largest single fragment needed by the application Then, create a pool of the calculated total size, in which preferably the minimum fragment may be at least as large as the largest fragment of the application—this may ensure that the application can be started in the pool, regardless of the pool's fragmentation.

This process may be used separately for the storage pool (where the volumes of the application may be created during app create and app config) and for the computing resources pool (where the application may run on app activate).

Application

Design notes:

create preferably creates from a class (incl. blank)

configure replaces the full cobj descriptor (not individual properties)

configure also may create any needed instance volumes (removing unneeded ones as well) and do volfix (if needed). If all or selected succeeds, it marks the state of the application as configured. The—skipvol option skips all or selected the volume ops but may leave the application in unconfigured state. activate, if it finds the application in unconfigured state, may complete the configuration before activating the app.

activate may be similar to the current alloc at CTLD—it preferably results in VMs created, volumes mounted and everything ready for appliance boot to begin activate may be given a resource pool ID to use (all or selected of it or any part of it, so that multiple apps may share the resource pool).

Application validation use cases:

provision from class
create blank app and/or edit existing app in place
resize resource use in place
move to another grid (optionally resizing resources)

Component

In one embodiment, the SSH operation may be forwarded once through the service portal/shell (such as the CUI 220) and a second time through the grid controller of the grid on which the component executes.

Interface

Note: apps that are in "development" mode may have the external interface of any appliance turned on for the purpose of outbound internet access (e.g., to download/install new software). The exact command/mechanism my vary. In one embodiment, the command may be something like this: interface enable external ip=1.2.3.4 [netmask=255.255.255.0 gateway=1.2.3.1 dns1=1.2.3.2]. This feature may be disabled for apps in "production" mode.

Volume

The mount and unmount operations may be removed.

Design notes:

set acquires the ability to configure number of mirrors, as long as the new number is above the system-wide setting. Setting the number to more than the current number of good mirrors puts the volume in degraded state (and may initiate repair). This allows increasing the mirroring count for volumes that may be:

very frequently read, rarely written (essentially doing load balancing between many mirrors)

mission critical (e.g., the grid metadata volume or an app's database volume)

being prepared for detaching a mirror using the new options on create share exposes a volume on the boundary of the grid, so that it can be accessed by other grids (or any other entity); this may be done, for example, to assist low-downtime migration of applications between grids, such as illustrated and described in FIG. 10 and elsewhere herein. The operation returns connection data sufficient to access the volume from another grid (e.g., a share ID, similar to the one used inside the grid, except it may expose the volume on the private (management) network). For example, in one embodiment, share may be configured or designed to work by provisioning a small application, with two appliances: IN gateway and the block server; the latter may have mounted the volume locally (vol may need to be moved). This way all or selected this traffic may be routed through normal channels and sufficient resources may be allocated for the access.

create may have various options:

create a new volume using a volume shared from another grid as one stream. This preferably creates a degraded volume, in which the only stream may be the external volume. Then the vol migrate command can be used to repair the volume and build local mirrors; the external mirror may be preferably treated as a disabled server (e.g., the volume may be in MIGRATE state even if it has sufficient mirrors). Once enough local mirrors are created, the external mirror may be preferably dropped, releasing the share. This option may be preferably used in conjunction with the new volume share capability described immediately above; this may be done, for example, to assist low-downtime migration of applications between grids, such as illustrated and described in FIG. 10 and elsewhere herein. For purposes of example, a low-downtime migration may be implemented by performing one or more of the following operations (or combinations thereof):

copying the application descriptor of the application from the old to the new grid. In addition, parameters that may need to be modified to enable the application to operate on the new grid (such as IP addresses) can be changed, although in many cases this may not be needed (e.g., if the application stays in the same datacenter and can use the same IP addresses or the IP addresses may be re-routed to the new grid).

performing volprep (instantiation of volumes) on the new grid based on requirements stopping the application on the old grid sharing the application volumes on the old grid, so that they would be accessible from the new grid on the new grid, creating the application volumes by using the external streams shared from the old grid starting the application initiating volume migration/repair of the application volumes until all (or selected) application volumes become local create a new volume from a stream of another volume. The new volume may be created in degraded state; the old volume may become degraded (corrective actions include repairing the volume or resetting the number of mirrors lower). The operation preferably fails if the old volume doesn't have at least two good mirrors, so that at no time a currently active volume does not remain with a single stream which may be corrupted or lost if the server on which it resides becomes inoperational. This option allows one to:

- take a snapshot of a volume instantly (even if the volume is currently in-use, and/or when it is available)
- do data recovery (e.g., to detach a mirror that may be marked as "out-of-sync," make a valid volume from it prior to trying a repair); this may also be useful when the server that holds the only good mirror becomes inoperational.

In at least one embodiment, the various mirror tuning options of the RAID driver and its control utility can be reviewed and verified in order to use some of the newer stream flags in mdadm (like—writemostly) in order, for example, to reduce traffic to the external stream.

In at least one embodiment, when creating a new volume from a stream of an existing volume for the purpose of taking a snapshot, the existing volume may be prepared for taking the snapshot by creating an additional mirror (e.g., in excess of the number of mirrors normally assigned to that volume), so that when one mirror is taken away for the creation of the new volume, the old volume remains in healthy state, rather than degraded state.

import/export allows to import and export volume contents from/to external storage. External storage may be any supported protocol, http/webdav, ftp, scp/sftp, as well as proprietary protocols like Amazon S3 and Nirvanix.

User

This interface may be kept for management purposes—to allow remote administration of grids by the service maintainer (not for regular users). In one embodiment, service users may not invoke this operation on specified grid(s).

Log

This interface may be kept for management purposes—to allow remote administration of grids by the service maintainer (not for regular users), as well as for collecting logs and propagating them to the service logs. In one embodiment, service users may not invoke this operation on specified grid(s).

Message

This interface may be kept for management purposes—to allow remote administration of grids by the service maintainer (not for regular users) In one embodiment, service users may not invoke this operation on specified grid(s).

Note that any message changes preferably cause notifications to be sent to the service controller (e.g., if notifications are registered).

Note in at least some embodiments, the terms "Cloudware controller" and "service controller" may be used interchangeably.

Scheduling

When operating large grids, it may be desirable to support additional resource scheduling algorithms in order to reduce fragmentation and more efficiently utilize the resources available on the grid. Additional algorithms that may be used in grids may be a pool-based scheduler and/or an optimizing scheduler.

In one embodiment, the pool-based scheduler may designate server groups within the grid for different resource sizes. For example, servers 1-10 may be reserved for appliances that need up to 0.25 CPU cores, servers 11-20 for appliances that need up to 0.50 cores, servers 21-30 for appliances that need up to 1 core, and so on. In one embodiment, pools may be defined based on any type of resource, including memory. Pool ranges can be dynamically assigned by the scheduler. In at least one embodiment, the scheduler can further use the "buddy" algorithm in order to define the pools and to use pools designated for larger components in order to run smaller components (e.g., one example of a well known "buddy algorithm" is used in the Linux kernel for memory allocation and is frequently described in various references, including Understanding the Linux Kernel, Third Edition, By Daniel P. Bovet and Marco Cesati).

In another embodiment, a scheduler may use optimization algorithms in order to optimally place appliance(s) in the available resources.

In at least one embodiment, one or both algorithms (e.g., pool-based scheduler and/or optimizing scheduler) may be used by the scheduler, together with the existing AppLogic scheduler algorithms (spread and pack).

In one embodiment, the underlying AppLogic grid OS may be configured or designed to support live migration of components, preferably using the live migration capabilities of the underlying hypervisor. Such migration may be used by the scheduler and other components of the Cloudware network, for example, to reduce fragmentation and allow better utilization of resources. In addition to live migration, it may be possible to migrate appliances by stopping them and restarting them on other server(s) and/or other data center(s).

Cloudware Service API

In at least one embodiment, the Cloudware Service API may provide one or more of the following objects and methods (or combinations thereof):

| Object | Operations |
|---|---|
| account | info, . . . |
| catalog | list, info, create, destroy, rename, copy, get_prop, set_prop, import, export |
| class | list, info, create, destroy, rename, move, copy, get_prop, set_prop, import, export |
| application | list, info, create, destroy, rename, copy, get_prop, set_prop, start, stop, restart, continue, move, import, export |
| component | list, info, start, stop, restart, continue |
| interface | list, info, enable, disable, reset |
| volume | list, info, create, destroy, rename, move, copy, get_prop, set_prop, resize, check, repair, migrate, clean |
| datacenter | list, info, create, destroy, rename, get_prop, set_prop |
| grid | list, info, create, destroy, rename, get_prop, set_prop, activate, deactivate, upgrade, rollback, hotfix |
| server | list, info, add, remove, get_prop, set_prop, enable, disable, reboot, shutdown |
| ippool | list, info, . . . |

Explicit Links

Explicit links may be created as a result of a network search and adding a link by a human.

In one embodiment, every entity type that can be linked to, in addition to its normal constructor operations (create, destroy), may also have a "link" constructors (link, unlink).

The link constructor operation may be preferably invoked with a global name of the entity to which the link may be established, as well as a local name under which that entity may be visible. The constructor creates a local link object which appears equal to locally owned objects of the same type and may be listed together with those objects.

For example, in one embodiment, to create a local appliance link called MySQL, the local name will be MySQL and the remote name may be com.mysql.catalog4.mysql5.ver2. Publisher's domain name may be used to ensure uniqueness of global names in a manner similar to the one used by Java classes (e.g., using the domain name of the publisher but in reverse order, starting with the Top Level Domain (TLD), for example com.3tera, uk.co.3tera, etc.)

When invoking an operation on the link, the API may verify whether the operation may be valid (allowed) through a link and forwards it or not, accordingly. Generally, a subset of the object operations may be available over linked objects (for example, info may be available, destroy may not be).

A link attribute may be preferably defined on each entity; the attribute may identify the entity as a real entity or as a link. All or selected sub-entities of a linked entity (e.g., classes in a linked catalog) may be preferably treated as links. That may be, on traversing the path to an entity, if at least one element may be a link, then the entity may be considered as a link. Note that then we may have two types of explicit links—manual and inherited. In one embodiment, manual links may be unlinked; inherited links may not.

Note: In one embodiment, implicit links, such as class-to-instances and application-to-grid, may be internal to the system and may not exposed through the public API.

Pricing and Billing for Cloudware

One goal in choosing pricing and billing methods is to achieve a simple and predictable billing.

Users preferably pay for the following:

computing resources: CPU/mem/storage public Internet transfers (aka bandwidth)

public IP addresses

In at least one embodiment, one may leave CPU/memory resources to be specified separately (e.g., no "BCU"). Various reasons for this may include, for example:

- a desire to leave this flexibility for the user
- a desire to retain control the flexibility to choose the most appropriate server configs (e.g., 4 cores/8 GB RAM vs. 8 cores/8 GB RAM), as well as to make grids available with different server configurations (e.g., one with 1 GB RAM per CPU core, another with 2 or 4 GB RAM per CPU core)

Leaving this flexibility to the user also allows one to improve the scheduling algorithms gradually, so that, for example, if we can combine two appliances—one that needs lots of CPU but little memory and one that needs less CPU but lots of memory—then the user may benefit from this.

To avoid fragmentation and make things a bit simpler, we may introduce fixed increments (powers of 2, starting from ⅛ of CPU core and ⅛ of 1 GB). This gives one:

- CPU core steps: ⅛, ¼, ½, 1, 2, 4 (with 8 and 16 available as hardware supports it more widely)
- Memory steps: 128 MB, 256 MB, 512 MB, 1 GB, 2 GB, 4 GB, 8 GB (with higher steps available as hardware supports it more widely)

In any case, at least per application, the billing may be based on a balanced CPU/mem combination. The ratio may depend on the hardware configuration of the grid's servers (GB RAM per CPU core). This means that the price for running an app with certain resources may be different on different grids.

It would be desirable to make it easier for users to predict the cost for operating an application on the grids and/or in the locations they select. One preferred solution may be to show the price for running an app for an hour (or for a month) in the dashboard—in the application list and in the editor/configurator. This way the user may see what the application costs to run, regardless of how complex the calculation may be and what factors/pricing models are being used. We may, of course, provide an explanation of the general principles somewhere in the docs, but it doesn't really matter, since users may be able to see the price both before starting the application and while the application is running. This achieves predictable and simple billing (e.g., the goal stated above).

Details relating to various example billing embodiments:

- In at least one embodiment, computing cost may be expressed as $ per core and GB RAM. The price scales rounding up to achieve the given CPU and RAM ratio
  - example 1: $0.20 per 1 core/2 GB RAM
    - 0.5 core and 1 GB RAM costs $0.10/hr
    - 1 core and 1 GB RAM costs $0.20/hr
    - 1 core and 4 GB RAM costs $0.40/hr
  - example 2: $0.15 per 1 core/1 GB RAM
    - 0.5 core and 1 GB RAM costs $0.15/hr
    - 1 core and 1 GB RAM costs $0.15/hr
    - 1 core and 4 GB RAM costs $0.60/hr
  - In at least one embodiment, computing cost may probably include some amount of storage and bandwidth xfer (per core)—see description of resource bundling herein
- In at least one embodiment, extra storage may be expressed as $ per GB-hour stored; probably quoted as $ per GB per month
- In at least one embodiment, extra bandwidth may be expressed as $ per GB transfer (aggregated per month)
- In at least one embodiment, IP addresses, if billed, may be expressed as $ per IP per hour (or $ per IP address, counting the max # of concurrently used IP at any given time in a month)

Additional resources that may extend the CPU/mem billing and/or be bundled with it may include, but are not limited to, one or more of the following (or combinations thereof):

- backbone bandwidth—generally components may be limited by default to 1 Gbps in each direction divided on the # cores in the server multiplied by the number of cores the appliance may use
- disk I/O bandwidth—similarly calculated According to different embodiments, different types of billing/accounting mechanisms may be implemented and used to charge users for various uses of Cloudware resources. For example, due to the nature of the virtual computing environment enabled by the Cloudware network, all or selected aspects of resource usage may be tracked via one or more virtual meters. Such technology provides the capability for unique and novel billing/accounting mechanisms to be implemented to track and bill users for various types of resource usage.

For example, the resources utilized by a given running instance of virtual appliance (associated with a given user) may be tracked (e.g., over one or more time periods) and used to calculate appropriate fees. Such tracked resource usage may include, for example, one or more of the following (or combinations thereof):

- CPU clock cycles utilized (e.g., over a given time period);
- volatile memory (e.g., RAM) utilized (e.g., over a given time period);
- disk I/O accesses utilized (e.g., over a given time period);
- I/O bandwidth and/or transfer utilized (e.g., over a given time period);
- cumulative and/or real-time active run-time hours (e.g., of a given virtual appliance over a given time period);
- total CPU and/or memory reserved for the appliance (e.g., guaranteed to be available);
- reserved I/O and/or network bandwidth and transfer;
- quality of service (QoS) class (e.g., priority with respect to other appliances, applications and user accounts);
- transaction with external services (e.g. database read/write, credit card billing service, micropayment service, backup storage, etc.);
- software license use;
- number of users/connections made to the appliance (e.g., over a given time period);
- etc.

Additionally, in some embodiments, allocation of resource usage may also be tracked based on the entity (or components thereof) which are utilizing the resource. For example, in one embodiment, the resources used by a given running instance of virtual appliance may be tracked. In another embodiment, where a virtual appliance is configured to run a software application (e.g, installed at the virtual appliance), the resources which are utilized by that specific software application may be tracked (e.g., for billing purposes) using one or more virtual meters.

FIG. 26 illustrates different example embodiments of various different utility computing billing models which, for example, may be offered to different users of the Cloudware network. For example, as illustrated in the example embodiment of FIG. 26, a DCO (or server grid provider) may offer different customers different types of utility computing billing models to suit different customer needs. Examples of such utility computing billing models may include, but are not limited to, one or more of the following (or combinations thereof):

- On-demand or "pay-as-you-go" for resource/service/license usage;
- Tiered levels of bundled resources "plans" and associated billing rates for (1) usage w/in plan parameters, and (2) usage exceeding plan parameters;
- Flat rate bundled resources "plans" and associated billing rates;
- Auctioned resources (e.g., real-time auctioning based on market supply/demand for utility computing resources);
- etc.

FIG. 27 illustrates an example embodiment of a user utility computing billing summary statement which, for example, may be provided to different users or customers of the Cloudware network. For example, as illustrated in the example embodiment of FIG. 27, various types of information which may be provided on the billing statement may include, but are not limited to, one or more of the following (or combinations thereof):

- Billing period
- Billing plan
- Last payment
- Next payment (est.)
- Current usage, GB-hours per hour
- Accumulated usage, GB-hours
- Projected usage at current level, GB-hours
- Projected overage, GB-hours
- Projected overage fee
- Current transfer (hourly average), GB/hour
- Accumulated usage, GB
- Projected usage at current level, GB
- Projected overage, GB
- Projected overage fee
- Current storage use, GB
- Average storage growth, GB/hour
- Projected usage at current level, GB
- Projected overage, GB
- Appliance license usage/fee details
- etc.

FIG. 28 illustrates an example embodiment of a cost estimator user interface 2800 which, for example, may be utilized by users (and/or prospective users) of the Cloudware network for estimating various types of utility computing resource usage costs relating to different types of distributed application configurations (e.g., 2802, 2804, 2806). For example, in at least one embodiment, when a user manipulates one or more of the respective range selector values (associated with each of the different types of utility computing resources and/or other displayed parameters (e.g., CPU, cores, Memory, Storage, Duration of use, Firewall, SSL accelerator, Load balancer, Web nodes, CPU, cores, node, memory, MB, web storage, GB, MySQL masters, MySQL slaves, dbase CPU/node, dbase mem/node, etc.), the cost estimator user interface may be configured or designed to dynamically calculate and display estimate cost information based on the input/selections provided by the user.

FIG. 29A illustrates an example embodiment of a Publisher Server/Network Resource Account Statement 2900. In at least one embodiment, such account statements may be generated and/or published by the resource publisher (e.g., DCO, server grid operator, etc). In other embodiments, such account statements may be generated and/or published by neutral and/or independent third parties/entities (such as, for example, the Cloudware network entity, a certification/monitoring entity, etc.). As illustrated in the example embodiment of FIG. 29A, the Publisher Server/Network Resource Account Statement 2900 may include various types of information relating to current and/or resources (and other related information) provided by the resource publisher, such as, for example, one or more of the following (or combinations thereof):

- Resources Published
- Servers published
- Server-hours published
- Starting price
- Auction reserve price
- Support SLA guarantee
- Connection quality
- Certifications
- Location
- Additional notes
- Traffic transfer price
- Traffic reserve price
- Resources Subscribed
- Servers used, peak
- Server-hours used
- Blended price (servers)
- Servers revenue
- Transfer used
- Blended price (transfer)
- Transfer revenue
- TOTAL value of resources sold SLA bonus(+)/penalty(−)
TOTAL remitted value
Resource specification information
uptime information;
failure information;
etc.

In at least one embodiment, a least a portion of the information included in the Publisher Server/Network Resource Account Statement 2900 may be customized based on user-specific or customer-specific information.

FIG. 29B illustrates an example embodiment of a Publisher Appliance/Application/Support Account Statement 2950. In at least one embodiment, such account statements may be generated and/or published by the resource publisher (e.g., DCO, server grid operator, etc). In other embodiments, such account statements may be generated and/or published by neutral and/or independent third parties/entities (such as, for example, the Cloudware network entity, a certification/monitoring entity, etc.). As illustrated in the example embodiment of FIG. 29B, the Publisher Appliance/Application/Support Account Statement 2950 may include various types of information relating one or more of the following (or combinations thereof):

appliance resources (e.g., virtual appliance templates)
application resources (e.g., distributed application templates)
support pricing
total revenue
pricing information relating to published resources
pricing or billing model information relating to published resources
usage information relating to published resources
etc.

In at least one embodiment, a least a portion of the information included in the Publisher Appliance/Application/Support Account Statement 2950 may be customized based on user-specific or customer-specific information.

It will be appreciated that such resource utilization tracking and billing mechanisms allow for novel types of software licenses and/or royalties to be implemented which, conventionally have not been possible using existing technology.

For example, using existing technology, there has traditionally been no easy way for a software provider who provides a downloadable software application to track the actual usage of its software at all the different user computer systems where the software has been downloaded and/or installed. For example, there has traditionally been no easy way for such a software provider to track, at each user's computer system the run-time hours for each executed session of the software application at each user's computer system.

As a result, a typical software license involves the user paying a one-time flat rate (e.g., purchase price of the software application) which allows of the user to install and use the software application on a single (e.g., designated) computer system. Once the license fee has been paid, the software provider typically does not monitor the user's ongoing usage of the licensed software application at the designee the computer system. Another drawback of traditional software licensing schemes is that they frequently involve a larger upfront license fee, which is a barrier to adoption by a wider market (lower cost) and for certain types of applications/markets (e.g., hosting, costs for just-in-time provisioning, etc.).

As an alternative to such a conventional licensing scheme, various features of the Cloudware network embodiments described herein now make it possible for a software provider to provide software (e.g., downloadable software applications) to users on a "pay-as-you-go" basis, whereby the user may be charged only for actual use of the application at one or more computer system(s). Thus, for example, in one embodiment, the software licensing fee may be calculated based on the total active run-time hours associated with each executed session of the software application at one or more computer system(s). In this way, a user is able to install a copy of the software application at multiple different computer systems (e.g., managed by or associated with the user), and be charged only for the actual usage of the software at each of the different computer systems (and/or be charged only for resources used by each of the different computer systems during execution of the software application at each respective system).

In the same manner, a user who elects to implement, at the Cloudware network, one or more running instance(s) of a virtual appliance created by a third party may be charged a fee or royalty which may be based, for example, on various types of criteria such as, for example: actual run-time usage of each instance of the virtual appliance in the Cloudware network; resources used by each running instance of the virtual appliance in the Cloudware network; etc.

In at least one embodiment, the tracking of various types of Cloudware network resource utilization (and/or instances of appliances and/or applications associated with such network resource utilization) may be tracked via the use of different types of virtual meters which have been configured or designed to monitor and/or track (e.g., in real-time) activities associated with various resources, appliances, applications, and/or other aspects of the Cloudware network.

In one embodiment, this mechanism allows the software licensor to allow the user to use the software in multiple locations, for example, without having to pay separately for each location. Thus, for example, the user may pay for the actual resources used, no matter where they were applied. This may provide further flexibility for the software user, allowing more freedom, better service and new business models.

Figure 16:
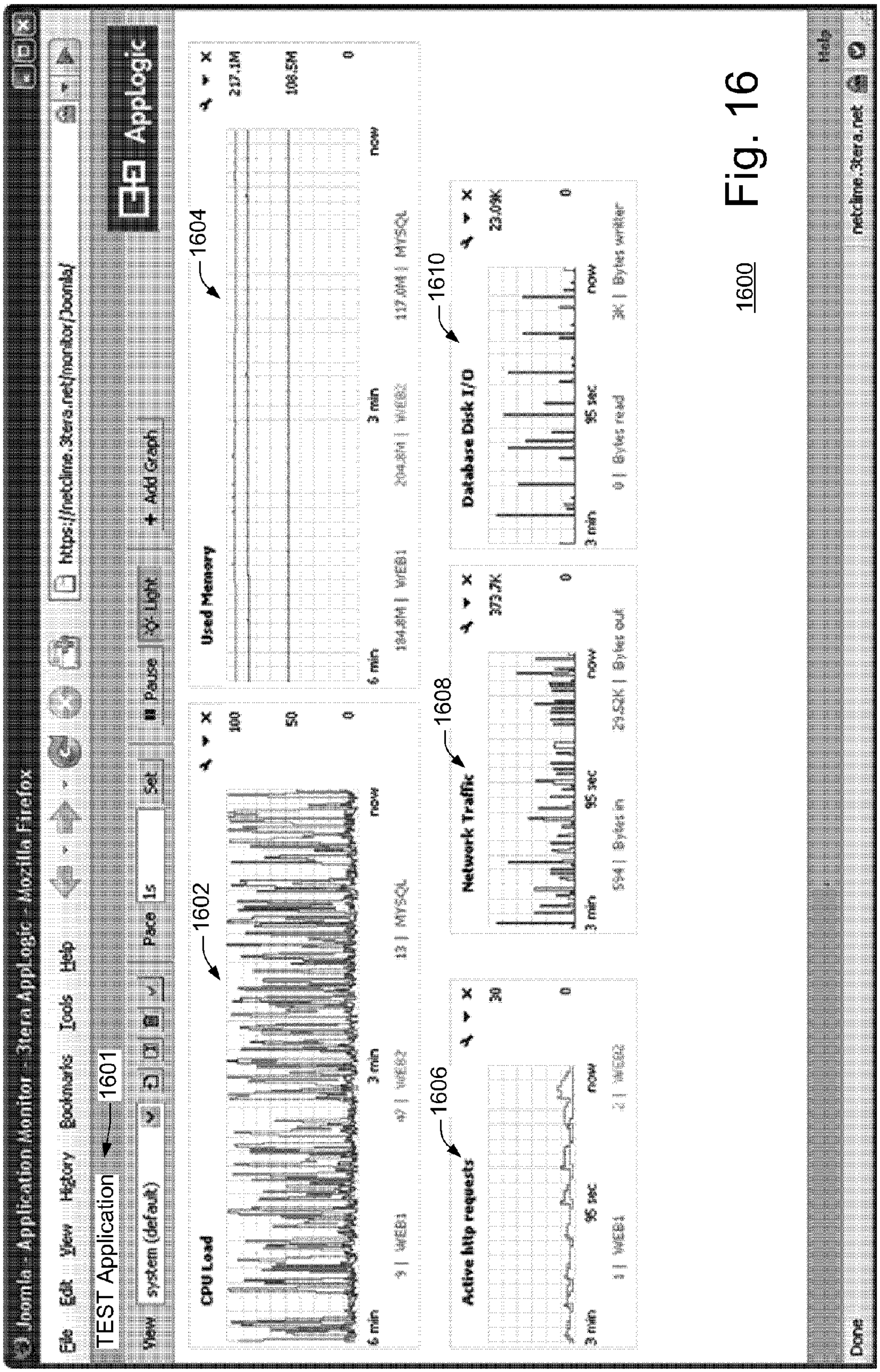
FIGS. 16-17 illustrate example embodiments of various types of Cloudware metering features and interfaces.

FIGS. 16-17 illustrate example embodiments of various types of Cloudware metering features and interfaces. For example, as illustrated in the example of FIG. 16, metering GUI 1600 may be displayed (e.g., to a user) which includes a plurality of different virtual meters (e.g., 1602-1610) that have been created and configured to monitor and/or track (e.g., in real-time) actual usage of various types of resources (e.g., of the Cloudware network) relating to the running instance of TEST Application 1601.

As illustrated in the example of FIG. 16, one or more metering graphs (e.g., 1602, 1604, etc.) may each be operable to simultaneously track and display different attributes associated with different appliances (e.g., WEB1 server appliance, WEB2 server appliance, MYSQL database appliance, etc.) of the application (e.g., TEST Application 1601) being monitored.

In other embodiments, other virtual meters may be configured or designed to track (e.g., in real-time) and display activities and/or attributes associated with selected resources, appliances, applications, and/or components thereof (such as, for example, usage of specified software installed at an instance of a virtual computer system running on the Cloudware network.

FIG. 17 shows an example of a meter configuration GUI 1700 which may be used to create, configure, modify, etc. various virtual meters for monitoring/tracking of various activities associated with selected resources, appliances, applications, and/or other aspects of the Cloudware network. For example, as illustrated in the example of FIG. 17, each instance of a virtual application may have associated therewith one or more different virtual appliances (e.g., 1702) which may be selectively monitored. Each instance of a virtual appliance may have associated therewith one or more different virtual entities (e.g., 1704) or virtual components whose usage/activities may be selectively monitored. Each instance of a virtual entity may have associated therewith one or more different counters (e.g., 1706) or attributes which may be selectively monitored.

Example Cloudware Portal Design

Various embodiments of the cloudware portal provides an easy way for customers to sign up to utility computing service. It may be a goal that users can self-serve at the portal and don't have to call sales or talk to human in order to subscribe for a service or change their account. While sales and support should be available, it is anticipated that many of the target users may prefer to perform most operations themselves.

In one embodiment, the Cloudware utility computing service may be based on the AppLogic™ 2.x platform which has been adapted communicate with the Cloudware portal. One enabling feature in AppLogic™ 2.x may be the SharedGrid.

Aspects of the user facing portion of the portal are described below. Ioe, the Cloudware portal may be implemented as a portion of a web site.

The following sections describe one possible scenario in which Cloudware portal functionality may be provided; it will be appreciated that many alternative implementations may be possible to achieve similar results.

Figure 2B:
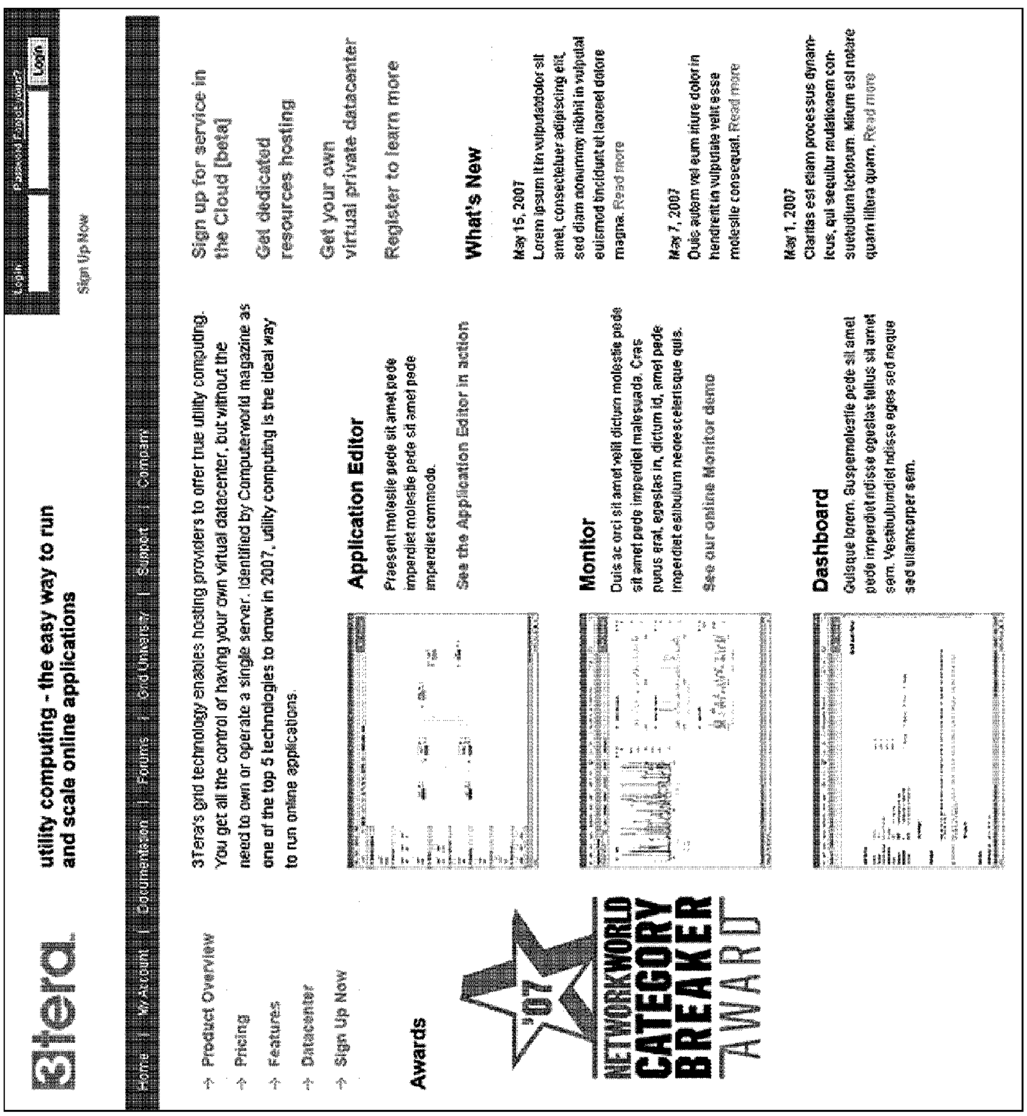
FIG. 2B illustrates an example embodiment of a Cloudware Portal home page 290.
Figure 2C:
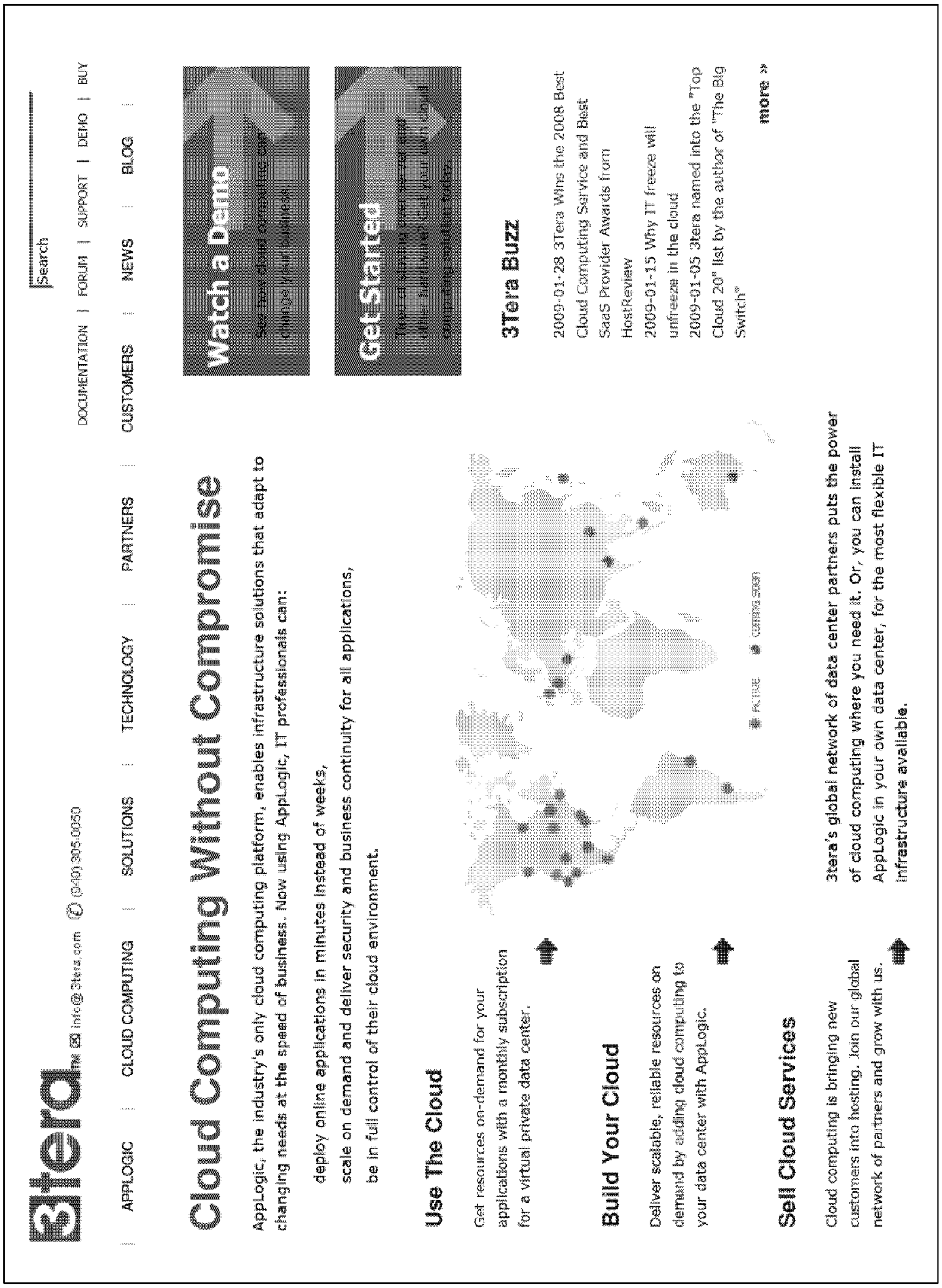
FIG. 2C illustrates another example embodiment of a Cloudware Portal home page 292.

Notes:
- the top menu may be focused on community portal and account functionality for existing users
- the home page may be focused on pre-sales, providing for an easy signup
- in at least one embodiment, it may make sense to have the home page change for users who are already logged in, so that to provide them with community info (see http://aws.amazon.com)
- the portal/web site mix may be based on leading service provider's web sites:

Google, Amazon, LinkedIn, as well as some innovative-while-simple ones like http://www.surveymonkey.com Portal Page Example FIG. 2B illustrates an example embodiment of a Cloudware Portal home page 290. FIG. 2C illustrates another example embodiment of a Cloudware Portal home page 292.

As illustrated in the example embodiment of FIG. 2B, Cloudware Portal home page 290 may provide access to and/or may include one or more of the following types of information (or combinations thereof):
- Home Page
- My Account
- Network
- Documentation
- Grid University
- Support
- Company Home Page
- All or selected pages static content and/or dynamically generated content.
- Left-side navigation with topics describing the product and the offering:
  - Overview (default)
  - Features
  - Partners
  - Pricing
  - Datacenter (credibility info about the service, network, etc.)
- Overview page
  - RSS feed widget that feeds off our success stories blog and/or what's new
  - On the top of the page, there may be a positioning statement and rotating banner with awards, etc.
  - The main piece screen may include a number of different snapshots (e.g., about 2-5 snapshots) of the service UI with as little text as possible
  - Calls to action:
    - top-right:
    - sign up for service in the Cloudware network (beta)->goes to the beta signup page (see below)
    - get your own virtual private datacenter->goes to the Partners page (see below)
    - register to learn more->goes to reg. page similar to the current 3tera reg. page (fill form, send e-mail)
    - after some of the snapshots (e.g., see online demo)
- Features page
  - identifies AppLogic™, virtual private datacenter (VPD) and the Cloudware network service as separate products/services
  - Lists the features of each {in order: cloud service, VPD, AppLogic™license} in a separate section on the same page
    - call to action at the end of each section: sign up for cloud, go to partners' page, register
  - The overall theme may be full lifecycle support/solution for every need—from $50/mo account for development, through VPD, to your own datacenter
- Partners page
  - Describes how we work with hosting providers to help them deliver VPD
  - Clickable partner logos; "Starting from" prices next to each
  - Call to action for hosting providers who want to become a partner; goes to a partner registration form (same as the one from the Features page for AppLogic™ license)

My Account
- In one embodiment, this page may be accessible only if the user is logged in; otherwise, presents a login page, prompting for login or signup for cloud beta
- Left-side navigation, at least the following 3 pages:
  - overview (default)
  - profile
  - billing
  - helpdesk
- Overview page—shows the account's summary info, allows the following actions:
  - adding new users to the account
  - lists users on account
  - basic account info
  - close account
- Profile
  - Company (w/ability to edit)
  - User (w/ability to edit)
- Billing page—integrates with the billing system (e.g., Modern Bill)
  - provides billing history
  - ability to purchase additional packages/change orders
  - make payments
- Helpdesk page—integrates with the helpdesk system (e.g., Cerberus)
  - open new ticket
  - view ticket status
  - view ticket history
  - (in one embodiment): start online chat with support Documentation
- static web pages, like doc.3tera.net (e.g., generated by wiki)
- 3 sections of the documentation
  - cloud service (beta)
  - AppLogic™ 2.x (production)
  - AppLogic™ 3.x (beta)
- use the documentation (esp. the home page) to provide the marketing context which today may be provided by the corporate site Network
- What's new (e.g., RSS feeds for latest apps, appliances, companies, etc.)
- Applications
- Appliances
- Datacenters
- Companies
- Users
- Forums (e.g., vBulletin, better integrated, unified login)

Grid University
- the grid U info, like now, including overview, curriculum, class calendar, pre-recorded classes, registration for live attendance, etc.

Support
- explains the support options and their terms, including premium support
- general feedback form, including feedback for partners and other resources available on the service
- links to support forums, documentation, helpdesk Company
- static page including the following subpages
  - profile
  - mission
  - management
  - board
  - contact
  - jobs
  - newsroom/events Design Notes The following design notes describe a set of related definitions and processes that may be used to implement the functions of one example embodiment of the Cloudware network. It will be appreciated that other approaches and designs can be used in alternate embodiments, depending on desired design constraints, needs, and/or other factors.

Users vs. Accounts
- a user may be preferably a person (human or machine) with a given identity; it can authenticate itself as that identity
- an account may be an entity that owns resources (and usually pays for them); it can allow one or more users to control the account and its resources
- a user can be created in many ways, for example via the forums
- when creating an account, the customer can specify either an existing user or create a new one as part of opening the account
- many existing authentication schemas may be used, including OpenID, LID and/or other authentication methods supported by the Yadis.org community project, LDAP, etc. (e.g., in one embodiment, OpenID or another single-signon mechanism may be used as one of the authentication method; use SSL connection to avoid OpenID phishing vulnerabilities)

Beta Signup Process
- User clicks sign-up for beta, arrives at a registration page which may be a qualification survey
- Upon completing the survey, portal e-mails the survey to betasignup@3tera.NOSPAM.com mailing list
- A signup manager (a human) decides if the user is qualified, responds by e-mail with 'yes' or 'delay'
  - if multiple signup managers respond, the first's action may be final;
  - if others send different action, e-mail notification to betasignup list about the conflict, to be manually resolved by e-mail 'yes override'
- If 'delay', portal sends e-mail saying 'your application has been accepted; we will notify you when we have an opening', adds to mailing list (same as registering for more info)
- If 'yes', portal sends e-mail to user with a link to a page where user can create an account, provide a credit card, get charged, etc.
  - In one embodiment, only invited users can create an account, and then only within X days of the invitation
  - user may accept terms of service to create the account
- Upon successfully charging the credit card, the portal:
  - creates an account on (a/the) grid; provisions an account controller
  - registers DNS name account.3tera.net (or .com)
  - sends the user confirmation e-mail with a link and other login info (intro e-mail)
  - (consider also scheduling a follow up e-mail in a week)
- Notes:
- signing up for an account initiates a monthly billing of a fixed amount
- variable usage charges happen through integration between the billing system and the metering system
- the signup process may be shortcut to automatically authorize applications upon providing a valid credit card number or another form of payment guarantee User Registration and Login
- User creation may be separate from account creation. There may be 3 cases in which we want to create users
  - during beta signup (or account creation)
  - upon registration for the forums
  - when adding more users to an account, if the users don't yet exist
- The portal allows multiple users per account, as well as one user to access multiple accounts
- Unified login: a login on the portal gives access to the account controller and vice-versa (e.g., if the user has an account, of course)
- Consider user name formats, which, for example, may include one or more of the following (or combinations thereof):
  - e-mail address (e.g., current user name in AppLogic™; pros: it has self-created uniqueness; cons: it may be long and hard to type, users may have multiple e-mail addresses or may have their e-mail address changed)
  - openID name (like a dns name: terry.3tera.com, joe.id3tera.com, john.myopenid.com)
  - classic user name (yet another name for people to remember, hard to get good names)
  - etc.

Architecture
- It appears that the core of the new site can be built on SiteKreator (or a content management system like Drupal, or using conventional static pages/PHP), with a new template for the new layout
- Additional functionality to be built may be:
  - user management
  - login
  - My Account page and everything in it
  - signup Access to the My Account tree and to account creation and signup may be over SSL. So may be the access to the account controllers. It may be possible to use a wildcard SSL certificate ($120/yr) for the *.3tera.net addresses.

One preferred architecture includes the one or more of the following components (or combinations thereof):

SiteKreator (e.g., without CDN), or other CMS in an appliance download server for online demo and misc downloads forums (e.g., vBulletin or phpBB)

billing system (e.g., Modern Bill)

docs (static web server using the wiki published pages)

new functionality—in one or more appliances

Features of AppLogic™which May be Implemented for Cloudware

To support Cloudware, it may be preferable to provide certain functionalities/features in AppLogic™. Various examples of such new functionalities/features are described below (and/or other portions described herein). However, it is to be noted that the new functionalities/features are not limited only to the various examples described herein.

For example, in at least one embodiment, the following changes/modifications may be implemented to existing or previous versions of AppLogic™ in order to enable various types of Cloudware functionality:

L2 tunneling within a grid (terminals and internal gateways) and between grids in the same DC (e.g., gateways only).

Automatic IP address allocation, including support for persistent and temporary IP addresses.

Private VLAN per account (for internal gateways).

BCU-based resource allocation (including UI changes).

Standard appliance sizes (e.g., ⅛ BCU, ¼ BCU, ½ BCU, IBCU, then rounding to ½ BCU above that).

Scheduler with additional pool-based allocation mechanism.

BCU, storage and bandwidth metering per application.

Ability to preallocate resources for an app w/o actually starting the application (e.g., semantics similar to what we do in ctld today).

Application templates treated as classes and support for application catalogs.

Use of external global repository for catalogs and account home directories

Global storage for catalogs, including local caching of volumes on each grid on which a given volume is used.

A new operation defined on appliances—"manage" (same like ssh but brings a web interface in a window if the appliance has one).

Apps as objects (e.g., construction from class, having the similar life cycle as appliances, direct login via SSH or manage operation without having to specify a component into which the login may be performed).

Ability to share and mount volumes across grids.

Improved application migration (e.g., no intermediate copies; instant local migration for example as described herein; encrypted (SSL) remote migration.

REST or SOAP API equivalent to 3tshell, with improved operation status information (including progress and detailed error reports)

API support for event handler registration (e.g., persistent, multiple handlers per event type) in order, for example, to allow grids to send notifications to the service controller.

API support for registration of external service interfaces (e.g. repository).

API support for grid configuration (e.g., AppLogic.conf, etc.), in order, for example, to support per-grid options, parameters and settings, as may be configured by a user or by the maintainer.

Automatic volume repair (e.g., w/o interfering with app start).

Support for locked appliances and applications, for example, so that users of published appliances cannot access protected entities (e.g., includes: no volume mounting, no login, no branch, no edit of locked entities).

Metering for appliances and applications (e.g., number of instances, resources used by each, time in use, class name, OS used, etc.).

distributing resources of the application to appliances in an intuitive and predictable manner (e.g., so that users don't have to open the application to start with non-default resources).

support for default resource values (e.g., in addition to the min and max). such as added in AppLogic 2.1

Other Features/Aspects

L2 Tunneling may be preferred to overcome the limit on the number of MAC addresses supported by L2 switches. The design may include a custom ARP-like protocol for resolving an IP/MAC pair for an interface to the MAC of the server that is handling the appliance to which the interface belongs. Higher-end HP ProCurve switches can handle 64K MAC addresses. If this is the case, the implementation of this feature may be postponed if higher end switches can be used for the grids that participate in the service.

Automatic IP Address Allocation

Automatic IP address allocation may be preferable in the Cloudware environment. To implement this, it may be preferable to distinguish between IP addresses that may be persistent (e.g. on the public network and have a DNS entry associated with them) and temporary (internal in the app, or private to the account). Persistent IP addresses may be allocated at the creation/provisioning/copying of an application, and freed when the application is destroyed. Temporary IP addresses can be allocated as part of the build and freed on app stop.

To account for the case when one is making a snapshot copy of an app (and, therefore, would like to keep the original persistent IP addresses), we may define a new option on copy, which preserves the original addresses (e.g., default may be to invalidate them/reallocate them). Alternatively, we may have an option on app start to force renewal of persistent IP addresses.

The IP address allocator may be implemented at a grid level, since we should not in general assume that the same IP address would be routable to a different grid. In addition to allocating and freeing addresses, it may be possible to lock/unlock an address. This may be used on app start, to prevent duplicate IP addresses on the network. In addition, the allocator may have to provide an interface sufficient for a human to manage the pool of addresses (view, add/remove, add/remove block, force unlock, force free, etc.). A mechanism similar to the leases in the DHCP protocol may be used.

The IP allocator may distinguish between public/routable/persistent IP addresses and other IP addresses. The public IP addresses may be a precious resource, cost money and may be preferably reported to the metering system per application.

In addition to the IP address allocation, it may be preferable for the grid to support enforcement of IP addresses, so that, for example, an appliance (or an application) may only use the IP addresses assigned to it. Further, the grid may also enforce that no appliance uses an IP address that may not be assigned to that grid (this may be useful for appliances that allocate their IP addresses in some other way, e.g., specified by a user in a web user interface such as cPanel).

Private VLANs Per Account

Private VLAN per account may be used by customers who may be building an online service comprising multiple apps. We may further extend this VLAN across multiple grids within the same datacenter, followed by secure tunneling across multiple datacenters in case the applications comprising the service are located in different data center.

Metering

Metering may be modified to report resource usage per application. Resources to be metered may include one or more of the following (or combinations thereof): (a) BCU/hrs, (b) GB of transfer on publicly routable IP addresses, as well on internal, non-routable/private VLAN addresses, (c) storage use (GB/hrs) beyond the storage associated with the BCU's, (d) other types of metered critera/parameters described herein.

Metering may further be extended to collect data for the individual appliances that comprise an application, including catalog/class name, resources assigned to the appliance, number and frequency of failure, OS used inside the appliance, as well as other characteristics (e.g., such as field engineering codes, whether the appliance is licensed or free, etc.). This data may be used for billing purposes, as well as for the collection of metrics and statistics to be made available on an aggregate basis.

A clear separation between metering and billing may be provided. Such separation may allow the system to be used equally well for (a) a commercial utility service available to subscribers, where the metering data may be used to calculate the amount of money to be charged to each subscriber; (b) for an internal utility (e.g., in an enterprise), where the metering data may be used for determining chargebacks to different groups and departments; (c) for a shared academic/research utility (e.g., in a national lab such as Lawrence Berkeley) where the metering data may be used to calculate amount of credits (e.g., chits, allowances, vouchers, etc.) used by each group; and/or (d) other usage.

Resource Allocation

Separating the resource allocation from the actual app start at the API level may allow one to decide on which grid to start a given app, and make that decision outside of the grid. The Cloudware service controller may choose a candidate grid and ask for resource allocation. It may be able to get back a handle/cookie (e.g., a resource pool name) that identifies the allocated set, so that it can pass it to the account controller that may actually start the application on that grid. On app start, it may be preferable to be able to pass an (optional) handle of a resource set, which may be presumed to be pre-allocated for that same app before. If such handle may be passed, the grid controller may use the preallocated resources and cannot fail the start due to lack of resources since the resources may be pre-allocated. If no handle may be specified, app start operates the same way as today.

In addition, shared resource pools may be implemented. Shared resource pools represent reservations that an account makes, so that it can operate applications within the reserved resources. Therefore, a resource pool may be defined for a specific application (e.g., app reserve) and for a group of applications. When an application may be being started, if a resource handle may be provided, it may be a handle to a shared pool; in that case, the system will subtract the resources needed by the particular application being started, leaving the remaining resources in the pool for use in other applications.

External Repository

An external repository may be preferably used for catalogs and/or for home directories of accounts. The actual interface to the repository may be defined as part of AppLogic™, so that it can be supported by the grids. The preferred responsibility and function of the repository may be illustrated and described as the repository 218 in FIG. 2A.

In one embodiment, the model supported by the repository may be a hierarchical repository of blobs (Binary Objects). Each blob may be addressed by an absolute or relative path, comprising hierarchical elements, similar to file paths and to host names in the domain name system. The blob can be of arbitrary size. Intermediate directories may be created automatically—there may be no need for explicit operations. Enumeration may be possible by partial path with wildcards. In another embodiment, the repository may be implemented using an LDAP directory such as OpenLDAP. It will be appreciated that other data models and implementations may be possible, such as SQL or XML databases.

The repository API may be implemented as a web services interface over SSL connection. The interface model may be discussed elsewhere in the Cloudware topic.

In addition to the typical definition of the repository data structure, it may be desirable to add various features such as, for example, one or more of the following (or combinations thereof): (a) ability to add (persistent) notifications at any level of the hierarchy, e.g., so that I can get a callback when something changes in a given subtree; (b) ability to place a lock at any level of the hierarchy, the lock semantics being read-lock, write-lock, or exclusive-lock. This may allow one to make complex updates to the repository content in a safe way.

The repository may be preferably replicated in more than one data center in order to improve availability and, if implemented, to provide load balanced distributed access to the repository and access with geographic locality The hierarchical name space may be organized to define catalogs and home directories for accounts. Each catalog may have a descriptor and a set of elements, which can be appliance classes or applications, depending on the catalog type. The catalog descriptor may be preferably an ADL file that may be stored as a single repository object, in the root of the catalog. Each appliance class may include a descriptor and one or more volumes. The descriptor may be a single repository object, and each volume may be a single repository object—all or selected under the appliance root in the catalog. Alternatively, the volumes may be stored in an external storage system, such as the storage system 240 illustrated in FIG. 2A; references to the volumes (e.g., their storage location in the storage system) may be recorded in the repository instead of the actual volume content.

The structure above allows all or selected catalog volumes to be stored in the repository by value. When using the repository, AppLogic™ may handle volume storage by value. The repository cannot be assumed to be local (or even within the same datacenter). Therefore, it may be preferred that the grids cache class and application template volumes locally on the grid. The grid may use local volumes (as opposed to files on the metadata volume) to cache catalog volumes. Repository notifications can be used to invalidate the cache when a volume may be changed/updated/deleted in the repository; alternatively, grids can inquire from the repository prior to starting an application whether any changes to the volumes or catalogs were made.

Note that unlike the catalog volumes, which may live in the repository and may be cached on the grids, the application volumes (meaning, the actual volumes of a provisioned application, as opposed to the volumes of an app template) preferably reside on selected grid(s) (of course, this assertion excludes any backups which may reside anywhere). This means that the application structure in the repository may differ significantly from the catalog structure. When it comes to applications, what may be stored in the repository include one or more of the following (or combinations thereof): (a) the application descriptor(s), (b) the global ID of the grid on which the application may be provisioned and/or running, (c) references to the application volumes on that grid, (d) etc.

In at least one embodiment, AppLogic™ preferably does not assume that catalogs, classes and applications may not be modified from outside a given grid. In Cloudware many of the modifications to the contents of the repository may be made by entities other than a grid controller, and multiple grids may be accessing the same catalogs concurrently. In one embodiment, concurrency in catalog access may be handled through locking, versioning or a combination thereof. In another embodiment, concurrency may be handled using traditional mechanisms used by distributed file systems and content delivery systems.

Applications as Objects

It may be desirable to implement changes to the application model in order to harmonize operations over applications and appliances.

First, it may be preferable to treat an application as just an assembled appliance without terminals, and unify the set of operations that apply to both. Application provisioning may be just a constructor, and may be called app create. The set of arguments on app create may be the same as on comp create. The same applies to app start and other lifecycle operations.

An application may have a logon target; in the case of a single-appliance app like the GSC, the logon to the application may be equivalent to the logon to the GSC appliance and may be forwarded to it by default. In the case of an assembled application, and in the case of an assembly appliance, too, it may be possible to forward the logon operation to a designated subordinate instance, for example, as one may be designated by the developer who defined the application or assembly infrastructure.

The "manage" operation on appliances may be a convenience, but then so may be the web shell, and may make a positive difference in perception and usability. When defining an appliance boundary, the appliance developer may be able to specify whether the appliance has a management web interface, and if so, provide the port (usually, it may not be port 80) on which the management web interface may be set up to run. If this is specified, the right-button menu on this appliance may contain the "Manage" operation. Selecting "Manage" may open a new browser window with the appliance management console in it. The interaction may be happening through the default interface of the appliance, in the context of the SSL session.

It may be possible to propagate the "Manage" operation to the application as a whole the same way as the "logon" may be propagated (e.g., the manage operation may also be defined on the application as a whole; single-appliance applications may select the sole appliance to forward the manage operation to; in multi-appliance entities a developer may specify the target appliance to which the application's Manage operation should be directed). This may allow building application controller appliances (e.g., appliances that serve as controllers for managing a whole complex application) with sophisticated web control interfaces and integrate them seamlessly into the apps.

In general, an application template may be treated as a class. This may allow easier upgrade and swap-out of application infrastructures, similar to the mechanisms that may be available to appliances in AppLogic.

Improved Application Migration

The ability to share and mount volumes across grids may be one approach that makes it possible to implement local (within the same DC) migration with minimum downtime for the application. It will be appreciated that this method may be used for remote migrations as well, and that other methods may be used for the local migration.

According to a specific embodiment, implementation of a local migration process may include one or more of the following operations (or combinations thereof):

- While the application continues to run on the source grid, it may be prepared on start the target grid incl. volprep/volfix of instance volumes
- The application is stopped briefly; app volumes may be shared from the source grid and mounted as a mirror on the target grid
- The application is restarted on the target grid
- Volume repair is started on the target grid for all or selected application volumes of this app
- When the repair process is complete, app volumes may be deleted from the source grid The net result may be to reduce the application downtime on migration to the time it takes to restart it on the same grid. This may go a long way toward aggregating multiple grids in the same datacenter and balancing the load across them.

For remote application migration (e.g., migration between different datacenters, possibly with large distance between them), a downtime of several hours may be considered completely acceptable. For remote application migrations, where it may not be possible to access volumes on the old grid from the new grid directly, due to latency, we may use asynchronous remote replication with narrowing differences.

In one embodiment, implementation of a remote migration process may include one or more of the following operations (or combinations thereof):

- While the application continues to run on the source grid, it is prepared on start the target grid incl. volprep/volfix of instance volumes
- For each application volume on the source grid, a new volume of the same size is created on the target grid
- An asynchronous remote replication is started between the volumes on the old grid and the volumes on the new grid. The volume data is preferably copied on a block level. At any time the target volume may synchronized up to a particular block number N; all blocks after that block is not copied yet. As the application on the source grid continues to execute, if it writes a block beyond block number N, there may be no need to replicate that (since the replication process has not yet reached N); if the application writes to a block number below or equal to N, the number of block being written is put on a "dirty" blocks list; from time to time, the blocks marked as dirty may be re-copied from the source to the destination. As the synchronization progresses, fewer and fewer blocks may need to be copied.

At some point, when a predetermined small number of blocks to be copied may remain, or when it is detected that the "dirty" blocks list keeps increasing (non-convergence), the source application is stopped The remaining "dirty" blocks of the application volumes may be copied to the target, so that the target volumes are complete copies of the source The application is restarted on the target grid The application, with all its volumes is deleted from the source grid In another embodiment, a commercial or open-source remote storage synchronization system may be used.

Rest API

The semantics of the REST API may be preferably not specific to the grid—they may apply to all or selected APIs in Cloudware. See a discussions elsewhere herein for API's definition and operation.

When it comes to AppLogic™, it may be preferable to define at least 2 REST interfaces—the grid interface and the repository interface. The grid interface may be semantically equivalent to the 3tshell interface. It may be a good idea to divide it further into separate interfaces by object. Such interface may be implemented in the grid controller, over the existing 3tshell or CLI object management utilities.

The API may also add (a) well-defined, predictable status codes on error, (b) enumeration of entities, and/or (c) common approach for long operations (such as volume copy or app start and migration).

The grid interface preferably provides operations for configuring the grid itself, including setting the grid properties (e.g., the applogic.conf file). This interface may further be used by the grid distribution and installer software.

In addition, the grid interface may implement the following set of operations:

Get/set repository interface pointers (w/ ability to have two pointers, DNS-style, for failover)

Register/deregister event handler pointer for system events (grid, server, messages, etc.)

Register/deregister event handler pointer for application events (app, component, interface, messages filtered by app)

Event handlers may be defined as a pair (URL, context value), where the URL may be a pointer to a REST interface/operation)

In one embodiment, grid, repository and Cloudware interfaces may be implemented as REST, SOAP and/or both type of interfaces.

Automatic Volume Repair

It may be desirable to automatically initiate the repair of degraded volumes, without interfering with the lifecycle of the application or appliance that may use the volumes that may be being repaired or migrated.

In one embodiment, volume repair may be possible in all circumstances, including while the application that owns the volume is stopped or running. If necessary, when starting an application whose volume is being repaired, the repair process is stopped, so that the volume mirroring driver may be moved to the server on which the appliance accessing the volume will be located; then the repair may be resumed.

Locked Appliances and Applications & Metering Changes

The support for locked appliances and applications may be provided for people who would like to offer proprietary software on AppLogic™; proprietary software may include, for example, proprietary packaging of open-source software.

Locked appliances may provide the ability to limit the user's access to the interior of the appliance/application in the way in which the author of the appliance/application may have selected. This includes:

No mounting of the volume(s) of this appliance/app except by the instances of it No branching of the appliance class No logon to the appliance/application, or login with restricted rights To support the same group of people, we may also extend the metering system to meter the use of appliances and applications. Note that this may apply not only to the locked appliances/apps—metering the use of all or selected catalog entities may be useful as a way to collect statistics on their popularity and reliability.

Core System Features

High performance support for many different datacenter OSs such as, for example, one or more of the following: Linux, Windows, Solaris/OpenSolaris (incl. the NTFS, ZFS and UFS file systems), etc.

Universal High Availability provides automatic recovery in the case of server and disk failure, without requiring application modifications.

Support for both 32-bit and 64-bit OS that can be mixed and matched within applications.

Scalable IP SAN with redundant storage and integrated volume management using direct-attached disks.

Self-serve troubleshooting and repair tools.

Web-Based User Interface Features

Drag-and-drop visual architecture editor for multi-server applications, supporting design annotations for fully documented deployments.

Dashboard for deploying and controlling applications in the cloud, including, for example, multi-server architectures.

Web-based file manager for storage maintenance.

Application Definition Language may be used to capture applications infrastructure and may serve as up-to-date documentation and/or as deployment/operations schema.

In-depth, architecture-aware monitoring system with support for custom performance counters and REST API for exporting monitoring data.

System Catalog Update Features

Access to multiple different pre-built infrastructure templates, ranging from scalable multi-server stacks to complete ready-to-run scalable applications.

Access to multiple different pre-configured virtual appliances for rapid building of new applications such as, for example, Tomcat, MySQL replication (master-master, master-slave, and more), PostgreSQL servers (e.g., for augmenting LAMP and infrastructure appliances available in prior versions), etc.

- Embeddable policy engine support, including ready appliances for backup, migration and automatic real-time SLA control.
- Easy to use Appliance Kit for building new appliances including installation from ISO images.
- Support for third-party licensed appliances including, for example, user license management, device (e.g., virtual machine) license management, appliance locking, usage metering, integrated billing, etc.

Cloudware API: Semantics, Implementation Notes

To build a larger system, and support effective automation, it may be preferable to implement a uniform way for defining interfaces in AppLogic™ and/or Cloudware. Some of those interfaces may be made public, while others may be left internal; in both cases, however, it may be preferable to have a way to express common interface design patterns, while being able to implement and use those interfaces using PERL, PHP, Java, etc., over an http transport. An additional design goal may be to define the interface mechanism loosely-coupled, so it can easily accommodate for versioning differences (e.g., in the case where the Cloudware service may need to operate grids of different versions).

Overview

- Cloudware interfaces may be web services interfaces; they may use HTTP as an underlying transport
- In all or selected cases, we may assume that the interface can be used globally; latencies of 200 msec+ may be assumed/designed for
- Unless specifically defined otherwise, all or selected interfaces may be assumed to be secure, operating over SSL
- REST may be one preferred architectural style for the interface; it will be appreciated that SOAP may also be a viable alternative that may add further loose coupling and make it easier to submit and process requests from languages such as Java and .NET that have extensive library support for SOAP. Additionally SOAP may provide more advanced features and standardization on gateways, caching servers, proxies, and other connectors.
- In at least one embodiment, every Cloudware interface may be a REST interface; however, not every REST interface may meet the criteria for a Cloudware interface.
- To implement the necessary interface semantics, we preferably add a number of additional requirements to our interfaces.

General Information about REST

- REST stands for "Representational State Transfer"
- Here may be the Wikipedia article on REST http://en.wikipedia.org/wiki/Representational_State_Transfer, herein incorporated by reference in its entirety.

Defining Interfaces

In at least some embodiments, it may be preferable to make a distinction between an interface mechanism, and a logical interface (or, simply, interface). In at least one embodiment, the interface mechanism defines how interfaces in general are constructed, implemented and invoked in a given system. In one embodiment, a logical interface may define the semantics of interacting with a given object or set of objects. The same logical interface may be implemented over different interface mechanisms, and a single interface mechanism may be used to implement all or selected logical interfaces in a given system, or at a given layer within the system.

Interface Mechanisms

According to different embodiments, an interface mechanism usually includes one or more of the following (or combinations thereof):

- A method for binding to an interface (e.g. name binding, terminal mechanism, etc.)
- A method for invoking a specific operation on the interface (e.g. v-table, message-passing, etc.)
- A method for passing arguments in and out of interface operations (e.g. buses, events)
- A method for dealing with asynchronous operations (callbacks, async completable requests)
- A method for preserving and carrying request-related state between requests (context)
- A convention for passing ownership of data items across the interface
- A set of return status codes/values Logical Interface(s)

In at least one embodiment, a logical interface may include one or more of the following (or combinations thereof):

- An interface bus
- A set of operations
- The semantics of each operation—inputs, outputs, allowed statuses, effect of the operation Patterns and Assumptions In one embodiment the following assumptions may be defined for the interfaces:

- Interface operations may be preferably orthogonal and form an algebra over a certain object or set of objects
- Interface operations may be preferably atomic:
  - if an operation returns status "OK", it has performed ALL of the required actions and the object on which may be was operating may be in its final state
  - if an operation returns any status except "OK" and "PENDING", it has failed, and the object may be in the exact state it was before the operation was invoked (exception to the state recovery may be allowed for composite destructors/cleanup operations that destroy multiple objects in order and, if a destructor fails in the middle, it may not be possible to undo the destructors that succeeded).
- Any interface operation can complete synchronously or get desynchronized by the implementor by returning "PENDING"
- Interface operations (and their invocations) may be non-blocking and take short and predictable amounts of time to complete
- The implementation of an interface makes no assumptions about the sequence in which the operations may be invoked.
- It may be legal to invoke an operation in a wrong state of the object or in wrong sequence; the implementation may return an appropriate status (e.g., WRONG_STATE, BAD_SEQUENCE); however, it may not malfunction
- All or selected operations of the same interface may be preferably invoked with the same request bus REST-Based Mechanism for Cloudware Interfaces The following description represents a modified REST architecture style which may deviate from the strict definition of the REST architectural style.

REST (Representational State Transfer) defines a general method of implementing RPC over HTTP which is simple and language independent. While semantically similar to SOAP, REST is much simpler and does not involve pages of hard to parse XML descriptors on every call.

The general idea of REST is simple:

- A URL may be used to identify an API function (e.g. http://www.cloudware.com/api/operation1)
- Input arguments to the function may be encoded in the URL (e.g. http://www.cloudware.com/api/operation1?arg1&arg2&arg3. Additional parameters

- may be passed as part of the document (when using POST); they may be encoded as URL (e.g., arg1=value1&arg2=value2), in XML, JSON and/or UDL).
- The call may be made by issuing HTTP GET or POST method to the so defined URL
- The POST returns a text document which preferably includes a return code and any output arguments This is just a general convention. Pointers may be represented by URL, so to pass anything by reference you pass a URL to it. Also, large arguments may be passed by value into the call by using HTTP POST instead of GET. Finally, for manipulating truly large binary data, one may use partial GET and PUT commands which read/write a given range of bytes at a given offset into the data item.

Cloudware-Specific Extensions to REST

To express logical interfaces, it may be preferable to extend the definition of REST in several areas. For example, it may be preferable to provide one or more of the following features (or combinations thereof):

- A way to bind to interfaces and operations
- A way to represent return status and values
- A way to desynchronize operations
- A way to represent request-related state and contexts In one embodiment, logical interfaces in REST may be specified in the same way as is done in VSDL, etc., namely, by defining the bus, the set of operations, and the semantics (in/out/action/status) of each operation.

Binding to Interfaces and Operations

Binding may by name, for example, by appending the terminal name and the operation name to the base URL of the API. Notice that I used the word terminal rather than object or interface. The difference may be in the ability to access two different instances of the same logical interface on the same boundary.

Examples:

| | |
|---|---|
| Base URL of the service API | https://www.cloudware.com/api |
| Terminal | https://www.cloudware.com/api/grid/server |
| Operation | https://www.cloudware.com/api/grid/server/add |

Representing Return status And Value

With very few clearly identified exceptions, each (or selected) interface operation in Cloudware may return a text document in the form similar to the example below:

{status=ST_OK arg1="some value" arg2=34}

In one embodiment, the status may come first. The allowed values for the status may be textual representations of the standard statuses. The rest of the string may be in the name=value format, with the names identifying the fields in the bus of the logical interface.

Additional return status information may be defined, such as, for example, human-readable error message, error message ID (useful for localization in different languages), log entries, etc.)

Further, a quoting mechanism for special characters in argument values (and for the whole values) may be defined, thus allowing any text or binary value to be given or returned as argument. Possible quoting mechanisms include URL encoding (e.g., a double quote may be encoded as %22; see, for example, http://www.blooberry.com/indexdot/html/topics/urlencoding.htm), UUENCODE (http://en.wikipedia.org/wiki/Uuencode) and many others.

Desynchronizing Operations

In at least one embodiment, Cloudware interfaces may be defined in a way that allow the implementor to desynchronize any specific request if it decides to do so. One example of how this may be done is described below:

- In one embodiment, every operation (or selected operations) may be expected to complete within 500 msec or less
- If the operation cannot complete within this time, the implementor may be expected to return status code "PENDING" and a completion context, cplt_ctx
- Each (or selected) interface(s) may implement a special operation called chk_progress, invoked with the cplt_ctx argument
- If the request in question may not be yet completed, chk_progress may return status code "PENDING"
- The first invocation of chk_progress after the request may be completed may return the status and other arguments of the original request and make cplt_ctx value invalid, further freeing any resources kept by the implementor to track the state of the operation
- While returning ST_PENDING, chk_progress may return optional fields like stage and percent_complete.

Examples:

```
https://www.cloudware.com/grid/server/add?ip__addr=198.162.10.14
   { status=ST__PENDING cplt__ctx=0x3478233 }
https://www.cloudware.com/grid/server/chk__progress?cplt__ctx=0x34
78233
   { status=ST__PENDING percent__complete=32}
https://www.cloudware.com/grid/server/chk__progress?cplt__ctx=0x34
78233
   { status=ST__PENDING percent__complete=70}
https://www.cloudware.com/grid/server/chk__progress?cplt__ctx=0x34
78233
   { status=ST__TIMEOUT }
```

Implementing Desynchronizable Operations in Scripting Languages

In one embodiment, REST operations may be preferably implemented as scripts under Apache. However, this may raise issues relating to how to implement asynchronous operation in such environment. In at least one embodiment, such an implementation may be accomplished via the use of one or more of the following operations (or combinations thereof):

- When the operation is first invoked, the script:
  - creates a temp file with a unique name
  - starts a detached process that will execute the operation, redirecting its stdout and stderr to a file
  - writes the PID of the process and the names of the stdout/stderr files into the temp file
  - checks if the PID is still running for no more than 500 msec (sleeping/blocking as appropriate)
  - if the PID process is done, collects the data from the stdout file, cleans up and returns the required text
  - otherwise, returns status code "PENDING" and the name of the temp file as the value of cplt_ctx
- On chk_progress
  - reads the PID from the temp file
  - checks if the PID is still running for no more than 500 msec (sleeping/blocking as appropriate)
  - if the PID process is done, collects the data from the stdout file, cleans up (e.g., deleting the stdout/stderror and temp files) and returns the required text.
  - otherwise, returns status code "PENDING" and the name of the temp file as the value of cplt_ctx A garbage collection processes may run periodically to clean up requests that have completed but whose status was not collected. In one embodiment, the cleanup may be similar to the cleanup on normal completion.

It may be beneficial to extend the chk_progress operation and/or extend the interface with enum_pending operation which returns a list of all operations currently pending (e.g., including operations still in progress and operations that have finished but whose status may not yet be collected).

Example Cloudware Entities and Relationships

User-Visible Entities–Hierarchy

The following are examples of some preferred containment relationships within Cloudware (Note: in the examples below. only high-level entities are shown; entities and attributes such as properties and terminals have been omitted for brevity).

```
└ service¹
  └ account⁺
    ├ application instance*
    │  ├ application volume*
    │  ├ application instance*
    │  └ cached class volume*
    ├ application catalog*
    │  └ application template*
    │     └ application volume*
    ├ application catalog*
    │  └ application class*
    │     └ class volume*
    └ datacenter*
       └ grid*
          └ server⁺
            cached class volume*
```

Note:
in one embodiment, the entities in bold have profiles and can be searched for/found in the Cloudware Network
although volumes belonging to application instances may be stored on grids, they may be formally contained within their application instance (which, for example, may be contained within the account)
Legend:
[1]singleton
[+]one or more
*zero or more Entity Profiles Common The following attributes may be present in some or all entity profiles:

| Field name | Field Description |
| --- | --- |
| Name | Name of the entity (short) |
| Full name | Full name of the entity (first/last, company, etc.) |
| Overview | Description of entity (free formatted text, a few paragraphs max.) |
| Picture | Graphical picture of the entity (headshot, logo, appliance, etc.) |
| Owner | Account that owns the entity (all entities except account) |
| Container | Container in which the entity resides (all entities except service) |
| Rating | Star-based rating |
| Reviews | 3rd-party reviews of the entity |
| Forum | Message forum for the entity |

Service

In addition to the common attributes, the Service entity may have one or more of the following attributes:

| Field name | Field Description |
| --- | --- |
| Root Account | Name of service's owner account (account with full privilege) |

Account

Attributes

In addition to the common attributes, the Account entity may have one or more of the following attributes:

| Field name | Field Description |
| --- | --- |
| Type | {Person, Organization} |
| Contact Info | Address, phone/fax numbers, e-mail addresses, skype/IM, etc. |
| Users[ ] | List of users with access to the account. Substructure ("account", "may be_admin(bool)") |
| Network[ ] | List of entities in this account's network (see below) |
| Message Center | Message center for the account - common place for receiving and responding to all messages |
| Billing info | Payment method, credit card info, etc. |
| Billing account | Billing/payment history, etc. |
| Metering data/graph | Summary of past and current usage |
| Options | Additional attributes describing the account: may be_hosting_provider, may be_service_provider, etc. |
| Blog | (optional) Blog |

Owned entities

| Field name | Field Description |
| --- | --- |
| applications[ ] | List of application instances (incl. their present assignment to grids) |
| cat_applications[ ] | List of application class catalogs |
| cat_appliances[ ] | List of appliance class catalogs |
| datacenters[ ] | List of datacenters owned by this account |

Account Network links

Account network may have one or more of the following explicitly created links:

accounts with access (e.g., users who have access to this account)

accounts that this account may have access to (e.g., the opposite—accounts that gave my account access)

application catalog references (3rd party)

appliance catalog references (3rd party)

appliance/application class references (3rd party) [references to individual classes rather than the catalogs they may be contained in; may not be supported in early implementations]

resources on which apps for this account can be scheduled on (zero or more of each type)

preferred hosting providers (account names)

preferred datacenters (other than datacenters belonging to the account) or locations (e.g., region like Western ONE); in the case of locations, the datacenters to which links exist may be determined by using a query leased grids providers that provide consulting, operations and/or support services to this account (account names)

Application Instance

Attributes

In addition to the common attributes, the Application Instance entity may have one or more of the following attributes:

| Field name | Field Description |
|---|---|
| Class | Link to the application class from which this application was instantiated |
| Configuration | Resources, attributes, properties, IPs |
| Stage | {Development, Test, Production} |
| Control Policy | Metadata on how the application should be operated in case of various failures (incl. whether app is mission-critical, to be autorestarted, etc.) |
| State | Application's current state (e.g., stopped, starting, running) |
| Location | Application's current location (e.g., location, datacenter, grid) |
| Stats | Statistics for this app instance: uptime, # runhours, MTBF |

Application Catalog

Attributes

In addition to the common attributes, the Application Catalog entity may have one or more of the following attributes:

| Field name | Field Description |
|---|---|
| Public | Whether the catalog is public (bool) |

Owned Entities

| Field name | Field Description |
|---|---|
| classes[ ] | List of application classes |

Appliance Catalog

Attributes

In addition to the common attributes, the Appliance Catalog entity may have one or more of the following attributes:

| Field name | Field Description |
|---|---|
| Public | Whether the catalog is public (bool) |

Owned Entities

| Field name | Field Description |
|---|---|
| classes[ ] | List of appliance classes |

Application Class

Attributes

In addition to the common attributes, the Application Class entity may have one or more of the following attributes:

| Field name | Field Description |
|---|---|
| At-a-glance | At-a-glance section (see elsewhere) |
| Boundary | Resources needed, proprties, IP addresses |
| Typical Usage | Description of typical usage, with diagrams |
| Detailed Description | Application documentation |
| License | License under which the class may be available for use; may be free (e.g., under GPL). The license text may be included and/or linked through a URL. If the class usage is not free, this field may include pricing method and price, together with any special terms (e.g., discounts, access/export limitations, etc.) |
| Stats | Statistics, incl. # of running instances, # runhours, MTBF (app MTBF may vary) |

Appliance Class

Attributes

In addition to the common attributes, the Appliance Class entity may have one or more of the following attributes:

| Field name | Field Description |
|---|---|
| At-a-glance | At-a-glance section (see elsewhere) |
| Boundary | Appliance boundary (terminals, properties, resources, volumes) |
| Typical Usage | Description of typical usage, with diagrams |
| Detailed Description | Appliance documentation |
| License | License under which the class may be available for use; may be free (e.g., under GPL). The license text may be included and/or linked through a URL. If the class usage is not free, this field may include pricing method and price, together with any special terms (e.g., discounts, access/export limitations, etc.) |
| Stats | Statistics, incl. # of running instances, # runhours, MTBF |

Datacenter

Attributes

In addition to the common attributes, the Datacenter entity may have one or more of the following attributes:

| Field name | Field Description |
|---|---|
| Public | Whether the datacenter is public (bool) |
| Address | Address and Location (incl. GPS coord) |
| Pricing | Resource pricing for resources in this datacenter (may be superseded by pricing information in grids) |
| ToS | Terms of service for the datacenter. May include free form legal terms, as well as parsed well-known fields (e.g., whether mass e-mails are allowed from that datacenter, tier, security level, etc.) |
| Info | Datacenter description (typical DC info, like power/HVAC/phys.security, network peering, stats/graphs links, etc. |
| | Owned entities |
| grids[ ] | List of grids within the datacenter |

Grid

Attributes

In addition to the common attributes, the Grid entity may have one or more of the following attributes:

| Field name | Field Description |
|---|---|
| Type | {Private, Leased, Shared} |
| Controller IP | IP address(es) of the grid controller (public and/or private) |
| Version | AppLogic version and hotfixes |
| servers[ ] | List of servers (name, IP address, comment) |
| server_login | Server login info: root pwd and/or ssh key |
| Resources | Total amount of resources, max. fragment (e.g., 2/4/8 CPU/server, max mem/server), whether the grid is 64-bit capable |
| Pricing | Resource pricing for resources in this grid |
| Stats | uptime, total hours runtime, MTBF |
| Assigned account | account name to which the grid is assigned (e.g., for leased grids only; not used for shared and private grids) |

Implicit Relationships

In at least one embodiment, one or more of the following relationships may exist by virtue of operating applications:

application instance ⇝ application class (instance of)

application instance ⇝ account (which owns it)

application instance ⇝ grid (on which it runs)

appliance instance ⇝ application instance appliance instance ⇝ appliance class

These relationships may be used for reference counting (so that, for example, appliance class cannot be deleted for as long as an instance exists) and for collecting statistics (e.g., total # instances of a class, runhours, etc.)

Cloudware as a Globally Distributed Computer System

In at least one embodiment, the Cloudware network may be implemented as a unified, globally distributed computer system having operational and control characteristics similar to a mainframe computing system. Thus, for example, in one embodiment, all or selected portions of the Cloudware network may be configured or designed to function as a globally distributed mainframe computing cloud, wherein the user or client computer systems may be operable as individual terminals for providing interfaces with the mainframe computing cloud. In at least one embodiment, the user/client systems may function as thin client terminals for providing interfaces with the mainframe computing cloud.

In at least one embodiment, the resources attributable to the globally distributed computing cloud may comprise an aggregate of all or selected resources associated with the various systems/components/devices of the Cloudware network. Thus, for example, in one embodiment, the globally distributed computing cloud may comprise a plurality of physically distinct systems (e.g., server systems, storage systems, computing grids, etc.) which are deployed in different geographic locations (e.g., ONE, UK, Germany, Japan, China, Australia, etc.). In one embodiment, the globally distributed computing cloud may comprise a plurality of physically distinct and geographically separate computing grids, wherein each computing grid has associated therewith its own respective data storage network. All or selected resources associated with each computing grid may be aggregated, shared, and/or combined, and collectively represented (e.g., to end users) as a single entity which represents a virtual, globally distributed computing system (or computing cloud). In some embodiments, selected resources associated with selected computing grids may be aggregated, shared, and/or combined, and collectively represented (e.g., to end users) as multiple different entities, each representing a virtual, globally distributed computing system. In some embodiments, all or selected resources associated with each computing grid may be aggregated, shared, and/or combined, and collectively represented (e.g., to end users) as a common pool of resources available for use and controlled by a unified, virtual, globally distributed computing system (or computing cloud).

Cloudware as a Desktop Cloud

In addition to being able to run various types of server-type applications (such as, for example, website applications/software, Web 2.0 applications, etc.), various embodiments of the Cloudware network may provide services for running various types desktop computer software, such as, for example, desktop computer operating system software (e.g., Linux, MS Windows, MAC OS, Solaris, etc.), desktop computer applications, etc.

In at least one embodiment, a desktop computer system may be configured or designed as a stand-alone computer system (such as a personal computer system or client system, for example), which includes at least one CPU, volatile memory (e.g., RAM), non-volatile memory (e.g., hard disk storage), and/or one or more interfaces (e.g., for providing access to the Internet).

For example, in at least one embodiment, a user may utilize selected resources of the Cloudware network to create and run an instance of a virtual desktop computer system (e.g., a virtual PC-type computer system) which has been configured or designed to run a Microsoft Windows™ operating system (such as, for example, Windows XP). In one embodiment, a user may create an instance of the virtual desktop computer system by utilizing various features and resources of the Cloudware network to create and configure a customized virtual appliance which includes a virtual machine, at least one virtual interface, and virtual storage.

For example, in one embodiment, the virtual desktop computer system may be configured or designed to have one or more of the following characteristics and/or properties (at least a portion of which have been implemented using at least some of the virtualization techniques described herein):

Operating System:

Microsoft® Windows® Vista Home Premium Edition

Processor:

Intel® Core™2 Duo E6850 Processor at 3.0 GHz

1333 MHz Front Side Bus

4 MB L2 cache

Volatile Memory:

4 GB DDR2 SDRAM at 800 MHz

Non-Volatile Memory:

320 GB NCQ Serial ATA Hard Drive (7200 RPM) with 16 MB DataBurst Cache

If desired, for purposes of compatibility, for example, the virtual desktop computer system may be configured or designed to have other characteristics and/or properties (at least a portion of which have been implemented using at least some of the virtualization techniques described herein). Listed below are a few examples:

Drives:

16×DVD+/−RW with double layer write capability

48×CDRW/DVD Combo drive 13-in-1 Media Card Reader

Graphics & Video:

513 MB NVIDIA GeForce® 8800 GT

Communications:

Integrated 10/100/1000 Ethernet

56K PCI Data/Fax Modem

Audio:

Integrated 7.1 High Definition Audio

Ports:

Video: 2 DVI and 1 S-Video

IEEE 1394-1 front & 1 back 6-pin serial connector

USB: 10 Ports (2 Front, 6 Back, 2 internal)

Audio: headphone, line-in, line-out, microphone, surround, center/LFE; integrated HDA 7.1 ch sound Network: Integrated Gigabit Ethernet Legacy: 2 PS/2 Ports, 1 Serial Port 1-S/P DIF out (optical)

In at least one embodiment, local devices/resources connected to the user's terminal (such as, for example, optical drives, hard drives, ports/interfaces (e.g., USB ports, COM ports, Ethernet ports, IDE interfaces, ATA interfaces, SATA interfaces, etc.), peripheral devices (e.g., flash drives, printers, etc.), local area network resources/devices, networks connections, etc.) may be attached to the virtual desktop computer system, for example, by virtualizing one or more local ports/interfaces (such as, for example, a local USB interface at the user's terminal), and forwarding the virtualized interface(s) over the terminal connection to the virtual desktop computer system instance at the Cloudware network. In this way, local devices connected to (or networked to) the user's terminal may be "virtually attached" to the virtual desktop computer system.

In other embodiments, a user may utilize selected resources of the Cloudware network to create and run different instances of different virtual desktop computer systems such as, for example, a first Windows OS-based virtual desktop computer system, a second MAC OS-based virtual desktop computer system, a third, Linux OS-based virtual desktop computer system, etc. It may also be possible to run certain virtualization systems, such as Parallels™, so that a single virtual desktop computer in Cloudware may execute multiple operating systems.

It will be appreciated that these are just a few examples of the different virtual appliances which may be created and configured using the Cloudware network resources, services and/or features. Other types of virtual appliances (e.g., such as those described herein) may also be created and configured using the Cloudware network resources, services and/or features. Moreover, it will be appreciated that, in at least some embodiments, the various Cloudware network resources which have been allocated to a running instance of a given virtual appliance may be distributed across multiple different physical computer (e.g., server) systems associated with one or more grids of the Cloudware network.

In some embodiments, a user may search through various Cloudware network catalogs to identify and/or select customized virtual appliances (such as, for example, specifically customized virtual desktop computer systems) which have been created and/or configured by other entities (such as, for example, other users, publishers, etc.). In one embodiment, when the user has identified a particular pre-configured virtual appliance (e.g., virtual desktop computer system) which suits the user's needs, the user may initiate an active instance of the selected virtual appliance, for example, by simply clicking on an appropriate link or button (such as, for example, a GUI button labeled "Start a running instance of this virtual appliance for my use.").

In one embodiment, the Cloudware network may include various preconfigured desktop appliances, with application software preinstalled. Such preinstalled software applications may include accounting packages (such as, for example, QuickBooks, Microsoft Money, etc.), video editing or conversion software, image editing and conversion/publishing software, word processing and other productivity applications (such as, for example, Microsoft Office, OpenOffice, etc.), database applications, server-side software (such as, for example, Active Directory and Microsoft Exchange Server), etc. In this way, for example, a client who needs a particular software application may create (and/or connect to) an instance of a virtual desktop appliance preconfigured with that application, without needing to install the application on his own (local or remote) desktop. In at least one embodiment, this may be used to provide novel business models, such as renting applications.

In at least one embodiment, once a running instance of the virtual appliance (e.g., virtual desktop computer system) has been created, the user may access the virtual appliance, for example, via a remote log-in protocol/interface. For example, a user may remotely access and control a specific instance of virtual desktop computer system, for example, using a remote access protocol such as, for example, the well known Microsoft RDP (Remote Desktop Protocol) protocol, and/or other remote access mechanisms such as, for example, VNC.

In one embodiment, Virtual Network Computing (VNC) is a graphical desktop sharing system which uses the Remote Frame Buffer (RFB) protocol to remotely control another computer. It transmits the keyboard and mouse events from one computer to another, relaying the graphical screen updates back in the other direction, over a network. In one embodiment, VNC may be platform-independent, meaning that a VNC viewer on any operating system can usually connect to a VNC server on any other operating system.

In at least one embodiment, a user may use a local computer system (e.g., local desktop computer system, PDA, notebook computer, smart phone, etc.) to gain remote access to the virtual desktop computer system. In one embodiment, the local computer system may be operable to function as a thin client for allowing the user to perform remote log-in to the virtual desktop computer system. For example, in one embodiment, the thin client may include functionality for providing a browser-based graphical user interface to the Cloudware network, which may be used to allow the user to remotely log in to one or more of the user's instantiated virtual appliances. Thus, for example, in one embodiment, when the user remotely logs-in to a specific instance of virtual desktop computer system running a Windows XP operating system, the display on the user's thin client interface may present the user with a GUI corresponding to a typical Windows XP desktop. Using this remote desktop interface, the user may perform various types of activities at the virtual desktop computer system such as, for example: installing/removing software components to/from the virtual desktop computer system, installing/removing virtual hardware components to/from the virtual desktop computer system, running software applications installed at the virtual desktop computer system, storing data at the virtual desktop computer system, retrieving data stored at the virtual desktop computer system, and/or other types of activities which may typically be performed at a desktop computer system.

In one embodiment, the Cloudware system may provide the required client software for accessing the remote desktop. For example, for appliances using the VNC protocol, the VNC client may be downloaded from the appliance or from the Cloudware system as a Java applet. Further, Ajax-based remote desktop clients may be used to eliminate the need for client-side remote desktop software.

In at least some embodiments, an integrated virtual desktop may be displayed to the user which incorporates or includes features (e.g., icons, graphics, text, services, etc.) from different virtual computer systems. For example, in one embodiment where a user has created a first Windows OS-based virtual desktop computer system, and a second MAC OS-based virtual desktop computer system, an integrated virtual desktop may be displayed to the user which includes icons from both the Windows OS-based virtual desktop and MAC OS-based virtual desktop. In one embodiment, when the user clicks on a selected icon on the integrated virtual desktop (e.g., to launch an application associated with the selected icon), the Cloudware network may be configured or designed to automatically identify the proper virtual desktop computer system which the icon/application is associated with, and to automatically launch the application (associated with the selected icon) at the identified virtual desktop computer system in a manner which is transparent to the user. Thus, for example, from the user's perspective, one embodiment of the integrated virtual desktop may allow the user to seamlessly launch a variety of different applications associated with different operating systems, wherein different launched applications are automatically, transparently and/or natively executed at different virtual desktop computer systems running different native operating systems.

It will be appreciated that at least a portion of the above-described features of the Cloudware network provide a variety of benefits and/or advantages.

For example, one advantage relates to the ability of a user to obtain access to one or more selected instances of virtual appliances from anywhere in the world. For example, a user who has created a running instance of a virtual desktop computer system may is able to access the virtual desktop computer system from any location in the world which provides Internet access.

Another advantage relates to the ability to create different customized virtual desktop computer systems (and/or other customized virtual appliances) for different purposes. For example, a user may create a first customized virtual desktop computer system for personal-related tasks, and may create a second customized virtual desktop computer system for business-related tasks. In other embodiments, a user may create a customized virtual desktop computer system which is optimized for performing various activities (such as, for example, video rendering/editing, complex system modeling, etc.).

Another advantage relates to the relative ease by which one or more selected virtual desktop computer systems (and/or other customized virtual appliances) may be migrated to different data centers or grids of the Cloudware network. For example, in at least one embodiment, a virtual appliance may be completely represented via one or more descriptor file(s) and/or associated instructions which may be used to create one or more running instances of the virtual appliance. Accordingly, it is possible to migrate a virtual appliance from a first data center (at a first geographic location of the Cloudware network) to a second data center (at a second geographic location of the Cloudware network) by simply using the descriptor file(s) and/or associated instructions to create a running instance of the virtual appliance at the second data center. Thus, for example, a user who frequently travels to different geographic locations (e.g., USA, Europe, Asia, etc), may desire to periodically migrate his virtual desktop computer system to a data center of the Cloudware network which is geographically proximate to the user's current location, for example, in order to reduce data access latency at the virtual desktop computer system. Additionally, in at least one embodiment, the Cloudware System may be configured or designed to automatically determine the user's current geographic location (e.g., using IP address, wireless signals, etc.), and to automatically migrate the user's virtual desktop computer system to a different data center (e.g., a data center which is physically closest to the user's current location) based upon various rules, policies and/or other criteria.

In at least one embodiment, the Cloudware system may adjust the resources allocated to a virtual desktop appliance based on the historical or current usage. For example, if the Cloudware System detects that the virtual desktop appliance is utilizing a relatively large amount of CPU resources, the Cloudware System may respond by automatically and dynamically allocating additional CPU resources for the virtual desktop appliance. As another example, if the Cloudware System detects that the virtual storage or memory associated with virtual desktop appliance is reaching full capacity, the Cloudware System may respond by automatically and dynamically allocating additional storage or memory resources, as needed, and/or may automatically take appropriate action to control or restrict storage/memory usage. In at least some embodiments, the actions which may be automatically and/or dynamically performed by the Cloudware System may be based on various rules, policies, conditions, events, and/or other criteria. In addition to other advantages, this dynamic adjustment of resources may allow less-skilled users to obtain optimal performance and price/performance ratio.

Figure 82:
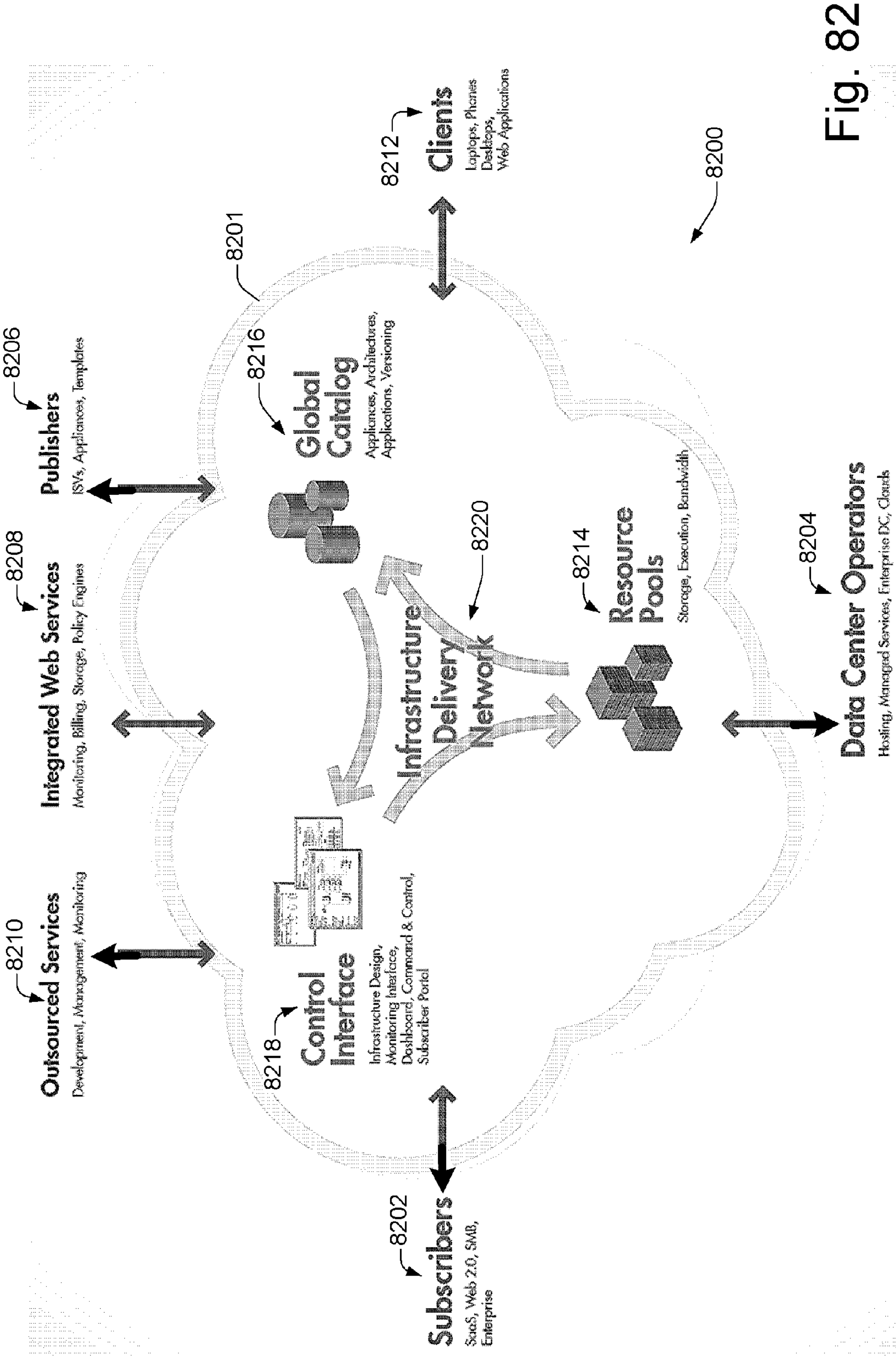
FIG. 82 shows an example embodiment of a Cloudware-enabled global network 8200 which may be used for implementing various aspects described herein.

FIG. 82 shows an example embodiment of a Cloudware-enabled global network 8200 which may be used for implementing various aspects described herein.

As illustrated in the example of FIG. 82, the Cloudware-enabled global network may include, for example, one or more of the following (or combinations thereof):

Wide area network cloud 8201
Subscribers 8202
Data Center Operators 8204
Publishers 8206
Integrated Web Services 8208
Outsourced Services 8210
Clients 8212
Resource Pools 8214
Global Catalog(s) 8216
Control Interface(s) 8218
Infrastructure Delivery Network 8220

Various features illustrated in the example embodiment of FIG. 82 are further described below.

Subscribers

In at least one embodiment, the examples of various subscribers may include, but are not limited to, one or more of the following (or combinations thereof): SMB, Web 2.0, SaaS, Enterprises, and/or other entities who may be responsible for setting up or managing IT infrastructure and/or who may have active (e.g., working, on-line) web applications and/or services. In at least one embodiment, subscribers may have their applications operate in the cloud 8201, without the need to own or manage servers, data centers, network peering, etc. They may deploy any desired architecture, middleware, including existing applications; may scale applications per their needs, and operate them anywhere in the world, paying only for what they use.

Data Center Operators

In at least one embodiment, data center operators may "publish" computing resources—such as, for example, servers, storage and network connectivity—making them available to subscribers (and/or other entities). In at least one embodiment, data center operators may include, but are not limited to, one or more of the following (or combinations thereof): hosting providers, managed service providers, enterprise datacenters and/or other clouds. In one embodiment, the data center operators may determine the prices for the resources they publish and/or may also determine or set criteria for who may access or use specific resources, which, for example, may range from individual subscribers (e.g., when an enterprise data center adds private resources for use by other subscribers in the enterprise), to general use by any subscriber. In addition, data centers may publish their excess capacity, or have the unused servers shutdown to conserve power until needed. In at least one embodiment, the Cloudware network may be configured or designed to automatically detect a need for additional capacity at one or more data centers, and may automatically respond by taking appropriate action to power-up additional servers at one or more data centers (which, for example, may have been shutdown temporarily to conserve power).

Publishers

In at least one embodiment, examples of different publishers may include, for example, one or more of the following (or combinations thereof): independent software vendors, virtual appliance vendors, infrastructure, platform and tool vendors, verticals, etc. In at least one embodiment, one or more publishers may publish in the global catalog, for example, appliances, ready-made architectures, whole ready-to-run applications, etc. In one embodiment, publishers may determine and/or specify various criteria relating to access and/or use of published resources such as, for example, which subscribers (and/or other entities) have access to what published resources, at what price, and/or other constraints (e.g., timing constraints, usage constraints, etc.). In at least one embodiment, virtual appliances allow, among other things, hardware appliance vendors to provide software equivalent(s) of their appliances, including, for example, firewalls, load balancers, security appliances, etc. In at least one embodiment, platform and middleware vendors may provide ready-to-use packages of their software that may be used without complex installation and configuration. IT professionals may productize their expertise by publishing ready to use architectures: LAMP, Ruby-on-rails, J2EE, including scalable versions, such as clustered database servers, application servers, etc. Verticals may publish their applications in a ready-to-run form that may be delivered by managed service providers or used by customers directly.

Integrated Web Services

In at least one embodiment, vendors may provide value-adding web services that are available to all or selected subscribers (and/or other entities). Examples include advanced monitoring tools, billing services, transaction monitors, life-cycle management and policy engines, storage (e.g., temporary and/or persistent), etc.

Outsourced Services

In at least one embodiment, outsourcing providers may publish their services and make them easily available on the cloud (e.g., 8201). Examples of such outsourced services may include, but are not limited to, one or more of the following (or combinations thereof): application development, monitoring, support, application management, etc.

Clients

In at least one embodiment, clients may include various users (e.g., end users) on the Internet which, for example, may be connected via wired, wireless, laptops, desktops, mobile phones, etc. In at least one embodiment, services and applications running in the cloud 8201 may be accessed (e.g., by users) over existing protocols which, for example, may be indistinguishable from services running on traditional architectures (except, for example, for their improved scalability, availability, etc.).

Resource Pools

In at least one embodiment, resource pools may provide access to various network and/or computing resources such as, for example, one or more of the following (or combinations thereof): raw computing power, CPUs, volatile memory (e.g., RAM), storage (e.g., persistent storage), network connectivity (e.g., to applications running in the cloud), etc. In at least one embodiment, various different resource pools may be located anywhere in the world at different physical global locations. In one embodiment, individual datacenter operators may publish multiple classes of resource pools—in terms of network connectivity, power, services, etc. In one embodiment, commodity servers may be configured or adapted for use as resource pools, for example, via installation and use of an AppLogic execution engine. In at least one embodiment, other resources—such as, for example, 3rd party clouds (such as, for example, Amazon's EC2 and S3 web-based services)—may also be published by providing the appropriate interfaces. In one embodiment, the resource pools may be controlled by the Infrastructure Delivery Network 8220 via web services interfaces.

Global Catalog

In at least one embodiment, the global catalog 8216 may be implemented as a worldwide distributed catalog service for enabling various publishers to publish or make their appliances, architectures and applications available to subscribers (and/or other entities). In at least one embodiment, multiple catalogs may be managed and accessed by subscribers (and/or other desired entities), allowing software publishers to organize their catalogs, and specialize them for their target markets. In at least one embodiment, the global catalog may include versioning and/or distributed caching systems which allow all (or selected) catalogs to be available to any (or selected) applications anywhere in the world (or at selected locations).

Control Interface

In at least one embodiment, the control interface may include a set of user interfaces and APIs for controlling applications and services running in the cloud. In at least one embodiment, the control interface may include, for example, one or more of the following (or combinations thereof): subscriber portals, dashboards, monitoring screens, infrastructure design tools, development tools (e.g., Eclipse plugins), command-and-control web-based interfaces, etc. In some embodiments, the control interface may include web services APIs for "programming" the cloud.

Infrastructure Delivery Network

In at least one embodiment, the infrastructure delivery network may be configured or designed to aggregate the different components of the cloud and their separate instances in a cohesive, distributed cloud. In at least one embodiment, the infrastructure delivery network may include functionality for providing, for example, one or more of the following (or combinations thereof): authentication, access controls, registration of resource pools, control interfaces, catalogs, etc.

In at least one embodiment, the infrastructure delivery network may include functionality for providing, for example, one or more of the following (or combinations thereof): dynamically and automatically deploying infrastructure from one or more catalogs to selected resource pools (e.g., as necessary) to provide the services specified through the control interface; providing data source for the integrated web services; facilitating the interactions between components of the cloud; managing complex transactions during deployment and migration, etc. In at least one embodiment, the infrastructure delivery network may be implemented as distributed service, providing, for example, resilient, highly-available and localized services for maintaining proper operations of the cloud.

Other Features/Embodiments of Cloudware

In at least one embodiment, various embodiments of Cloudware may be configured or designed to allow or enable "open cloud" computing, where individuals and companies will be able to add their distinct capabilities to the cloud. In at least one embodiment, Cloudware's flexible architecture empowers customers to build and run large-scale applications in the cloud without compromising their choices of operating system, middleware, security, location, architecture and vendors. Additionally, in at least some embodiments, Cloudware architecture may be configured or designed to operate across numerous data centers, operating systems, and even include important issues like security and high-availability to meet the needs for enterprise computing.

Using Cloudware's flexible architecture there is no need to make compromises when using cloud computing. For example, in at least one embodiment, the Cloudware architecture defines interfaces for resources, software, and controls that run existing code and middleware.

Generally, when a conventional vendor refer to "cloud", the vendor is referring specifically to that vendor's customized "cloud." Typically such customized vendor specific "clouds" are proprietary and associated exclusively with that vendor's customized data centers. Additionally, such customized vendor specific "clouds" typically do not allow for access or participation by other ($3^{rd}$ party) data center operators, and typically do not provide infrastructure within the vendor specific cloud other than that which the vendor has specifically provided. Additionally, such vendor specific clouds typically require that $3^{rd}$ party software developers utilize the vendor's published APIs when writing software for use with that vendor's specific cloud.

In contrast, in at least one embodiment, the Cloudware architecture described herein not only provides access to a variety of products and/or services, but may also be configured or designed to allow $3^{rd}$ party entities (e.g., independent companies, vendors, etc.) to design and provide inclusive cloud-based service within the Cloudware network.

In at least one embodiment, because of its open nature, the Cloudware Architecture may be configured or designed to allow any existing web applications to run in a Cloudware-based cloud, with no limitations as to specific language, software libraries and/or interface.

In at least one embodiment, the Cloudware network may be open to all entities, such as, for example, data center operators (e.g., who can provide resources), appliance vendors, system integrators, managed service providers, developers, etc.

Thus, one advantage of the Cloudware architecture is that everyone may benefit by being able to combine technologies to deliver a better service to the end user.

In at least one embodiment, Cloudware architecture provides a flexible architecture empowering customers to build and run large-scale applications in the cloud without compromising their choices of operating system, middleware, security, location, architecture and vendors.

In at least one embodiment, aspects of the Cloudware architecture may be based upon technology proven in 3Tera's award winning AppLogic™ grid operating system. In at least one embodiment, the Cloudware architecture may incorporate various types of distributed computing resources such as, for example, storage, computing, connectivity, security, etc. Further the Cloudware architecture may define and manage how each different resource relates to the other resources in a far reaching architecture for enabling an "open cloud" computing system.

In one embodiment, the Cloudware architecture may be implemented in a manner which is non-vendor specific, so that any third party vendor's software can be incorporated in a Cloudware-enabled system. Additionally the Cloudware architecture may be implemented in a manner which supports all (or selected) operating systems, such as, for example, Linux™, Solaris™, Windows™, etc. Additional features include, for example, choice of multiple data centers worldwide, pre-built MySQL clusters, database replication appliances and NAS integration with third-party storage solutions, etc.

In at least one embodiment, the Cloudware architecture may be implemented in a manner which utilizes 3Tera's AppLogic™ grid operating system for providing a true distributed utility computing services. In at least one embodiment, the Cloudware architecture enables commodity servers to be converted into scalable grids on which users can visually operate, deploy and scale transactional Web applications, for example, without any modification of code. Utilizing various embodiments of the Cloudware architecture, Software-as-a-Service providers, Web 2.0 companies, enterprises and open source developers can now get new online services quickly to market by utilizing resources from commodity hosting providers on a pay-as-you-go basis, while maintaining complete control of applications including visual operation, scaling and on-demand resource provisioning.

Global Panel for AppLogic™

FIGS. 20-29B illustrate various example embodiments of different graphical user interfaces (GUIs) and/or virtualized components which may be utilized, for example, for enabling, accessing and/or implementing various types of global utility computing features and/or information described herein.

The global panel may be an on-line control panel for customers who manage applications across multiple AppLogic™ grids. In at least one embodiment, it presents a global list of applications, aggregating the applications from multiple grids in a single view. It allows the grid operator to focus on the applications, rather than on the locations where they run. The global panel may be intended to be a production-quality application, running on AppLogic™. It may be available to all (or selected) customers who want to use it. An example embodiment of the global panel graphical user interface (GUI) may be illustrated, for example, in FIG. 20.

Figure 20:
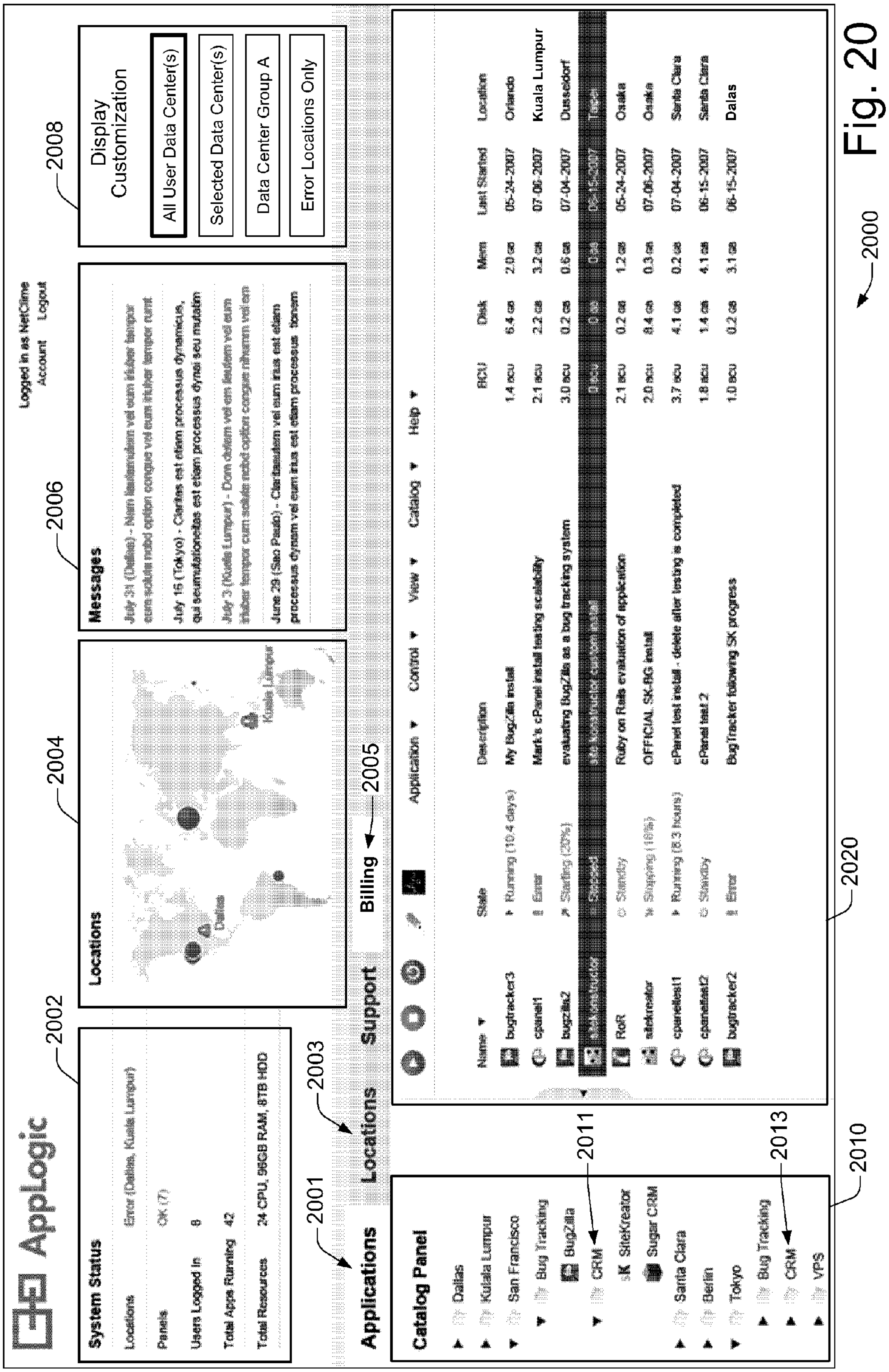

FIG. 20 shows an example embodiment of graphical user interface (GUI) 2000 which may be used for implementing various Cloudware related aspects/features. In at least one embodiment, GUI 2000 may be implemented as a web page which may be accessible to users via conventional Web browsers such as Microsoft Internet Explorer, Mozilla Firefox, etc. In at least one embodiment, GUI 2000 may correspond to a global or consolidated user dashboard page or global panel page which is associated with a particular Cloudware user (or customer).

According to specific embodiments, the global user dashboard page may be accessible to various entities or Cloudware customers such as, for example: data center operators, end users, publishers (e.g., publishers of applications, appliances), etc. In the example of FIG. 20 it is assumed that a user (e.g., NetClime) has logged into the Cloudware System, and that at least a portion of the content of global user dashboard page 2000 has been dynamically generated for that particular user.

As shown in the example of FIG. 20, user dashboard page 2000 includes a variety of different types of content which may be related to or associated with one or more applications which the user has deployed at one or more globally distributed data centers of the Cloudware network. Examples of such content may include at least a portion of the various content previously described and illustrated with respect to FIGS. 7-13, for example.

In at least one embodiment, the Cloudware System may be operable acquire user-specific utility computing information (e.g., associated with a specific user, associated with a related group of users, associated with a given business entity, etc.)

from multiple different geographically distributed data centers (and/or from multiple different geographically distributed server grids), and may aggregate or consolidate selected portions of the acquired information for presentation via the consolidated user dashboard page 2000. In this way, for example, the user may readily observe and/or assess (e.g., via observation of the content displayed on the user's consolidated dashboard page 2000) application deployment details, status information, etc., which are related to the various distributed applications which the user has deployed at one or more geographically distributed data centers (and/or geographically distributed server grids) of the global utility computing network.

For example, as shown in the example of FIG. 20, user dashboard page 2000 includes a variety of different types of content such as, for example, one or more of the following (or combinations thereof):

- Consolidated system status information (e.g., 2002) such as, for example:
  - User-related Application Status Information (e.g., 42 applications currently running at 4 of the 6 (total) data centers where user has deployed applications, application run-time errors detected at 2 of the user's data centers (e.g., Dallas, Kuala Lumpur).
  - User-related Cloudware Resource Information which includes aggregated data relating to various types of user-related resource usage such as, for example: current (or real-time) total BCU resources being used by all (or selected ones of) the user's deployed applications, current (or real-time) total storage resources being used by all (or selected ones of) the user's deployed applications, current (or real-time) total bandwidth resources being used by all (or selected ones of) the user's deployed applications, etc.
  - Total number of other related users (e.g., users who may be associated with the same business entity as that of the current user) who are currently logged into the Cloudware network.
  - Total or aggregated resources currently in use (e.g., 24 CPU, 96 GB RAM, 8 TB HDD)
  - etc.
- Data Center Location and Status Information (e.g., 2004) relating to the location(s) and operational status of all (or selected ones of) the data centers where the user has deployed one or more applications. For example, as illustrated in the example of FIG. 20, different graphical objects (e.g., used to represent one or more different geographic data center locations) may have different characteristics (e.g., shapes, sizes, colors, etc.), which, for example, may be used to represent the operational status of applications running at different data center locations throughout the global Cloudware network. For example, in one embodiment, a data center object represented in the color green may indicate that all the user's deployed applications at that data center location are functioning normally; a data center object represented in the color yellow may indicate that some user's deployed applications at that data center location have experienced errors in the past 24 hours; and a data center object represented in the color red may indicate that one or more of user's deployed applications at that data center location are not functioning normally. In at least one embodiment, the user may select (e.g., click on) a specific data center object to access additional information relating to that data center.
- Display customization options (e.g., 2008) which, for example, may be operable to allow the user to selectively filter and display customized content on user dashboard page 2000 which, for example, relates to selected data centers, selected geographic regions, and/or other types of filtered content which the user wishes to be displayed at user dashboard page 2000.
- Application/Appliance Catalog Content (e.g., 2010) relating to various types of network accessible virtual appliances and/or applications which are available at different geographically located datacenters of the global Cloudware network.
- Application Status Content (e.g., 2020) relating to various applications which have been deployed by the user (or which have been identified as being associated with the user) at one or more geographically distributed data centers (and/or geographically distributed server grids) of the global utility computing network. In at least one embodiment, the user may select a record or entry of the displayed application information table (e.g., 2020) in order to access additional information relating to the application associated with that selected entry.

In at least one embodiment, the global user dashboard may be implemented as the default dashboard for grids, either being integrated in the grid controller, or running on the grid, optionally, as an app (the controller GUI can forward to the global panel if the global panel may be running, or provide local dashboard if not). In one embodiment, it may be operable to allowing peer-type clustering of any number of private grids, at least two (or simply all) grids running a copy of the global panel. This may be further coupled with the ability to request additional servers for grids, and optionally, with the ability to order additional grids in different locations. Further, in at least one embodiment, the global user dashboard may be used as the account control panel of Cloudware for shared services. For example, grid's ACL-based permissions may provide the security and isolation to enable using the global panel as the account dashboard for all customers of the Cloudware service Example Features Functional

- display summary status of all configured grids (locations)
- display the applications from all configured grids, with the ability to perform any operation on an app (control, edit, etc.); in one embodiment, only non-template applications are shown in the list; application's location (grid) may be displayed
- display application templates in a separate panel, similar to the appliance catalog
- allow easy provisioning from any template from any configured grid to any grid
- allow easy migration of an application from one grid to another
- for most operations, execute directly on the target grid, over ssh; for edit or other operations requiring application-level user interface, OK to invoke the target grid
- stateless operation—changes can occur spontaneously (e.g., from another global user dashboard or from grid's own local user interface)

Access

- incoming access: web (https only)
- outgoing access: ssh and web (https) to grids; smtp for mail notifications Clustering The global user dashboard may run on multiple grids for high availability and locality (the grids may or may not be the grids listed in Locations). Multiple different global user dashboards of the same account may be able to synchronize with each other, so configuration changes made on one are propagated on the other. In most other aspects, the global user dashboards may preferably remain independently operating (e.g., their monitoring). There may be no shared state, so this may be easy.

Monitoring

The global user dashboard may preferably monitor all Locations configured in it and show the state of each, as well as an overall health indicator. In addition, the global user dashboard may preferably monitor any other instances of the global user dashboard for the same account and report their state in a similar fashion.

Whenever a change of state may be detected, the global user dashboard may preferably send notifications. At least e-mail may preferably be supported, with SNMP and SMS on the wishlist.

It may be desirable to add support for monitoring applications. This may provide good, distributed monitoring. In at least one embodiment, one may also define deployment type and entry points/monitoring metadata in the applications themselves.

Packaging

The global user dashboard may preferably be available for use in different deployment models such as, for example:

- AppLogic™ application template (e.g., a standard app template in AppLogic™, or available for a separate download), allowing the customer to deploy on their own grid, using the resources already available
- as a service (e.g., if one or a partner operates a shared grid on which global user dashboards are instantiated for each customer who wants them)

Authentication and Security

In at least one embodiment, the global user dashboard may be operable to manage global account logins and/or to improve on the authentication process of the grids or in their security aspects (e.g., ACL-based access).

The global user dashboard may maintain a list of authorized users (login by user name and password, with lockout; the user name may be in e-mail format).

The global user dashboard accesses the grids various ways such as, for example:

- over ssh—for most operations; ssh authentication can happen through a private key stored persistently in the global user dashboard
- over web (https)—when necessary to open the editor or monitor over an application; preferably, the global user dashboard takes care to automatically login the user to the target grid In at least one embodiment, the global user dashboard accesses other instances of the global user dashboard for the same account over a web services interface (https). The global user dashboard may be configured (via properties) with a special admin user, which can be used to create initial users. The admin user cannot be changed from the global user dashboard user interface; it can, however, be disabled through properties (the desire may be to keep it inactive after the initial setup, until needed). The global user dashboard may be configured (via properties) with user and password for SMTP authentication (optional). It may also be possible to allow uploading a password-protected key, and ask the user to unlock it interactively (keeping the unlocked key in a key agent until the user logs off, subject to automatic logoff timeout, given the near-statelessness of HTTP-based sessions).

Details

The user interface of the global user dashboard may be web based. It comprises a main screen, with a dashboard panel on the top and tabbed view below. The dashboard panel comprises three sub-panels: summary, locations and messages. The tabbed views include: applications, locations and support. Applications view may be the main operational view.

Dashboard Panel

System Status

- Heading "System Status"
- Locations: OK (green), Error (yellow/orange), Fail (red)
- with smaller letters, shows number of locations if green, or list of locations in error or that have failed
- For each location (grid) error may be defined as at least one of the following
  - grid's system status may not be OK (as returned by grid info)
  - at least one server may not be up (whether enabled or disabled)
  - HA status may not be OK (for grids with more than 1 server; ignored if HA status not reported) [note that this includes volumes needing repair]
  - at least one application may be in error/failed state
  - login failed (but connection could be established)
- For each location, fail may be defined as unable to reach the grid
- Clicking on the status (or on a "details . . . " link next to it) can display a more detailed list of all detected errors/fails, with their reasons (preferably a popup)
- Panels: OK (green), Error (yellow/orange), Fail (red)
- with smaller letters, shows number of panels (if green), or lists the panels in error/failure
- failure may be defined as panel may be inaccessible
- error may be defined as unable to login or other error (except failure)
- Users logged in: shows number of users logged in (click or hover shows the list) [optional but desirable]
- Total number of applications running
- Total amount of resources (CPU, memory, storage)

Locations Map

- Heading "Locations"
- each location may be shown as a dot with the appropriate color based on status; size of the dot may be based on the amount of resources available
- desirable to have the location's name shown next to the dot
- hover shows additional details (e.g., state of the location, apps running, resources summary)
- click: TBD
- context menu (same as defined for Locations table below)
  - Grid Shell (login to grid shell)
  - Grid Dashboard (open grid GUI)
  - - - -
  - Properties (or Settings)
- when multiple locations are in the same vicinity/geographical location:
  - maybe show some slightly different symbol (e.g., two or three circles)
  - show the number of locations in parentheses, e.g.: "Dallas (5)" and "Seattle (2)"
  - when clicking, menu selects target location name
- may use clipart from http://www.worldatlas.com/webimage/world/flate.htm, or http://www.smartdraw.com/specials/maps-software.htm Messages Panel

- shows the most recent messages, union from all locations (location name may preferably be shown together with the date/time)
- distinguishes alerts and regular messages (similar to grid's dashboard)
- messages may be abbreviated (similar to RSS feed)
- hover over the message shows the full message click on the message: access additional related content/functionality
context menu:

Applications Tab
toolbar/menu bar
catalog panel (collapsible)
application list panel Toolbar
Start
Stop
Restart
Configure
Monitor Menu

| Application | Control | View | Catalog | Help |
|---|---|---|---|---|
| New (blank) | Start | (*) List | Provision | Help Contents |
| New from template | Stop | ( ) Canvas | View | — |
| — | Restart | — | — | About Global user dashboard |
| Edit | Advanced | [X] Catalog | Rename | About AppLogic(TM) |
| View | Continue | [X] Filter | Copy | |
| Configure | Clean | — | Migrate | |
| — | Build | Select columns . . . | — | |
| Rename | — | | Edit | |
| Copy | Login | | Configure | |
| Migrate | Manage | | — | |
| — | Monitor | | Import | |
| Copy to template | Grid Shell | | Export | |
| Import | | | Delete | |
| Export | | | | |
| Delete | | | | |

Catalog Panel

Folders for each location that has the "show templates" selected. If only one location has it, don't show a folder for it. Sub-folders may be arranged by category of the template. Leaves are templates, shown with icon and name.

In addition, the catalog panel may be extended or replaced with a catalog from a central or external catalog service, such as described elsewhere in this disclosure.

Applications List Panel
Context Menu
Start
Stop
Restart
- - -
Edit
Configure
Migrate
- - -
Login
Manage
Monitor Monitoring Tab Monitoring may include a dashboard tracking the performance and operation of all or selected applications among the applications visible in the applications list.

Locations Tab

A location may be, in a nutshell, a grid. Each location entry provides sufficient information to access the grid, submit commands to it, and/or open the user interface on it. In addition, Global user dashboard may preferably monitor all locations and report any problems (e.g., grid no longer available).

Datacenter Locations

List of all locations with current status of each location (green-OK, yellow-problem, red-down).

From the list, one may select a location and perform one of the following actions:
Grid Shell (login to grid shell)
Grid Dashboard (open grid GUI)
- - -
Properties (or Settings)

One may preferably also be able to add, rename and remove locations.

Each location has the following properties:
Name
Controller host (dns name or IP address)
Geo location (city/state/country or GPS coordinates)
Show templates in catalog (checkbox; if checked, templates from that grid are shown in the template catalog; otherwise, not)
Location access key (optional; global key used if per-location key not specified)

In at least one embodiment, "geo location" may be findable (with varying degrees of precision) by IP address. One may might be able to fill it in automatically, when the controller IP address may be entered.

In addition, the following properties can be added:
Type (dedicated or shared)
Service type (e.g., AppLogic™, EC2, VMware, etc.)

The list may preferably show the following information items:
Status
Name
Geo location
Applications (# of running applications)
Resource capacity (CPU/mem/stg)
Resource utilization %
(optional) country flag and local time: e.g., 15:03 PDT Panel Sites The global user dashboard may be "clustered" for high availability and access. This may be useful in general, but even more when the GlobalPanel may be deployed on customer's own grids. As a nice bonus, the global user dashboard now also monitors all known grids of that customer, and having two or more global user dashboards running in different locations may preferably provide enough redundancy.

The panel sites list includes the list of IP addresses (plus any authentication data, TBD) so that the panels can synchronize with each other. For each entry, one have:
global user dashboard host (DNS name or IP address)
comment (may be used to specify the location; however, global user dashboards may reside not in locations controlled by the global user dashboard—e.g., in the shared panel example)
status (green=OK, yellow=out-of-sync, red=inaccessible)
link to open that panel (or context menu)

In at least one embodiment it may be desirable to synchronize the locations list (and, when defined, preferences), as well as the panel sites list itself. In its simplest form, the synchronization may be performed with rsync, with each entry to be syncrhonized (e.g., location) being represented in a separate file (deleted entries don't remove the file, just contain metadata inside saying the entry may be deleted). Latest modification time wins [or use unison or anything else that replicates, like, for example, couchDB, openldap, or master-master MySQL].

Synch of data between panels: if data is kept in text files that are sufficiently well partitioned (no more than one property value per line), the text-based merge (as used in version control systems) may do well enough. If merge fails, then apply the 'latest date wins' approach, and show a warning.

Notifications

Shows the current notifications rules and allows configuring notifications (button 'Edit settings . . . ' or similar).

Overall state: enabled, disabled (it may be useful to globally disable the notifications, e.g., when maintenance starts); may be re-enabled manually or on time elapsed since disabled (e.g., disable notifications when starting maintenance, set re-enable timer to maintenance window).

Entries:

State: enabled, disabled (notifications may be disabled without losing the settings)

Type: e-mail (later, SMS, SNMP, syslog, etc.)

Target: notification address (depending on type; for e-mail, e-mail address, and optionally, an e-mail server; for SMS, a phone number; for SNMP, an SNMP manager; for syslog, a syslog host; etc.)

Max Rate: max. number of notifications per hour (0-unlimited) [if max rate exceeded, the last notification sent to the target may be that no more notifications may be received until xyz)

Also, a button may open a pop-up link of recent events.

Support Tab

Similar to AppLogic™ 2.3.9 support tab; OEM kit may be installed on the volume in order to customize the appearance and set of links.

Account (Top-Right Link)

Users

Table of users of the panel, entries contain:

user name (e-mail address format)

password (****)

administrator (checkbox); administrators can edit users (add/remove/resetpwd/admin)

Operations on each, allowed only for administrators:

Add

Remove

Reset password

In at least one embodiment, "Add" may not be a per-user operation, as the text above implies. One may need either a separate "add" button, or have an empty row in the users list, with all fields empty, except the user name, which may be replaced by a "Add new user" hyperlink.

There may be a link/button to change own password.

Authorization Key

Master user (for background ops/monitoring):

user name (e-mail address format)

ssh key

Login (Appears Before Dashboard)

Similar to AppLogic™ login screen.

Lockout on bad passwords.

Example AppLogic™ Features Relating to Global User Dashboard

Desirable for Global User Dashboard add up to two icons (small and medium) for each app; used for display in lists and property sheets next to or instead of the application name. the icons can be stored uuencoded in the visual{ } entity of the package descriptor or application descriptor add a category attribute for app packages, similar to appliance classes; allowed always but used preferably only for templates add ssh-accessible user login command which returns a URL sufficient to effect a browser-based login (e.g., http://mygrid.3tera.net/auth/login?user=myname@mydomain.com&token=23409a9e09er09a09e0a9e0930212). This allows users who are authenticated via ssh to open browser windows. The token may be a single-use, no-retries; subject to lockout.

app provision to allow provisioning templates from remote locations, including: http(s) (import) and remote grid (migrate). While this can be initially emulated in the global user dashboard, it may be preferable to make this a standard operation on the grid app provision and app migrate pre-flight check on whether all required appliance classes are available on the target grid; there may be an option to also migrate any missing appliances Other Considerations/Aspects At least one embodiment may include a .deployment_type={development, test, staging, production} and .deployment_schedule={manual, always_on} to application/package descriptor. This may allow us to know what to do with apps when they are down; or when there are insufficient resources (e.g., production apps always win). Also, having staging and production apps fail in some way may cause alert in AppLogic™ to be sent; while for dev/test apps, it may be a warning.

At least one embodiment may include "inputs" of applications. Entries may include (name, protocol, address, description); so, for example, one may have "Open, http, blog.3tera.com, Open site", "Admin, https, blog.3tera.com:8080, Administer". These can be extended with attributes for monitoring (e.g., monitor type, request, response; as in "ping" or "http get, /monitor.php, .*Test Page.*"); similarly consider adding outputs and bi-directional connections for interacting between applications, as well as between applications and external services A Billing/Payment Tab (2005) may be provided for accessing billing, invoicing and/or payment related information which may be associated with the user's account. Examples of such billing, invoicing and/or payment related information are illustrated and described, for example, with respect to FIGS. 27-29B of the drawings.

Figure 21:
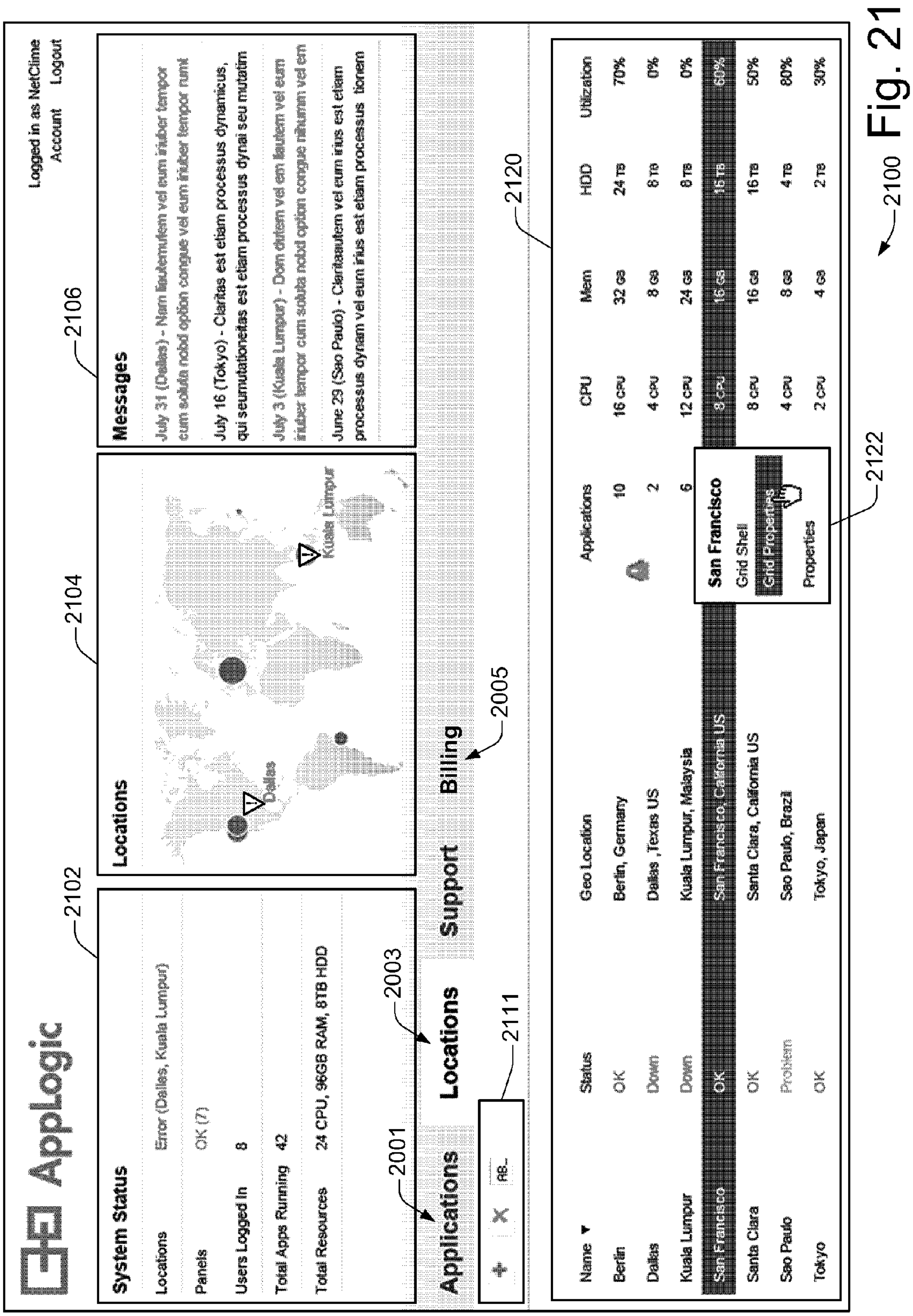

FIG. 21 shows an example embodiment of graphical user interface (GUI) 2100 which, for example, may be accessed by selection of the "Locations" Tab 2003 of the global user dashboard page 2000 of FIG. 20. In at least one embodiment, GUI 2100 may be associated with the global user dashboard page, and may be configured or designed to (1) display application status content (e.g., 2120) relating to various applications which have been deployed by the user (or which have been identified as being associated with the user) at one or more geographically distributed data centers (and/or geographically distributed server grids) of the global utility computing network; and/or (2) provide additional functionality for enabling a user to select, edit, add, delete, customize, configure, start, stop, pause, migrate, lock, and/or otherwise manipulate one or more of the user's associated applications (and/or associated parameters) which have been deployed at one or more geographically distributed data centers (and/or geographically distributed server grids) of the global utility computing network.

For example, as illustrated in the example embodiment of FIG. 21, it is assumed that the user has selected (e.g., by left clicking, right clicking, double clicking, etc.) the highlighted "San Francisco" server grid record to access a dynamic GUI (e.g., display window or overlay layer 2122), which, for example, may be configured or designed to enable the user to perform additional operations with regard to the currently selected server grid (e.g. San Francisco), such as, for example, one or more of the following (or combinations thereof):

- enable the user to remotely login to the shell of the identified/selected server grid;
- enable the user to access additional information relating to the identified/selected server grid (such as, for example, authentication keys, server grid status information, etc.)
- enable the user to remotely modify and/or manipulate one or more of the user's associated applications (or virtual components thereof) which are deployed at the selected server grid;
- enable the user to selectively customize displayed content relating to the identified/selected server grid;
- etc.

In at least one embodiment, graphical user interface (GUI) 2100 may include additional first outing for enabling the user to selectively add, modify and/or delete (e.g., via GUI portion 2111) server grids to/from the user's currently displayed server grid list (e.g., 2120). For example, the user may manually add a new data center or server grid to the users current server grid list by selecting (e.g., clicking on) the "+" icon displayed in GUI portion 2111. After adding the new data center/server grid to the users current server grid list, the newly added data center/server grid will then be available for subsequent use by the user (e.g., for deployment of one or more applications).

Figure 22:
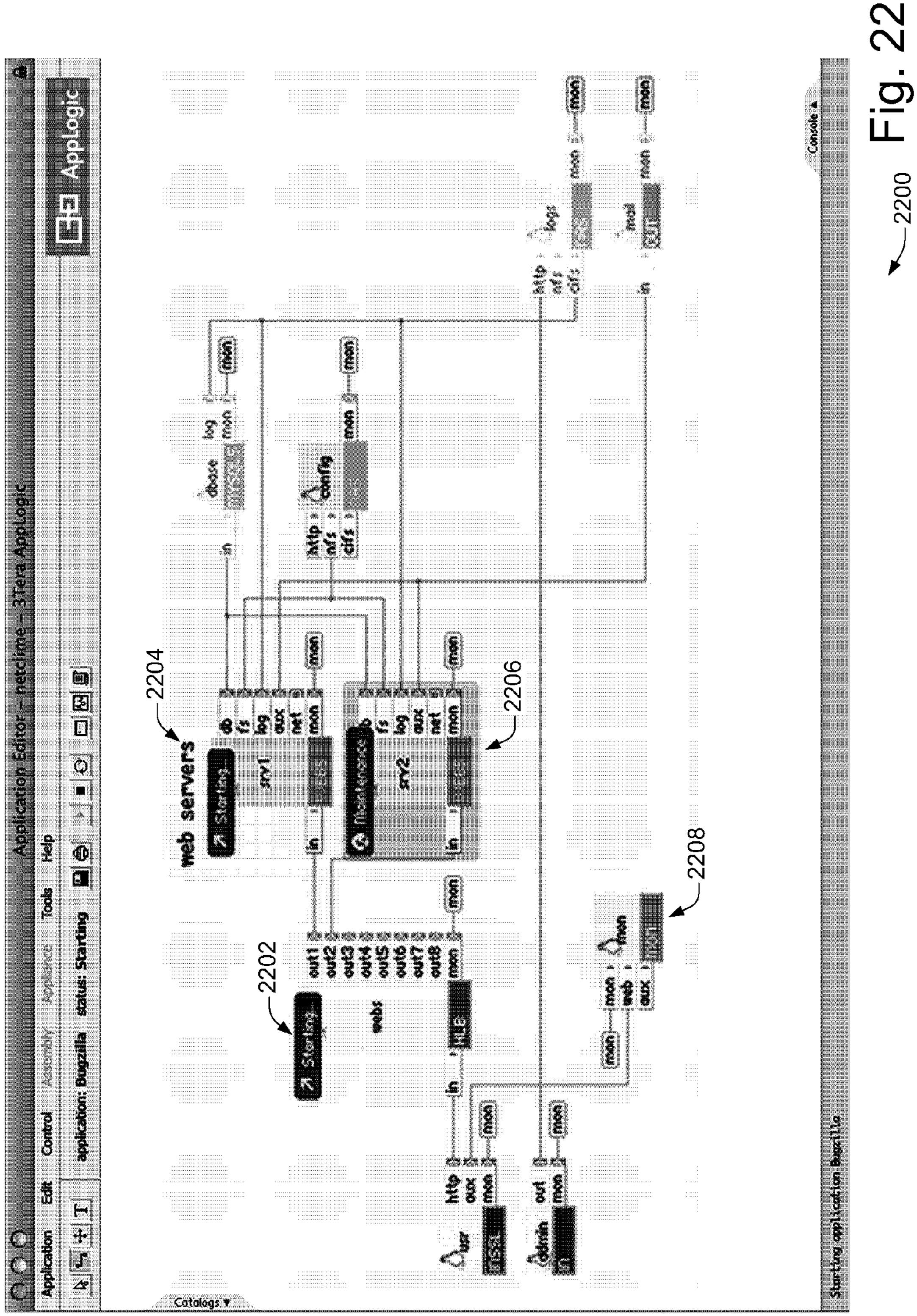
Figure 23:
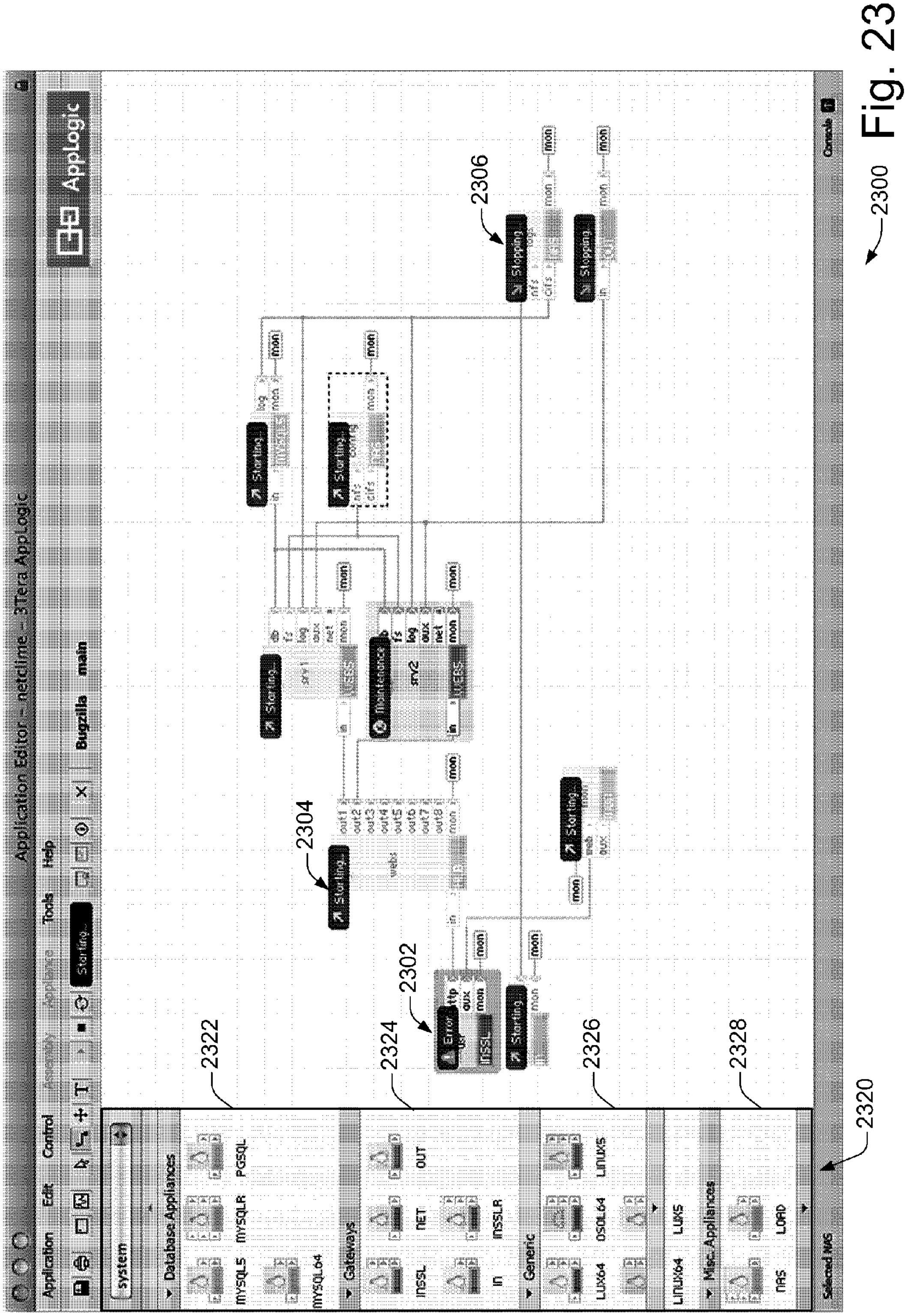

FIGS. 22 and 23 show different example embodiments of graphical user interfaces (GUIs) 2200, 2300 which may be used for implementing various Cloudware related aspects/features. For example, in at least one embodiment, GUI 2200 may correspond to an infrastructure editor/status dashboard page which, for example, may be used to enable a user (and/or other entity) to create, configure, edit, manage, control and/or otherwise manipulate various appliances and/or applications which, for example, may be deployed at one or more server grids of the Cloudware network.

In at least one embodiment, GUIs 2200 and/or 2300 may be implemented as a web page which may be accessible to users via conventional Web browsers such as Microsoft Internet Explorer, Mozilla Firefox, etc.

As illustrated in the example embodiment of FIG. 22, infrastructure editor/status dashboard page 2200 includes a variety of different types of content which may be related to or associated with one or more applications and/or appliances. Examples of such content may include, but are not limited to, one or more of the various different types of content previously illustrated and described, for example, with respect to FIG. 14 and/or other portions of this disclosure.

In the specific example of FIG. 22, it is assumed that a user has accessed GUI 2200 (e.g., via the Cloudware network) in order to edit and/or monitor the status of various appliances (e.g., 2202, 2204, 2206, 2208) which are part of a distributed application (e.g., "Bugzilla") that has been deployed at a selected server grid.

According to specific embodiments, the infrastructure editor/status dashboard page may be accessible to various entities or customers such as, for example: data center operators, server grid operators, end users, developers, IT staff, system administrators, publishers (e.g., publishers of applications, appliances), etc. In at least one embodiment, at least a portion of the content of infrastructure editor/status dashboard page 2200 may dynamically generated (e.g., for a given user/entity/account).

In at least one embodiment, the infrastructure editor/status dashboard GUI 2200 may be configured or designed to be operable in at least two modes of operation: (1) editor mode (e.g., for enabling the user to create, configure, edit, manage, control and/or otherwise manipulate various appliances and/or applications), and (2) status monitoring mode (e.g., for enabling the user to monitor the current operational status of various appliances and/or applications). In at least one embodiment, the infrastructure editor/status dashboard GUI may be configured or designed to simultaneously operate in both editor mode and status monitoring mode.

For example, as illustrated in the example embodiment of FIG. 22, the status monitoring mode of the infrastructure editor/status dashboard GUI 2200 may be operable to acquire and display updated virtual appliance status information (e.g., 2202 "starting", 2206 "maintenance", etc.). At the same time, the editor mode of the infrastructure editor/status dashboard GUI 2200 may be operable to enable a user to modify or edit the configuration of one or more displayed virtual appliances (e.g., such as, for example, appliances which are not currently running or started).

As illustrated in the example embodiment of FIG. 23, infrastructure editor/status dashboard page 2300 includes a variety of different types of content which may be related to or associated with one or more applications and/or appliances. Examples of such content may include, but are not limited to, one or more of the various different types of content previously illustrated and described, for example, with respect to FIG. 14 and/or other portions of this disclosure.

In at least one embodiment, the infrastructure editor/status dashboard GUI 2300 may be configured or designed to be operable in at least two modes of operation: (1) editor mode (e.g., for enabling the user to create, configure, edit, manage, control and/or otherwise manipulate various appliances and/or applications), and (2) status monitoring mode (e.g., for enabling the user to monitor the current operational status of various appliances and/or applications). In at least one embodiment, the infrastructure editor/status dashboard GUI may be configured or designed to simultaneously operate in both editor mode and status monitoring mode.

For example, as illustrated in the example embodiment of FIG. 23, the status monitoring mode of the infrastructure editor/status dashboard GUI 2300 may be operable to acquire and display updated virtual appliance status information (e.g., 2304 "starting", 2306 "stopping", 2302 "error", etc.). Additionally, in at least one embodiment, the editor mode of the infrastructure editor/status dashboard GUI 2300 may concurrently be operable to enable a user to modify or edit the configuration of one or more displayed virtual appliances such as, for example: appliances which are not currently running or started, appliances showing error conditions (e.g., 2303), etc. Further, in at least one embodiment, the infrastructure editor/status dashboard GUI 2300 may be operable to enable the user to edit or modify the displayed application (e.g, by dragging and dropping additional virtual appliances from the appliance catalogue 2320 onto the application editor canvas) concurrently while GUI 2300 displays updated virtual appliance status information.

Figure 24:
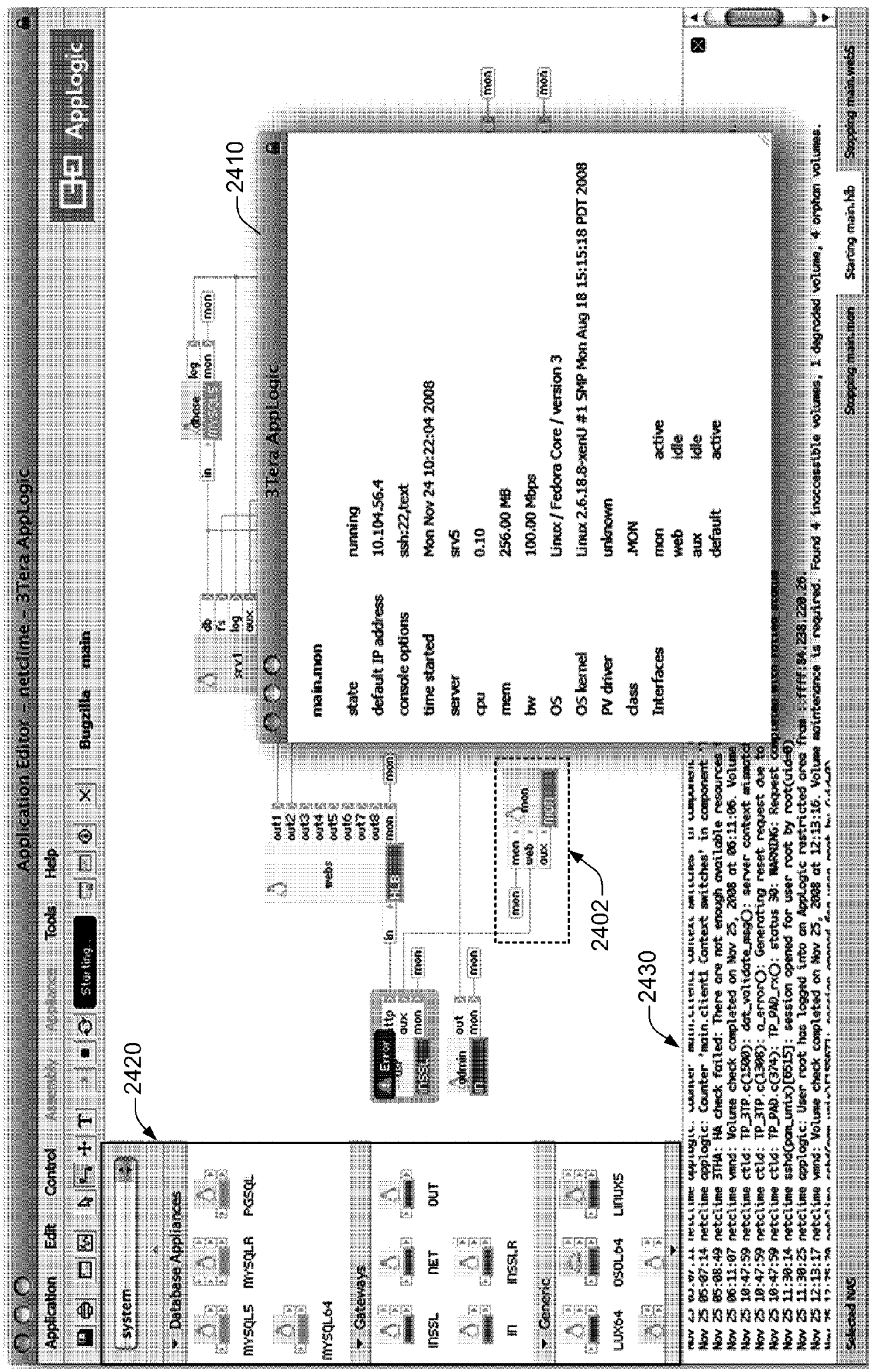

FIG. 24 shows an example embodiment of an application editor graphical user interface (GUI) 2400. As illustrated in the example embodiment of FIG. 24, application editor graphical user interface 2400 includes a variety of different types of content which may be related to or associated with one or more applications and/or appliances. Examples of such content may include, but are not limited to, one or more of the various different types of content previously illustrated and described, for example, with respect to FIGS. 14, 22, 23, and/or other portions of this disclosure. In at least one embodiment, GUI 2400 may be implemented as a web page which may be accessible to users via conventional Web browsers such as Microsoft Internet Explorer, Mozilla Firefox, etc.

As illustrated in the example embodiment of FIG. 24, application editor GUI 2400 includes window or frame region 2430 which may be configured or designed as a text display console that is operable to display textual information relating to various application-related operations (e.g., current and/or historical) which (1) have been performed, (2) are currently being performed, and/or (3) are scheduled to be performed (e.g., at the server grid where the instance of the application is currently running). Examples of such textual information may include, for example, log file information, transcript information, etc.

Additionally, as illustrated in the example embodiment of FIG. 24, application editor GUI 2400 may include functionality for enabling a user to access additional information for a selected appliance (e.g., 2402) via display of overlay window/layer 2410. For example, as illustrated in the example embodiment of FIG. 24, when the user selects virtual appliance 2402 (e.g., via mouse click operation), the application editor GUI 2400 may respond by dynamically displaying overlay window/layer 2410 and populating the displayed overlay window/layer 2410 with additional content/information relating to the selected virtual appliance.

Figure 25:
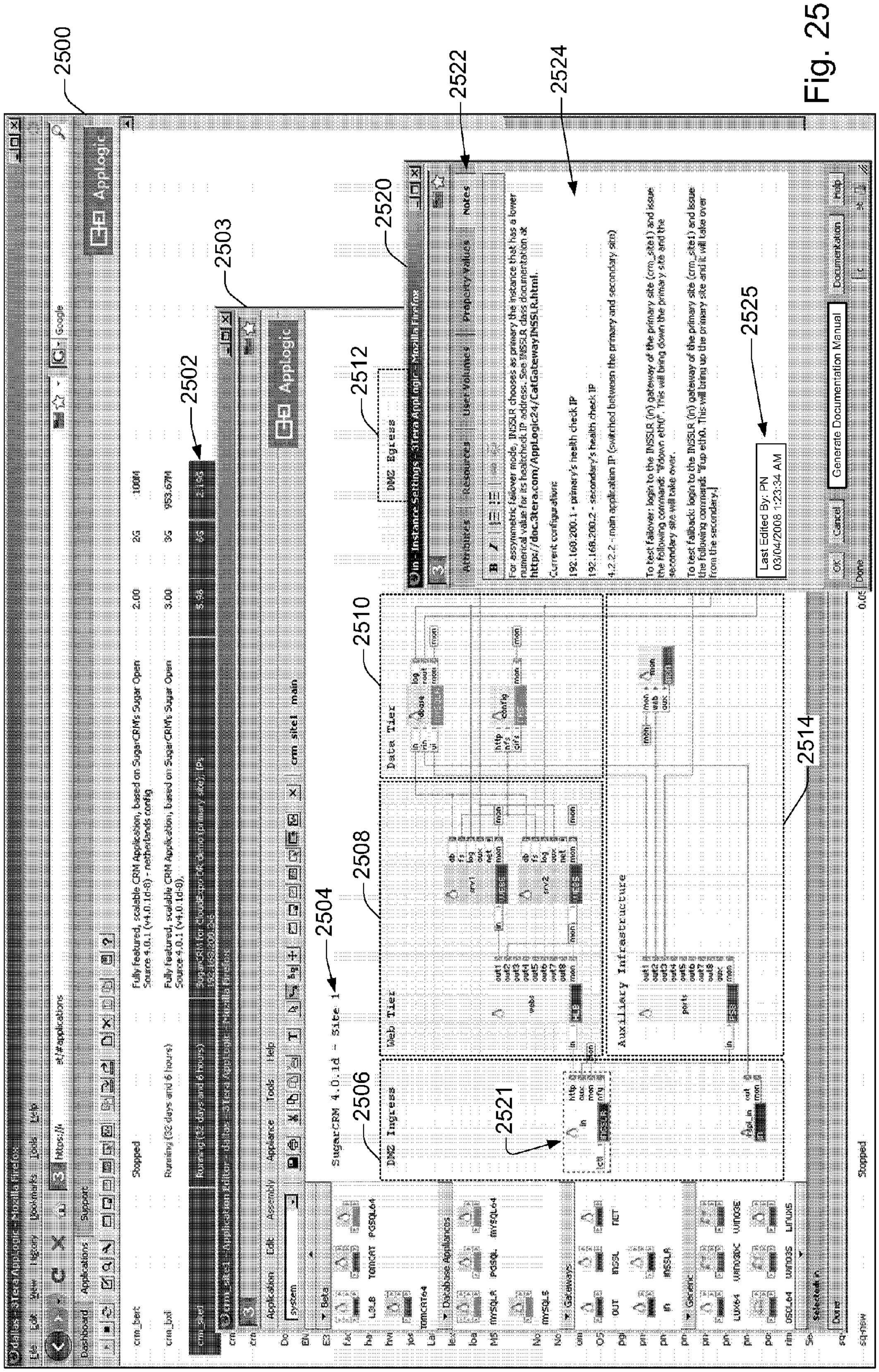

FIG. 25 shows another example embodiment of an application editor graphical user interface (GUI) 2500. As illustrated in the example embodiment of FIG. 25, application editor GUI 2500 includes a variety of different types of content which may be related to or associated with one or more applications and/or appliances. Examples of such content may include, but are not limited to, one or more of the various different types of content illustrated and described, for example, with respect to FIGS. 14, 22-24, 65-75 and/or other portions of this disclosure. In at least one embodiment, GUI 2500 may be implemented as a web page which may be accessible to users via conventional Web browsers such as Microsoft Internet Explorer, Mozilla Firefox, etc.

In the specific example embodiment of FIG. 25, it is assumed that a user has selected a specific application (e.g., 2502) from the displayed application list to be accessed via application editor GUI portion 2503.

One notable feature of the application editor GUI 2500 is it's ability to enable a user to create, display and edit different "annotation zones" (e.g., 2506, 2508, 2510, 2512, 2514) which, for example, may be utilized for annotating selected regions or portions of the virtual application canvas in a manner similar to the way software engineers may annotate computer software code.

As illustrated in the example embodiment of FIG. 25, the various annotation zones may include graphical content (e.g., visually displayed regions of differing colors, shadings, boundaries, etc.) and/or textual content (e.g., "DMZ Ingress", "Web Tier", "Data Tier", 2504, etc.). In at least one embodiment, graphical and/or textual annotations which are added to the application canvas may have no effect on the operation of the application and/or its components. However, as will readily be appreciated, the visual annotations facilitate a more comprehensive understanding of the application's design and enter relationship between the various components (e.g., virtual appliances, virtual networks, etc.) of the application.

In some embodiments, a least a portion of the annotation zones may be automatically created and/or populated (e.g., by the server grid where the application is deployed, by the Cloudware System, etc.). In some embodiments, a least a portion of the annotation zones may be manually created (e.g., by one or more users). Such a feature advantageously enables and facilitates multi-user collaboration in a virtualized application editing environment.

Additionally, as illustrated in the example embodiment of FIG. 25, application editor GUI 2500 may be operable to provide a multi-tabbed appliance Instance Settings property sheet (2520) which enables a user to specialize or customize an appliance instance for its role in the application.

For example, as illustrated in the example embodiment of FIG. 25, user selection of virtual appliance 2521 may automatically trigger the display of Instance Settings property sheet 2520 for enabling the user to configure and/or edit various properties or characteristics of the selected virtual appliance.

As illustrated in the example embodiment of FIG. 25, the Instance Settings property sheet 2520 includes a "Notes" tab 2522 which provides access to "Notes" window region 2524 which, for example, may be utilized for providing notes, annotations, comments and/or documentation relating to the selected virtual appliance. In some embodiments, a least a portion of the information (e.g., 2525) included in the "Notes" window region 2524 of the Instance Settings property sheet may be automatically created and/or populated.

In at least one embodiment, the "Notes" window region 2524 may be utilized to store notes, annotations, comments and/or documentation relating to various features, uses, and/or aspects of the virtual appliance, which may serve as an embedded "runbook" for that particular appliance. In at least one embodiment, functionality may be provided for enabling a user to generate a "Documentation Manual" for the appliance (e.g., by clicking on the "Generate Documentation Manual" button of window 2520), wherein at least a portion of the documentation manual is generated using the information contained in the "Notes" window region (2524).

ADL—Application Descriptor Language

Overview

In at least one embodiment, ADL is a language for describing applications within the AppLogic™ application model, where applications are built out of multiple components, with each component being an instance of a virtual appliance, with its own OS and application software. In the interpretation of ADL, "host" and "hardware" (or any type of resource) do not necessarily correspond to physical resources, they may be virtual devices that share the same hardware.

ADL may be based on UDL—a generic language for describing hierarchically structured data in plain ASCII text form. One may find descriptions of UDL in various references.

Descriptor Types

These are the descriptor types defined in ADL:

| | |
|---|---|
| component | describes a simple component, which may be running on a single host. Typically a component may be a single "network appliance" that performs one specific service, e.g., an HTTP server, a database server, etc. Component descriptors are either written manually by a developer or produced by a GUI tool. |
| assembly | describes a composite component, consisting of several interconnected components (either simple components or other assemblies). An assembly descriptor may be also used to describe the structure of an entire application. |

-continued

| | |
|---|---|
| | Assembly descriptors are either written manually by a developer or produced by a GUI tool. |
| package | package descriptors are used as “table of contents” for an application, a catalog (catalogs are sets of re-useable components that can be shared among applications), or for data caches used internally by the AppLogic(TM) software. The package descriptors contain configuration information and a list of component and assembly descriptors. They can also include binding information linking the abstract descriptors to installed boot volume images for the components. |

Syntax Rules that Apply to all Descriptor Types

As ADL may be based on UDL, all of its descriptor files share common syntax properties, as follows:

Lexemes

Here are the smallest units of grammar used in the ADL language, defined as Perl-style regular expressions:

| Reg expr | Sym | Use | Notes |
|---|---|---|---|
| [A-Za-z_] [A-Za-z0-9_]* | SIDENT | entity name, entity type | A simple identifier. This may be the identifier subset that may be acceptable to most text-based languages used, including shell command interpreters (bash, csh), Perl, C, Java, etc. Most user-defined names in the ADL language are of this type (exceptions are noted, where needed). |
| [A-Za-z_$.-] [A-Za-z0-9_$.-]* | IDENT | entity name, attribute name | An identifier. Similar to a C identifier, but ‘-’, ‘$’ and ‘.’ are also valid characters. |
| [^,“‘>=#\s]+ | STR | attribute value | A “bare” string. A string that may not be quoted may be allowed as a value for an attribute, if it does not contain any special characters. |
| ‘[^‘]*’ or “(\\[“]!\\t! \\n!\\r![^”])*” | STR | attribute value | A quoted string, with two variants - single-quoted and double-quoted, interpreted in a manner similar to Perl - the single-quoted string recognizes no special meta-characters and can quote any printable characters except a single quote; the double-quoted string recognizes the \ meta-character and allows quoting of the double-quote itself and some non-printable characters as well. |
| [\]\[{ }:,=““] | | punctuation | See the Punctuation Details section below. |
| => | | punctuation | Association separator |
| [ ]+ | | whitespace | whitespace may be a syntax separator, whenever two adjacent lexemes cannot be distinguished otherwise (e.g., two identifiers). In all other cases, whitespace between lexemes may be simply ignored. |
| \n | | separator | A newline or the EOF assertion. Multiple newlines are treated as one. |

Punctuation Details

ADL may be line-oriented, that may be, it treats the newline character differently from other whitespace. Please note that in all the syntax descriptions below, the newlines are significant and the presence of a newline in a syntax example means that it may be required.

Here may be the meaning of other punctuation characters in ADL:

| | |
|---|---|
| : | separates an entity definition from an in-line list of attributes for that entity |
| , | separates attributes in an attribute list following an entity definition (in-line attributes) |
| { } | block separators. These may preferably appear alone on a line. A pair of braces encloses a set of attributes and/or sub-entities related to the entity after which they appear. Only one block may be allowed per entity and only a single pair of braces may be used to enclose it, e.g., constructs like these below are invalid: |

```
input X
  {
  { # double brace - illegal
    protocol=http
  }
  }
input X
  {
  }
   { # second block for same entity - illegal
  protocol=http
  }
```

-continued

| | |
|---|---|
| [ ] | array block separators. A pair of square brackets following an entity heading identifies it as an "array" entity. Like the { } separators, these may preferably appear alone on a line. Each line in the [ ] block may be a comma-separated list of attributes for a single array element. |
| \ | when found at the end of a line, this may be a 'line continuation' character. The next line may be treated as part of the current line. |
| # | comment separator. All characters following #, up to the end of line are ignored (including the \ line continuation character). |

Descriptor Structure

```
Each descriptor file has the following overall structure:
entity-type entity-name
  {
  attributes-and-subentities
  }
```

Where:

entity-type may be one of component, assembly or package and identifies the type of descriptor that may be contained in the file.

entity-name may be the name of the entity being described in this file (SIDENT).

attributes-and-subentities may be an unordered set which includes any number of attributes and sub-entities. Each attribute may be on a single line and has the form: 'name=value'., where name may be an identifier (IDENT) and value may be a string value (STR). Each sub-entity has one of the following forms:

```
name : attributes
typename :attributes
name
  {
  attributes-and-subentities
  }
typename
  {
  attributes-and-subentities
  }
```

type and name are the type and the name of the sub-entity, respectively.

attributes may be a comma-separated list of name=value pairs. Note that attributes can also be specified in the { } block following the entity heading line. When attributes are specified on the same line as the entity definition (after the colon), binary attributes can be specified without a value (just the attribute name, meaning 'set to 1'), e.g.

volume boot: dev=/dev/hda1, ro may be the same as volume boot: dev=/dev/hda1, ro=1

Each subentity type defines a namespace, and within that namespace only one subentity of a given name can exist. That applies to the sub-entities with no type at all (one may think of the subentities with no type as having the empty string as the type).

Specifying attributes both in-line and in the { } block may be allowed, it may be avoided except in the cases where one particular attribute may preferably stand out (e.g., the .class attribute in a subordinate component's specificaion); otherwise for simpler sub-entities with few attributes the inline syntax may be preferred; for more complex entities that have many attributes and/or sub-entities, use the { } block.

Component Descriptor Syntax

The component descriptor includes one component entity, defining either a "singleton" component or an instantiable class of components. There may be no difference between the definition of a singleton and a class, except that instantiable classes are required to reside in a library of components referred to as a 'catalog'. Also, either type of component can be used in an assembly, but a singleton can appear only once in the structure of an application, while an instantiable component can be used multiple times.

Below are two examples of the component descriptor structure; the first example may be the current standard form, the second example shows the old format of the boot information specification. The old format may be fully supported for compatibility with existing catalog appliances.

```
component name
  {
  volume sname : dev= pathname [, mount= pathname][, ro] [, high__bw]
  resource cpu : min= val , max= val
  resource mem : min= val , max= val , abs= val
  resource bw : min= val , max= val
  (input|output) sname : protocol= name [, mandatory ][, alias =
  dnsname ]
  interface sname
  property sname : type=(string|integer|ip__addr) [, filter= regexp ] \
        [,min= val ,max= val ] [, (mandatory| dflt= val) ]
  property sname : type=(string|integer) [, values= v1|v2|v3... ] \
        [, (mandatory| dflt= val ) ]
  .config__mode=(dhcp|vol|fix)
  virtualization: mode=(paravirt|hvm)
    {
    path = filename
    initrd = filename
    options = " string "
    console = " string "
    device__schema = " string "
    }
  visual
    {
    ...
    }
  }
component name
  {
  volume sname : dev= pathname, [, ro] [, high__bw]
  resource cpu : min= val , max= val
  resource mem : min= val , max= val , abs= val
  resource bw : min= val , max= val
  (input|output) sname : protocol= name = [, mandatory][, alias =
  dnsname =]
  interface sname
  property sname : type=(string|integer|ip__addr) [, filter= regexp ] \
        [,min= val ,max= val ] [, (mandatory| dflt= val) ]
  property sname : type=(string|integer) [, values= v1|v2|v3... ] \
        [, (mandatory| dflt= val ) ]
  cfgfiles
    [
    vol= sname , path= filename
    vol= sname , path= filename
    ...
    ]
  kernel: path= filename [, initrd = filename ] [, options = " string" ]
  visual
    {
    ...
    }
  }
```

The component entity has the following attributes defined:

| | |
|---|---|
| .migrateable | If set, it allows the component to be moved from one CPU to another (provided that the component may be running in a virtual machine and there may be VM migration support). There may be no need to specify this attribute in a component - the default, if not specified, may be 1 (TRUE). This may be a boolean attribute (valid values: 0,no,false,1,yes,true; also may be specified inline without value at all, meaning '1'). In the absence of this attribute, .migrateable=1 may be assumed by default. Note that this may be unlike most other boolean attributes defined in ADL - they usually default to 0. |
| .server | If .migrateable may be set to 0, defines the name of the server on which this component may be to run. This attribute, along with the .migrateable attribute are usually set from an outer assembly, not in the component descriptor itself. The compiler may output a warning if this attribute may be set in the component. |
| .standby | If set, this means the component may not be started automatically when the application may be started. The .standby attribute may not be meant to be set in a component descriptor directly. Normally, it may be set from an assembly that includes the component or re-directed to the top-level assembly of an application to allow enabling/disabling parts of the application by modifying the application's properties (stored in the top assembly - see the Package Descriptor further on). This may be a boolean attribute. |
| .boot_tout | boot timeout, in seconds. If specified and set to a non-zero value, indicates the amount of time the application controller may be to wait for the component to become active before assuming that it has failed to start. If this attribute may be omitted or may be set to zero, a default value that may be configured for the AppLogic(TM) controller may be used. |
| .os_type | obsolete this attribute may preferably not be used in newly created descriptors. See the virtualization entity description instead. .os_type specifies the OS that this component uses. This information may be necessary for support of multiple OS types running in virtual machines. The value provided may not be interpreted by the ADL build system; together with the data in 'kernel' entity described below it may be intended to be passed along to the VM boot loader. If not specified, 'linux' may be assumed. |
| .config_mode | specifies how the component may be configured. The allowed values are: dhcp and volfix. The default may be dhcp. This attribute may be used explicitly only for backward compatibility, if the volfix functionality may be retained for a given component. This attribute may be ignored and the mode may be set to volfix if the descriptor does not have the virtualization entity. This may be to allow old descriptors (which belong to components that rely on volfix and do not support the dhcp configuration) to work without modification. |
| .field_opt | a bitmask of options for enabling various debugging and troubleshooting support. Note that this attribute does not follow the normal rules for overriding property values from an assembly, which apply to all other pre-defined attributes - the .field_opt value specified for a component may be kept as "class field options", while any setting of the same attribute for an instance of the component in an assembly may be kept as "instance field options". |
| .category | an arbitrary string that defines the general category to which the component belongs. It may be allowed by the ADL syntax, but may not be interpreted in any way. It may be intended for use by the AppLogic(TM) visual tools to organize components in component libraries (catalogs). |
| .description | a short description of the component. Similarly to .category, the value of this attribute may be arbitrary and intended for documentation purposes only. |

All component attributes are optional and need not be present in the descriptor.

All of the attributes are also valid properties of the component, which can be overridden in an assembly that includes the component. Note that the attribute names are prefixed with a dot, to avoid name conflicts with regular properties (see the 'property' entity below).

The table below may be a summary of the valid sub-entities in a component, followed by sections that explain each sub-entity in detail.

| | |
|---|---|
| volume | defines a volume that includes a file system used by the component. At least one volume entity may preferably appear in each component. |
| resource | defines the requirements of the component towards the hardware resources that may preferably be made available for it to run. |
| input, output | these entities define "terminals" of the component, which are network interfaces intended for connection with other components in the same application. |
| interface | used to enable and configure network interfaces that are not meant for connecting to other components (as the input and output terminals are) |
| property | defines a configurable property of the component. |
| cfgfiles | defines a list of configuration files that need to be checked for property markup and updated accordingly. |
| kernel | obsolete - use virtualization instead. This entity includes OS-specific boot information, its contents depend on the value of the .os_type attribute of the component. |

-continued

| | |
|---|---|
| virtualization | This entity defines the virtual environment for which the component may be designed and includes boot-specific options to be provided to the component's boot loader. |
| visual | Visual presentation data. ADL does not define the contents of this entity. It may be intended for a GUI editor to store information related to how the component may be displayed in the editor's window (color, icon shape, layout of terminals, etc.).<br>The contents of this entity may preferably conform to the general syntax rules of UDL, which were presented earlier in this document, in the Syntax Rules that Apply to All Descriptor Types section. Also, see the UDL specification for more details. |

Volume

Defines a volume that includes a file system used by the component. At least one volume entity may preferably appear in each component. The volume entity has the following attributes:

| | |
|---|---|
| dev= | the device name, as it may be seen by the host OS of the component. The physical device containing the filesystem (and which can be either local or remote) may be made available to the host OS under that name. This attribute may preferably be specified for all volumes. No two volumes in the same component can have the same value for this attribute. |
| mount= | optional mount path for the volume. This attribute can be specified for volumes that are not mounted automatically by the component's operating system. Specifying this attribute for system-mounted volumes (e.g., the boot volume) has no effect, as the OS may mount those volumes before it receives any configuration from AppLogic(TM). The software resident on the component may receive the mount path for each volume as part of its configuration and may be responsible for mounting the volume appropriately. An AppLogic(TM) component may not be required to support this. Note that the meaning of "mount path" may vary between OS types and may not be necessarily supported by every OS. |
| class | If specified for an instantiable component that resides in a catalog, this attribute specifies that the volume data may be common to this class of components and an image of the volume may be present in the catalog. See also the 'type=' attribute below. If specified for a singleton component, the volume data may be to become a common template image whenever the singleton component may be converted to an instantiable component.<br>If the 'class' attribute may not be present, there may be no common image for the volume and the name of an image for the volume may preferably be configured for each instance of the component (this may be usually done in the assembly that includes the component). |
| type= | This attribute may be mandatory for volumes that have the 'class' attribute set. It speficies how the common class image of the volume may be to be provided to each instance of the class. It can have the following values:<br>instantiable - the 'class' image may be the initial data for each instance and a separate copy of it may be provided to each instance. (It may be assumed that each instance's actual data may not differ significantly form the initial image and that the 'copy' may be replaced by a logical equivalent thereof, e.g., only the modified portions of the data may be kept separately for the instance, using the common image for the unmodified data).<br>template - This may be similar to the 'instantiable' type, but a complete copy of the volume may be made for each instance. This may be useful for database templates.<br>common - the 'class' image may be accessed directly by each instance of the component. Volumes of this type cannot have configuration files that are writable by the ADL build system stored on them - e.g., entries in the cfgfiles table (described further on) for these volumes are invalid. The 'common' type also implicitly sets the 'ro' and 'shared' attributes (see below).<br>blank - there may be no image provided, each instance may be to receive an empty un-initialized volume upon boot. 'null' may be intended for specifying swap volumes. It also requires that the 'size=' attribute be specified. |
| size= | Volume size, for volumes of type blank. This may preferably be a non-zero integer value, specifying the size in bytes. K, M and G suffixes can be used, meaning Kbytes, Mbytes, etc. |

-continued

| | |
|---|---|
| mandatory | this applies only to volumes that do not have the class attribute and indicates that the volume may be required for the operation of the component. If mandatory may not be set, the component may preferably be prepared to work correctly even if the device (which may be seen by the component's software as specified by the dev= attribute) may not be present. |
| ro | means the filesystem on the volume may not be written to by the component. Specifying this attribute does not guarantee that the component itself may not attempt to write to the volume. However, the presense of this attribute may be used to prevent write operations from going through. Specifying 'ro' also implies 'shared' - see below. |
| shared | this attribute, if present, means that the volume image can be shared among multiple instances of the same component, as well as with other components.This may be mostly useful if the 'ro' attribute may be also specified, or if the filesystem on the volume has a built-in mechanism for read/write sharing at block level. Note that 'shared' need not be specified for class volumes of type 'common' (see type= above). |
| boot | marks the volume as an OS boot volume. Note that the file paths specified in the 'kernel' sub-entity are relative to the root directory of the boot volume. Exactly one volume in a component may preferably have the boot attribute. |
| high_bw | identifies a volume that may be accessed frequently and/or large amounts of data are transferred to/from it. This may be a hint used for resource allocation, making it preferable to use a local resource for this filesystem. |
| local_only | if specified, this attribute means that the volume may preferably reside on the same host as the component instance that uses it. |

A 'volume' entity that has no 'class' attribute also defines a configurable property on the boundary of the component, which can be set the same way as other properties of the component—see the property entity below. The mandatory attribute for such volumes works the same way as the mandatory attribute for properties. A 'volume' property may be set to the logical name of one of the application's volumes (as found in the application's package descriptor). Note that this means volumes and properties share namespace and one cannot define a volume and a property of the same name.

Resource

The resource entities define the requirements of the component towards the hardware resources that may preferably be made available for it to run. The name of a resource entitiy may preferably be one of: cpu, mem or bw. The definition of these entities may be as follows:

| | |
|---|---|
| cpu | The min and max attributes of this sub-entity define the CPU time needed by the component, relative to the CPU time of other components that are allocated on the same physical CPU expressed as a decimal fraction or as percentage value. The value may exceed 1 (or 100%), if the component requires 2 or more CPUs on an SMP system. |
| mem | defines the amount of memory needed by the component; The three attributes of 'mem' are interpreted as follows:<br>max - the maximum amount that may be allocated to the component (e.g., it may not benefit its operation if it had more memory),<br>min - the minimum amount that may be allocated for the component to retain near-optimum functionality,<br>abs - the minimum amount of memory necessary for the component, under which it may cease to be operational.<br>The number may be suffixed by a scale modifier like K and M and G, with their usual meaning of Kbyte (1024), Mbyte (1048576), etc. |
| bw | defines the minimum and maximum network bandwidth necessary for the component to operate, expressed in bits/sec (scale modifiers like K and M and G are allowed; unlike the memory units, these modifiers follow the networking tradition - they mean decimal orders of magnitude K = 1000, M = 1,000,000, etc., e.g., 1000M means 1 gigabit/s, same as 1G). |

The 'resource' entities are mandatory, all may preferably be specified in a component's description and all may preferably have the 'min' and the 'max' value specified. The 'abs' value may be omitted and may be assumed to be equal to 'min' by default.

Input, Output

These entities define "terminals" of the component, which are network interfaces intended for connection with other components in the same application. A "terminal" may be a special kind of network interface—it may be used only for one specific protocol and only in one direction ("direction" here refers to flow of control, not of data—e.g., an output terminal may be an interface used by a protocol client; while an input terminal may be for a server). The presence of a terminal entity automatically defines a host name that resolves to the remote side of the connection in which this terminal participates. The terminal entities have the following attributes:

| | |
|---|---|
| protocol | this may be the name of the network protocol filter for this terminal. The protocol name corresponds either to a pre-defined protocol (e.g., http, nfs, etc.) or to a custom protocol that has filtering rules defined in the application's package descriptor. This attribute may preferably be present for each input or output. If no protocol control may be needed for the terminal, use 'protocol=any'. |
| mandatory | if present, this binary attribute means that the terminal may not be left unconnected. Mandatory terminals may trigger a compilation error in an assembly that includes a component with such a terminal left unconnected. |
| gateway | (for outputs only) - if present, identifies the terminal as the default gateway for the component. A gateway output, instead of being programmed for connection to a single input on the remote side, may be configured as the interface through which all connections outside the local network may preferably go. When it may be connected in an assembly, the remote end of the connection becomes the default gateway in the IP routing table and it may be also programmed as the DNS server. Usually, a gateway terminal would be connected to a NAT router with DNS forwarding (and/or cache) or something similar. |
| alias | Output terminals can also have an alias attribute, defining an additional host name under which the remote side of the connection may be known (in addition to the terminal name itself, which may be always added to the 'hosts' file). |

Interface

This entity type may be used with one of two fixed names—'external' and 'default'. It may be used to enable and configure network interfaces that are not meant for connecting to other components (as the terminals are—see above) and have no restrictions on the type of connections that can be made. The syntax for the interface entities may be as follows:

interface external interface default

The 'interface external' entry enables the device named 'eth0' to be used as the external network interface of the component (accessible from outside the application). If enabled, eth0 may not be used for terminals and its IP configuration may not be set up automatically. Instead, it may be expected that properties are defined to configure the network adapter.

The 'interface default' entry enables configuring an unused network interface for unrestricted use, with an automatically assigned IP address on the same subnet as the ones used for terminal connections. The assigned IP address may be made available to the AppLogic™ controller as the IP address of the component; this can be used for maintenance logins.

Property

The property entity defines a configurable property of the component. Any parameter that may need to be configured can be defined as a property. The values of properties are made available to the component's software in the following ways:

- all properties are available for access by shell scripts and executables as environment variables defined in a shell file that may be stored automatically on the component's boot volume and can be included by any script;
- also, any files named in a 'cfgfiles' entity (see below) are searched for special markup identifying a portion of the file as corresponding to a property value—all matching instances are automatically updated to reflect the property value as configured in the component's descriptor or as overridden by any assembly in which the component participates. There are several variants of "markup", which allow making it appear as comments to the software that uses the file, so it may be completely transparent to the component's code. See the Property Markup Syntax section later in this document.

Note that since a volume can appear as a configurable property on the boundary, volumes and properties share namespace and one cannot define both a volume and a property of the same name.

The property entity has the following attributes:

| | |
|---|---|
| type= | defines the propety type, the value of this attribute may preferably be one of: string, integer or ip_addr. If the 'type=' attribute may not be specified, 'string'may be assumed. |
| filter= | A regular expression defining the set of valid values for the property. The expression may preferably be coded in the syntax defined by Perl for regular expression pattern matching. The match may be done on the entire property value - that may be as if /^expression$/ was used in a Perl statement to check for a match (where expression may be the value of the filter attribute.<br>This attribute may be optional. If not present, the value ".*" may be assumed (match any string). |
| values= | This attribute can be used as an alternative to the filter= attribute. It may be treated exactly as the filter attribute by the ADL compiler, except that the use of values= expr instead of filter= expr may be a hint to the GUI editor that the regular expression may be a simple concatenation of strings to be matched, in the normal regular expression form "string1!string2! . . . " etc. This can be used to display a drop-down list of values in a property sheet instead of a free-text edit box. |
| min=<br>max= | Mininum and maximum values for an integer property. If the specified property type may be 'integer', these optional attributes specify the limits of valid values. They are applied in addition to any regular expression pattern specified by the filter = attribute.<br>The presence of a '−' or '+' sign in one of these values may be taken to mean that the integer comparison against the limits may be to be done as for signed integers. |
| mandatory | If present, this attribute indicates a property with no default value. When the component may be used in an assembly, a value for the property may preferably be supplied in the assembly or it may preferably be redirected to the assembly boundary; in the latter case, the corresponding property of the assembly also takes on the 'mandatory' attribute.<br>If 'mandatory' may not be specified, a default value for the property may be given with a 'dflt=' attribute (see below). |
| dflt= | specifies a default value for the property. This attribute cannot be used together with 'mandatory'. |
| lowercase | indicates that the property value may be to be converted to lowercase before it may be used to configure the component. This may be used for properties that need to appear as case-insensitive to the user, but provide the component a consistent value that can be compared using case-sensitive compare. Note that the lowercase conversion may be done in the C locale. |

Cfgfiles

In at least one embodiment, this parameter may be used to define the configuration files that need to be checked for property markup and updated accordingly. This entity may be an array, each entry defines one configuration file and has these attributes:

- vol—names the volume on which the file may be located (this may preferably match one of the component's volumes, as defined by the volume entities). A value for this attribute may preferably be specified for each cfgfiles array element.
- path—this may be the file name of the configuration file, relative to the volume on which it may be located. Note that this may be different from the path where the application "sees" that file—depending on how the particular volume may be mounted by the component. A value for this attribute may preferably be specified for each cfgfiles array element.
- quoting—defines the method for quoting meta-characters in the configuration file. A "meta-character" may be any character that has a special meaning in the config file and may preferably be quoted (or "escaped") in some manner in order to appear as a data character and not in its special-function role.

In at least one embodiment, the 'quoting' attribute can be set to one of the following strings:

conf - no quoting (default).

bash - data values that are enclosed by quotes are assumed to use \" to mean the quote character and \\ to mean the backslash. Backslashes that don't quote a " or \ character are left untouched, e.g., if the user sets a property value to "abc\def"ghi\n", the result written into the config file may be "abc\\def\"ghi\n". Values that are not surrounded by quotes are limited to alphanumeric characters (an error may be reported if such a property may be set to a value with other characters, even if the filter for that property allows it).

perl, c - same as 'bash' html - the characters that have significance in the HTML syntax (< > " and &) are encoded as < > " and &, e.g., abc&def<ghi becomes abc&def<ghi in the config file.

NOTE:

the cfgfiles sub-entity may be useful only when .config_mode may be set to volfix. In the dhcp mode, the component's boot volume may not be modified and it may be expected to configure itself dynamically over the network.

Virtualization

This entity includes the boot information needed to start the component in the virtual environment for which it may be designed. The virtualization entity supersedes the kernel/os_info definitions and may be used instead of them. The presence of this entity also indicates a 'new-style' component descriptor and turns off the compatibility mode, which includes forced .config_mode=volfix.

The following attributes are defined for the virtualization entity:

| | |
|---|---|
| mode = string | defines the component's virtual environment. Valid values are paravirt (for components that have a para-virtualized kernel supported by the host system) and hvm (for components designed to run directly on hardware and require hardware-assisted virtualization if ran in a virtual machine). |
| options = "string" | arguments to pass to the bootloader. If mode = hvm, the string may be interpreted as a space-separated list of 'name = value' pairs, which are passed to the virtual hardware emulator. Examples of parameters supported by the qemu emulator (used in XEN) include: acpi = (0!1), apic = (0!1), pae = (0!1), etc. If mode = paravirt, the string may be passed to the component's kernel command line, and may be available to the code running in the component's virtual environment, if the component's OS kernel supports that. |
| path = filename or kernel_path = filename | the name of the kernel image file, relative to the boot volume's root directory. This attribute may be meaningful only if mode = paravirt and may be ignored otherwise. If path may not be set, it may be assumed that the component has the GRUB bootloader installed and its configuration file includes the correct location of the kernel image and the initial ramdisk, if one may be used. |
| initrd = filename | the name of the ramdisk filesystem image to use during boot. This attribute may be meaningful only if mode = paravirt and may be ignored otherwise. initrd may be ignored if path may not be set (in this case the names of both files are looked up in the GRUB configuration file found on the component's boot volume). |
| console = string | OS System console configuration parameters. The format of this string may not be part of ADL, the currently supported console parameters are defined in RefEditorClassEditorSimple |
| device_schema = string | This may be used to store the disk device naming convention, as used by the component's OS. The format of this string may not be part of ADL: the device_schema attribute may be reserved for use by the AppLogic(TM) application editor. See RefEditorClassEditorSimple for details. |

Kernel, os_info

In one embodiment, this parameter relates to virtualization. The presence of a kernel or os_info sub-entity in the descriptor may indicate an old descriptor and the volfix configuration mode may be forced automatically.

This entity includes OS-specific boot information, its contents depend on the value of the .os_type attribute of the component. The keywords kernel and os_info are equivalent, kernel may be retained for backward compatibility.

When .os_type=linux, the following attributes are defined for the os_info entity:

path=filename—the name of the kernel image file, relative to the boot volume's root directory.

initrd=filename—the name of the ramdisk filesystem image to use during boot. The kernel image file and the ramdisk image file are typically produced as a result of building the Linux kernel.

options="string"—other arguments to pass to the bootloader's 'kernel' command line.

When .os_type=legacy, the following attributes are defined:

options="name=value name=value . . . "

The legacy OS type may be used for all hardware-assisted virtual machines. The name=value pairs are not interpreted, they are passed on to the HVM emulator directly. Examples of parameters supported by the qemu emulator (used in XEN) include: acpi=(0!1), apic=(0!1), pae=(0!1), etc.

Assembly Descriptor Syntax

The assembly descriptor includes one assembly entity, defining a new component that comprises several components, which can be either simple components or other assemblies. An assembly that may be made up entirely of instantiable components (all residing in a catalog), may be itself considered instantiable. If a singleton component appears anywhere in an assembly, the assembly itself may be a singleton and cannot be moved into a catalog.

The assembly descriptor has the following structure:

```
assembly sname
  {
  .category = text
  .description = " text "
  .console = " subord-name "
  input sname
  output sname
  ...
  property sname  [ : dflt = value ]
  property sname  [ : mandatory ]
  ...
  volume sname
  subordinate sname
    {
    .class = clsname
     attr = val
    ...
    }
  connections
    [
    sub-name . trm-name => sub-name . trm-name
    ....
    ]
  visual
    {
    ...
    }
  }
```

The following attributes are defined for assemblies only, they have no meaning in simple components:

| | |
|---|---|
| .console | the name of a subordinate component, which may serve as the default login target for this assembly. This makes it possible to define an assembly that behaves like a simple component in the sense of allowing the assembly to accept a login request the same way as a simple component that has support for a login console can. As not every component may be required to have a login console (depends on the OS and the software installed on it), an assembly may not be required to have one. If the assembly does not need a login console or does not have any component that can serve as one, this attribute can be omitted or set to the empty string. Note that as a special exception, when the attribute may be omitted (rather than set explicitly to the empty string), and the assembly has only one subordinate it may be silently assumed that this subordinate may be the default login target. The subordinate specified by the .console attribute (or assumed by default, for single-subordinate assemblies) can itself be an assembly. NOTE: it may not be an error to specify a subordinate that does not support console login (either because it may be a component that has no console, or because it may be an assembly that has .console set to emtpy): the only outcome of such a setting may be that the resulting assembly may not support console login. |

The following attributes are defined for an assembly; they have the same meaning as their counterparts for a simple component:

| | |
|---|---|
| .category | an arbitrary string that defines the general category to which the component belongs. It may be allowed by the ADL syntax, but may not be interpreted in any way. It may be intended for use by the AppLogic(TM) visual tools to organize components in component libraries (catalogs). |
| .description | a short description of the component. Similarly to .category, the value of this attribute may be arbitrary and intended for documentation purposes only. |

The order of entities in the assembly may not be important and all of the sub-entities are optional, except that an assembly may preferably have at least one subordinate entity.

Here may be a summary of the sub-entities of the ‘assembly’ entity, followed by sub-sections defining each one in detail:

| | |
|---|---|
| input, output | these sub-entities define the assembly’s terminals. |
| property | defines a property of the assembly. Each property may preferably be connected to at least one property of a subordinate component - see the ‘subordinate’ entity. |
| volume | defines a property of the assembly, similar to the ‘property’ entity. |
| subordinate | defines a subordinate component in the assembly. |
| connections | defines the assembly’s connection table. This may be an array entity, each element corresponds to one connection. |
| visual | Visual presentation data. ADL does not define the contents of this entity. It may be intended for a GUI editor to store information related to how the assembly may be displayed in the editor’s window (color, icon shape, layout of terminals, layout of subordinate components, routing of connections, etc.). The contents of this entity may preferably conform to the general syntax rules of UDL, which were presented earlier in this document - in the Syntax Rules that Apply to All Descriptor Types section. Also, see the UDL specification for more details. |

Input, Output

These sub-entities define the assembly’s terminals.

The terminal entities support a single attribute: mandatory. Specifying this attribute means that the terminal may preferably be connected; mandatory terminals may trigger a compilation error in an assembly that includes a component with such a terminal left unconnected. Note that specifying the mandatory attribute for an assembly may not be necessary if the subordinate component’s terminal to which it may be connected may be already mandatory.

An assembly can have any number of terminals, except for the top-level assembly of an application, which may preferably have no terminals.

Property

The property entity defines a property of the assembly. Each property may preferably be connected to at least one property of a subordinate component—see the ‘subordinate’ entities below. A property may have a default value, identified by the dflt attribute. The default, if specified, overrides the default value in the subordinate components to which the property may be connected. Alternatively, ‘mandatory’ may be specified, requiring that the property be set from outside (e.g., in an outer assembly) even if the subordinate components to which it may be connected have a default value for the property.

Volume

This entity defines a property of the assembly, similar to the property entity. The property defined with the ‘volume’ entity may preferably be connected to at least one ‘volume’ property on a subordinate component—see the subordinate entities below. The property defined by a volume entity may have the mandatory attribute specified, requiring it to be set, even if the components’ volumes to which it may be connected do not have the mandatory attribute set. Unlike regular properties, default=cannot be specified for a volume.

Subordinate

The subordinate entity defines a subordinate component in the assembly. Each subordinate can have any number of attributes, each corresponding to a property (including ‘volume’ properties) of the component that may be overridden with the specified value. In addition, the following pre-defined attributes with a special meaning exist for each subordinate, all having a name that begins with a '.' to distinguish them from regular properties:

| | |
|---|---|
| .class | specifies the class name of the subordinate component; this can be either the name of an instantiable class or the name of a singleton. This attribute may be mandatory and cannot be omitted.<br>The class name may be specified either as a simple name or in the form catalog-name.class-name, where catalog-name may be the name of a catalog (either a catalog that belongs to the application or a global catalog configured in the AppLogic(TM) configuration file). The catalogs specified in the application package are looked up first.<br>When no catalog name may be given, the class-name may be taken to be that of a component class residing in the same place as the assembly - e.g., if the assembly may be a catalog part, the subordinate may be looked up in the same catalog; if the assembly belongs to an application the subordinate may be looked up in the application's package. |
| .start_order | defines the order of starting this subordinate, relative to the other subordinates in the same assembly. Lower numbers are started first and those with a higher number are not started until all those with lower numbers have started successfully. Subordinates having the same start_order number can be started in any order and may have their startups overlap in time. The start order may be local to the assembly and the same start order numbers can be reused in different assemblies (the relative order of starting subordiantes in different assemblies depends on the start order numbers assigned to those assemblies). Subordinates with no .start_order attribute are started after all subordinates that do have the attribute. |
| .failover | defines a failover group identifier. Components that have the same failover group ID in the application constitute a group of components that serve as backup for one another and therefore may preferably never be scheduled on the same physical device (so that in case of hardware failure, some of them remain alive). The failover group ID may be global to the application, that may be, components with the same group ID in different assemblies are considered to belong to the same group. Setting this attribute to the empty string may be allowed and may be treated as if the attribute may not be set at all (e.g., no scheduling preference for this component). |
| .ignore | A boolean attribute. If it may be set to 1 (true), specifies that the subordinate's operation may not be critical to the assembly and if the subordinate fails to start, the application startup may preferably proceed as normal. Note that this attribute cannot be redirected to the assembly boundary.<br>When setting this attribute, check that the other subordinates that have outputs connected to the one with .ignore set may work correctly if their outputs are unconnected. |
| .field_opt | This sets the 'instance field-option' value of the subordinate. Unlike the other pre-defined attributes of a component (.migrateable, .boot_tout, etc.) which can be overridden by specifying the attribute of the same name in a subordinate entity in an assemlby, the component's own .field_opt may not be overridden - it may be kept as the 'class field-option' instead. See the .field_opt definition in the component descriptor syntax and also above where the assembly's attributes are explained. |

All attribute names other than the pre-defined ones are considered to be property names of the subordinate component that need to be set to the specified value—this includes the predefined attributes of the subordinate component (.boot_tout, .migrateable, .server, .standby), as well as the component-specific properties defined in it by the 'property' or the 'volume' entities (see the component descriptor syntax).

A special type of value may be defined indicating that the property may be connected to the assembly's boundary: $.name, where name may be the name of one of the 'property' or 'volume' entities in the assembly. If a property has to be set to a literal value that begins with the "$." characters, the value may preferably be quoted to ensure that it may not be interpreted as a property connection. More than one subordinate property can be connected to the same boundary property and all such properties get the default value from the boundary property definition if none may be provided in an outer-scope assembly. The $.name can be used for the pre-defined attributes of the subordinate as well, making them regular properties on the assembly boundary.

The 'subordinate' entity in an assembly also accepts the resource sub-entities mem, cpu and bw, with the same attributes as defined in the Component Descriptor Syntax section. When applied to a subordinate that may be a simple component, they override the resource settings in that component. The "override" may preferably remain within the limits of the range defined in the component (e.g., the new range may preferably no wider than the old one and may preferably fit entirely into the old one). When applied to a subordinate that may be an assembly, the specified resources are distributed pro-rata according to the relative weight of the resource requirements in each of that assembly's subordinates. If a resource setting for a subordinate assembly causes a component to receive a resource setting that may be outside of the min-max range defined for it, an error may be reported by the ADL linker.

Connections

This defines the assembly's connection table. The connections entity may be an array entity and each array element may be an "association" in the form x=>y, where x and y identify two terminals to be connected, each terminal identifier comprises a subordinate name and a terminal name separated by a '.' character. Terminals that are to be exposed as terminals of the assembly itself ("exterior" connections) are also defined in the same table, with the following syntax:

$.atrm-name=>sub-name.strm-name, or sub-name.strm-name=>$.atrm-name.

Both syntax variants are equivalent and mean that the terminal strm-name of subordinate sub-name may be to be visible as atrm-name on the assembly (atrm-name may preferably correspond to an input or output entity defined in the assembly). Since an input terminal may be a 'network server' and an output terminal may be a client, the following rules apply:

an output can be connected to at most one input
- an input can be connected to any number of outputs (subject only to limitations on the number of clients that the component supports for the specific service)
- an input terminal on the assembly boundary may preferably be redirected to exactly one input of a subordinate component any number of subordinate component's outputs can be redirected to a single output on the assembly boundary Package Descriptor Syntax The package descriptor may be a "table of contents" file that defines the contents of an application or of a component library (a catalog). The package descriptor also includes references to volume images that are outside the application's root directory (the application may be installed on the grid controller, while the volumes may reside on any of the grid's servers). For applications, it also includes the configuration settingscomponent of the application.

Following are the different types of package descriptors:

| | |
|---|---|
| application | ToC for an entire application, includes the app's configuration data and references to other package descriptors |
| catalog | ToC for a catalog (library of components), includes a list of components |
| recycle, clipboard | ToC for work directories used by the GUI tools. They have a format similar to the 'catalog' package descriptor. |

The package descriptor includes one entity of type 'package'.

An application package descriptor may also contain an entity of type 'assembly', with the same structure as the one found in an assembly descriptor, except that it cannot have terminals and properties on the boundary. It may be used as the topmost component of the application containing the property settings for the application itself, with a single subordinate that may be the application's main assembly.

The 'package' entity has the following attributes:

| | |
|---|---|
| type= | one of: application, catalog, volcache (obsolete), recycle or clipboard. |
| description= | A human-readable description of the package's contents. |
| uid= | An ID assigned to the application at the time it was installed. This ID may be an integer value in the range 1 . . . 254 and may be unique among the applications installed on the same cluseter of servers. |
| template= | 0/1 designating whether the application may be a template. |
| user1= | Free-form user-defined text intended for specifying billing code. |
| user2= | Free-form user-defined text intended for specifying billing code. |

The 'package' entity has the following sub-entities, described in detail further below:

-continued

| | |
|---|---|
| package | a reference to another package, which may be part of the same application. This may be used only if type = application. |
| class | defines a component class, including the name of the component descriptor file. |
| volume | a reference to a volume, defining an application-specific data volume (only in application packages) |
| protocol | defines a protocol filter |
| resources | defines the set of servers on which the application can be scheduled to run; optionally defines the numeric ranges from which IP addresses can be assigned to the components of the application. This may be used only in application package descriptors. |

The 'Package' Sub-Entity

The 'package' sub-entity in a package descriptor may be a reference to another package. In at least one embodiment, only application packages can have references to other packages. The references are to catalog packages that are part of the application itself—no references to global catalogs are added to an application's package descriptor.

The following attributes are defined for the 'package' sub-entity:

| | |
|---|---|
| file= | file name of the sub-package, relative to the directory in which the 'parent' package resides. |
| type= | the package type, one of: catalog, recycle or clipboard. |

The 'Class' Sub-Entity

This may be a reference to a component class descriptor. The following attributes are defined:

| | |
|---|---|
| top | marks the 'topmost' component of the application. This attribute may be used for class references in an application descriptor only. The descriptor for the 'topmost' component (which may be an assembly) may be in the application's package descriptor file itself. |
| singleton | specifies that only a single instance of this component can be used in an application. This attribute may be usually specified for all 'class' sub-entities found in an application's package descriptor. |
| file = name | specifies the name of the file where the component descriptor may be located. The name may be relative to the directory where the package descriptor itself may be found. |

The 'Volume' Sub-Entity

The volume sub-entity may be a reference to a volume image that may be directly assigned for use by a component of the application. No attributes are defined for this entity. Volumes defined in this manner are stored with the application itself (e.g., when it may be archived, moved or copied). These application volumes are assigned to 'placeholder' volumes of component instances using the regular property setting syntax in an assembly.

Note that the 'volume' entities in a package descriptor are the only explicit reference to volumes that belong to the application. However, each component class defined in the application scope or in an application-specific catalog also implicitly refers to one or more volumes that belong to the same application—each volume listed in such components' descriptors that has the class attribute has a corresponding 'template' volume, considered an integral part of the application.

The 'Protocol' Sub-Entity

This sub-entity may be used to define protocol filters. It can appear either in a catalog's package descriptor or in an application package descriptor. If any catalog may be used in an application, all filters defined in it are available for use in the application (whether by components coming from that catalog or by components defined in the application itself).

If the same protocol filter may be defined in more than one package descriptor, all definitions may preferably match exactly, otherwise an error may be reported by the ADL compiler. The well-known protocols' filter definitions are defined in the global catalog that may be part of any AppLogic™ installation; these include: http, ftp, smtp, ssh, etc.

The name of each 'protocol' entity may be a name that can be used in the 'protocol=xxx' attribute of a terminal (see the component descriptor syntax).

The 'protocol' subentity has a single attribute: 'filter', with a string value that defines the protocol constraints, e.g.:

protocol http: filter="tcp_in:80"

Note: the syntax of the protocol filter string may not be part of this specification—it may not be interpreted by the ADL compiler.

The 'Resources' Sub-Entity

The 'resources' sub-entity defines what may be available for the application to use on the grid of servers on which it may be installed. It includes the following sub-entities:

| | |
|---|---|
| servers | the set of servers that may be available to the application. 'servers' has these attributes:<br>min = min_val - minimum number of servers to assign to the application<br>max = max_val - maximum number of servers to assign to the application<br>set = "name1,name2, . . . " - optional; if specified, defines a subset of servers that the application may use. |
| mem,<br>cpu,<br>bw | Instead of defining specific servers that can be used by the application, restrictions on the amount of resources that can be used by it can be defined using one or more of the 'mem', 'cpu' or 'bw' constraints, which have the same syntax as the corresponding resource sub-entities for a component are define the total amount of the corresponding resource that can be made available to the application. |
| ip | the set of IP addresses available for assignment to terminals of the application's components, defined with these attributes:<br>base = ipaddr<br>n = max_addrs<br>netmask = ipaddr<br>The n and netmask attributes are optional. If netmask may be omitted, it may be computed from the high-order byte of the IP address, assuming the standard assignments of class A, B and C addresses. If n may be omitted, it may be computed from the netmask as the maximum number of valid addresses that the netmask allows for. [TBD: it may be more convenient and less error-prone to use the "base/bits" format instead of the netmask, e.g., to specify a range of 510 addresses, "base = 192.168.4.1/23" can be used instead of "base = 192.168.4.1,netmask = 255.255.254.0"]<br>The 'ip' sub-entity may be optional. If not specified, the AppLogic(TM) build system assigns a subrange of IP addresses from the pool of IP addresses defined in the AppLogic(TM) configuration file (AppLogic(TM).conf). The global pool of addresses defined in AppLogic(TM).conf may be divided into 256 sub-ranges of equal size, each sub-range may be used for one of the installed applications depending on its unique ID number assigned at installation time (see the uid attribute above). |

Property Markup Syntax

The property markup syntax may be used to identify text in ASCII configuration files of a component as being configurable properties, which are modified automatically to match the component's configuration within the application before the component may be started. All files identified in the 'cfgfiles' array in a component are scanned for property markup and updated as needed each time the application may be being prepared to start.

Note that the property markup may be only supported for appliances that use the volfix configuration mode.

General Requirements

A configuration file may be eligible for inserting property markup into it, if the file's syntax meets the following conditions:

It may be a plain-text file—that may be, a file that can be opened and edited by a text editor.

If the text file includes multi-byte characters, it uses the UTF-8 encoding, or any similar encoding that, if processed as a stream of bytes, allows interpreting any value in the range of 0-127 as the corresponding latin ASCII character, regardless of context.

The file format allows for inserting comments that are transparent to the component's code that uses the configuration file; the comment syntax may be such that comments can be placed sufficiently close to the property values that are being instrumented.

Within a comment, the characters [" $ : , - \] do not serve as terminators of the comment block and are not interpreted in any other special way.

No properties need to be configured to have the newline character as part of their value.

If newline may not be the terminator for a comment block, then in the normal text the file format may preferably allow for encoding all characters that are part of a comment terminator in a way that they stop looking like a comment terminator.

If the file may be being read and re-written by anything other than the AppLogic™ volume fixup utility, the markup comments are preserved and additional newlines are not inserted in the middle of a property value.

If the file may be being read and re-written by anything other than the AppLogic™ volume fixup utility, there may be a way to ensure that during a re-write, no new text may be inserted between a markup comment and the property values to which it refers.

The following file formats are known to comply with the above requirements, and may be preferable in one or more embodiments:

Linux line-oriented configuration files (commonly residing in the /etc/ directory and having the .conf suffix), in which lines beginning with the # character are treated as comments.

sh/bash and Perl scripts source files in C++ (including header files).

source files in C, when compiled by GCC or another compiler that allows the C++ single-line comments (//).

HTML and similar SGML files

To handle non-instrumentable files, the recommended approach may be to write a bash (or Perl) script that updates the config file on boot and instrument the script itself.

Markup Styles

Inline Markup:

$$prop: val1: name1, val2: name2, . . .

The presence of a $$prop: string on a line of text in the configuration file means that this line includes one or more property values. Usually, the "$$prop:" string and the rest of the line of text are made invisible to the application that uses this configuration file by making it appear as a comment, e.g., if the configuration file may be a Perl script this might look like:

$port=3306 # $$prop: 3306:ip_port

The val:name pairs following the markup identifier string are interpreted as follows:

val1:name1 indicates that the first occurrence of the string val1 on this line may be to be treated as the value of the property name1 and replaced whenever that property needs to be changed.

val2:name2 indicates that the first occurrence of the string val2 following the first occurrence of val1 may be the value of the property name2, etc.

If the name in a val:name pair may be the string '–', the string 'val' may be simply ignored. This may be used to skip parts of the configuration data that might otherwise match a property value, e.g., a markup like this:

x1=1 # $$prop: 1:val may cause the '1' in x1 to be considered the value of the property 'val'. To make the string '1' that follows the = sign be the property value, the markup has to be:

x1=1 # $$prop: 1:–, 1:val

The special '–' property name may be also used in case the property value may be the empty string, e.g., in the following markup the property may be the empty string that follows the "x1=" string:

x1=#$$prop: "x1=":–,"":val

If a value includes punctuation characters that are part of the markup syntax (colon, comma, space), the value may preferably be quoted, using the double-quote syntax that may be defined for the ADL descriptor files.

Next Line Markup:

$$propN: val1: name1, val2: name2, . . . [$$]

This markup may be used for configuration files that do not allow comment text to appear on the same line as the value that needs to be exposed as a modifiable property. It may be similar to the inline syntax, but it indicates that the text on the line that follows the one on which the markup appears may be to be searched for matching strings, not the current line.

Markup for Files that are not Line-Oriented:

$$propF: val1: name1, val2: name2, . . . $$

This markup may be used for configuration files in which the newline character may not be considered different from other whitespace and updates of the file may cause newlines to be added or removed at any place where un-quoted whitespace occurs. For this type of markup, a closing $$ sequence may be required to indicate the end of the list of val:name pairs. Newlines are allowed between the val:name pairs. All text following the closing $$ mark, regardless of newlines may be searched for strings matching the values, until all values are found or until 1K of text may be read for each val:name pair (if the latter occurs without finding all values, an error may be reported). Note that each property value may be still expected to reside on a single line.

Meta-Character Quoting in Configuration Files

Some configuration files allow characters that have a special meaning (meta-characters) to be quoted in a way that they lose their special meaning and become part of normal data. The ADL property update code in the Volume Fixup utility may be aware of quoting and may maintain it when property values are updated.

Whenever a property value includes such "escaped" characters, they may preferably appear in the same exact way both in the markup (which may be inside a comment section in the file) and in the actual text, even if these characters need to be "escaped" only in the normal config file text (or only in the comment). For example, the & character doesn't have a special meaning in HTML comments, but it has to be "escaped" in HTML data, e.g.:

<!—$$propF "&":my_prop $$—><sometag someattr="text & more text"> may not be valid, even though "&" may be OK to appear in the comment, and may preferably be re-done this way:

<!—$$propF "&":my_prop $$—><sometag someattr="text & more text">

The quoting of the data values may be in different formats, depending on the file type, as specified by the 'quoting=' attribute (see the component descriptor syntax). This quoting may be independent of the C-style double quotes used by the markup syntax itself to enclose a property value—the latter may be always done with the C-style double quotes and may be superimposed on top of the former, e.g., the string 'abc-"def', which may be quoted as abc\"def for a C file, may appear as follows in the markup:

p="abc\"def"; //$$prop "abc\\\"def":p_val

Per-Property Quoting Style Override

The component descriptor syntax allows specifying a single quoting style for a config file, which applies to the entire file. This may not be sufficient to cover for cases when a single file has two or more meta-character quoting methods, depending on context (e.g., in an HTML style, regularly the & . . . ; sequence may be used to quote special characters, but in URLs the % xx hex-coded quoting may be used.

To provide for cases like this, a per-property override can be defined as an extension of the markup syntax, e.g.:

$$prop value:prop-name(quote-style), . . .

More Quoting Styles

Additional meta-character quoting styles can be added, such as, for example, one or more of the following (or combinations thereof):

user-defined styles (e.g., specified as perl-style replacement commands like: s/&/&/)

pre-defined styles:

makefile: \<LF> may be encoded as \#<LF>, trailing whitespace (<SP><LF>) may be encoded as <SP>#<LF>, leading whitespace may not be encodeable and may be forbidden.

xml: TBD, may be similar to HTML.

User Interfaces

Application Configuration

The Application Configuration property sheet allows one to configure the settings of the application as a whole. If one may look at the entire application as a single appliance, these are its instance settings.

For a well-built application, these settings are the only configuration that one may need to change when starting a new instance of the application (e.g., one may need to do that if one may have made a copy of the application or one may have moved the application from another AppLogic™ system).

In addition to the application settings, this property sheet includes some additional elements, such as the application management panel and the protocols settings.

One may reach the Application Configuration property sheet in one or more of the following ways:

- from the dashboard, select the Applications tab, select the application one may want to configure and press the Configure application button at the top of the applications list
- from the dashboard, select the Applications tab, select the application one may want to configure, open the right-click menu for the application and select the Configure option
- from inside the editor, open the right-click menu on the canvas and select the Configure Application option or click on the Application menu item and select the Configure option.

The application configuration may be structured in the following sections (tabs):

- General
- Resources
- User Volumes
- Properties
- Protocols
- Notes

This property sheet may be very similar to the Instance Settings property sheet, except it affects the settings of the application as a whole.

FIGS. 40-45 show various example embodiments of graphical user interfaces (GUIs) which may be used for implementing one or more features/aspects relating to distributed application configuration.

Figure 40:
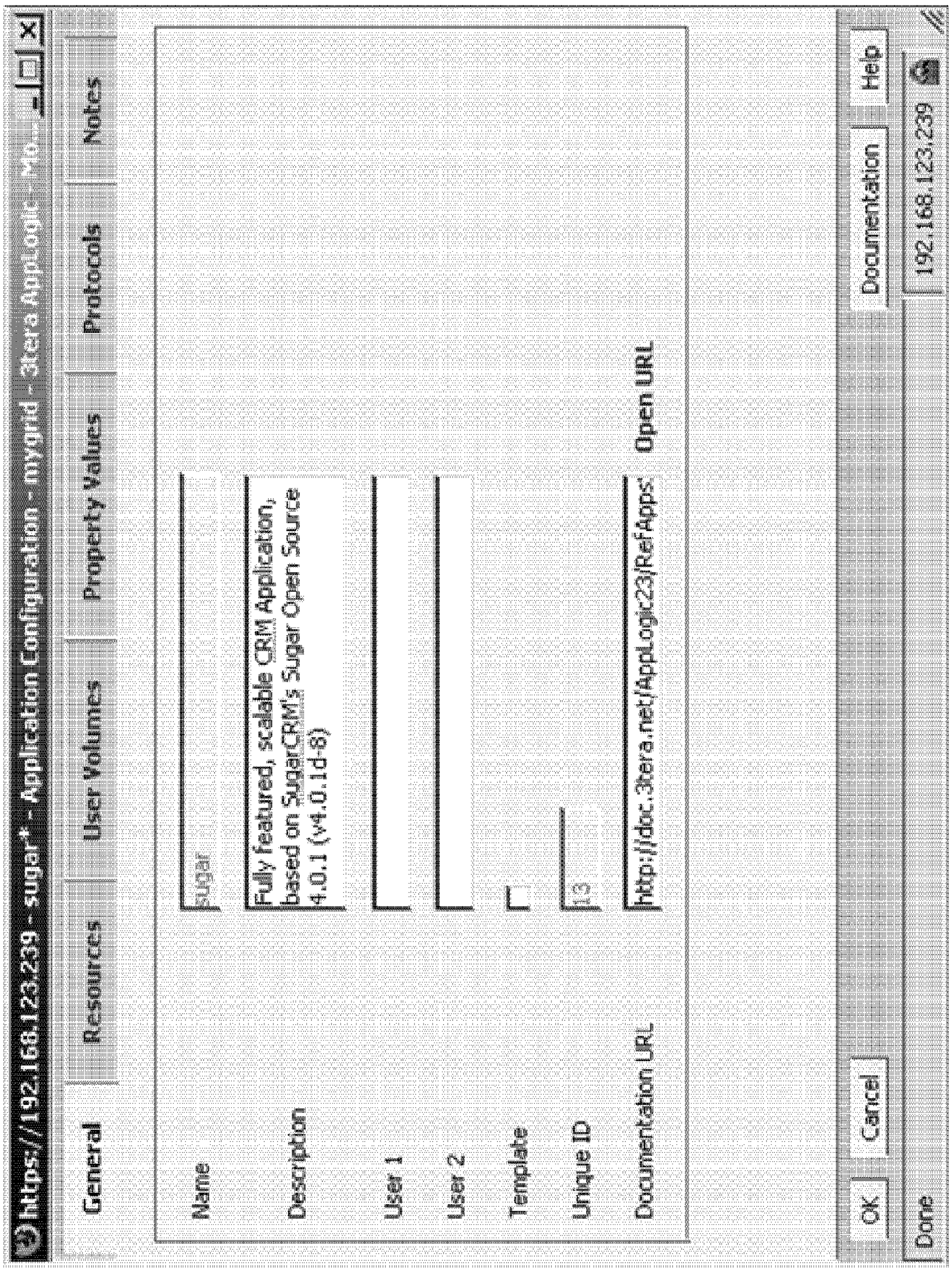
FIGS. 40-81 illustrate various example embodiments of different graphical user interfaces (GUIs) and/or virtualized components which may be utilized, for example, for enabling, accessing and/or implementing various types of global utility computing features and/or information described herein.

General (FIG. 40)

Name

Unique name of the application on this grid.

A icon may be shown to the right of the application name designating that the application may be locked. When an application may be locked, it may not be edited or viewed within the Editor. See Application and Class Locking Reference for more information.

Description

Human-readable description of the application.

User 1

Free-form user-defined text intended for specifying billing code.

User 2

Free-form user-defined text intended for specifying billing code.

Template check box specifying that application may be a template (e.g., it may be provisioned)

Unique ID

Unique numeric identifier of the application used internally by AppLogic™. It may be assigned automatically when the application may be created.

Documentation URL

URL where the documentation for the application can be found. The URL may be opened by clicking on the Open URL text to the right of the field.

Although one may cannot change the application name here, one may rename the application from the Installed Applications screen.

Figure 41:
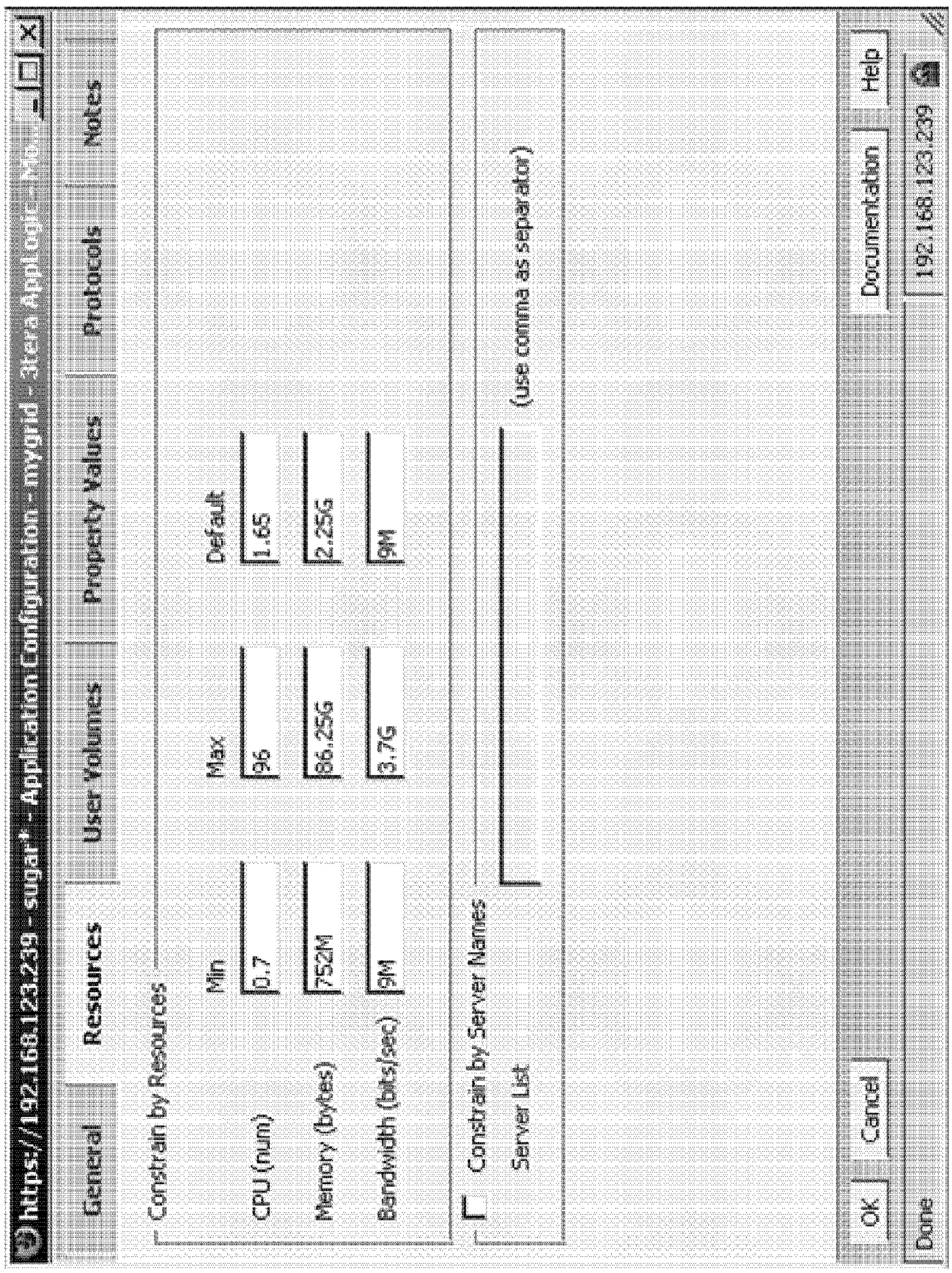

Resources (FIG. 41)

The Resources tab allows one to control how much resources the application requires and may be allowed to take.

By default, AppLogic™ calculates the resource range of the application based on the resource ranges of all appliances used in the application.

If one may don't want to constrain the application further or simply don't know yet what constraints one may want, leave the default settings (uncheck all constraints).

AppLogic™ provides two ways to constrain further the amount of resources to be allocated to the application: by number of servers or by resource range.

In addition, one may select a subset of servers in the system, on which the application can be scheduled. Such constraints allow one to specialize this particular instance of the application for production and sandbox (testing) environments.

AppLogic™ determines the actual amount of resources to be given to an application when one may start the application. Whatever resources are available and/or specified when starting the application may preferably fit within the range defined here. See Starting Applications for more details.

one may fix the exact amount of resources to be used when starting the application by specifying the maximum values equal to the minimum. This may ensure that (a) no freedom may be given to the AppLogic™ scheduler, (b) the application may not start unless at least that much resources are available, and (c) the application may take no more than that much resources.

On this screen one may only reduce the resource range: specify a higher minimum and/or lower maximum for resources.

Limit the Resource Range—Constrain by Resources

Specify the resource range for each hardware resource separately (CPU, memory and bandwidth).

The following resource types can be specified:

CPU

Portion of CPU or number of CPUs to be allocated for the application. Fractional amounts can be specified as a decimal number (e.g., 0.5 or 3.5). Whole CPUs are specified simply as an integer (e.g., 12).

Memory

Amount of memory to be allocated for the application. The amount can be specified as an integer value in Megabytes (e.g., 512 M) or in Gigabytes (e.g., 9 G).

Bandwidth

Amount of network bandwidth to be allocated for this application (total for all terminals/interfaces, including the internal communication inside the application). The amount can be specified as an integer value in Megabits/sec (e.g., 10 M) or in Gigabits/sec (e.g., 1 G).

See here for an important note regarding resource oversubscription of network bandwidth.

A range can be specified for each resource type. The range defines the normal operating parameters desired for the application in production environment.

Minimum

The minimum amount of a resource that the application needs to work at all. This may be useful to allow running the application in functional testing environments, where the application may not be expected to run under production load, and therefore can run with much less resources. Contrast this with the Default below, which may be amount of resources needed for production use.

Maximum

The maximum amount of a resource that the application may be allowed to take. Typically this may be the maximum that the application can use (e.g., giving it more resources may not increase performance). The application may not be allocated more than the specified maximum amount, ensuring that it may not be able to take resources away from other applications—think of it as a quota.

Default

The minimum amount of a resource that the application may be provided with for normal operation in production environments. The application may not be started unless at least that much can be allocated for it. Specifying a default ensures that the application may work within certain "guaranteed" resource amount—think of it as a service level agreement (SLA) for that resource.

One may easily see which values override the defaults—they are displayed in bold. If one wants to restore the default value for a given resource, use the restore button next to the value.

Limit the Set of Servers—Constrain by Server Names

One may also select on which particular servers of the system one may would like the application to run.

The list of servers on one's system can be found by executing the server list shell command.

This may be an advanced option that may be useful when one may want to run several applications on the same system and the results produced by the AppLogic™ scheduler are not satisfactory. In most cases one may preferably leave this constraint disabled.

Figure 42:
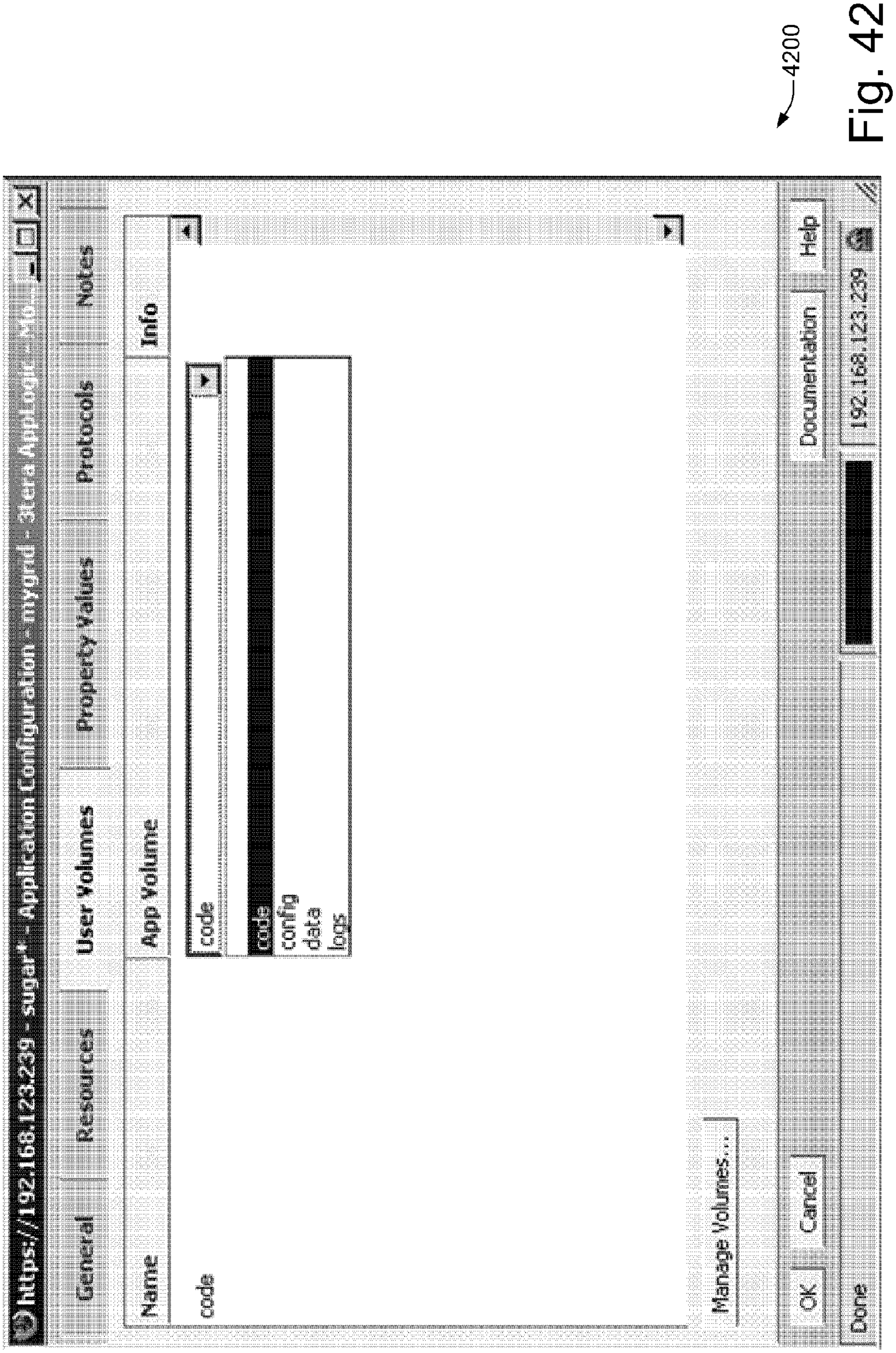

User Volumes (FIG. 42)

The User Volumes tab allows one to configure volumes for the application instance. Many applications don't have any configurable volumes (all application volumes are assigned internally in the application), so there would be nothing to configure.

Being able to configure volumes on the application may be useful in the cases when the application has more than one actual volume for a given volume need. For example, an e-commerce application may have a test database and a production database volumes. In this case, the User Volumes tab allow one to specify which actual volume one may want to configure as the database volume.

If one wants to add or remove actual application volumes or access one of the application volumes in order to upload and/or download files to/from it, press the Manage Volumes button.

If one wants to add or remove placeholder application volumes (volume roles), close this property sheet and edit the application boundary by right-clicking on the editor canvas and selecting Edit Application Boundary from the menu. See Class Editor for details.

The info button next to the volume (if present) gives one may information about the volume requirements (e.g., read-only, shared, etc.).

Figure 43:
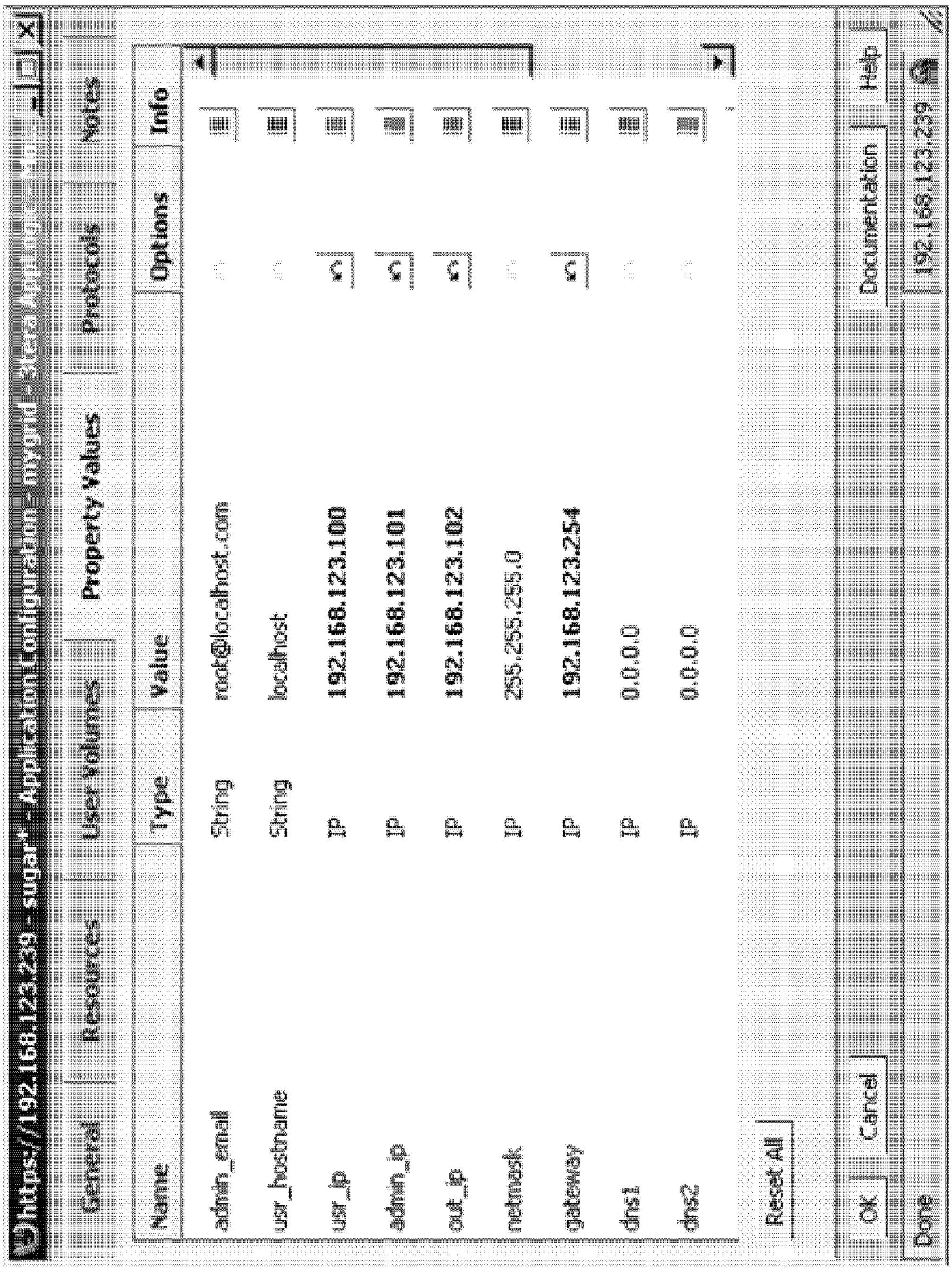

Properties (FIG. 43)

The Properties tab allows one to set values for properties of the application, allowing one to specialize this instance of the application. This may be useful for configuring location-specific parameters, such as IP addresses, and for configuring tuning parameters, such as cache sizes.

The default values of the properties are shown in normal font weight. Property values explicitly configured for this application are in bold.

For information on the property, its type and allowed values, select the info button . To restore the default value of a property, press the restore button (use the "Reset All" button to reset the values of all properties to their defaults).

If one wants to add or remove application properties, close this property sheet and edit the application boundary by right-clicking on the editor canvas and selecting Edit Class from the menu. See Class Editor for details.

Figure 44:
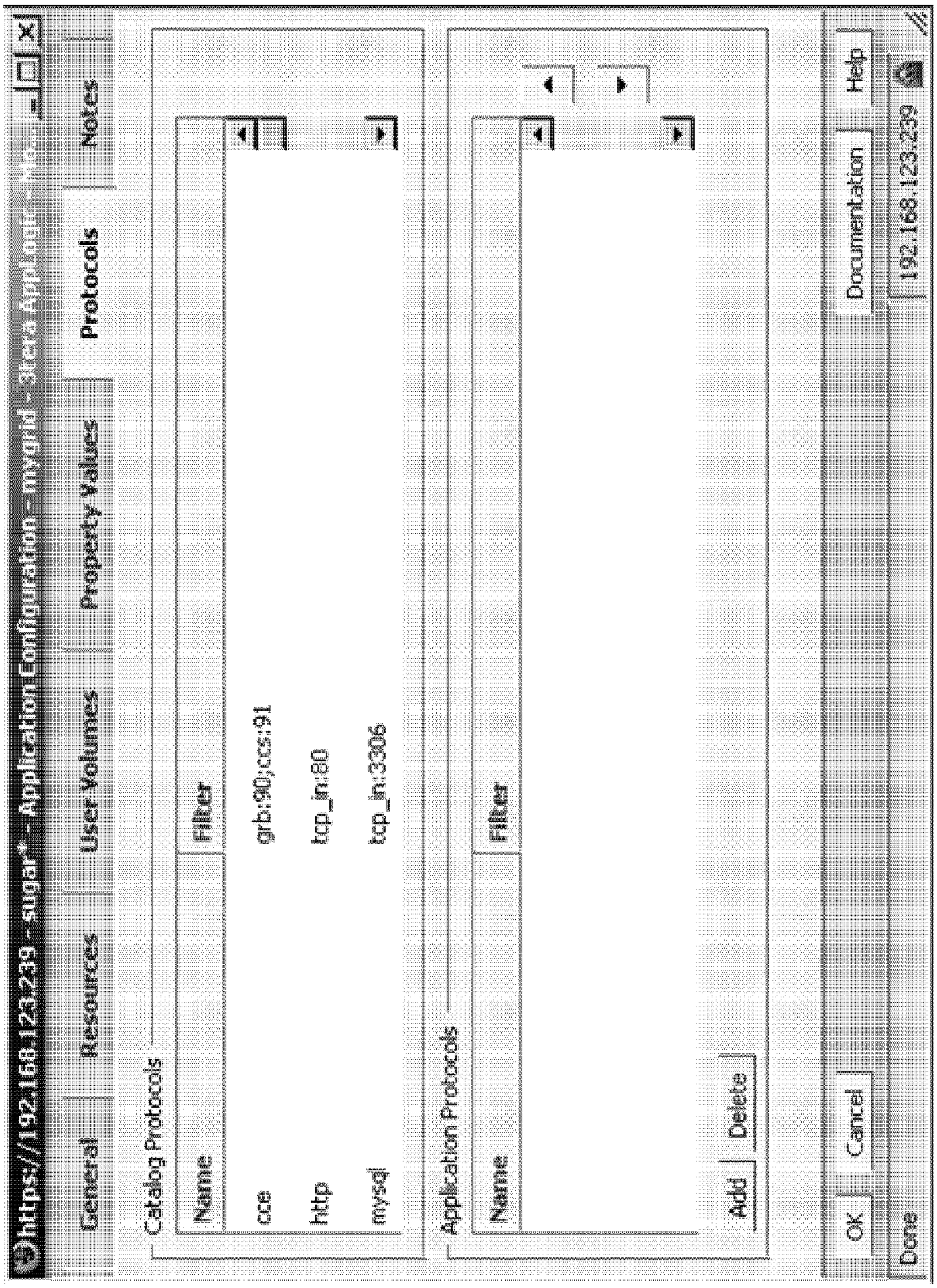

Protocols (FIG. 44)

The Protocols tab shows the full set of protocols available for defining appliance terminal types. This may not be a configurable application settings (e.g., it may not be something that one may want to change from one instance of the application to another), but rather an advanced option for configuring appliances in the application scope (Protocols are on a separate tab for convenience, although they belong to the application configuration and may be part of the application boundary property sheet).

This may be useful when one may are defining new appliances and want to know what protocol types are available, or want to add new protocols.

Catalog Protocols

This list shows the protocols defined in all catalogs accessible to the application (union of all protocols defined in all catalogs, with the duplicates eliminated).

Name

The name of the protocol. This name may be used when selecting a protocol for each terminal of an appliance inside the application.

Filter

A network filter specification for the protocol, describing what are the legal interactions. The descriptions are similar to setting up port filters.

This list may be read-only. To add a new protocol, use the Application Protocols list below.

Application Protocols

This list defines the custom protocols specific to the application.

One may add new protocols, defining the same parameters as for the catalog protocols list above.

Name

The name of the protocol. This name may be used when selecting a protocol for each terminal of an appliance inside the application; it may preferably be unique (may be a duplicate of a catalog-defined protocol). The name may be a single word, case-sensitive, alphanumeric ([A-Za-z0-9_]).

Filter

A network filter specification for the protocol, describing what are legal interactions in that protocol. Currently, the filter specification for AppLogic™ may not be fully defined. Please use the following format for the filter value: # protocol identification or comment. The comment may be sufficient to identify the application-level protocol (such as an RFC number) or simply a description (# TCP port 80).

The any protocol allows connections to be established in any direction within a connection (a bi-directional connection). The any protocol may preferably be set on both terminals of the connection.

Even though this version of AppLogic™ does not enforce the protocols on inter-appliance connections, it may be a good idea to set those correctly, both for documenting the required protocol and for making use of the protocol enforcement feature when it becomes available.

one may add new protocols only for singleton appliances; if one may add the appliance using the new protocol(s) to a catalog, the protocol settings may not be propagated properly. If one may need to add new protocols, contact Technical Support for more details and/or review the protocol definitions in catalog packages described in the ADL Language Reference.

Figure 45:
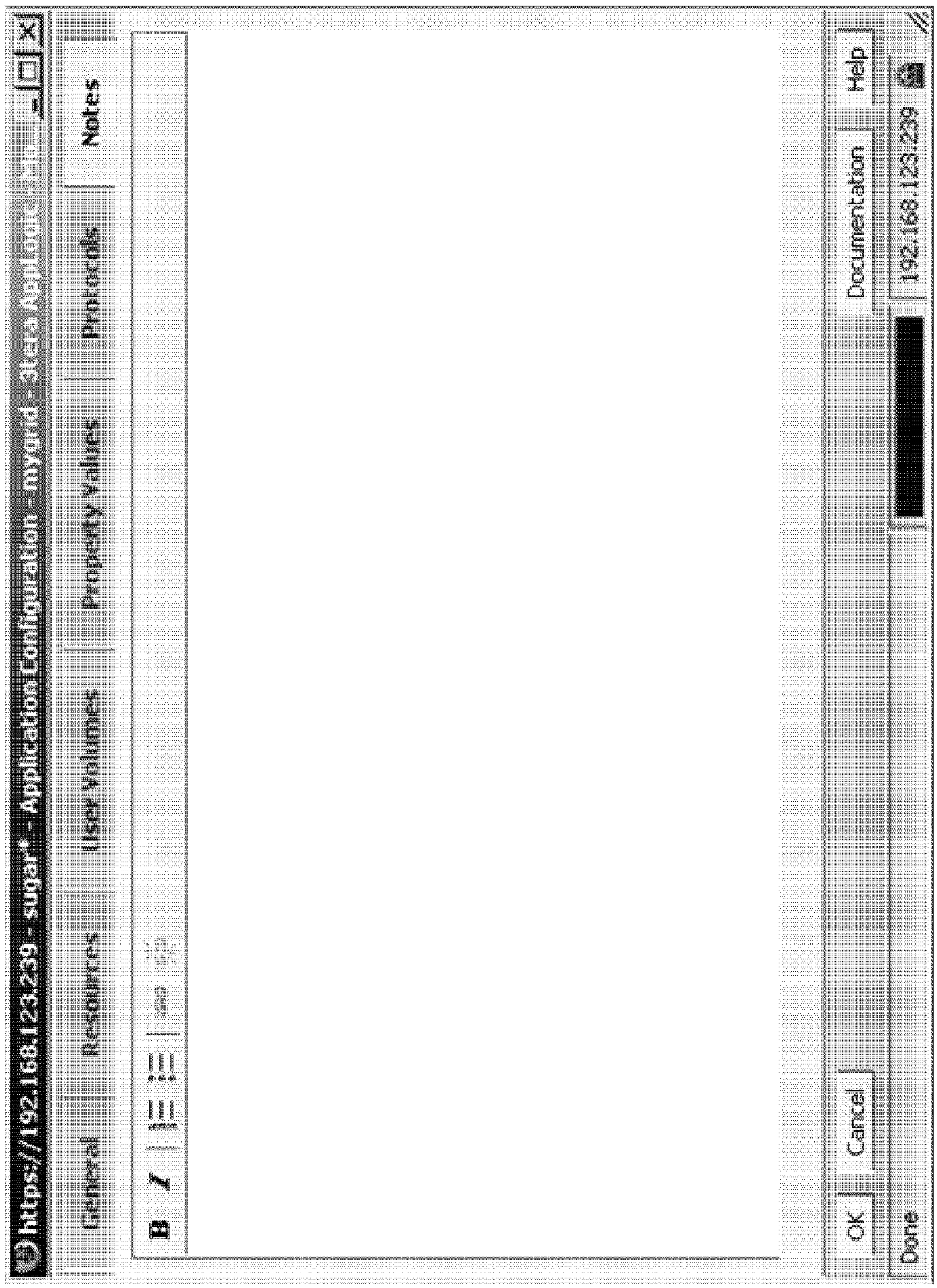

Notes (FIG. 45)

The notes tab shows free-form notes that are set on the application. One may edit the notes by double clicking on the text window.

According to different embodiments, the Note editor/viewer may be based upon TinyMCE, a platform independent web based Javascript HTML WYSIWYG editor control released as Open Source under LGPL by Moxiecode Systems AB.

The following text formatting options are available from the toolbar:

Bold

Bold text that may be selected or text to be typed.

Italicize

Italicize text that may be selected or text to be typed.

Ordered List

Create numbered list.

Unordered List

Create unordered bulleted list.

Insert/Edit Link

Insert or modify a hyper link. To insert a hyper link, type and highlight the text that may be to comprise the hyper link and then click on the Insert/edit Link button. A dialog may be displayed where one may enter the URL to which the link may be to refer as well as optional text This option may be also available from the right-click menu.

Unlink

Remove a hyper link leaving the text. This option may be also available from the right-click menu.

Application Migration Wizard

The Application Migration wizard allows one to migrate an application from a remote grid or a URL or migrate an application to a remote grid.

one may reach the Application Migration wizard in the following ways:

Application Import from the dashboard, select the Applications tab and press the Migrate from button at the top of the application list or right-click the mouse and select Migrate From from the context menu.

Application Export from the dashboard, select the Applications tab, select the application to be migrated, and press the Migrate to button at the top of the application list or right-click the mouse and select Migrate To from the context menu.

Setting Up Trust Between the Grids

Before the Application Import Wizard can be run, "trust between the two grids" may preferably be set up. To setup trust between the two grids, perform the following steps:

From the grid shell, execute grid info –v and copy the value of the Grid Public SSH Key.

Log into the remote grid and create a new user specifying the public SSH key retrieved in the previous step as the sshkey parameter. For Example:

user create reotegrid@3tera.net pwd=somepwd sshkey=sshkey

Execute the 'application import wizard'

Optional: remove the user that was created in on the remote grid if no more applications need to be imported.

In addition, either the user's and/or the grid's public SSH key may preferably also be installed on the remote grid in order to set up a "trust" between the two grids. When importing an application from a remote grid, Importing an Application from a Remote Grid When importing an application from a remote grid, the Application Import Wizard walks the user through the steps necessary to import and configure an application that resides on a remote grid. In at least one embodiment, the wizard walks the user through at least one or more of the following steps:

General (Step 1 of 3)

Configuration Properties (Step 2 of 3)

Finalizing (step 3 of 3)

Migrating

FIGS. 46-49 show various example embodiments of graphical user interfaces (GUI) which may be used for implementing one or more features/aspects relating to the importing of an application from a remote grid.

Figure 46:
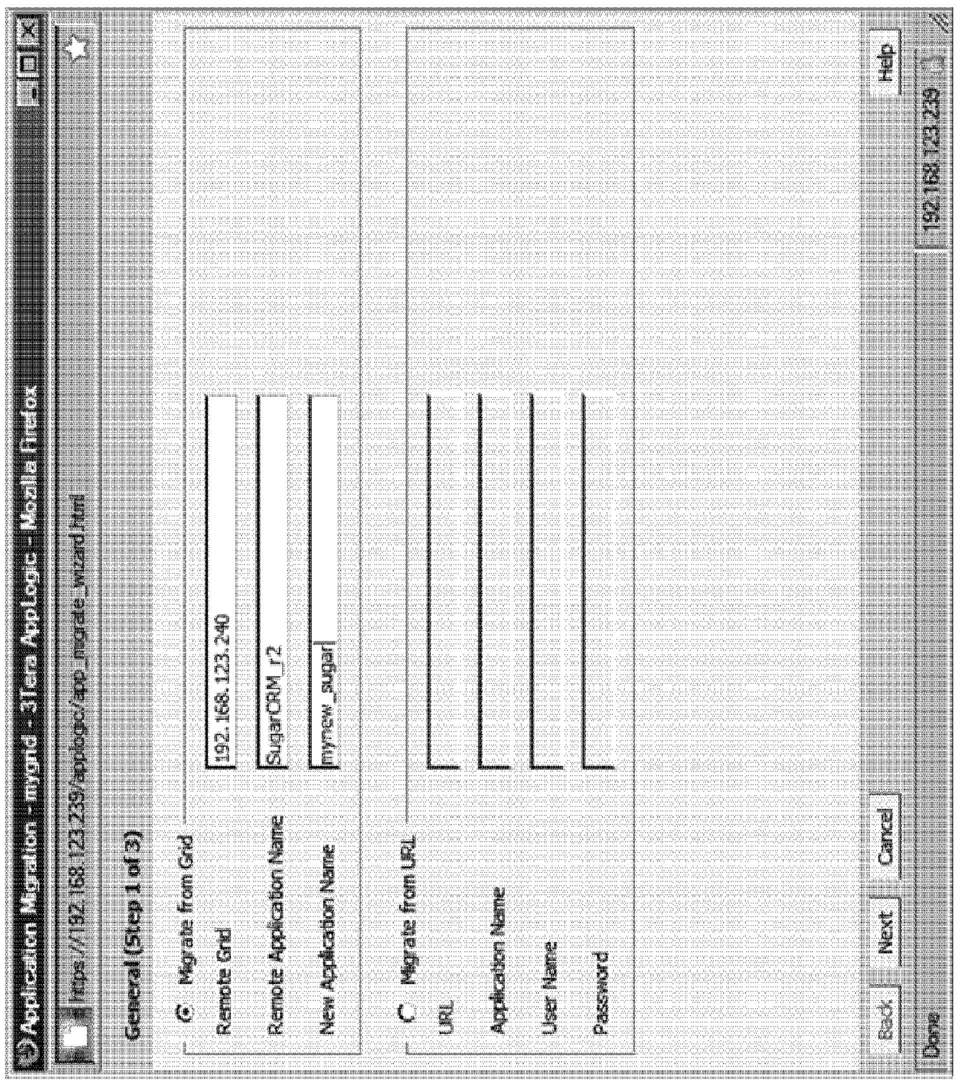

General (Step 1 of 3) (FIG. 46)

When the 'Import from Grid' radial button may be selected, the wizard allows the following fields to be specified:

Remote Grid

DNS name or IP address of remote grid from which the application may be to be imported (e.g., mygrid.3tera.net).

Remote Application Name

Name of application on remote grid that may be to be imported.

New Application Name

Optional new name for imported application. If a new name may not be specified, the imported application may have the same name as the 'Remote Application Name' specified above.

The 'Import from Grid' option may be similar to executing the application migrate command from the grid shell.

Figure 47:
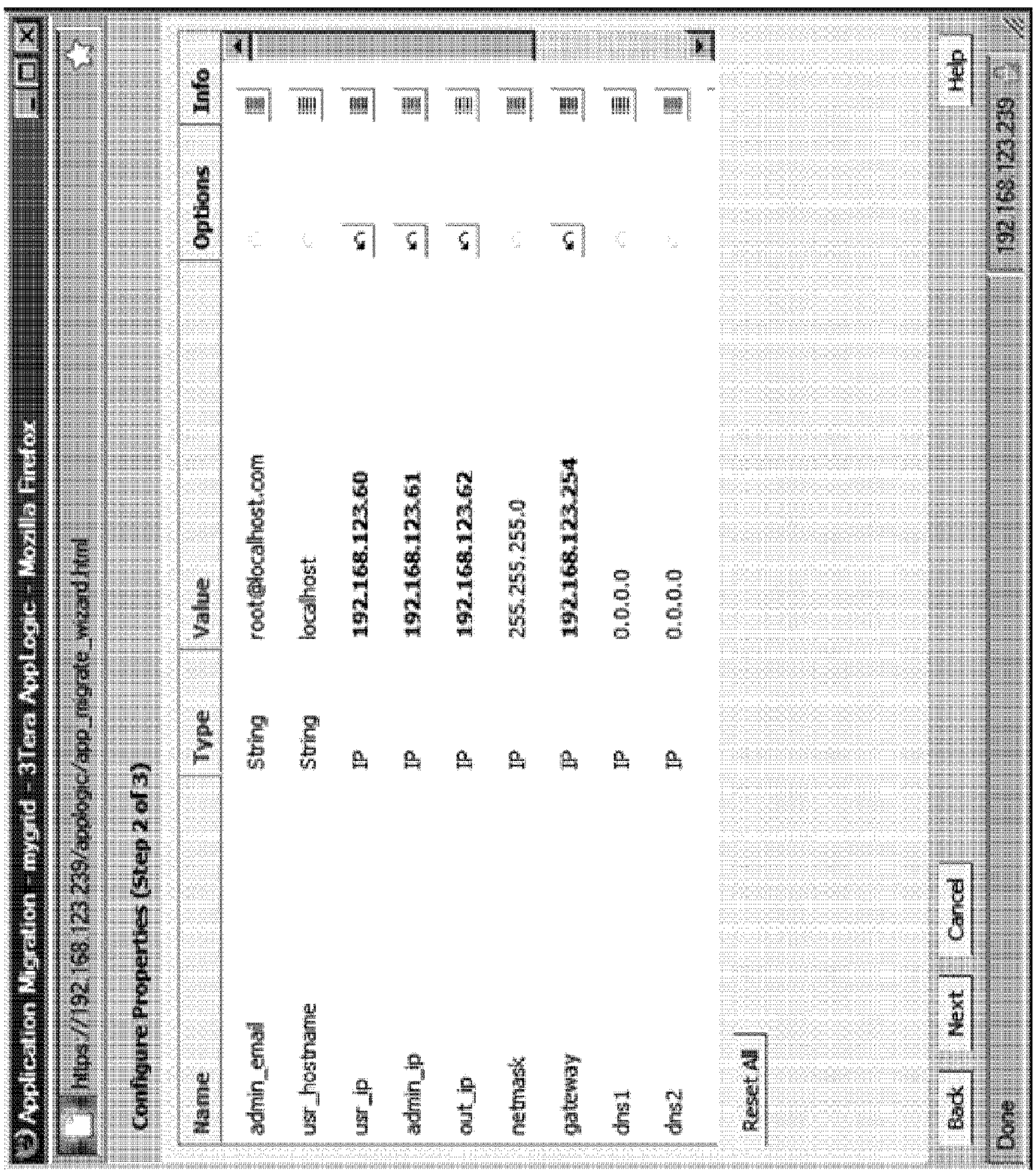

Configuration Properties (Step 2 of 3) (FIG. 47)

The 'Configuration Properties' dialog of the wizard allows one to set values for properties of the application, allowing one to specialize this instance of the application. This may be useful for configuring location-specific parameters, such as IP addresses, and for configuring tuning parameters, such as cache sizes.

The default values of the properties are shown in normal font weight. Property values explicitly configured for this application are in bold. Mandatory property values that have not yet been configured are highlighted in red.

For information on the property, its type and allowed values, select the info button. To restore the default value of a property, press the restore button (use the "Reset All" button to reset the values of all properties to their defaults).

Figure 48:
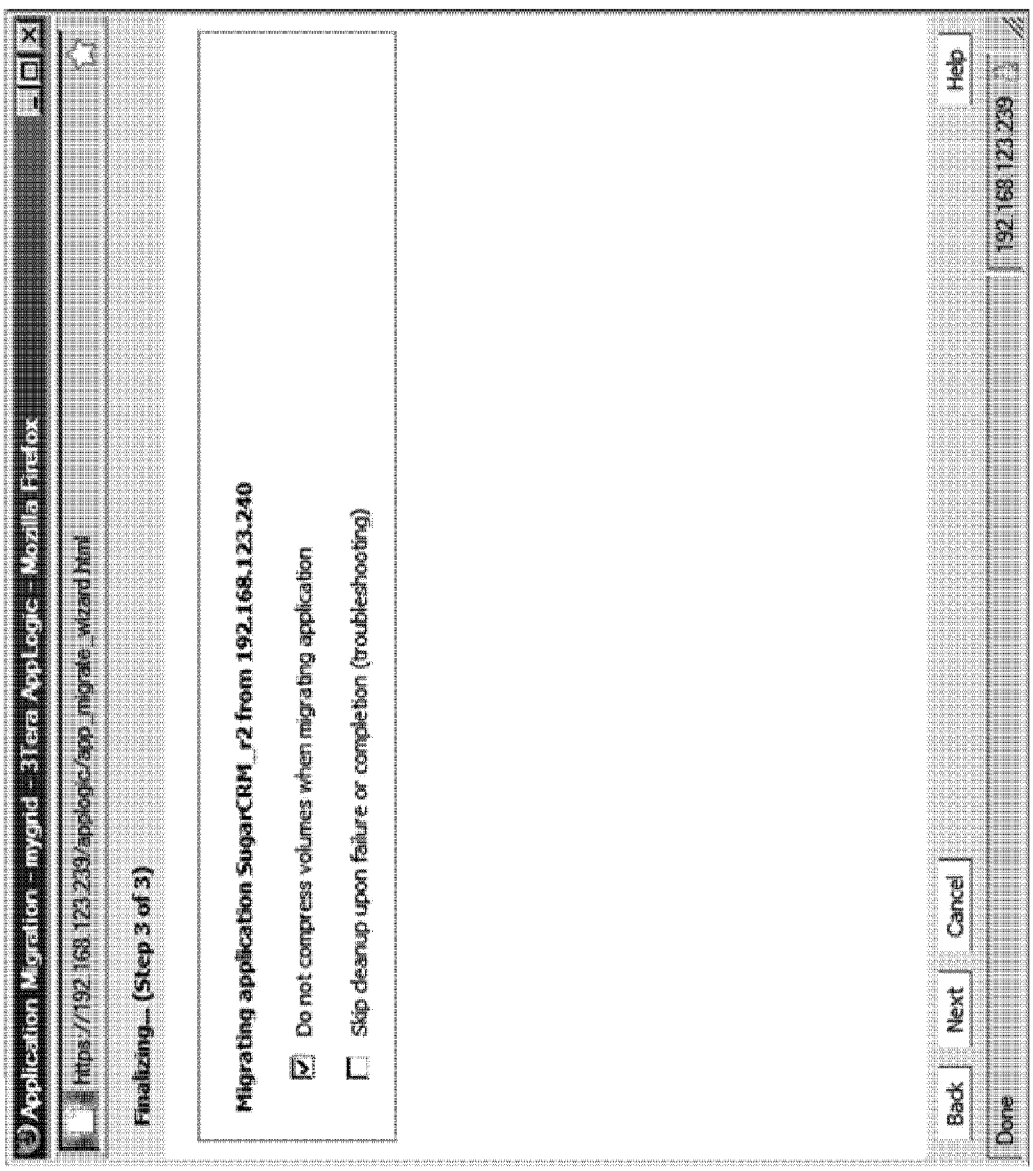

Finalizing (step 3 of 3) (FIG. 48)

The 'Finalizing' dialog of the wizard allows for one to specify the following:

Do not compress volumes when migrating application

Select this option to disable compression when transferring volumes for the application. This option may speed up the operation if the application includes very large volumes.

Skip cleanup upon failure or completion (troubleshooting)

Select this option to not cleanup the imported application if a failure may be encountered.

Figure 49:
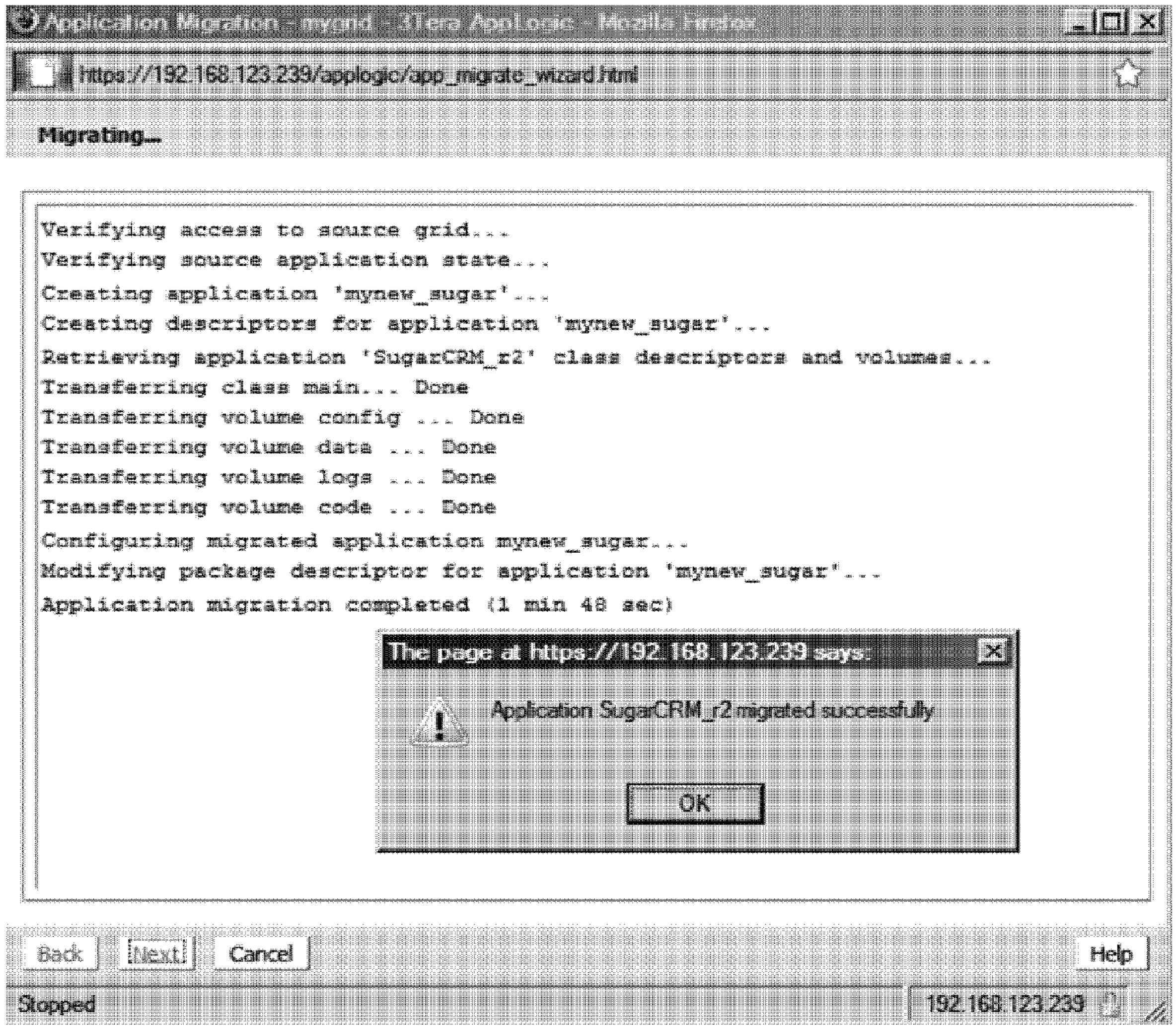

Migrating (FIG. 49)

The 'Migrating' dialog of the wizard shows the overall progress for the application import operation.

Importing an Application from a URL

Figure 50:
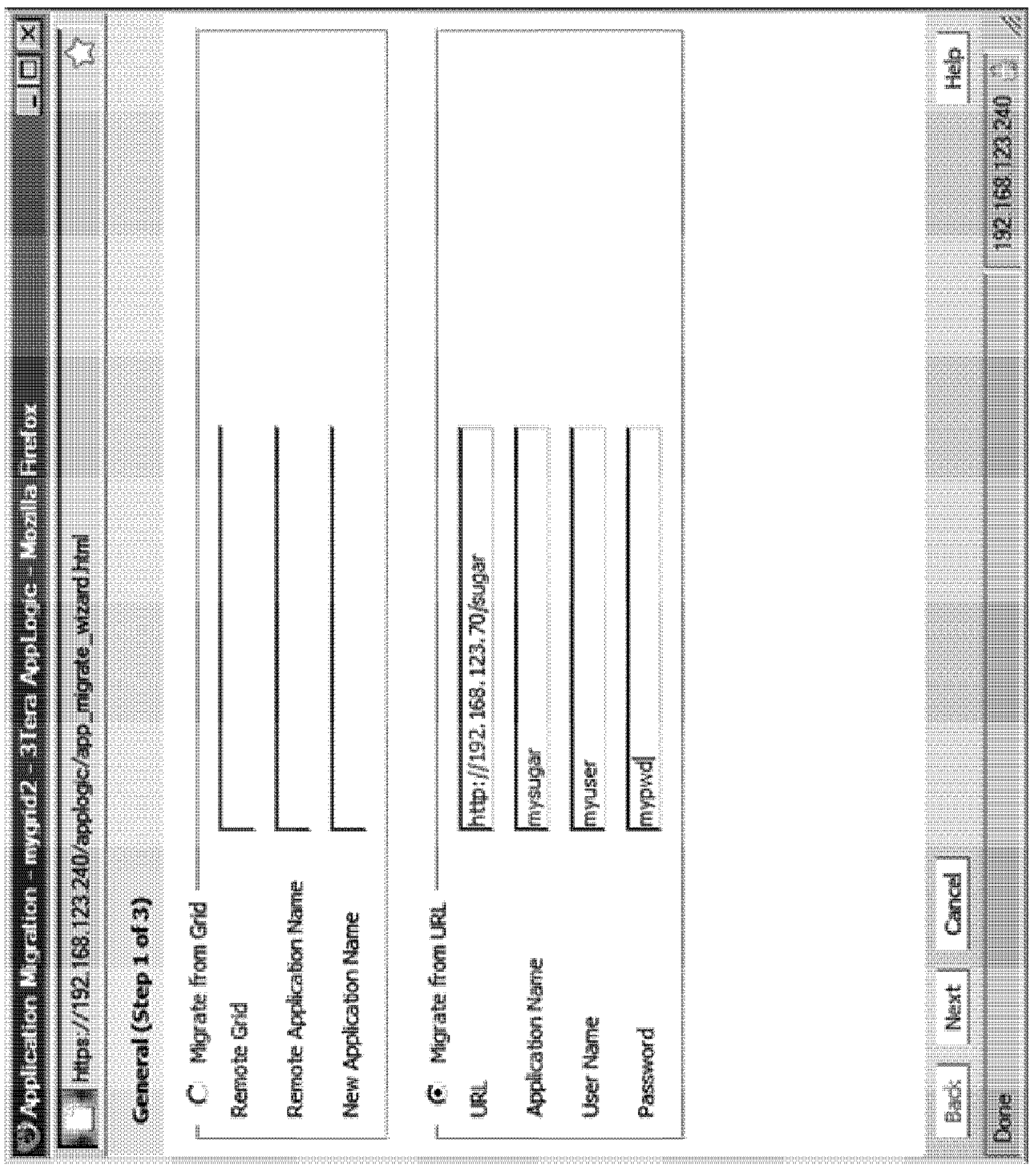
Figure 51:
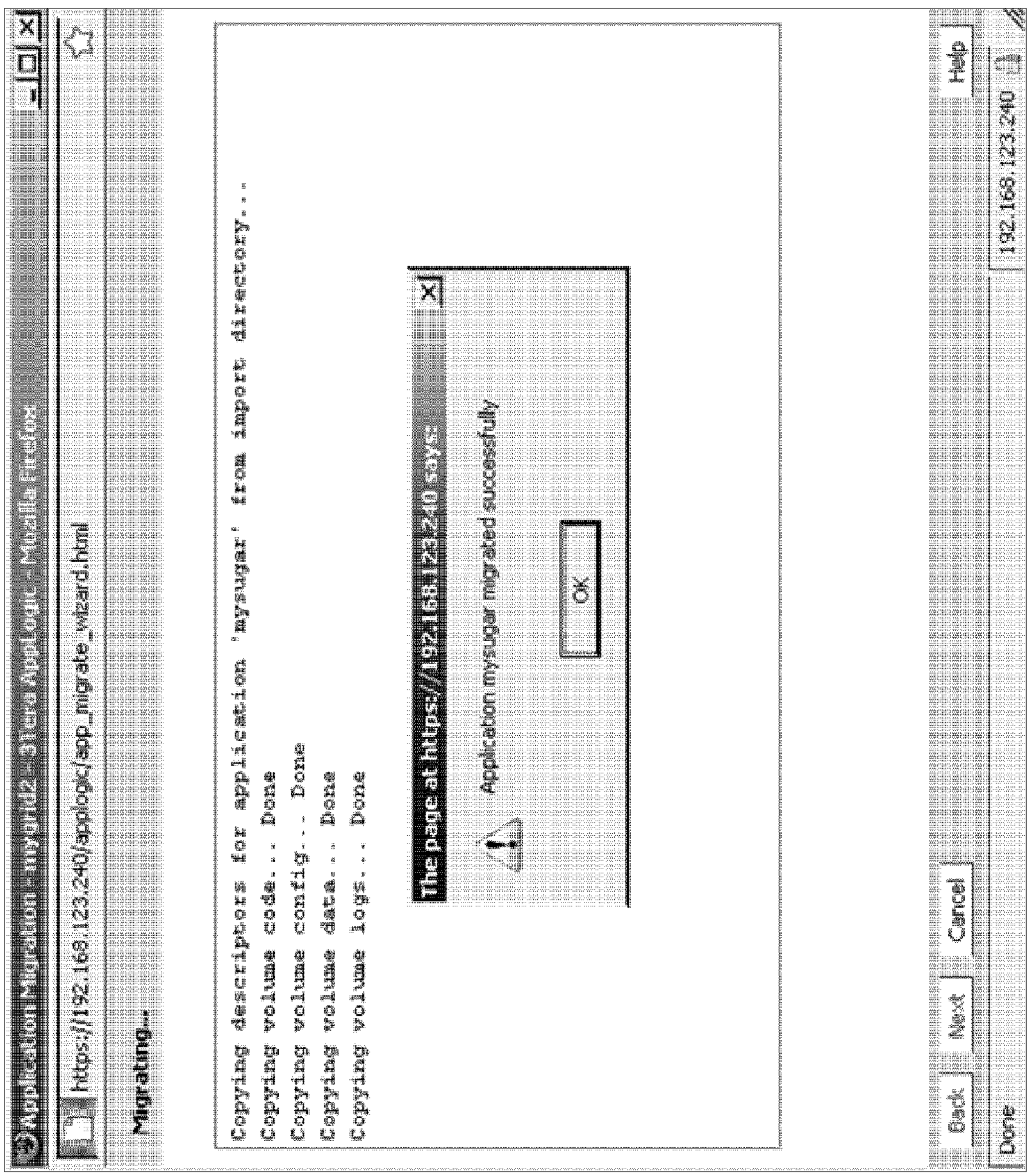

FIGS. 50-51 show various example embodiments of graphical user interfaces (GUIs) which may be used for implementing one or more features/aspects relating to the importing of an application from a URL.

General (FIG. 50)

When the 'Import from URL radial button may be selected, the wizard allows the following fields to be specified:

URL

URL of the directory where the application archive resides. May preferably be in the form: http://path.

Application Name

Name of the imported application.

User Name

Optional user name for gaining access to the HTTP server.

Password

Optional password for gaining access to the HTTP server.

The 'Import from URL' option may be similar to executing the application import command from the grid shell and specifying a URL for the exchange directory.

Migrating (FIG. 51)

The 'Migrating' dialog of the wizard shows the overall progress for the application import operation.

When the application has been successfully imported, it may be configured using the Application Configurator.

Exporting an Application to a Remote Grid

FIGS. 52-56 show various example embodiments of graphical user interfaces (GUIs) which may be used for implementing one or more features/aspects relating to the importing of an application from a URL.

When exporting an application to a remote grid, the Application Export Wizard walks the user through the steps necessary to export and configure the application to reside on a remote grid. The wizard walks the user through the following steps:

General (Step 1 of 3)

Configuration Properties (Step 2 of 3)

Finalizing (step 3 of 3)

Migrating

Figure 52:
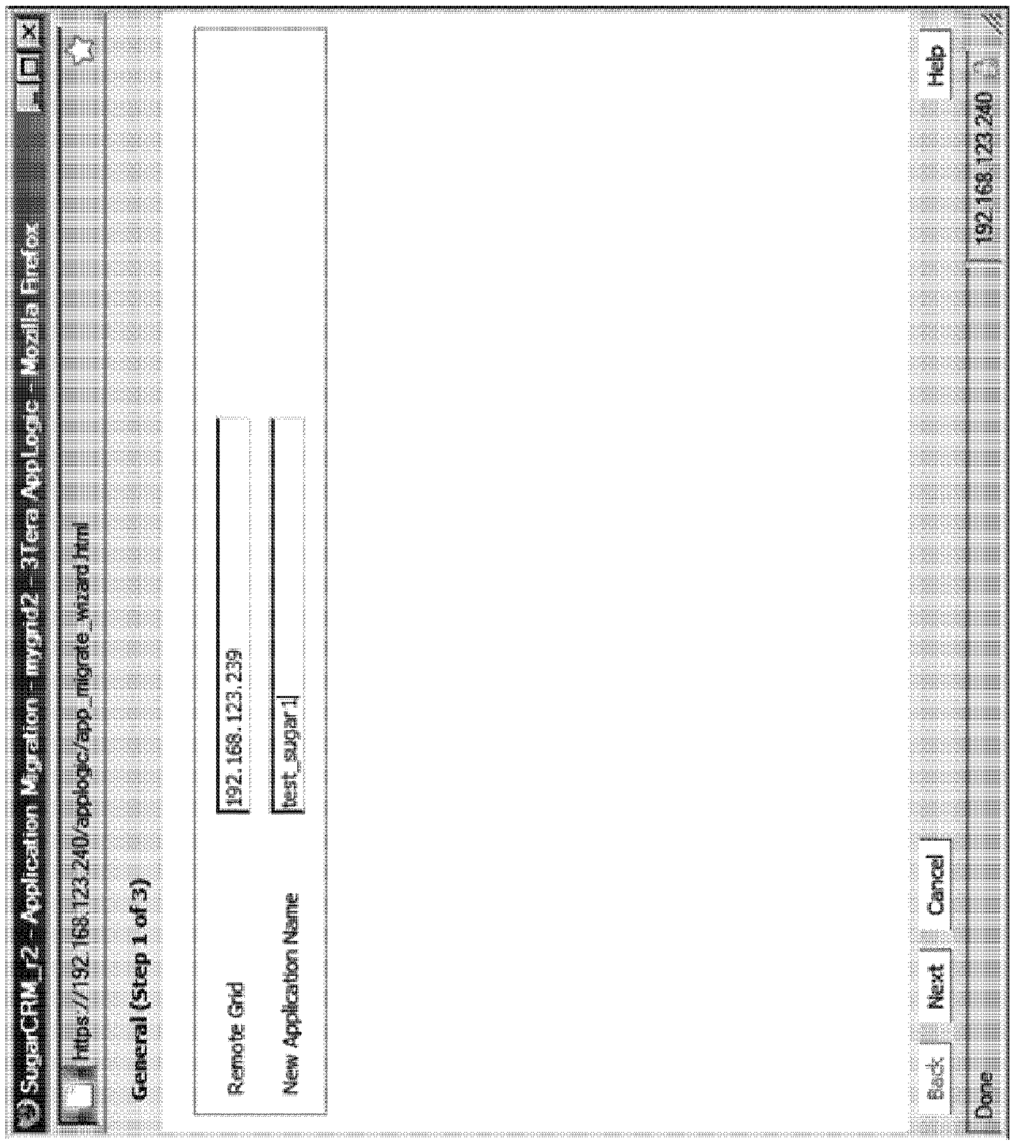

General (Step 1 of 3) (FIG. 52)

Remote Grid

DNS name or IP address of remote grid to which the application may be to be exported (e.g., mygrid.3tera.net).

New Application Name

Optional new name for exported application. If a new name may not be specified, the exported application may have the same name as the local application being exported.

Figure 53:
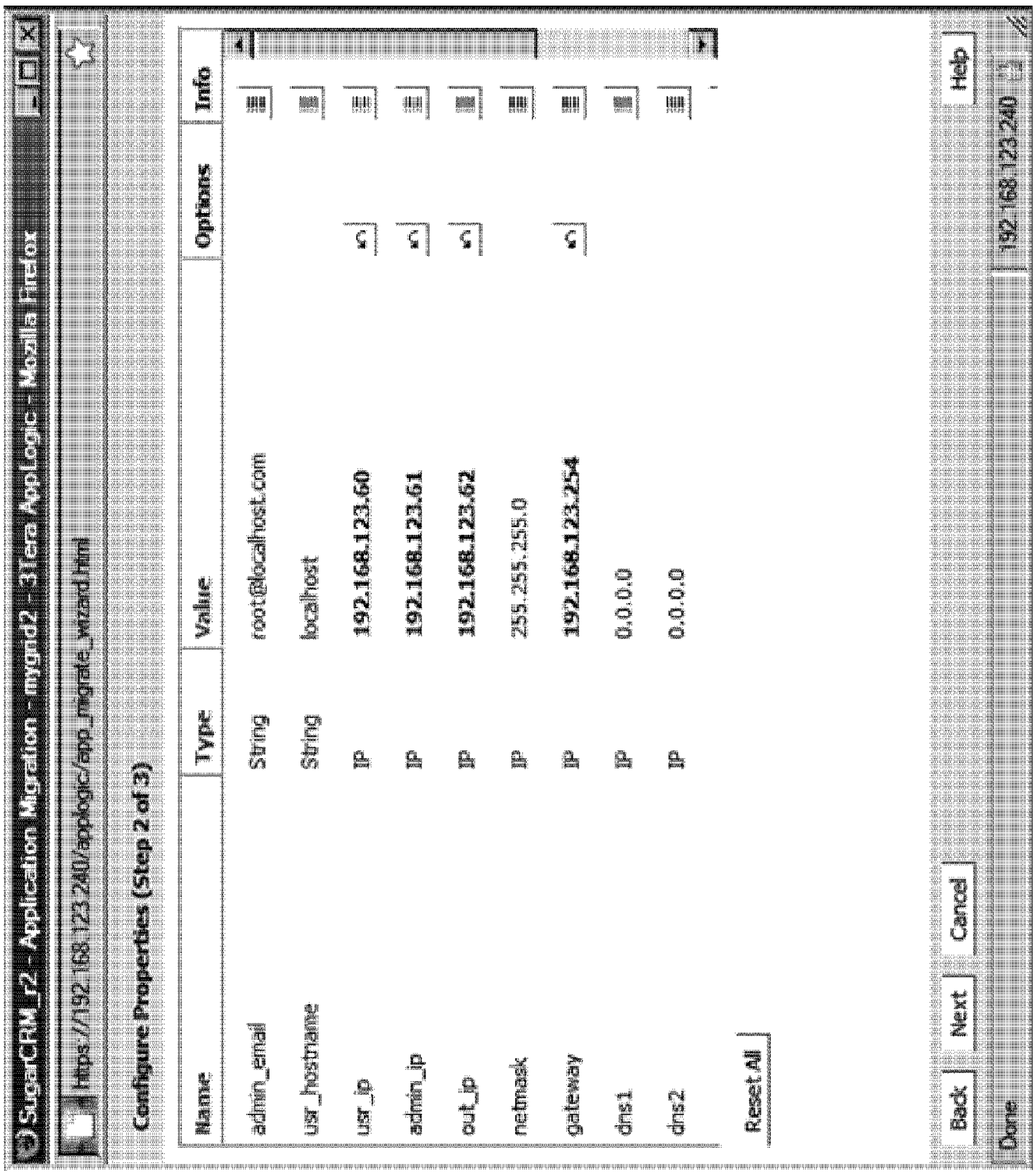

Configuration Properties (Step 2 of 3) (FIG. 53)

The 'Configuration Properties' dialog of the wizard allows one to set values for properties of the application, allowing one to specialize this instance of the application. This may be useful for configuring location-specific parameters, such as IP addresses, and for configuring tuning parameters, such as cache sizes.

The default values of the properties are shown in normal font weight. Property values explicitly configured for this application are in bold. Mandatory property values that have not yet been configured are highlighted in red.

For information on the property, its type and allowed values, select the info button . To restore the default value of a property, press the restore button (use the "Reset All" button to reset the values of all properties to their defaults).

Figure 54:
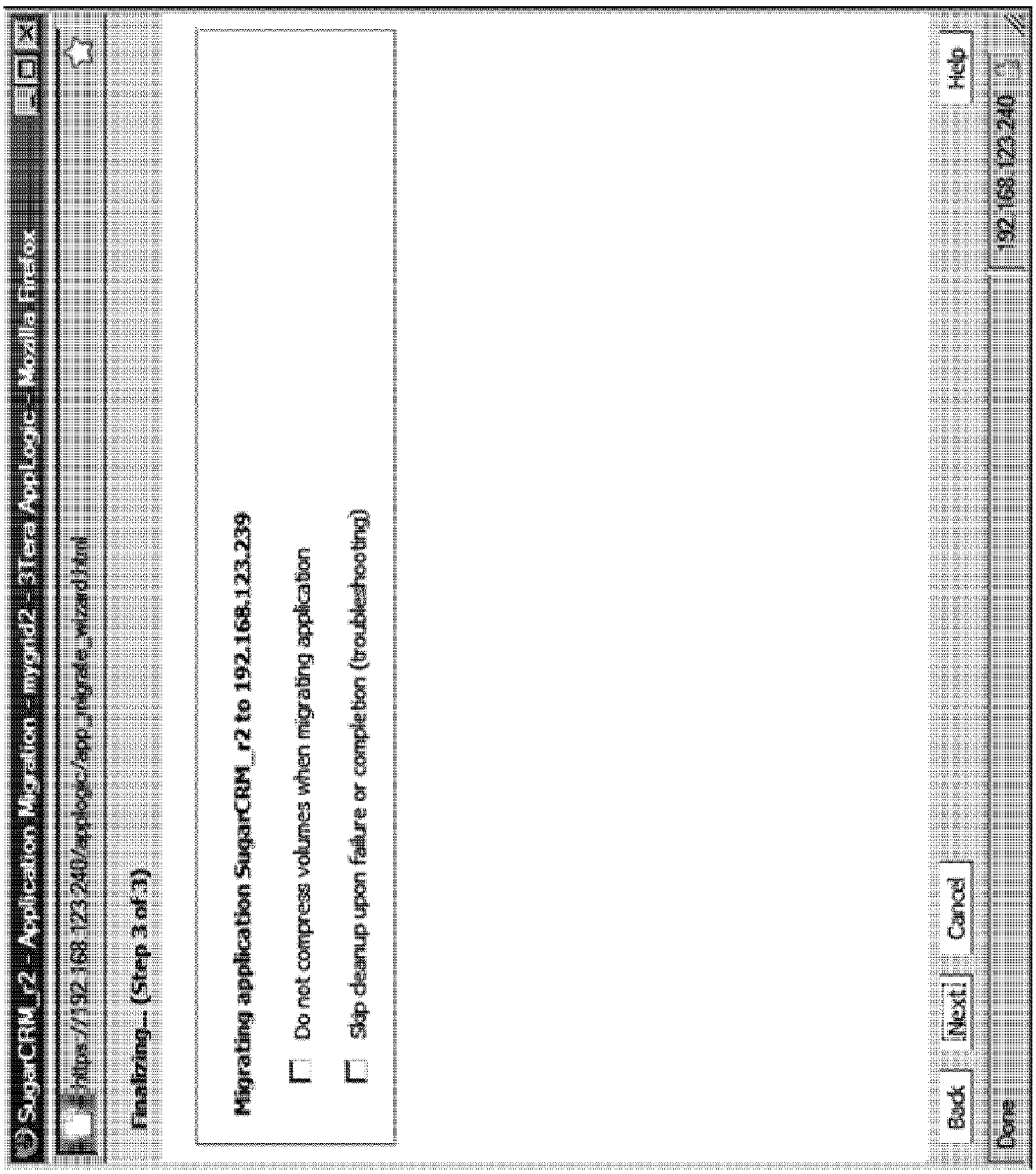

Finalizing (step 3 of 3) (FIG. 54)

The 'Finalizing' dialog of the wizard allows for one to specify the following:

Do not compress volumes when migrating application

Select this option to disable compression when transferring volumes for the application. This option may speed up the operation if the application includes very large volumes.

Skip cleanup upon failure or completion (troubleshooting)

Select this option to not cleanup the imported application if a failure may be encountered.

Figure 55:
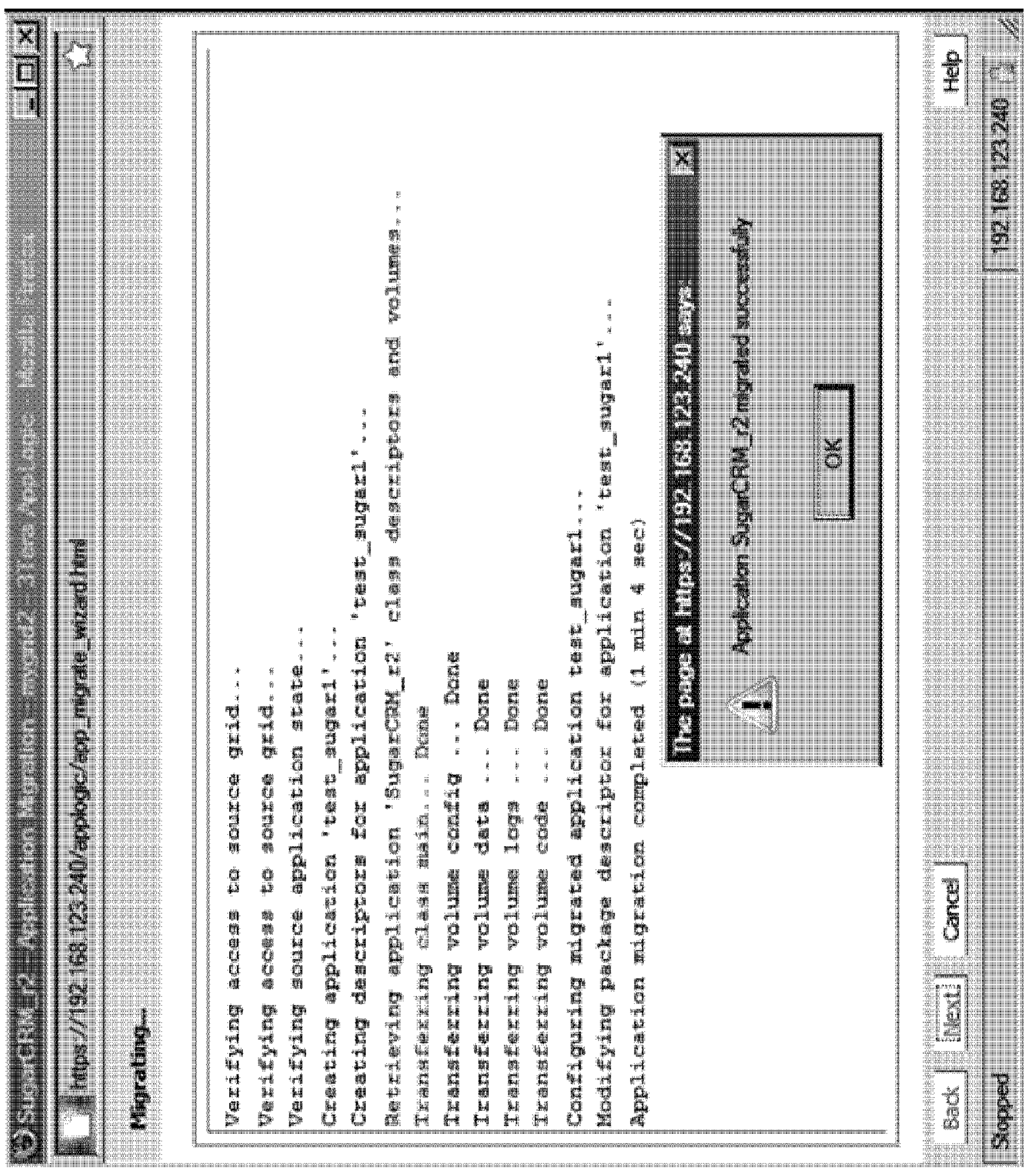

Migrating (FIG. 55)

The 'Migrating' dialog of the wizard shows the overall progress for the application export operation.

Class Editor—Simple Appliances

FIGS. 55-64 show various example embodiments of graphical user interfaces (GUIs) which may be used for implementing one or more features/aspects relating to configuration of appliance classes, boundaries, and/or other characteristics, including editors relating thereto.

The Class Editor property sheet allows one to define the boundary of an appliance class and set the bindings between the class boundary and the appliance internals.

To reach the Class Editor property sheet in the editor: select an appliance shape on the canvas, open the right-click menu and select Modify Boundary or View Boundary. The Class Editor property sheet can also be reached by selecting an appliance shape on the canvas, opening the Appliance menu and selecting the Modify Boundary or View Boundary option.

In at least one embodiment, the class editor may be organized in 6 sections (tabs):

General

Interfaces

Volumes

Properties

Config Files

Resources

Notes

Notes:

The descriptions here are written assuming one may understands the concepts described in the AppLogic™ Overview. Short definitions of some terms are also available in the Glossary.

AppLogic™ has different class editors for simple appliances and for assemblies. It automatically selects the appropriate class editor based on the type of appliance one may edits. The class editor for assemblies may be described in Class Editor—Assemblies.

The class editor may be read-only for catalog classes. See Branching Classes for details on how to customize an existing class or create a new singleton class using the New Singletons section in the editor catalog.

Figure 56:
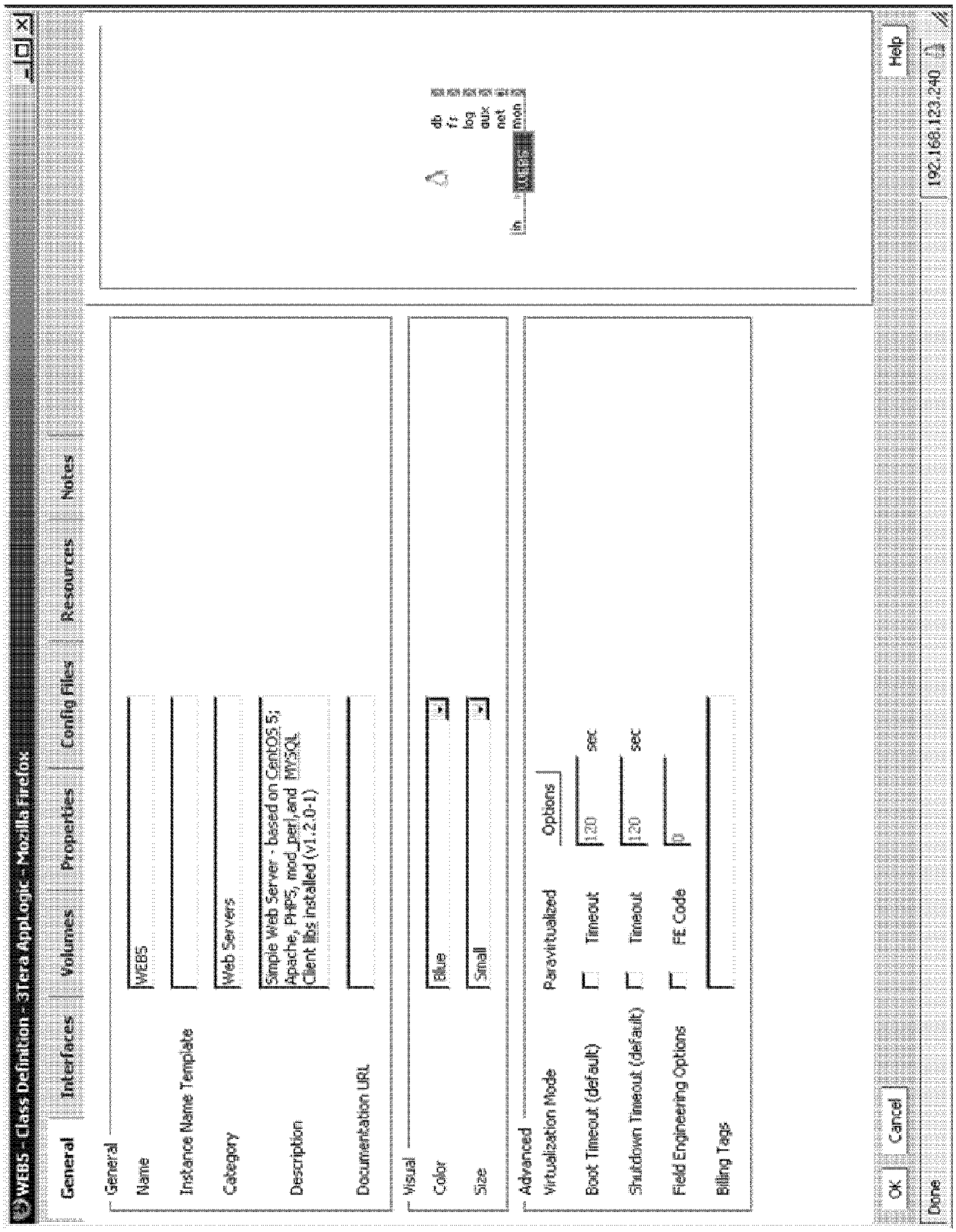

General (FIG. 56)

The General tab describes the appliance class as a whole and also includes some advanced settings.

General Attributes

Name

Class name. Defines the name of the appliance class. This name may be shown in the bottom left side of each appliance shape on the canvas. If the appliance may be placed in a catalog, the class name may be also shown in the catalog. The name may be a single word, case-sensitive, alphanumeric ([A-Za-z0-9_]).

Instance Name Template

Template from which appliance instance names are generated. When a template may be specified, the first instance may have the same name as the template and subsequent instances may have names comprised of the template followed by a number. If no template may be specified, the name of the class may be used as the template.

Category

Category of the appliance. The category may be a short alphanumeric phrase describing the group (category) of appliances within a catalog that the appliance belongs to. If the appliance may be placed in a catalog, all appliances from the same category are grouped together in a section.

Description

Free text description of the appliance. Typically the description includes definition of the appliance's function, some distinguishing details (separating an appliance from other similar appliances), as well as the key software package(s) used inside the appliance.

Documentation URL

Specifies the URL where the class documentation can be found.

Visual Attributes

The following attributes determine the visual appearance of the appliance shape:

Color

The color of the appliance shape, as shown on the canvas and in the catalog.

Size

The width of the appliance shape when shown on the canvas.

It may be useful to keep color choices consistent by appliance category—this makes completed applications look better.

It may be recommended to use shape size proportional to the importance and complexity of the appliance.

The height of the appliance adjusts automatically based on the number of terminals.

Advanced Attributes

The following attributes determine special and diagnostic features for the appliance class.

Virtualization Mode

Specifies the type of virtualization to be used for the appliance. AppLogic™supports the following virtualization modes: Paravirtualized and Hardware Emulation.

Boot Timeout

The default value of the boot timeout for the appliance—the time, in seconds, that AppLogic™ allows the appliance between the start of boot and the moment the appliance needs to indicate to AppLogic™ that it has completed boot and may be operational. See Appliance Creation Guide for details. One recommend that one may leave this setting empty, so that AppLogic™ may use the system-wide default timeout.

Shutdown Timeout

The default value of the shutdown timeout for the appliance—the time, in seconds, that AppLogic™ allows the appliance between the start of shutdown and the moment the appliance needs to indicate to AppLogic™ that may be has shutdown. One recommend that one may leave this setting empty, so that AppLogic™ may use the system-wide default timeout.

Field Engineering Options

This may be a numeric value that enables diagnostic or other special features of AppLogic™ for the appliance class; this setting affects all instances of the appliance. For a list of available codes and precautions when using them, see Field Engineering Codes. In short, do not enable this option unless directed by a support engineer.

Billing Tags

Comma separated list of name=value pairs that can be used for billing purposes.

Figure 57:
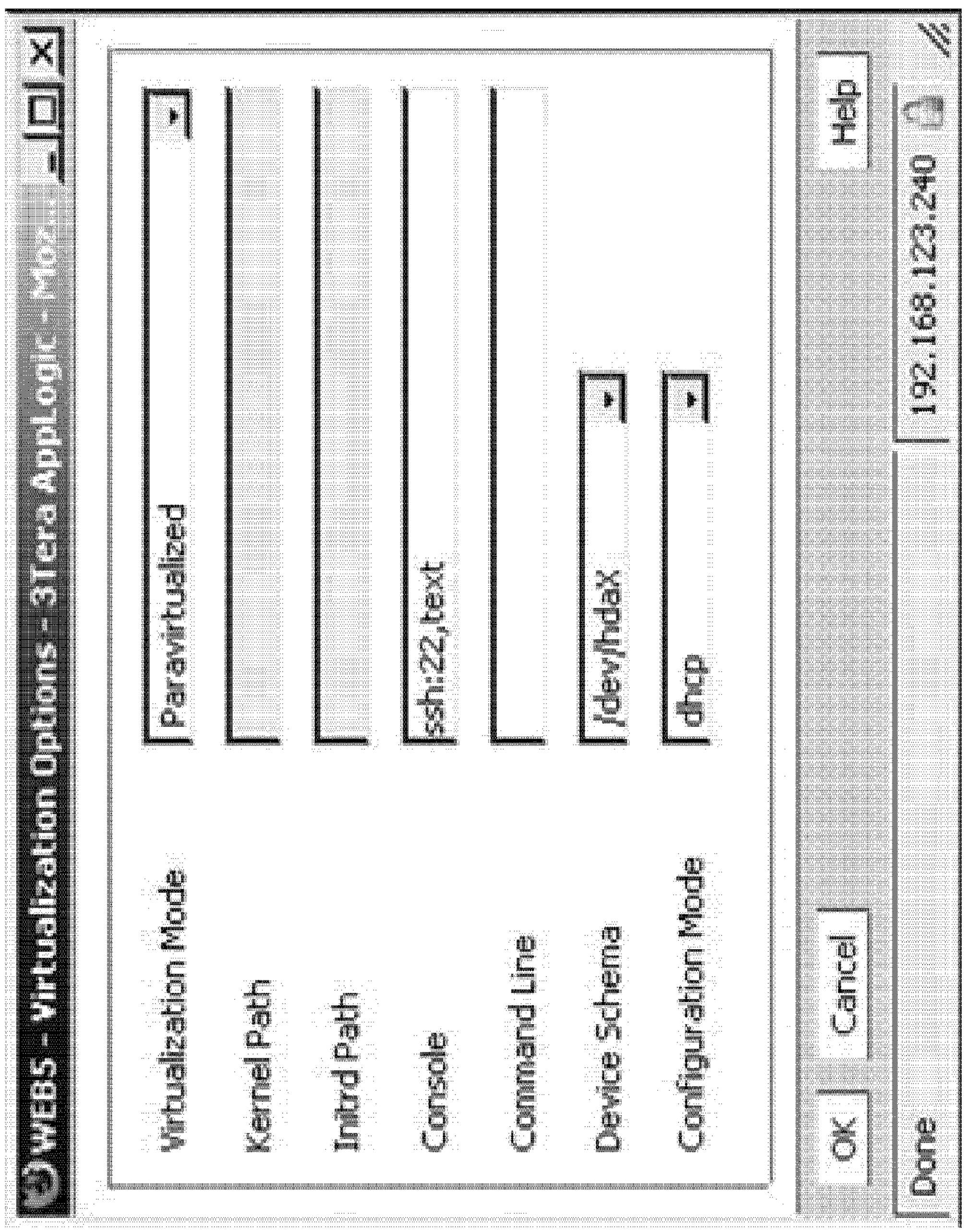

Advanced Virtualization Mode Settings—Paravirtualized (FIG. 57)

The following advanced settings are available by clicking on the Options button when the virtualization mode may be set to paravirtualized:

Kernel Path

Path to the file containing the OS kernel on the appliance boot volume. The path may be relative to the boot volume root directory. If a kernel path may not be specified, the appliance uses pygrub in order to start. See Appliance Creation Guide for more details on choosing the correct kernel.

Initrd Path

Path to the file containing the boot initrd image on the appliance boot volume. This path may be relative to the boot volume root directory. If an initrd path may not be specified, the appliance uses pygrub in order to start. See Appliance Creation Guide for more details on choosing the correct initrd image.

Console

Specifies the types of consoles that are supported by the appliance. The value of this setting may be a comma separated list of one or more of the following:

- ssh:port—access console via SSH on port port.
- web:port—access management interface via HTTP on port port. Allows appliance to expose a HTTP management interface on the default interface of the appliance that may be accessible via the manage operation from the AppLogic™ Editor. See Appliance Web Interface topic for more information.
- text—appliance exposes a text-based boot console—Supported only for Linux and Solaris-based appliances.
- In addition, any of the above strings can be prefixed with default: which specifies that the subsequent console type may be the default login console for the appliance. For example, ssh:22, default:text specifies that the text boot console may be the default login console for the appliance that may be used in comp login comp-name. The default: prefix may not be valid for web.

Command Line

Additional parameters to be specified on the kernel command line when the appliance boots. This setting can be used to pass parameters to high-level drivers running in the appliance, such as file systems and network stacks. For Linux appliances, the kernel command line syntax may be space-separated param=value pairs. This setting may be optional and may be usually empty.

Device Schema

Specifies the schema by which the appliance operating system recognizes disk devices. For example, Linux recognizes disk devices as /dev/hda1, /dev/hda2 . . . /dev/hdaX. The device schema may be used by AppLogic™ to auto-assign devices to new volumes that are added to the appliance class. The devices are stored in the class descriptor and can be used by the appliance to access its volumes. The following device schema are supported:

- /dev/hdaX—typically used for Linux distributions
- /dev/dsk/c0dX*—Solaris 10/!OpenSolaris Configuration Mode

- Specifies the mechanism by which the appliance retrieves its configuration. The following mechanisms are supported:
- volfix—Appliance's property settings and network configuration are applied directly to the appliance's boot image during the application build process. This mode may be currently valid only for Linux-based appliances.
- dhcp—Appliance retrieves its configuration dynamically during its boot phase. Appliances that use this configuration method build/start much faster than when the volfix configuration mode may be used (as AppLogic™ does not have to fixup the appliance volumes before starting the appliance). This may be a new mode that was introduced in AppLogic™ 2.3. In order to specify the configuration mode as dhcp, the appliance may preferably have the AppLogic™Appliance Productization Kit (APK) installed. See the APK User Manual for more information.

Figure 58:
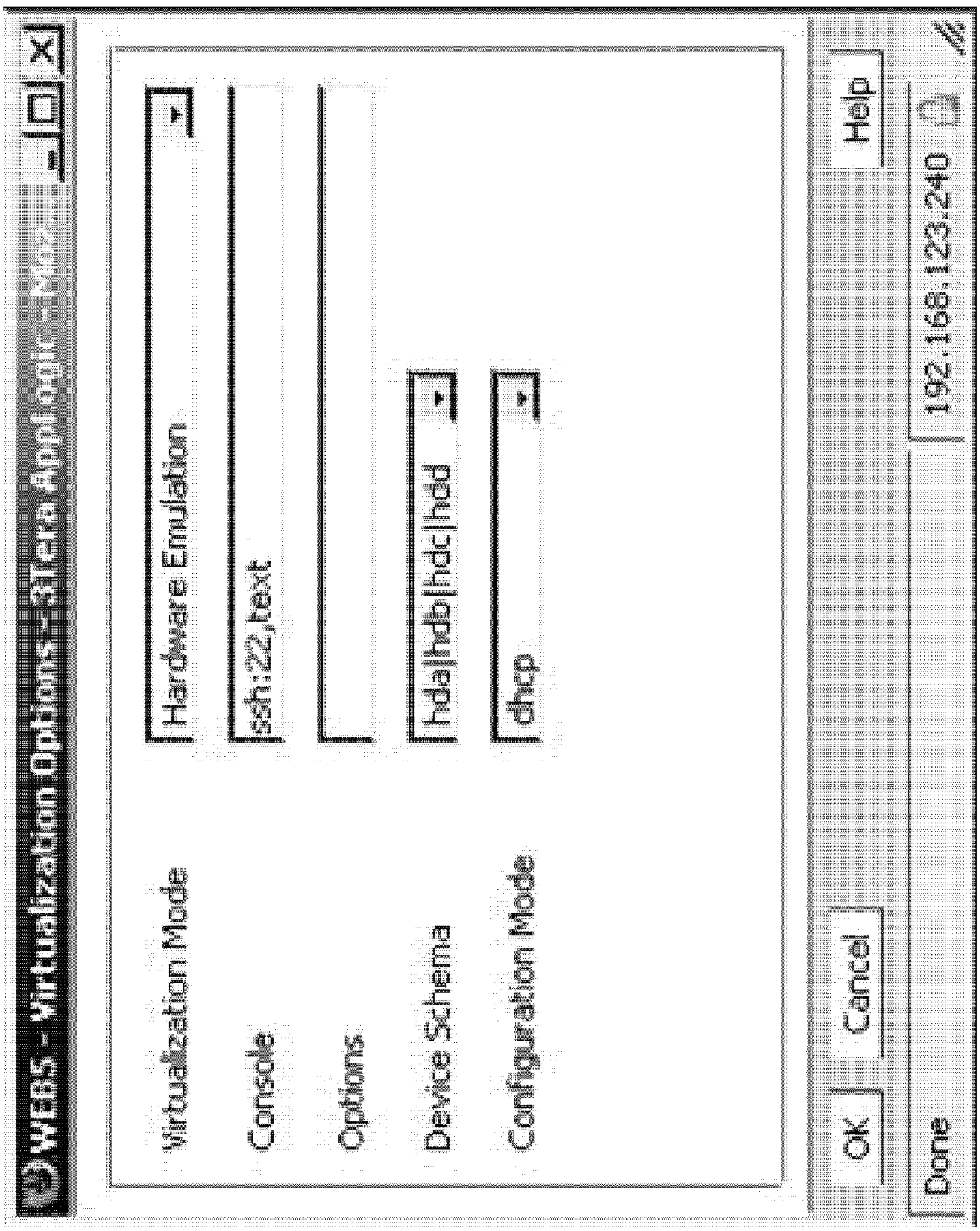

Advanced Virtualization Mode Settings—Hardware Emulation (FIG. 58)

The following advanced settings are available by clicking on the Options button when the virtualization mode may be set to hardware Emulation:

Console

Specifies the types of consoles that are supported by the appliance. The value of this setting may be a comma separated list of one or more of the following:

- ssh:port—access console via SSH on port port.
- web:port—access management interface via HTTP on port port. Allows appliance to expose a HTTP management interface on the default interface of the appliance that may be accessible via the manage operation from the AppLogic™ Editor. See Appliance Web Interface topic for more information.
- text—appliance exposes a text-based boot console. Supported only for Linux and Solaris-based appliances.
- graphic—appliance exposes a graphic console (e.g., Windows desktop).
- In addition, any of the above strings can be prefixed with default: which specifies that the subsequent console type may be the default login console for the appliance. For example, ssh:22,default:text specifies that the text boot console may be the default login console for the appliance that may be used in comp login comp-name. The default: prefix may not be valid for web.

Options

This setting may be only available when the virtualization mode may be set to Hardware Emulation and comprises a space separated list of options in the format of option=val that affect how the appliance may be started. The following options are supported:

- acpi=val—Enable/disable Advanced Configuration and Power Interface. Default may be 0.
- apic=val—Enable/disable Advanced Programmable Interrupt Controller. Default may be 1.
- pae=val—Enable/disable Physical Address Extension. Default may be 1.
- ne2000=val—Enable/disable NE2000 support. Default may be 0.
- localtime=val—Enable/disable booting using localtime instead of UTC. Default may be 1.
- serial=val—Enable/disable BIOS serial console redirection. Default may be 1.
- diskemu=val—Enable/disable disk hardware emulation. Default may be 1.
- ethemu=val—Enable/disable NIC hardware emulation. Default may be 1.

Device Schema

Specifies the schema by which the appliance operating system recognizes disk devices. For Hardware Emulated appliances, this setting may preferably be set to hda,hdb,hdc, hdd. The device schema may be used by AppLogic™ to auto-assign devices to new volumes that are added to the appliance class. The devices are stored in the class descriptor and can be used by the appliance to access the volumes.

Configuration Mode

Specifies the mechanism by which the appliance retrieves its configuration. For Hardware Emulated appliances, this setting may preferably be set to dhcp and the appliance may preferably have the AppLogic™ Appliance Productization Kit (APK) installed. See the APK User Manual for more information.

Figure 59:
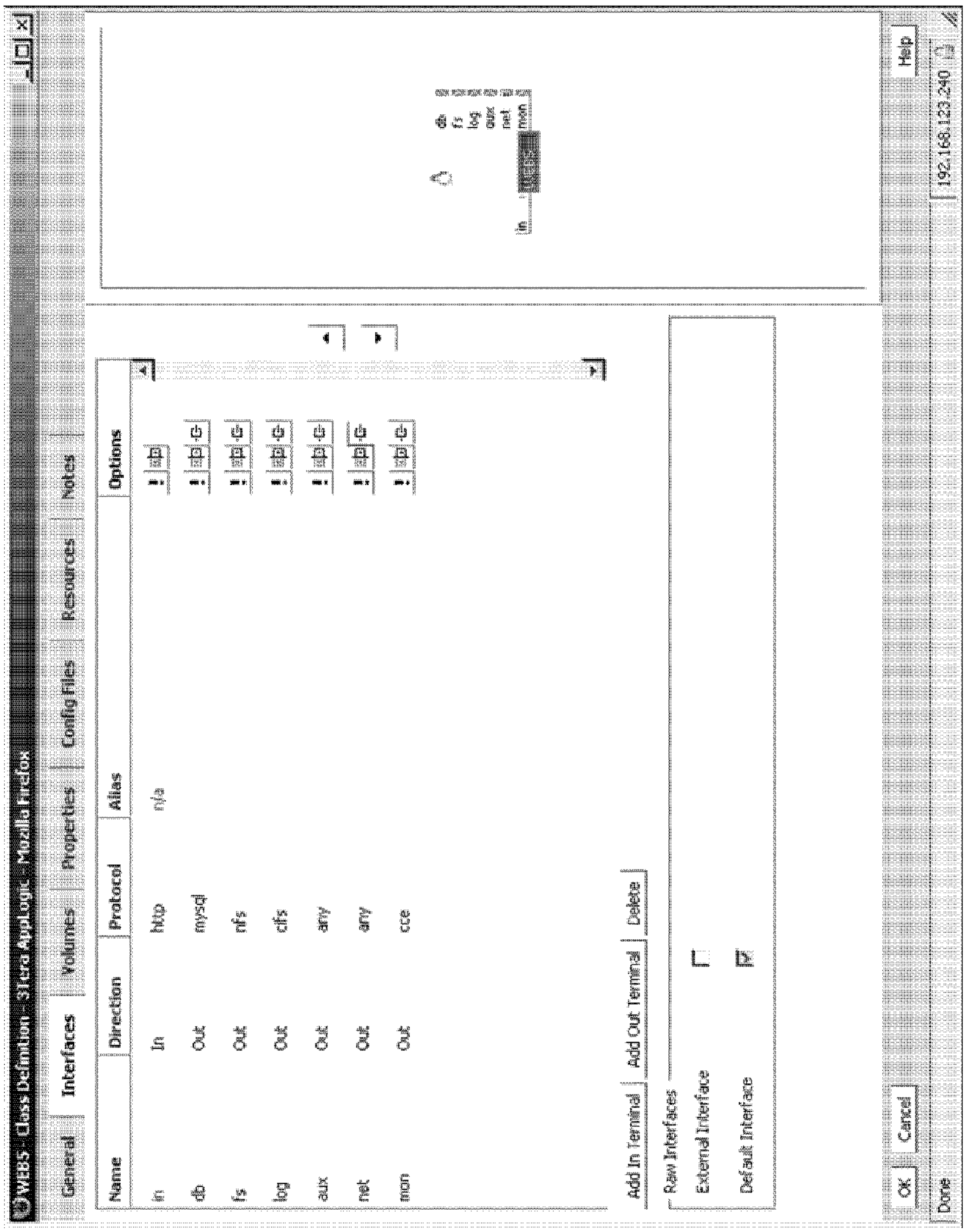

Interfaces (FIG. 59)

The Interfaces tab defines the network interfaces for the appliance. There are two types of network interfaces:

- terminals, which are used to connect the appliance to other appliances
- raw interfaces, which are used for interacting with entities outside of the application.

Most appliances may preferably use only terminals for their interactions (see the AppLogic™ Overview if this may not be obvious).

See OS Limitations for details related to the maximum number of interfaces supported by each OS.

Terminals

The appliance terminals are named network interfaces, through which the appliance interacts with other appliances in the same application. The terminals have direction—input or output. The terminal direction determines whether the appliance originates connections or accepts connections.

Looking from inside an appliance, the terminal may be a host name visible only to that appliance instance. The terminal name of an input terminal can be used inside the appliance to set up a listening socket for accepting connections. The terminal name of an output terminal resolves to whatever appliance may be connected to the output and can be used to establish connections to that appliance.

Each input terminal can have many appliances connected to it. Each output terminal can be connected only to a single appliance. For more details see AppLogic™ Overview and Appliance Creation Guide.

Name

Name of the terminal, representing the role of the interface within the appliance. It may be a single word, case-sensitive, alphanumeric ([A-Za-z0-9_]). Terminal names are usually lowercase and short—3 to 4 characters, so that they fit in the appliance terminal shape.

Direction

Direction of the terminal: input or output. The direction determines whether the appliance originates connections (client-side of most protocols) or accepts connections (server-side of most protocols). The direction determines only where the connection originates from; the appliance can pass data in and out of any terminal.

Protocol

Application-level (layer 7) protocol that may be used for connections on this terminal. Selecting the correct protocol allows AppLogic™ to enforce certain aspects of the communication and, more importantly, to provide protocol-specific statistics, such as response time for the traffic passing through the terminal. In case the appliance may be protocol-agnostic, select Any. The Any protocol also allows connections to be established from an output terminal to an input terminal (bi-directional terminals). To define new protocols, see the Protocols tab on the Application Configuration property sheet.

In this release, this setting may be ignored; however, if one may configure it correctly, one may be able to use the advanced connection features when they become available.

Alias

Alias of the terminal name that can be used inside the appliance to refer to the terminal. The alias can be any valid DNS name (RFC 1035). That DNS name may be available inside the appliance as an alias to the terminal name. Aliases are useful when some application inside the appliance may be hard-coded to access an external service via fixed host name (e.g., server1.mycompany.com). The alias attribute may be available only for output terminals.

Options

Optional terminal attributes that can be set on the terminal:

! The mandatory attribute marks the terminal as mandatory to connect for normal operation of the appliance. Typically inputs are non-mandatory and outputs are mandatory.

The switch-sides button makes the terminal appear on the other side of the appliance shape. It may be useful for feedback terminals whose connection direction goes opposite to the general left-to-right flow. This attribute affects only the visual appearance, it has no runtime impact.

The gateway attribute makes an output terminal a default gateway interface for the appliance. A gateway output allows the appliance to access multiple hosts and resolve DNS names through that output. Typically, gateway outputs are used to connect appliances to the subnet gateway appliance ([GatewayOutNet][NET]]). Only one output of an appliance can be selected as a gateway. Most appliances don't have gateway outputs.

The order of the terminals in the list, as well as in the appliance shape, can be modified by selecting a terminal entry in the list and using the up and down arrow buttons on the right side of the list. This may be especially useful for appliances that have more than one terminal on one of the sides.

If a mandatory terminal may not be connected, the application may not start. This ensures that configuration constraints are met and prevents many configuration errors from happening. AppLogic™ may report the name of the appliance and the terminal that failed the check, so that one may easily locate and fix it.

Raw Interfaces

The raw interfaces allow the appliance to interact with entities outside of the application.

External Interface

This option enables the appliance to interact with other applications and with any host accessible on the network (external interactions). In hosted AppLogic™ environments, the external interface has access to the Internet, so make sure the appliance may be properly firewalled and otherwise protected if one may enable the external interface. The appliance may be responsible to fully configure the external interface, including its IP address, gateway, etc. See the Appliance Creation Guide for more details. Typically, only gateway appliances need to have the external interface enabled.

If in doubt, keep the external interface disabled (and contact Technical Support for discussion).

Default Interface

This option allows the appliance to interface with the AppLogic™ system, specifically permitting authorized secure shell (ssh) connections to the appliance.

In this release the default interface cannot be disabled, since it may be used by appliances to report that they have started. Even if one may uncheck this option, the default interface may be enabled.

Figure 60:
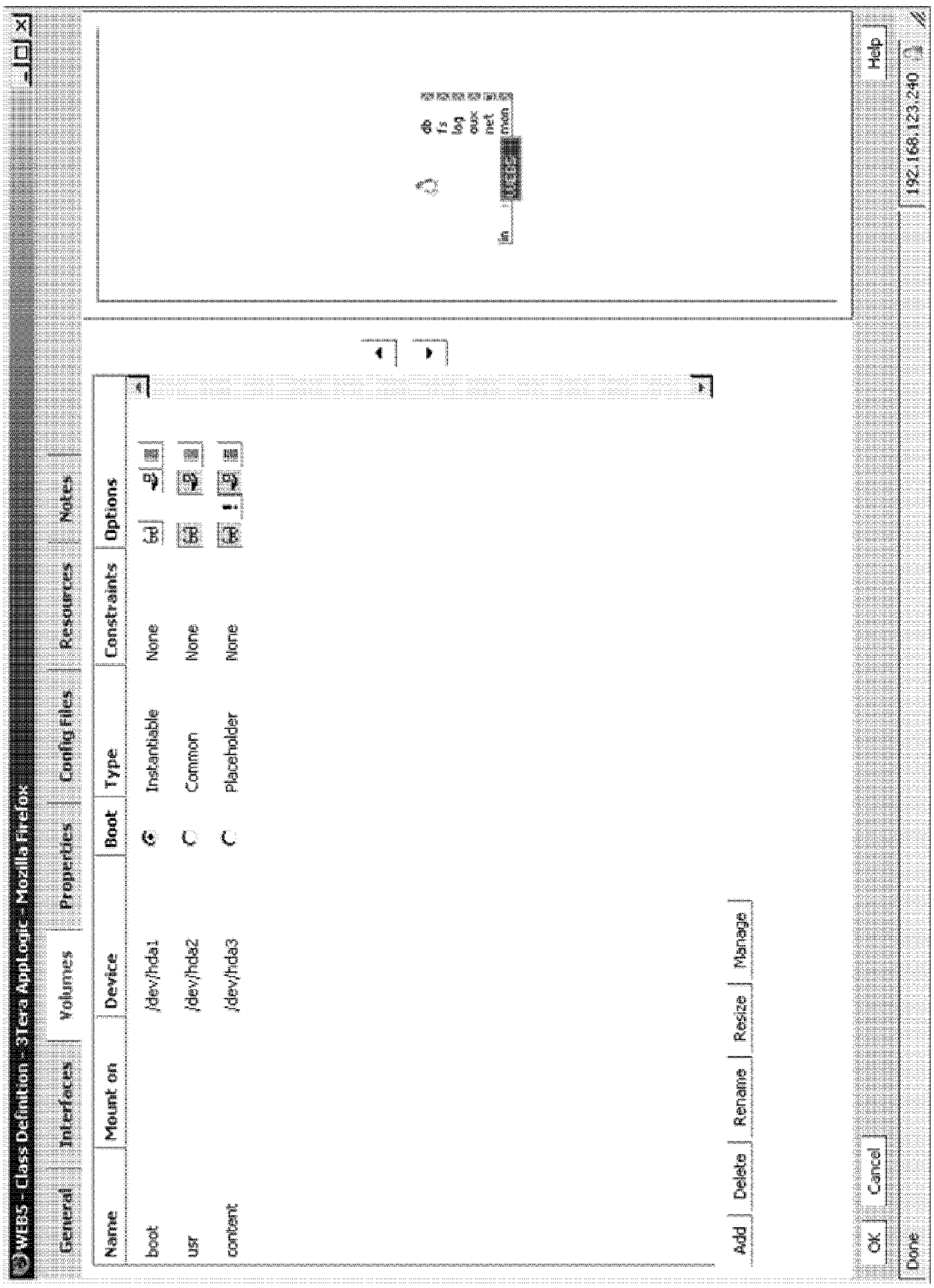

Volumes (FIG. 60)

The Volumes tab allows one to create and destroy the set of volumes required for the operation of the appliance.

See OS Limitations for details related to the maximum number of volumes supported by each OS.

Volume Information

For each volume, the following fields are defined:

Name

Logical name of the volume within the appliance. This name represents the role of the volume for the appliance class. It may be a single word, case-sensitive, alphanumeric ([A-Za-z0-9_]).

Mount on

Path where the volume may be automatically mounted inside of the appliance (e.g., /mnt/data). If left empty, it may be up to the appliance to mount the volume.

For Windows appliances, boot volumes may only be mounted as c or c:\. The mount path for non-boot volumes can be only one of the following: letter, letter:\, or c:\path where letter may be any valid drive letter except for c and path may not be empty.

The mount path for the boot volume does not need to be set to c or c:\ as this may be done automatically by AppLogic™.

This feature may be only available if the Configuration Mode may be set to dhcp.

Device

Name of a device, on which AppLogic™ makes the volume available to the appliance. For Linux appliances this may be typically in the form of /dev/hdaN, where N may be a digit between 1 and 9. The appliance itself determines in its /etc/fstab configuration file how and where in the filesystem hierarchy the volume may be mounted unless Mount on path may be specified.

Boot

Determines the boot volume for the appliance. Each appliance may preferably have a boot volume, otherwise it may not start. See the Appliance Creation Guide for more information on how to create an appliance boot volume.

Type

Volume type. AppLogic™ supports the following volume types:

Instantiable: A class volume of the appliance that needs to be instantiated for each appliance instance. AppLogic™ makes a separate copy of such volumes for each instance of the appliance. Most boot volumes are of this type. Press button to create a new volume.

Placeholder: A placeholder for a volume that can be configured with an application volume for the appliance instance. The appliance class itself does not carry the volume. Each appliance instance may be configured explicitly with a volume from the application. Most content, data and code-containing volumes are of this type.

Common: This type of class volume may be shared between all instances of the appliance class. All instances access the same volume and it may preferably be read-only. No separate copy of the volume may be made.

This volume type may be useful for large read-only data sets that are not used heavily.

Blank: An empty volume, that may be created for each appliance instance.

The blank volume type may be similar to the instantiable volume type, except that no template volume exists for the class and instance volumes are created empty (unformatted). This type of volumes may be useful for appliances that hold user data (like database and other).

Size

Volume size for blank volumes. This field defines the size of the volume that AppLogic™ may create. The size may be specified as integer with optional M or G suffix (e.g., 256 M). This field may be shown and needed only for volumes of type blank. For all other volumes, AppLogic™ gets the volume size from the volumes themselves.

Constraints

Performance constraints for the volume. AppLogic™ supports three volume constraints: none, high bandwidth and local only. For volumes requiring high-bandwidth access, AppLogic™ tries to schedule the appliance on the same server where the volume resides. If this may not be possible, AppLogic™ logs a warning but it nevertheless runs the application. For volumes set here as requiring local-only access, AppLogic™ may not start the application unless it can ensure that the appliance can run on the same server where the volume may be.

Options

A set of important volume options described below.

The mandatory attribute makes the placeholder volumes required (currently all volumes are required, so this attribute may not be used).

The read-only attribute makes the volume read-only (write-protected) for the appliance The shared attribute marks the volume as shareable between appliances (see a number of cautions below)

When there may be no Mount on path specified, it may be the responsibility of the appliance to mount a volume itself whenever it needs it in the file system and needs to select the r/o or r/w option on the mount within /etc/fstab to specify the type of access to the file system. The R/O vs. R/W setting in the editor does not affect how the appliance mounts the volume but only how it can mount it. For example, if a volume may be specified as R/O in the editor then the appliance can only mount the volume as R/O. However, if the volume may be specified as R/W in the editor, the appliance may mount the volume as R/O or R/W.

Volume Operations

Add

Add a new volume to the class. Press this button to create a new volume and assign it to the class.

Delete

Delete the selected volume. This operation permanently removes the volume from the class and from the grid. All volume content may be lost. There may be no undelete.

One may cannot remove a volume that may be currently used by the appliance.

Rename

Rename the selected volume.

Resize

Resize the selected volume. This operation changes the size of the volume.

Manage

Manage the selected volume. This operation provides access to the volume contents via a web browser. Files may be uploaded, downloaded, edited, deleted, etc. See the Volume Browser Reference for more information.

In some embodiments, the one or more of the following cautions may be noted:

- don't make a volume shared unless it may be also read-only (shared r/w access may corrupt the filesystem)
- don't make boot volumes read-only unless one may have configured the boot volume specifically for this
- when making a volume read-only, make sure that /etc/fstab may be properly configured for read-only mount
- when designing the set of volumes for appliances, keep the user data on a placeholder volume
- when possible, use instantiable volumes instead of blank volumes—they are easier
- Combining the read-only and shared attributes allows one to share read-only volumes between appliances. Further, one may define properties to configure root directories, so that multiple appliances can use the same volume to obtain different file sets from it (e.g., HTML content, application code, etc.)

One may arrange the order of the volumes in the list using the up and down arrows. The order affects only how the volumes may be shown to one may in the property sheets; it has no runtime impact.

Figure 61:
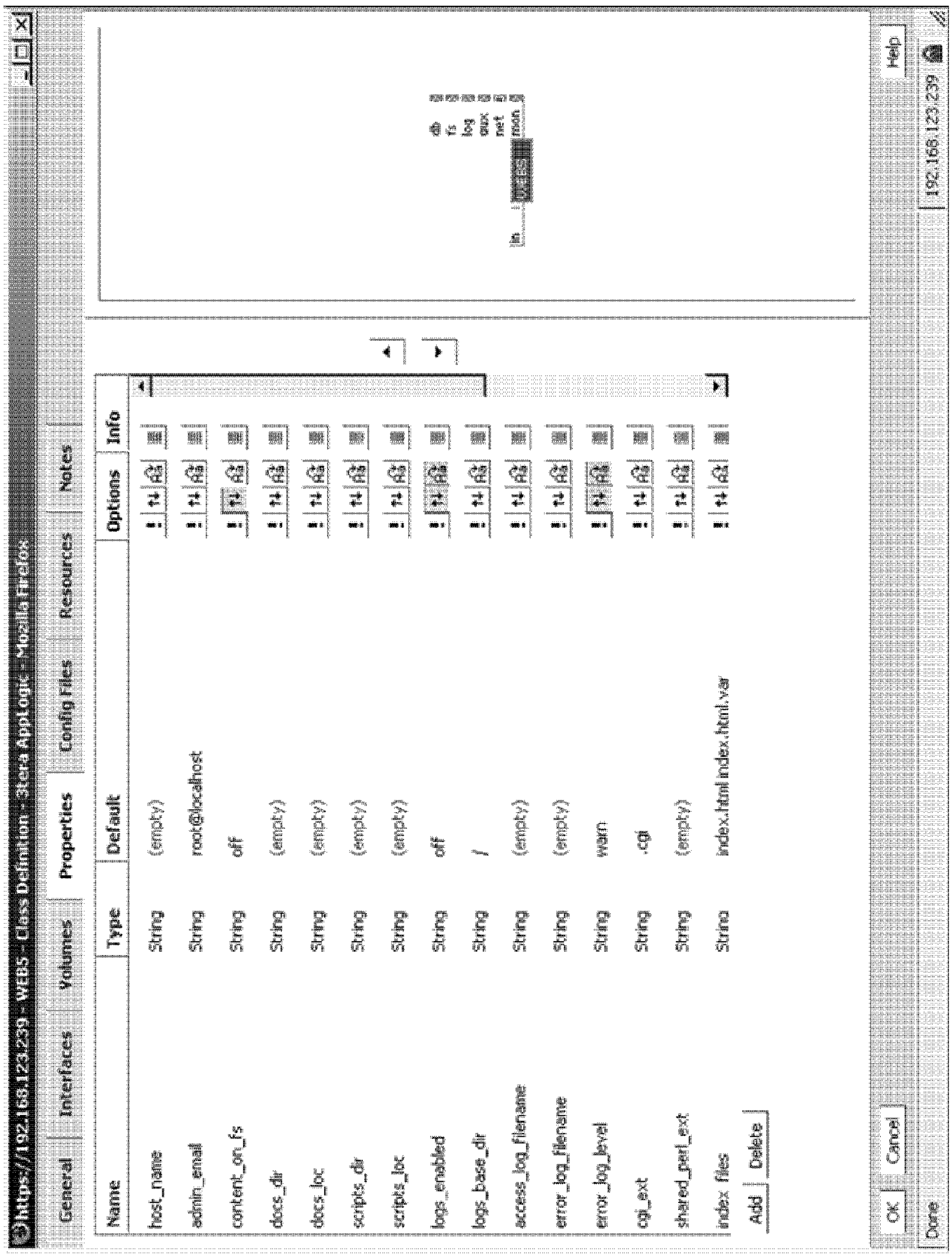

Properties (FIG. 61)

The Properties tab defines the properties that may be available on the appliances of this class. Properties are named configuration parameters for the appliance.

Defining Properties

AppLogic™ supports three property types: string, integer and IP address. One may make a property mandatory, requiring that its value be explicitly set on each instance. Alternatively, one may define a default value for the property and that value may be used, if no special value may be configured on an appliance instance.

The set of properties on an appliance class reflects the specific needs of the class. AppLogic™ passes the property values to the appliance without interpretation. One may are free to define whatever properties one may like.

Name

Name for the property. The property name uniquely identifies a property within the appliance. The property names are used to set property values in the Instance Settings property sheet. The property names are also used inside the appliance to match the property values to configuration parameters (see Appliance Creation Guide for details).

Type

Type of the property. AppLogic™ supports three property types: string, integer and IP address. The type constraints the possible property values (for other constraints options, see below).

Default

Default value for the property. This value may be used if no value may be specifically defined for the property in an appliance instance. Most properties may preferably have defaults. One may leave the default value empty, in which case the default may be an empty string. One may also disable the default value by making the property mandatory (see below).

Options

Optional property attributes include the following:

The mandatory attribute marks the property as required to be set specifically on each appliance instance, making it so that the property has no defaults. Having a lot of mandatory properties makes it hard to use the appliance, so keep them to a minimum. Mandatory properties may be used only in cases where no default can be defined (e.g., the target host name in output gateways).

The constraints button opens a separate window, shown below that allows one to define value constraints for the property.

The lowercase attribute makes the property values not case sensitive. No matter what letter case may be used in for property values in the instances, the values may be lowercased by AppLogic™ when provided to the appliance. This attribute may be useful for things like DNS names and for properties that have pre-defined list of values (see below).

Info

In addition, pressing the info button provides a summary of the property attributes. This may be a quick way to see any constraints without opening the constraints window.

One may arrange the property order in the list by using the up and down buttons on the right side of the list. One recommend using the property order to make configuration more intuitive: group the more important properties at the top; arrange the properties in the order in which it may make sense to configure them (e.g., IP address, netmask and then gateway).

Property Constraints

Figure 61A:
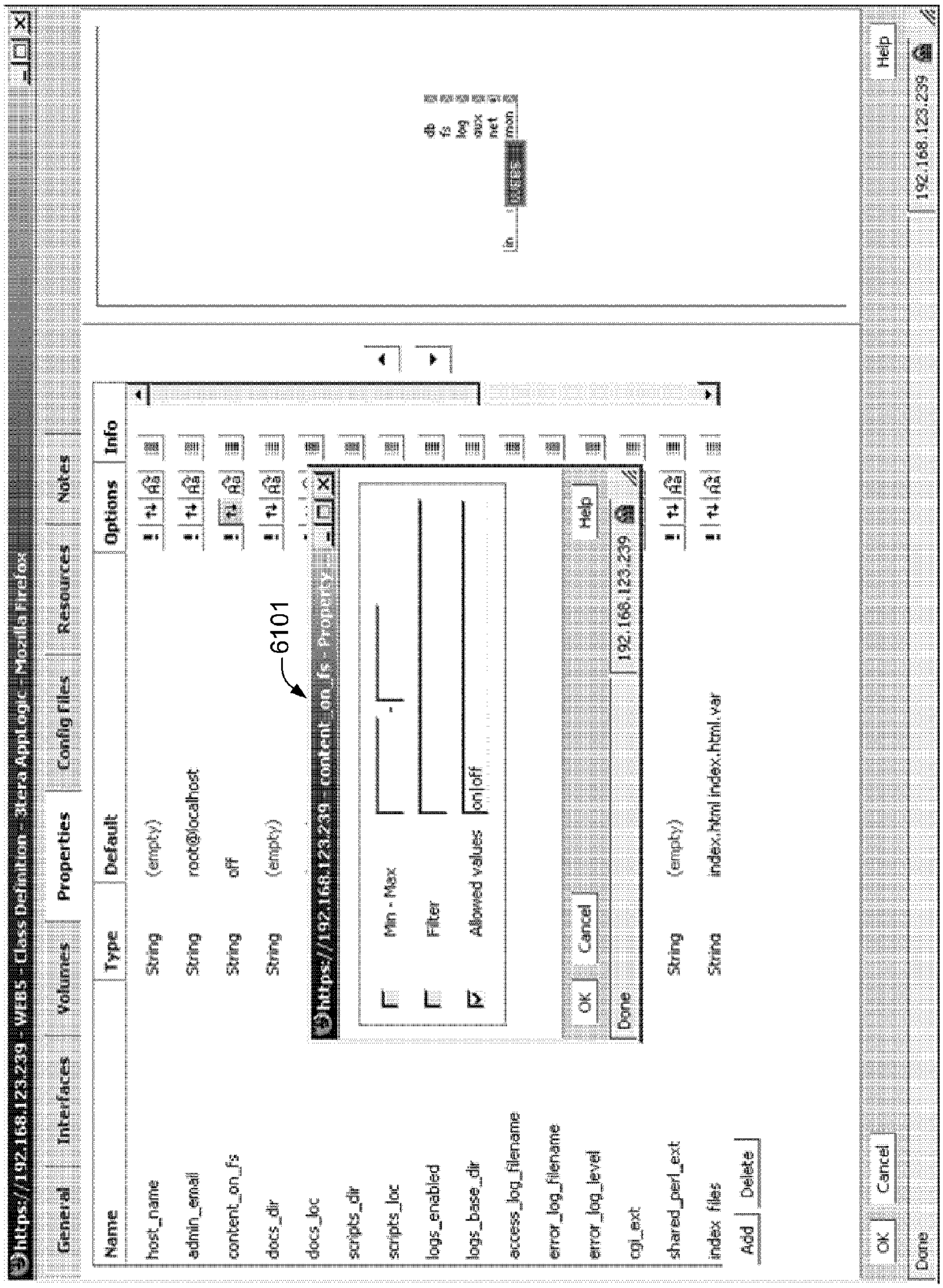

If one wants to define value constraints for a property, press the constraints button ⇅ This may open the constraints setup window (FIG. 61A, 6101):

In at least one embodiment, AppLogic™ supports at least three types of constraints:

Min-Max

The min-max (range) constraint allows setting a minimum and a maximum value for integer properties. To limit only on one side of the range, leave the other side empty (e.g., specify only the minimum or only the maximum).

Filter

The filter constraint allows setting a regular expression for validating the property value. Regular expressions are fickle (very error prone), so use this constraint with care—or simply use the values constraint instead. The syntax of the filter may be the same as the Perl regular expression pattern matching (http://perldoc.perl.org/perlre.html). AppLogic™performs the match on the entire property value—that may be as if /^filter$/ was used in a Perl statement to check for a match (where filter may be the value of the filter attribute). One may use the filter constraint with any property type.

Values

The values constraint allows one to define an enumerated set of values for the property, limiting the possible property values. The syntax may be regular expression-like: literal values separated with vertical bar (|). For example, any|tcp|udp allows only any, tcp or udp as values for the property. One may use the filter constraint with any property type. For string properties, one may use the values constraint together with the lowercase property attribute to make the value set not case sensitive.

If a mandatory property may not be set or a property value constraints are not met, the application may not start. This ensures that configuration constraints are met and prevents many configuration errors from happening. AppLogic™ may report the name of the appliance and the property that failed the constraint check, so that one may easily locate and fix it.

Figure 62:
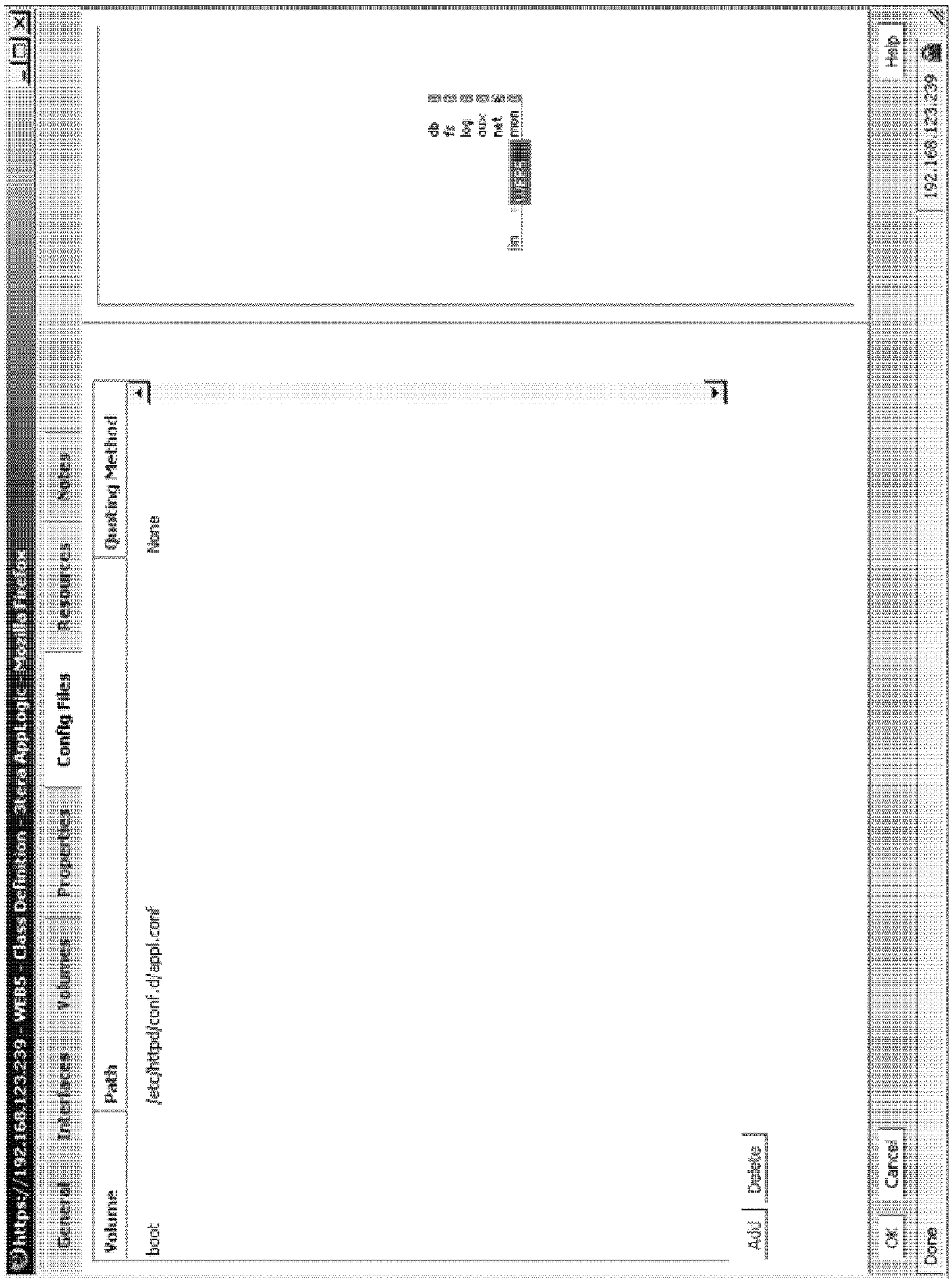

Config Files (FIG. 62)

The Configuration Files property sheet lets one may define a set of files on the appliance volumes that one may want AppLogic™ to modify. All property values set on the appliance instance may propagate to these files. Such files, for example, would be httpd.conf for Apache web server appliance, my.cnf for MySQL database appliance, etc.

Note: The Configuration Files property sheet may be only supported if the configuration mode for the appliance may be set to volfix. If the configuration mode for the appliance may be set to dhcp, configuration settings may preferably be handled internally by the appliance.

For each configuration file one may want AppLogic™ to modify, add an entry in this list.

Volume

The appliance volume where the configuration file resides. Typically this may be the boot volume, but in some cases one may want to have the a configuration file on a data volume. AppLogic™ can modify config files on instantiable and placeholder volumes that are not read-only.

Path

The path to the configuration file that needs to be modified, relative to the root of the volume. For example, this may be /etc/my.cnf for MySQL's config file.

Quoting Method

The method that AppLogic™ may use to quote meta-characters in the value. A "meta-character" may be any character that has a special meaning in the config file and may preferably be quoted (or "escaped") in some manner in order to appear as a data character and not in its special-function role. Based on the type of configuration file one may have, the quoting method can be set to one of the following values:

None or Conf—no quoting (default). The value may be stored in the config file as may be.

Bash, Perl or C—data values that are enclosed by quotes are assumed to use \" to mean the quote character and \\ to mean the backslash. Backslashes that don't quote a "or \ character are left untouched, e.g., if one may set a property value to "abc\def"ghi\n", the result written into the config file may be "abc\\def\"ghi\n". Values that are not surrounded by quotes are limited to alphanumeric characters. An error may be reported if such a property may be set to a value with other characters, even if the filter for that property allows it.

HTML—the characters that have significance in the HTML syntax (< >" and &) are encoded as < > " and &. For example, abc&def<ghi becomes abc&def<ghi in the config file.

One may change the order in the list by selecting an entry and using the up and down buttons on the right side of the list.

In order for AppLogic™ to properly modify the configuration files and know where to apply the instance property values, one may need to have those configuration files instrumented using the Property Markup Syntax. See the Appliance Creation Guide for more details.

In addition to configuration files one may add here, AppLogic™ also puts all property values in a small shell script file called /etc/AppLogic™.sh. One may use that file from shell scripts via the source /etc/AppLogic™. sh command. See the Appliance Creation Guide for more details.

Figure 63:
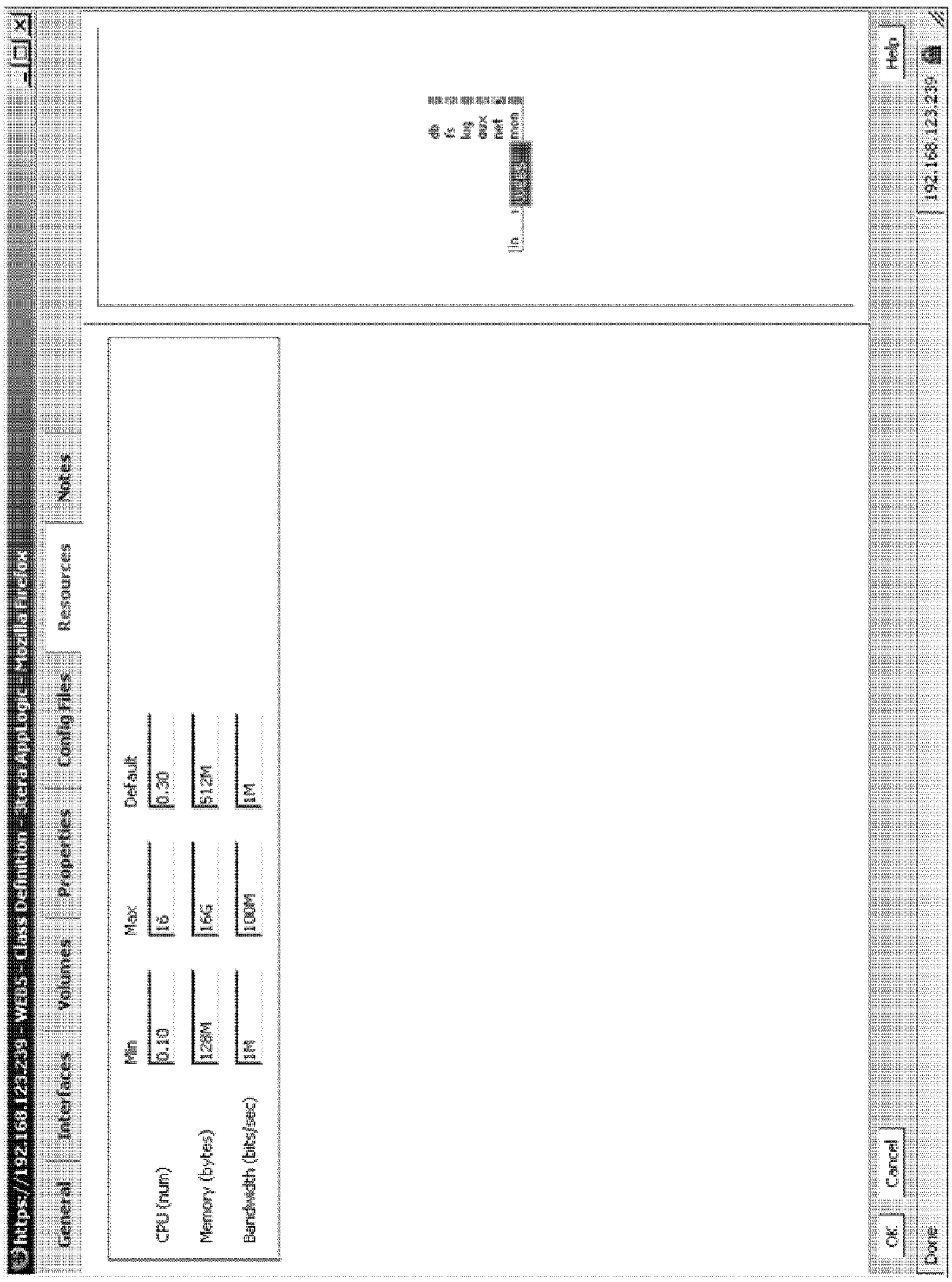

Resources (FIG. 63)

The Resources tab allows one to specify the amount of hardware resources that are needed for each instance of this appliance. One may select amount of CPU (percentage of a full CPU), memory and bandwidth needed by the appliance.

Resource Types and Specification

The following resource types can be specified:

CPU

Portion of a CPU to be allocated for each instance. Portions can be specified as percentage (e.g., 10%) or as a decimal number (0.10).

In this version of AppLogic™, the maximum amount of CPU for a simple appliance maybe 100% or 1.0.

Memory

Amount of memory to be allocated for each instance. The amount can be specified as an integer value in Megabytes (e.g., 128 M) or in Gigabytes (e.g., 2 G). For 32-bit Linux appliances, the memory may be at least 32 M and no more than 3 G.

Bandwidth

Amount of network bandwidth to be allocated for each instance (total for all terminals/interfaces). The amount can be specified as an integer value in Megabits/sec (e.g., 10 M) or in Gigabits/sec (e.g., 1 G). The maximum amount of bandwidth for a simple appliance may be 2 G (a full duplex Gigabit Ethernet port).

See here for an important note regarding resource oversubscription of network bandwidth.

Resource Ranges

One may specify a range for each resource type. The range defines the normal operating parameters desired for the appliance, as well as minimum resource requirements for sandbox use.

Minimum

The absolute minimum amount of a resource that the appliance needs to work at all. This may be useful to allow running the appliance in functional testing environments, where the appliance may not be expected to run under production load and can run with much less resources. Contrast this with the Default below, which may be amount of resources needed for production use.

Maximum

The maximum amount of a resource that the appliance may be allowed to take. Typically this may be the maximum that an appliance can use (e.g., giving it more resources may not increase performance). The appliance may not be allocated more than the specified maximum amount, ensuring that the appliance may not be able to take resources away from other appliances—think of it as a quota.

Default

The minimum amount of a resource that the appliance requires for normal operation in production environments. The appliance may not be started unless at least that much can be allocated for it (likely failing the start of the application as a whole). Specifying a minimum ensures that the appliance may work within certain "guaranteed" resource amount—think of it as a service level agreement (SLA) for that resource.

Notes

Leave the broadest reasonable range for all resources. The amount of resources actually allocated for an instance of the appliance can be further constrained by the instance settings of the appliance. In at least one embodiment, the degree, to which the resource ranges are enforced varies, may be based on the underlying virtualization technology used by AppLogic™.

In at least one embodiment, the CPU minimum may be guaranteed and the maximum may be enforced only if other appliances need the CPU; the memory minimum and maximum are strictly enforced; the bandwidth minimum and maximum are not enforced at all—they are used only in order to make scheduling decisions. As a result, it may be guaranteed that an appliance may get its minimum CPU and memory. It may not get its full bandwidth, if another appliance may be scheduled on the same server and hogs the bandwidth. In other embodiments, bandwidth guarantee may be provided.

Figure 64:
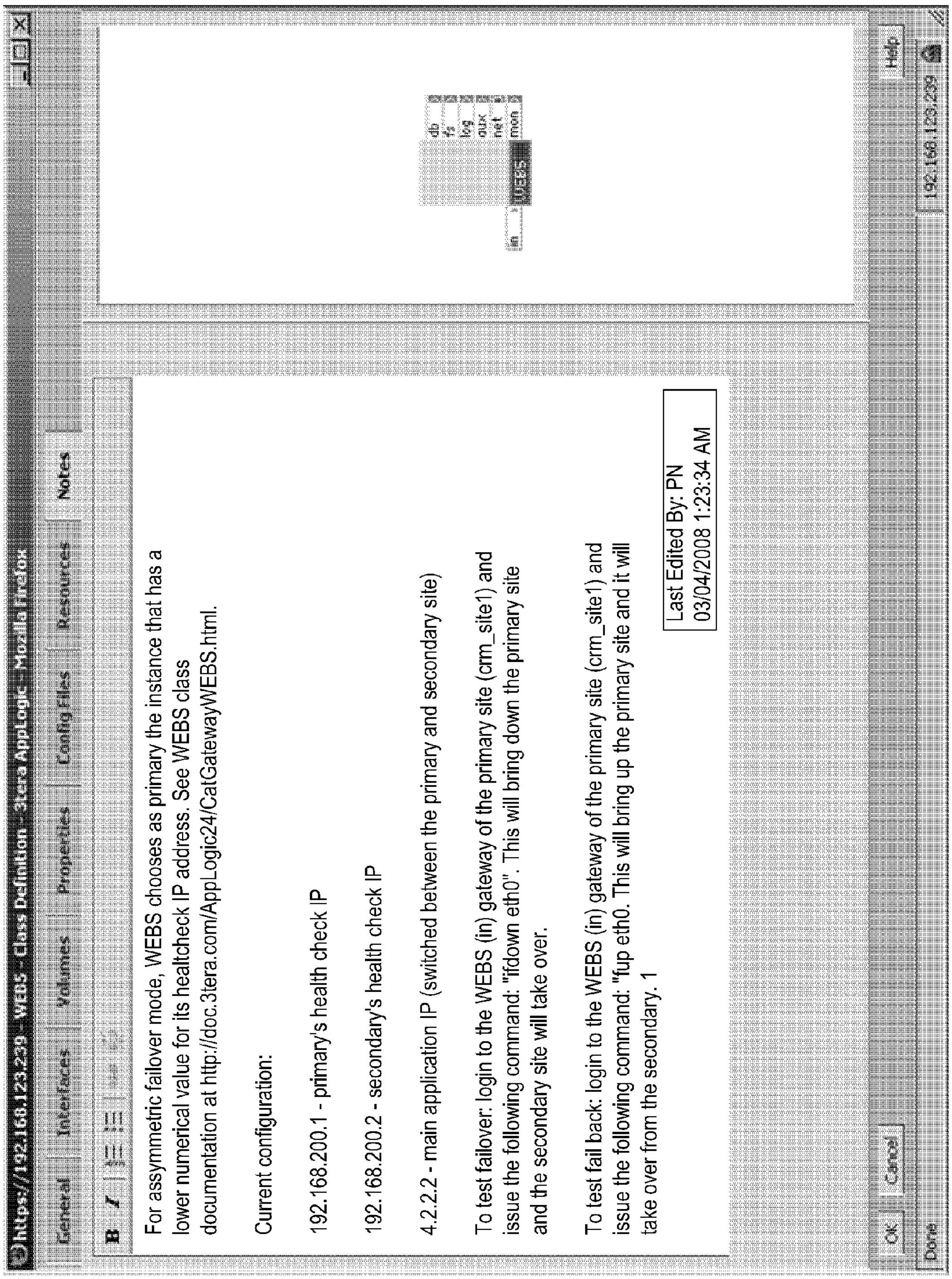

Notes (FIG. 64)

The notes tab shows free-form notes that are set on the class. One may edit the notes by double clicking on the text window.

The Note editor/viewer may be based upon TinyMCE, a platform independent web based Javascript HTML WYSIWYG editor control released as Open Source under LGPL by Moxiecode Systems AB.

The following text formatting options are available from the toolbar:

Bold

Bold text that may be selected or text to be typed.

Italicize

Italicize text that may be selected or text to be typed.

Ordered List

Create numbered list.

Unordered List

Create unordered bulleted list.

Insert/edit Link

Insert or modify a hyper link. To insert a hyper link, type and highlight the text that may be to comprise the hyper link and then click on the Insert/edit Link button. A dialog may be displayed where one may enter the URL to which the link may be to refer as well as optional text This option may be also available from the right-click menu.

Unlink

Remove a hyper link leaving the text. This option may be also available from the right-click menu.

In some browsers, the cut, copy, and paste operations from the right-click menu are not available. Text may be cut, copied and pasted using CTRL-X, CTRL-C, and CTRL-V respectively.

Instance Settings Property Sheet

FIGS. 65-68 show various example embodiments of graphical user interfaces (GUIs) which may be used for implementing one or more features/aspects relating to configuration of appliance instance properties and/or other characteristics, including editors relating thereto. For example, in at least one embodiment, the Instance Settings property sheet allows one to specialize an appliance instance for its role in the application.

In at least one embodiment, the instance settings may apply to a currently selected appliance instance. They override any defaults specified in the class of the appliance.

Most instance settings have their default values defined in the appliance class. When one may change these values, they are shown in the property sheet in bold.

For certain settings, instead of defining an explicit value, one may redirect a setting so that its value may be obtained from the settings of the containing assembly. By way of example, at least a portion of the "redirected" settings are shown herein in underlined format. One may find more information on redirected settings in Redirected Properties.

To reach the Instance Settings property sheet in the application editor, double-click on an appliance shape on the canvas or right-click on the appliance shape and choose Attributes, Resources, User Volumes, Property Values or Notes from the menu.

The instance settings are divided in four sections (tabs):

Attributes

Resources

User Volumes

Property Values

Instance Notes

When the appliance instance may be contained in an assembly that may not be the main application assembly, the instance settings specialize the instance for its role in that assembly. The assembly itself may be further specialized for its role in its containing assembly, recursively going up to the whole application.

The Instance Settings property sheet may be read-only if one may opened it on an instance within a catalog assembly. To learn how to modify catalog classes, see Branching Classes.

If some settings need to be applied to all instances of an appliance, one may use the mechanism described in Redirecting Properties. If the settings in the appliance class needs to be changed, see Branching Classes and Class Editor—Simple.

Figure 65:
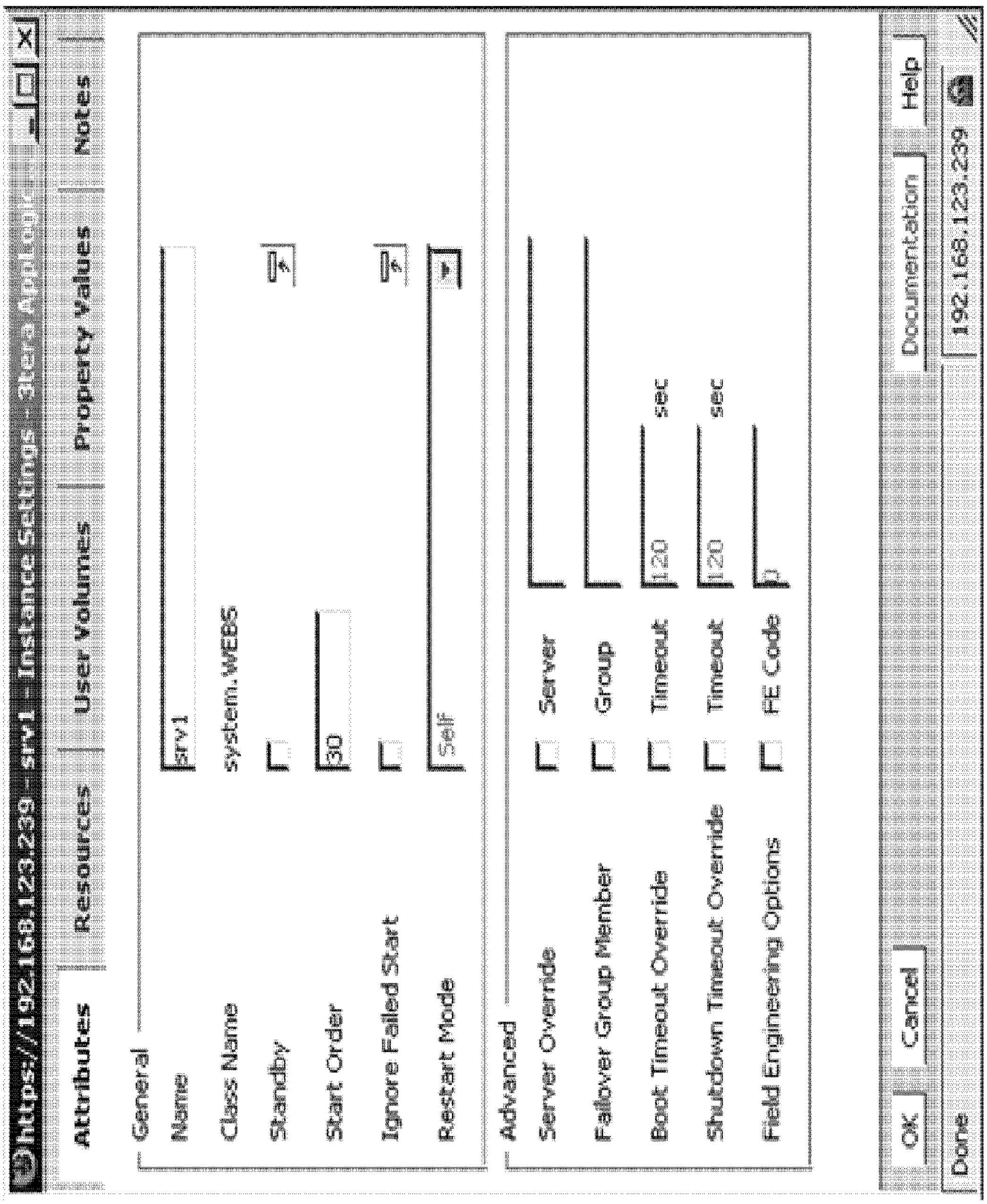

Attributes (FIG. 65)

This tab includes the instance attributes, starting from the instance name and class name, through start order to a number of advanced settings.

General Attributes

These attributes are defined on all instances:

Name

Instance name of the appliance. This name typically reflects the role of the appliance in the application (more precisely, in its containing assembly). The name may be a single word, case sensitive, consisting of alphanumeric characters and underscore ([A-Za-z0-9_]); the name may preferably be unique within the containing assembly.

The instance name may be shown in the center of the appliance shape on the editor canvas.

A icon may be shown to the right of the instance name designating that the appliance may be locked. When an appliance may be locked, it may not be edited nor its interior viewed within the Editor. See Application and Class Locking Reference for more information.

Class Name

Class name of the appliance. This name may be read-only and indicates the name of the appliance class to which this instance belongs. Typically, this field also shows the catalog where the class comes from (catalog:class), uniquely identifying the class.

The class name may be shown in the bottom left of each appliance shape on the editor canvas.

Standby

If the standby option may be checked, the appliance may not start automatically when the application starts (the appliance can be started manually later). The standby option may be convenient for appliances that are used in development/diagnostics, or for appliances that are planned "in reserve". This attribute may be valid only for simple appliances; it may be ignored on assemblies. The Standby attribute can be redirected by selecting the button. See Using Standby for more information on the various uses of the standby attribute.

Start Order

Defines the order of starting this instance, relative to the other instances in the containing assembly. Lower numbers are started first. Appliances with a higher number are not started until all those with lower numbers have started successfully. Appliances with the same start order number can be started in any order and may have their startups overlap in time. The start order may be local to the containing assembly and the same start order numbers can be reused in different assemblies. The relative order of starting subordinates in different assemblies depends on the start order numbers assigned to those assemblies. Appliance instances with the start order attribute not set are started last.

Ignore Failed Start

If the ignore failed start option may be checked and the appliance fails to start, this may not result in the application failing to start as a whole. This option may be convenient for appliances that are under development and have not been fully tested.

Migrateable

If one may check migrateable attribute, one may allow the appliance to be moved from one server to another at runtime. When not checked, the appliance may run only on the server where it was initially started. By default, all appliances are migrateable. Disabling the migration for an appliance may be particularly useful to "pin" an appliance to a particular server (see Pinning Appliances for more details). This attribute may be valid only for simple appliances; it may be ignored on assemblies. This attribute can be redirected by selecting the button.

Advanced Attributes

This may be an advanced capabilities section—all fields here have reasonable defaults. Unless one may need to do something special, make sure all advanced attributes are unchecked and one may skip this section completely.

The following attributes modify the scheduling and other behavior of AppLogic™ with respect to this appliance.

Server Override

When specified, it defines the name of the server where the appliance may start (normally, the servers are automatically assigned by the AppLogic™ scheduler). Typically, the server override may be used together with unchecked Migrateable attribute to "pin" an appliance to a particular server.

Note that selecting a server limits the portability of the application to another grid which may not have the same server. This attribute can be redirected and it may be recommended to always redirect it all the way up to the application properties. A portable way to separate appliances on different servers may be to use the Failover Group Member attribute described below.

If the server override includes the name of a server that may not be in the system, the appliance may fail to start. To see the set of server names on a given system use the server list shell command.

Failover Group Member

This field, when enabled, defines a failover group name for the appliance. Appliances belonging to the same group may not be scheduled to run on the same server, providing an easy way to ensure that if a server fails, at least one of several appliances in the group may remain running. The group name may be user-defined, global for an application; it may be a single word, case-sensitive, alphanumeric ([A-Za-z0-9_]). This attribute can be redirected and it may be recommended that it may be redirected all the way up to the application properties.

Look here for details on how to best set up mandatory and optional failover groups.

Boot Timeout Override

Time, in seconds, given to the appliance to complete its startup. If not set, AppLogic™ uses a default value specified in AppLogic™'s configuration files (usually 2-5 minutes). One use of this attribute may be to help diagnose why an appliance may not be starting (see Debugging Appliance Start on how to do that).

The time specified here may be how long the appliance has from start of OS boot to running the VM agent (vmad) that tells AppLogic™ that the appliance has started successfully. For more details, see the Appliance Creation Guide.

Shutdown Timeout Override

Time, in seconds, given to the appliance to complete its shutdown. If not set, AppLogic™ uses a default value specified in AppLogic™'s configuration files (usually 2-5 minutes).

Field Engineering Options

This may be a numeric value that enables diagnostic or other special features of AppLogic™ for this appliance instance. For a list of available codes and precautions when using them, see Field Engineering Codes. In short, do not enable this option unless directed by a support engineer.

Figure 66:
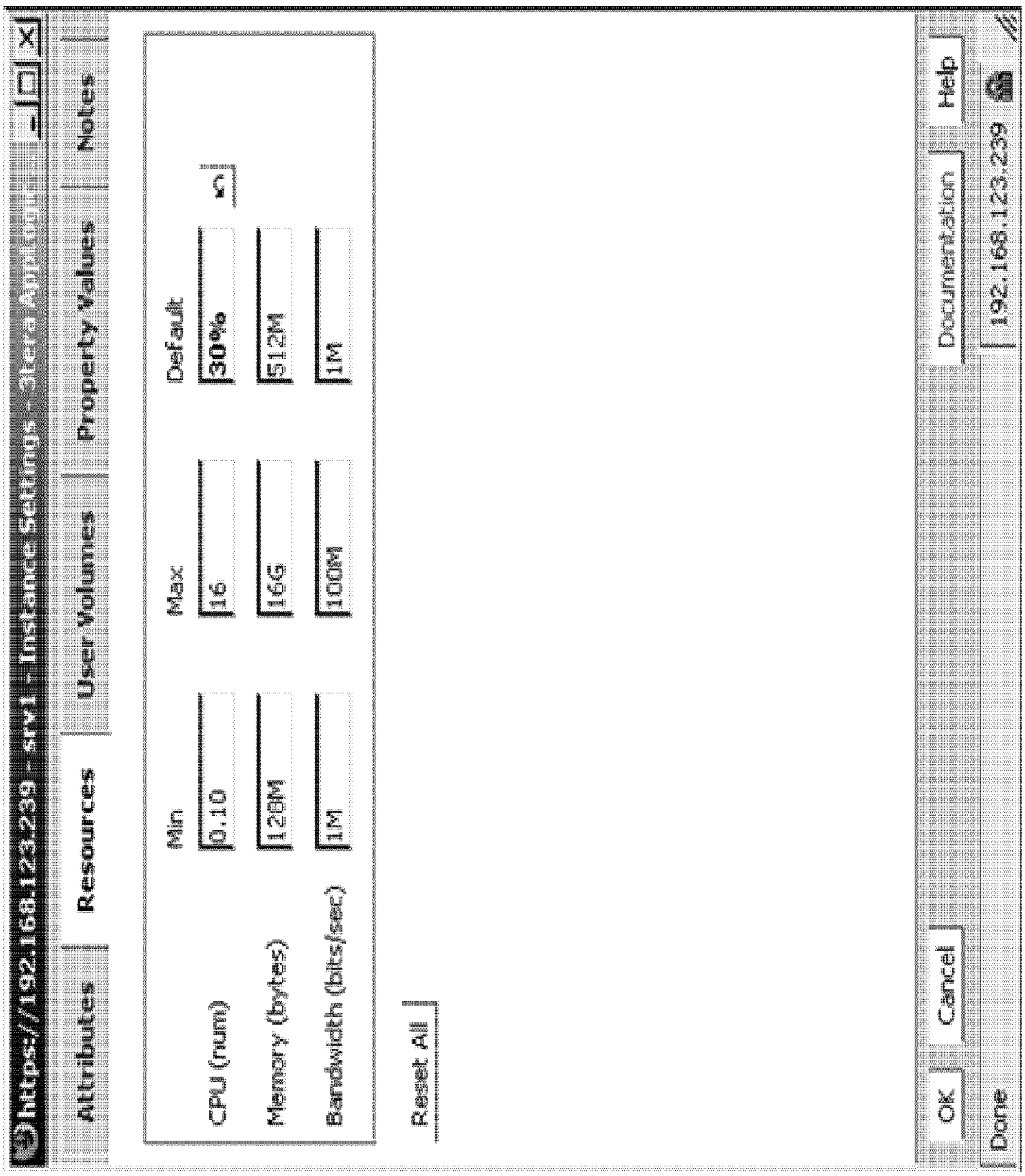

Resources (FIG. 66)

On the Resources tab one may specify the amount of hardware resources that may be provided to the appliance instance. Unless one may override some of the values here, this tab shows the defaults provided by the appliance class. The ability to override resources per instance allows one to further specialize the instance for its role.

For example, a database appliance can work with as little as 128 MB RAM or take as much as 3 GB RAM. To allow this wide range, the database appliance class would set these as its resource requirements (minimum 128 MB, maximum 3 GB). An instance of the database appliance responsible for keeping a small and rarely used database (e.g., maintenance account passwords) can be further constrained through this tab to 256 MB RAM maximum, as there may be no need to reserve more memory for such a small and rarely used database. In contrast, a database appliance that may be responsible for a core application database—which may be likely to be large and heavily loaded—can be constrained to run with at least 512 MB RAM, ensuring that the application may operate well.

If one may don't know what resource constraints to use, one recommend that one may leave the class defaults.

One may easily see which values override the defaults—they are displayed in bold. If one wants to restore the default value for a given resource, use the restore button next to the value. To restore all values to defaults, use the "Reset All" button.

Resource Types and Specification

The following resource types can be specified:

CPU

Portion of CPU or number of CPUs to be allocated for this instance. Portions can be specified as percentage (e.g., 10%) or as a decimal number (0.10). Whole CPUs are specified as integer (e.g., 2).

Memory

Amount of memory to be allocated for this instance. The amount can be specified as an integer value in Megabytes (e.g., 128 M) or in Gigabytes (e.g., 2 G).

Bandwidth

Amount of network bandwidth to be allocated for this instance (total for all terminals/interfaces). The amount can be specified as an integer value in Megabits/sec (e.g., 10 M) or in Gigabits/sec (e.g., 1 G).

Resource Ranges

A range can be specified for each resource type. The range defines the normal operating parameters desired for the appliance, as well as minimum resource requirements for sandbox use.

Minimum

The absolute minimum amount of a resource that the appliance needs to work at all. This may be useful to allow running the appliance in functional testing environments, where the appliance may not be expected to run under production load and can run with much less resources. Contrast this with the Default below, which may be amount of resources needed for production use.

Maximum

The maximum amount of a resource that the appliance may be allowed to take. Typically this may be the maximum that an appliance can use (e.g., giving it more resources may not increase performance). The appliance may not be allocated more than the specified maximum amount, ensuring that the appliance may not be able to take resources away from other appliances—think of it as a quota.

Default

The minimum amount of a resource that the appliance requires for normal operation in production environments. The appliance may not be started unless at least that much can be allocated for it (likely failing the start of the application as a whole). Specifying a minimum ensures that the appliance may work within certain "guaranteed" resource amount—think of it as a service level agreement (SLA) for that resource.

To use the appliance with less than the default resources, the crunch scheduling option may preferably be specified when starting the application—see application start options.

In at least one embodiment, the resource range that can be specified for the instance may preferably be a subset of the class resource range. For example, in one embodiment, the following may preferably be true: the instance minimum may preferably be no less than the class minimum; the instance maximum may preferably be no more than the class maximum; the instance default may preferably be no less than the class minimum value. Other common-sense constraints apply (e.g., that the minimum may preferably be not greater than the maximum).

When propagating resource constraints through multiple levels of assemblies, the same rules apply: the new resource range may preferably be a subset of the lower level resource range.

The degree, to which the resource ranges are enforced varies, based on the underlying virtualization technology used by AppLogic™. In one embodiment, the CPU minimum may be guaranteed and the maximum may be enforced only if other appliances need the CPU; the memory minimum and maximum are strictly enforced; the bandwidth minimum and maximum are not enforced at all—they are used only in order to make scheduling decisions. As a result, it may be guaranteed that an appliance may get its minimum CPU and memory; it may not get its full bandwidth if another appliance may be scheduled on the same server and hogs the bandwidth. In other embodiments, the bandwidth guarantee may be provided.

Figure 67:
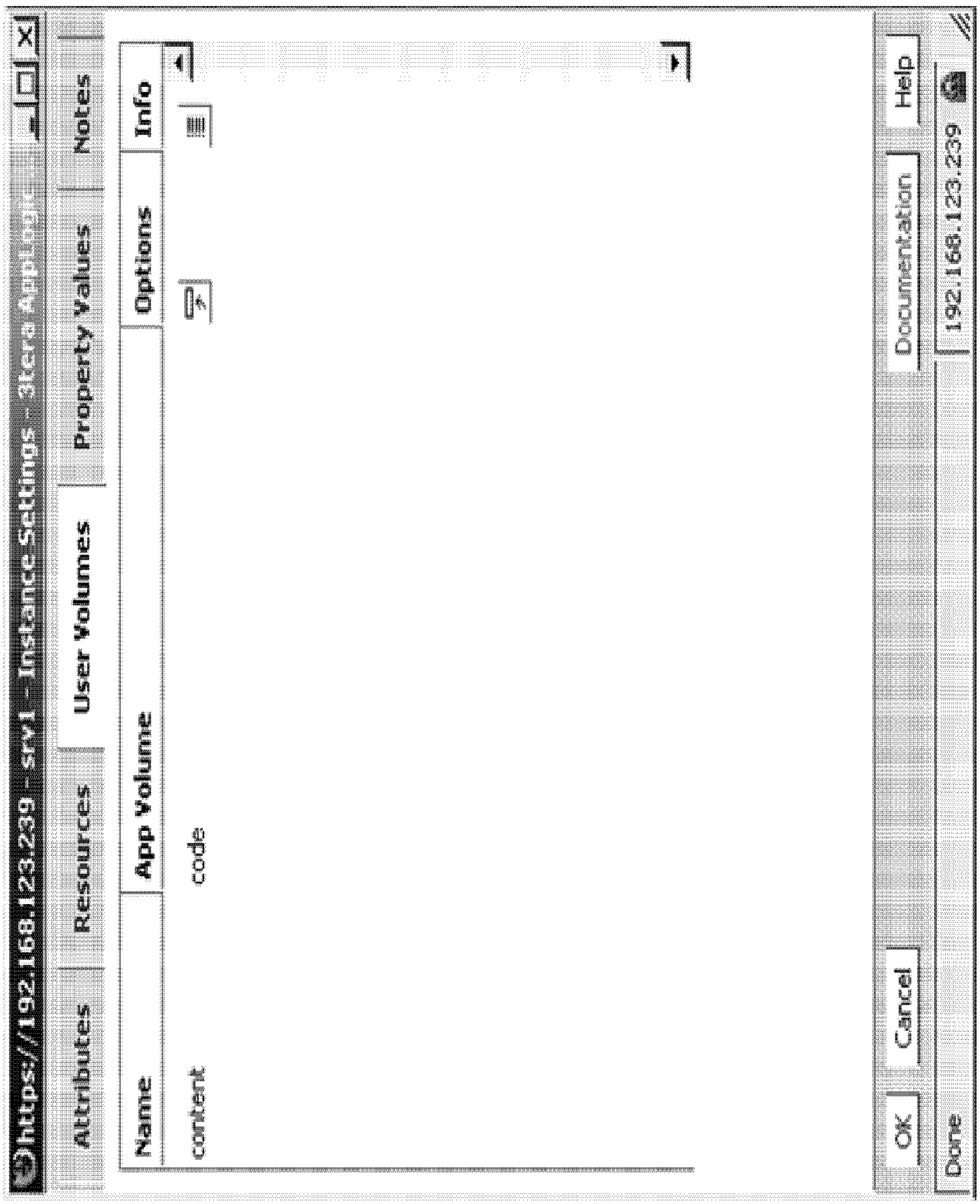

User Volumes (FIG. 67)

The User Volumes tab allows one to configure volumes for the appliance instance. Not all appliances need volumes to be configured for them; typically, only appliances that work with application-specific persistent data have such volumes. If the volume list on this tab may be empty, the appliance instance does not need volumes.

Note that only "placeholder" volumes need to be configured through the instance settings (see the volumes tab in Simple Class Editor property sheet). Other volumes needed by the appliance—such as its boot volume—are provided automatically by the appliance class and don't need to be configured explicitly.

For each placeholder volume in the appliance, one may configure an application volume that may be used for this appliance.

To add or remove application volumes, go to the Application Configuration property sheet, select the User Volumes tab and press the Manage Volumes button.

Instead of picking a specific application volume, one may also redirect the volume selection to the containing assembly. To do this, select the button and choose a volume defined on the assembly boundary (see Assembly Class Editor for details on how to manage those).

The info button next to the volume gives one may information about the volume requirements (e.g., read-only, shared, etc.

See the appliance class data sheet for details what are the requirements to the volume(s) and whether they can be shared between appliances; also there may be some properties that can be set to configure directory names on the volume for this appliance. The data sheets for the global catalog appliances are in the RefCatalog.

Figure 68:
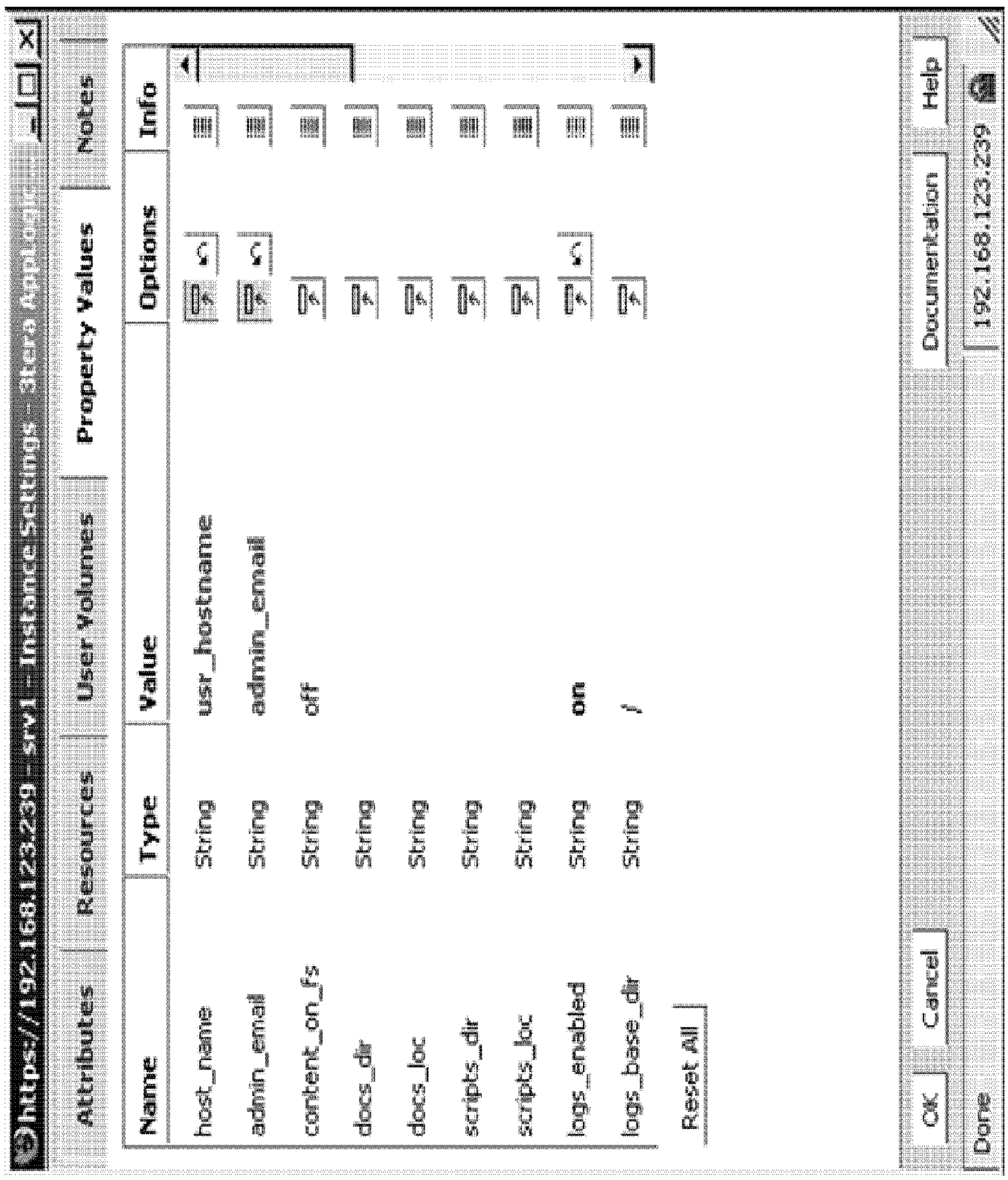

Property Values (FIG. 68)

The Property Values tab allows one to set values for properties of the appliance instance. The existing properties for an instance and their defaults are determined by the appliance class (see Simple Class Editor or Assembly Class Editor for how properties are defined).

The default values of the properties are shown in normal font weight. Property values explicitly configured for this appliance are in bold. Property values that are redirected to the values of the containing assembly's properties are shown in blue.

For information on the property, its type and allowed values, select the info button To restore the default value of a property, press the restore button (use the "Reset All" button to reset the values of all properties to their defaults).

To redirect a property, press the redirect button and choose the name of the assembly property to which one may would like to redirect its value. For details on property redirection, see Redirected Properties.

Note that some properties may not have defaults and require explicit (or redirected) values. Those properties are described as "Mandatory" in the info. Not setting a value or redirection for a mandatory property may prevent the appliance from starting.

See the appliance class data sheet for details on what properties mean and what their values may be. The data sheets for the global catalog appliances are in the Catalog Reference.

Figure 69:
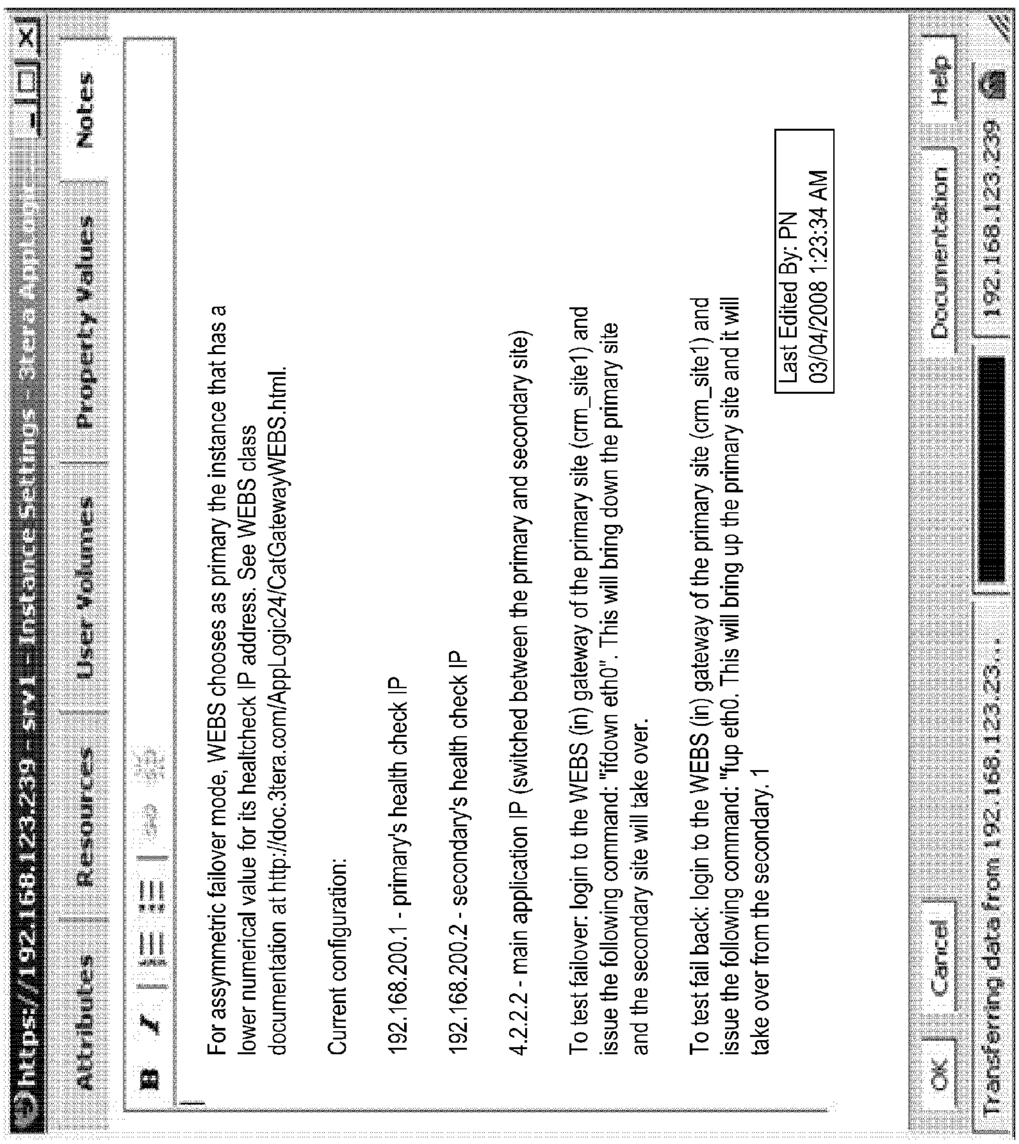

Instance Notes (FIG. 69)

The notes tab shows free-form notes that are set on the instance. One may edit the notes by double clicking on the text window.

The Note editor/viewer may be based upon TinyMCE, a platform independent web based Javascript HTML WYSIWYG editor control released as Open Source under LGPL by Moxiecode Systems AB.

The following text formatting options are available from the toolbar:

Bold

Bold text that may be selected or text to be typed.

Italicize

Italicize text that may be selected or text to be typed.

Ordered List

Create numbered list.

Unordered List

Create unordered bulleted list.

Insert/edit Link

Insert or modify a hyper link. To insert a hyper link, type and highlight the text that may be to comprise the hyper link and then click on the Insert/edit Link button. A dialog may be displayed where one may enter the URL to which the link may be to refer as well as optional text This option may be also available from the right-click menu.

Unlink

Remove a hyper link leaving the text. This option may be also available from the right-click menu.

In some browsers, the cut, copy, and paste operations from the right-click menu are not available. Text may be cut, copied and pasted using CTRL-X, CTRL-C, and CTRL-V respectively.

Visual Editor

Overview

FIGS. 70-76 show various example embodiments of graphical user interfaces (GUI) which may be used for implementing one or more features/aspects relating to one or more embodiments of infrastructure editor(s) which, for example, may be used by various users to create and/or modify the disposable infrastructure associated with their applications.

Figure 70:
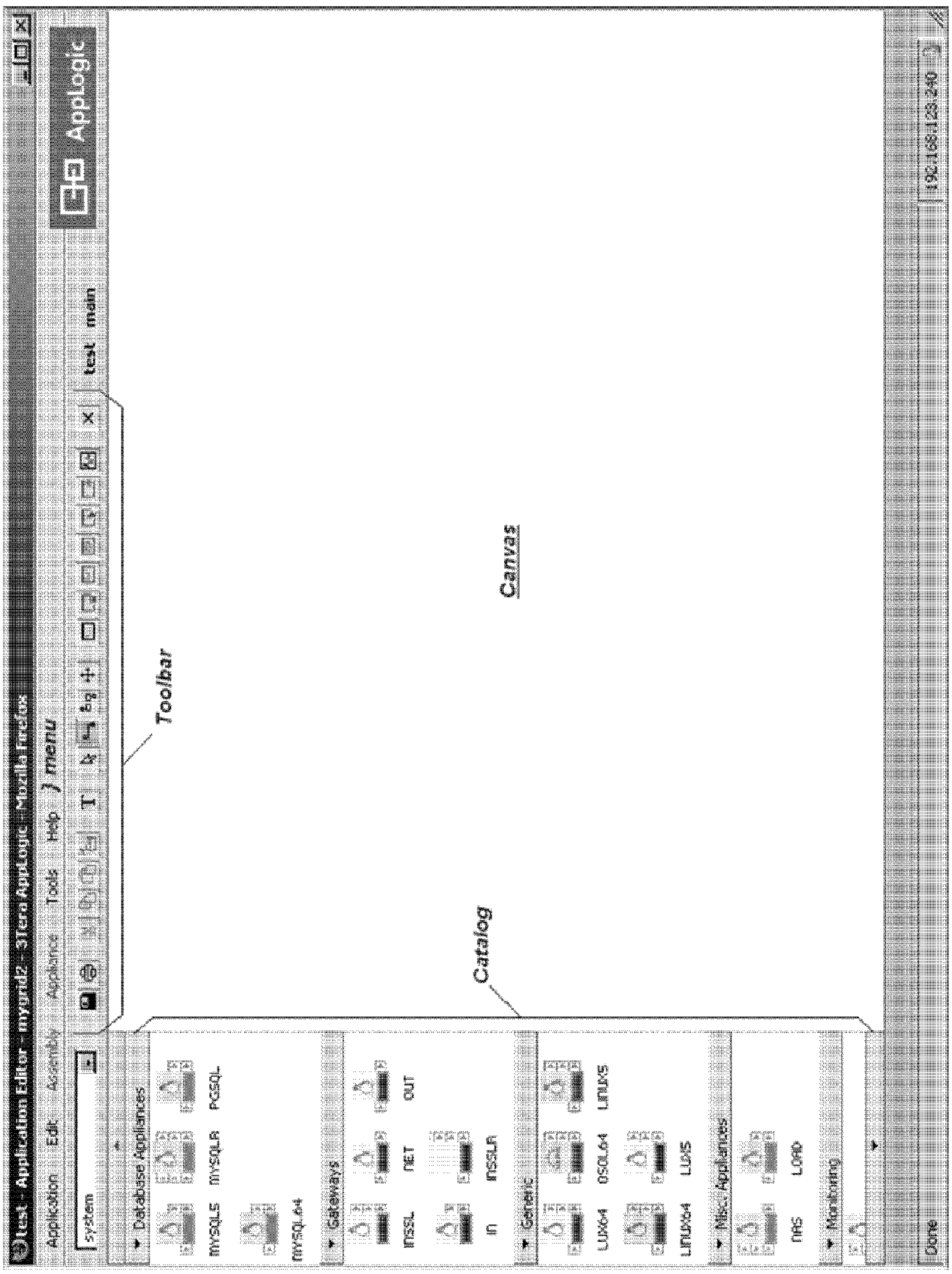

FIG. 70 shows an example embodiment of a main screen of the Infrastructure editor. One may use it to create and modify the disposable infrastructure for one's applications. The same editor may be used to edit the structure of the application and the structure of composite appliances (assemblies). In fact, the application itself may be an assembly called main.

The editor main layout includes a palette with appliance catalogs on the left and a drawing canvas on the right.

One may reach the Infrastructure editor by first logging in and then selecting an application to edit.

Editing Applications

The application as a whole may be an assembly—a composite appliance with a well-defined boundary, built as a structure of connected appliance instances (subordinates). In addition to the application assembly main, which may be created automatically by AppLogic, one may create additional assemblies that one may use to build up one's application.

So, to restate, the infrastructure editor allows one to visually edit the interior structure of an assembly: to define the subordinate instances, their configurations and connections.

The editor provides a drawing canvas, where one may build structures of connected appliances. The editor further provides a number of property sheets for configuring various aspects of the application and its appliances.

The editor may be configured or designed to be intuitive and to enable users to use the palette-and-canvas layout familiar from a number of drawing applications.

Menu

The editor menu may include, but are not limited to, one or more of the following (or combinations thereof):

- Application
  - Configure—Configure the application—opens Application Configurator
  - Manage Volumes—Manage application volumes—opens Manage Volumes dialog
  - Login (ssh)—Log into the configured default appliance of the application via SSH—opens SSH Console
  - Login (web)—Access the Web Interface of the default appliance. This option may be only available when the configured default appliance provides WEB access via its default interface.
  - Login (text)—Access the text boot console of the configured default appliance—opens Text Console
  - Login (graphic)—Access the graphical console of the configured default appliance—opens Graphical Console
  - Monitor—Monitor the application—opens Application Monitor
  - Modify Boundary—Edit the application boundary—opens Assembly Class Editor
  - ADL Main Descriptor—View/edit the class descriptor for the application's main assembly—opens ADL Descriptor Viewer/Editor
  - ADL Package Descriptor—View/edit the application's package descriptor—opens ADL Descriptor Viewer/Editor
  - save—save the current application
  - print—print the assembly currently on the canvas
  - Documentation—View application documentation. This item may be only available if a Documentation URL may be set for the application.
  - Close—close the editor
- Edit
  - Add Annotation—Add an annotation to the application
  - Cut—cut the selected appliance(s) into the clipboard (singletons are not supported)
  - Copy—copy the selected appliance(s) to the clipboard (singletons are not supported)
  - Paste—paste any appliance(s) from the clipboard to the canvas (singletons are not supported)
  - Delete—delete the selected appliance(s)
  - Select Mode—selection mode
  - Connect Mode—Select connection mode (default)
  - Balloon Mode—Select balloon connection mode
  - Pan Mode—pan the canvas (scroll)
  - Show/Hide Validation Errors—Show or hide the validation errors (unconfigured mandatory properties/volumes, unconnected mandatory terminals)

Assembly
- Navigate Up—Navigate
- Login (ssh)—Log into the configured default appliance of the assembly via SSH—opens SSH Console
- Login (web)—Access the Web Interface of the default appliance of the assembly. This option may be only available when the configured default appliance provides WEB access via its default interface.
- Login (text)—Access the text boot console of the configured default appliance of the assembly—opens Text Console
- Login (graphic)—Access the graphical console of the configured default appliance of the assembly—opens Graphical Console
- Modify Boundary—View/Edit the boundary of the assembly—opens Assembly Class Editor
- ADL Class Descriptor—View/Edit the class descriptor of the assembly—opens ADL Descriptor Viewer/Editor
- Class Documentation—View the assembly's class documentation. This item may be only available if a Documentation URL may be set for the assembly class.

Appliance
- Attributes—View/configure the appliance attributes. Opens Attributes Tab of the Instance Settings Property Sheet.
- Resources—View/configure the appliance resources. Opens Resources Tab of the Instance Settings Property Sheet.
- User Volumes—View/configure the appliance user volumes. Opens User Volumes Tab of the Instance Settings Property Sheet.
- Property Values—View/configure the appliance property values. Opens Properties Tab of the Instance Settings Property Sheet.
- Notes—View/Edit appliance instance notes. Opens Notes Tab of the Instance Settings Property Sheet.
- Login (ssh)—Log into the selected appliance via SSH—opens SSH Console
- Login (web)—Access the Web Interface of the selected appliance.
- Login (text)—Access the text boot console of the selected appliance—opens Text Console
- Login (graphic)—Access the graphical console of the selected appliance—opens Graphical Console
- Set/Unset Default Console—Set or unset the selected appliance as the default console within the current scope.
- View Interior—View the interior of the selected catalog class assembly.
- View Boundary—View the selected catalog class' class boundary definition—opens Assembly Class Editor
- Modify Interior—View/Edit the interior of the selected singleton class assembly.
- Modify Boundary—View/Edit the selected class' class boundary definition—opens Assembly Class Editor
- ADL Class Descriptor—View/edit the selected appliance's class descriptor—opens ADL Descriptor Viewer/Editor
- Branch Class—Branch the selected class thus creating a singleton appliance. This item may be shown if the selected instance may not be a singleton class. See Branching Classes for more information.
- Move to Catalog—Move the selected singleton to a catalog.
- Class Documentation—View class documentation for the selected appliance. This item may be only shown if a Documentation URL may be configured on the appliance.

Tools
- Grid Shell—Open a grid shell with the current application and or selected instance set as the current application and component.

Figure 70A:
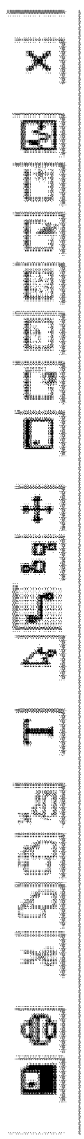

Help
- Editor Documentation—opens this document
- AppLogic Documentation—Opens AppLogic Documentation
- AppLogic Forums—Goto AppLogic Forum
- 3Tera Website—Goto 3Tera website
- About AppLogic—information about the maker of AppLogic Tool Bar (FIG. 70A)

The editor toolbar provides quick access to the following functions:

- Application operations
  - Save—save the current application
  - Print—print the current application
- Clipboard operations
  - Cut—cut the selected appliance(s) into the clipboard
  - Copy—copy the selected appliance(s) to the clipboard
  - Paste—paste any appliance(s) from the clipboard to the canvas
  - Move to Catalog—move the selected appliance to the catalog
- Annotations
  - Add Annotation—Add an annotation to the application
- Edit mode
  - Select Mode—selection mode
  - Connect Mode—connection mode (default)
  - Balloon Mode—balloon connection mode
  - Pan Mode—pan the canvas (scroll)
- AppLogic operations
  - grid shell—open command line shell
  - Login (ssh)—Login to the configured default appliance of the application or the selected appliance instance via SSH—opens SSH Console
  - Login (web)—Access the Web Interface of the default appliance of the application or the selected appliance instance. This option may be only available when the configured default appliance or selected instance provides WEB access via its default interface.
  - Login (text)—Access the text boot console of the configured default appliance or the selected appliance instance—opens Text Console
  - Login (graphic)—Access the graphical console of the configured default appliance or the selected appliance instance—opens Graphical Console
  - Set/Unset Default Console—Set or unset the selected appliance as the default appliance
  - Monitor—Monitor application—opens Application Monitor Next to the buttons, the editor shows the name of the application and the hierarchical path to the assembly being edited. The path also doubles as "breadcrumb" navigation: one may step up to parent assemblies, all the way up to main.

Canvas Context Menu

The following operations are available by right-clicking on the canvas via the right-click context menu:

- Canvas Operations
  - Paste—Paste any appliance(s) from the clipboard to the canvas
  - Add Annotation—Add an annotation to the application Application Access Operations Login—Access the default console of the configured default appliance of the application.

Application Editing Operations

Manage Volumes—Manage application volumes—opens Manage Volumes dialog

Modify Application Boundary—Edit the application boundary—opens Assembly Class Editor Configure Application—Configure the application—opens Application Configurator Application Documentation Operations Documentation URL may be set for the application.

Instance Context Menu

The following operations are available by right-clicking on an appliance within the application via the right-click context menu:

Appliance Configuration Operations

Attributes—View/configure the appliance attributes. Opens Attributes Tab of the Instance Settings Property Sheet.

Resources—View/configure the appliance resources. Opens Resources Tab of the Instance Settings Property Sheet.

User Volumes—View/configure the appliance user volumes. Opens User Volumes Tab of the Instance Settings Property Sheet.

Property Values—View/configure the appliance property values. Opens Properties Tab of the Instance Settings Property Sheet.

Notes—View/Edit appliance instance notes. Opens Notes Tab of the Instance Settings Property Sheet.

Appliance Access Operations

Login—Login to the selected appliance. If the appliance may be an assembly, the default console of that appliance may be logged into; if the appliance may not be an assembly, then that appliance may be logged into.

Appliance Class Operations

Branch Class—Branch the selected class thus creating a singleton appliance. This item may be shown if the selected instance may not be a singleton class. See Branching Classes for more information.

View Interior—View the interior of the selected class assembly. This item may be shown if the selected instance may be a catalog appliance View Boundary—View the selected class's boundary definition. This item may be shown if the selected instance may be a catalog appliance Modify Interior—View/Edit the interior of the selected singleton class assembly.

Modify Boundary—View/Edit the selected class' class boundary definition.

Class Documentation—View class documentation for the selected appliance. This item may be only shown if a Documentation URL may be configured on the appliance.

Catalogs

In AppLogic, each application has access to a two or more catalogs. At a minimum, the application has access to the global system catalog and to its local catalog.

The global system catalog includes appliance classes that are common for AppLogic and are accessible to all applications. Changing an appliance in the global catalog affects all applications.

The local catalog includes appliance classes specific to the application one may are editing. Each application has its own local catalog. Changing an appliance in the local catalog affects only this application. Many applications don't actually have any appliances in the local catalog and use only appliances from the global catalog.

One may select which catalog to use by choosing it from the drop-down box above the palette.

The appliance classes in a catalog are grouped by category. One may visually collapse or expand a category by clicking on the category name. If the catalog has a lot of appliances, one may be able to scroll the catalog up and down as well.

The editor shows the catalog appliances with smaller shapes, using the same color and terminals as the appliance may have when dropped on the canvas. The class name of each appliance may be shown under the shape.

One may create an instance of an appliance class by dragging its shape onto the canvas.

One may move a singleton appliance to the catalog—and make it a catalog class—by dragging the singleton into the catalog (make sure one may have selected the correct catalog first). See Branching Classes for more information on singletons and on customizing classes.

One may access the following operations over appliance classes by opening the right-click menu on a class in the catalog:

Delete Class—Delete the class

Rename Class—Rename the class

Create Instance—Create an instance (similar to dragging the class shape onto the canvas)

Move To . . . —Move the class to another catalog (or to the application as a singleton)

View Descriptor—View the class descriptor—opens ADL Descriptor Viewer/Editor

View Boundary—View the class (in the Class Editor)

Class Documentation—View the class documentation

Help—View this document

Canvas

The canvas may be the drawing area, where one may assemble one's application by dragging elements from the catalog pallete and connecting them.

In addition to dragging instances around, selecting instances and re-routing connections, one may right-click on the canvas and access the following operations:

paste from clipboard create annotation access application console manage application volumes edit or view the boundary of the assembly (opens the Class Editor)

configure the application as a whole (opens the Application Configuration)

view application documentation

Status Bar

The status bar shows one's user name and the names of the currently selected appliances.

Also, it shows a progress indicator for some of the longer operations (such as loading or saving an application).

Figure 71:
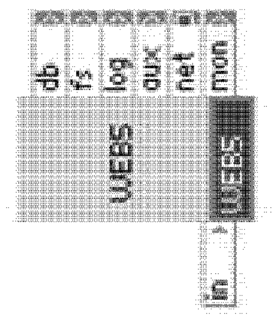

Subordinate Instances (FIG. 71)

One may create an instance of an appliance—a subordinate within the assembly—by simply dragging an appliance shape from a catalog palette onto the canvas. Once one may creates the instance, one may move its shape freely anywhere on the canvas.

In at least one embodiment, the shape comprises the following visual elements:

a main body (the rectangle in the middle)

an instance name, shown in the center of the shape a class name, shown in the lower left side of the shape one or more terminals, shown as block arrows (IN and OUT) on the left and/or right side of the shape One may configure the instance settings of the new appliance by double-clicking on it: the editor opens the Instance Settings property sheet for the instance.

One may change the class name of a subordinate by SHIFT-dragging the new class form the catalog onto the existing subordinate. This may be useful if one may wish to replace a WEB5 with WEB64, replace an IN gateway with INSSL, etc. However, the following limitations apply:

- the names and number of terminals may preferably be the same between the two classes
- the subordinate that may be to be replaced may not be a branched instance.

If the existing subordinate may not be connected to any other instance, the class name of the subordinate may be changed regardless of the number and names of its terminals.

Figure 72:
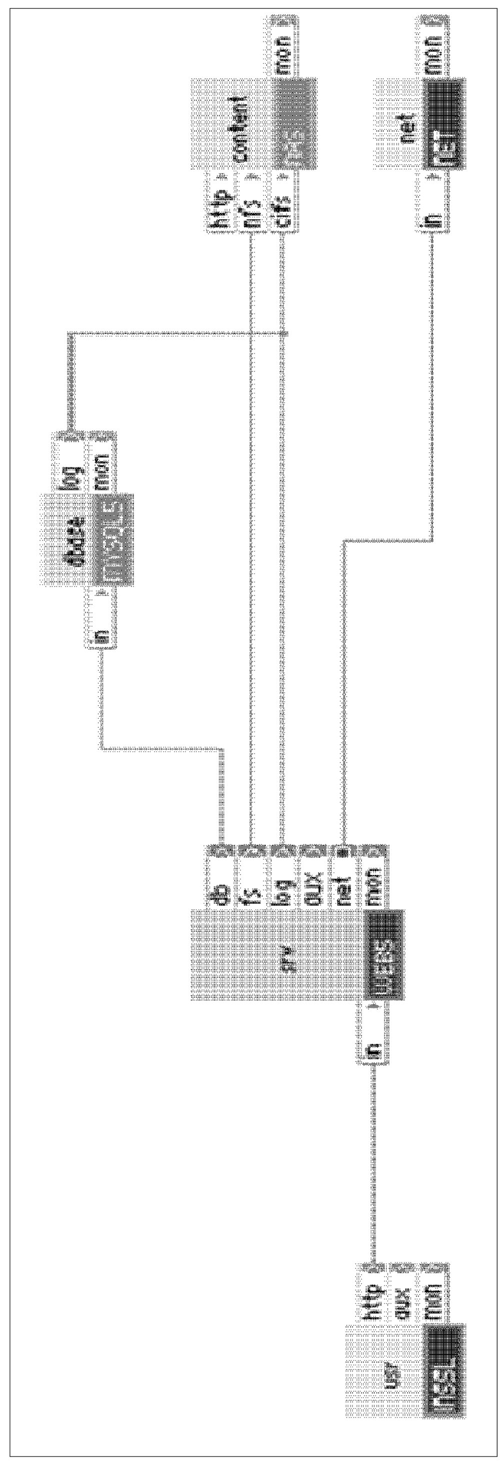

One may also perform the following operations on it by opening a right-click menu on the shape:

- configure Instance Settings: Attributes, Resources, User Volumes and Properties
- Log into the appliance
- branch the appliance class to create a new class based on this instance (called a singleton class). See Branching Classes for more information.
- view or edit the appliance class (opens the Class Editor property sheet)
- view or edit the interior of an appliance, if it may be itself an assembly (step into the assembly)
- View the class documentation Connections (FIG. 72)

Once one may has a few instances, one may also connect them. Appliances can be connected by connecting their terminals (the named "arrows" that stick out of the appliance shape). One may connect two appliances by clicking on the terminals one may wants to connect: click the output first, then the input one may want it connected to.

The mouse cursor may provide clues as to what connections are allowed. Many outputs can be connected to a single input. Each output, however, can be connected to exactly one input. It may be even possible to connect the output of an appliance to an input of the same appliance.

For more information on what the connections mean at runtime and the benefits of using connections, please see the AppLogic Overview.

When multiple outputs are connected to a single input, the editor reduces visual clutter by joining the connections with as few lines as possible. Whenever a connection joins an existing connection, the editor places a small dot, indicating the joining of connections.

One may route the connections manually by dragging their corners up/down or left/right. Once one may position the mouse cursor on a connection corner, it may give one may visual clue as to what directions are allowed. One may also add a segment to the connection route, which may allow one to make a route that passes around another appliance.

Figure 73:
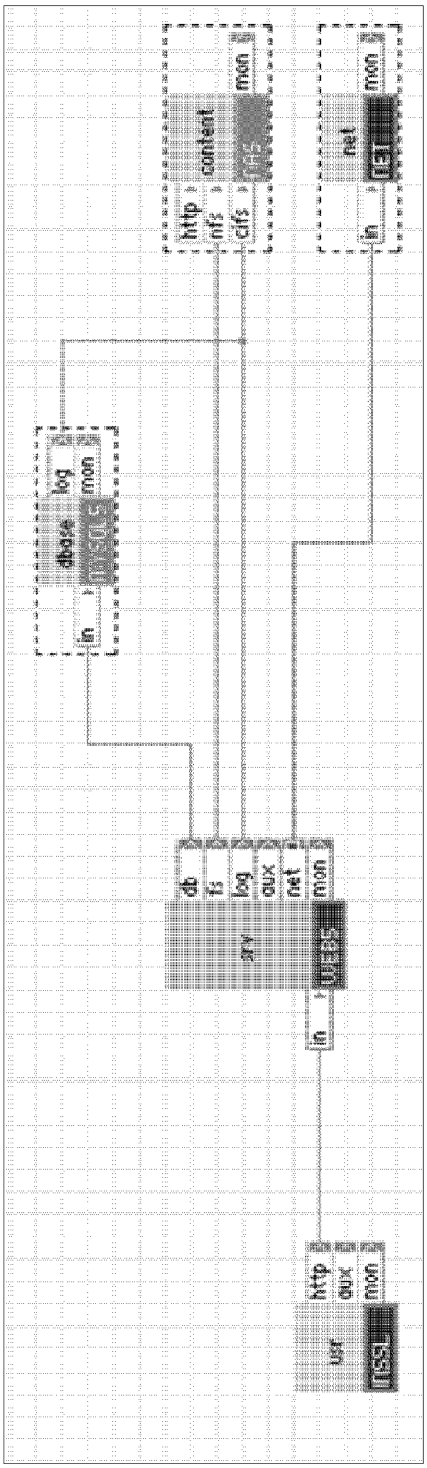

One may perform the following operations over a connection by right-clicking on the connection and selecting from the menu:

- add a segment
- re-route the connection (automatic re-route, useful to simplify connections)
- delete the connection Selection (FIG. 73)

One may select one or more appliances in order to perform operations on them.

Clicking on an appliance makes it the selected appliance. Clicking on an appliance while holding the Ctrl key adds the appliance to the currently selected appliance group. Drawing a rectangle on the canvas around several appliances selects all the appliances within that rectangle.

Figure 74:
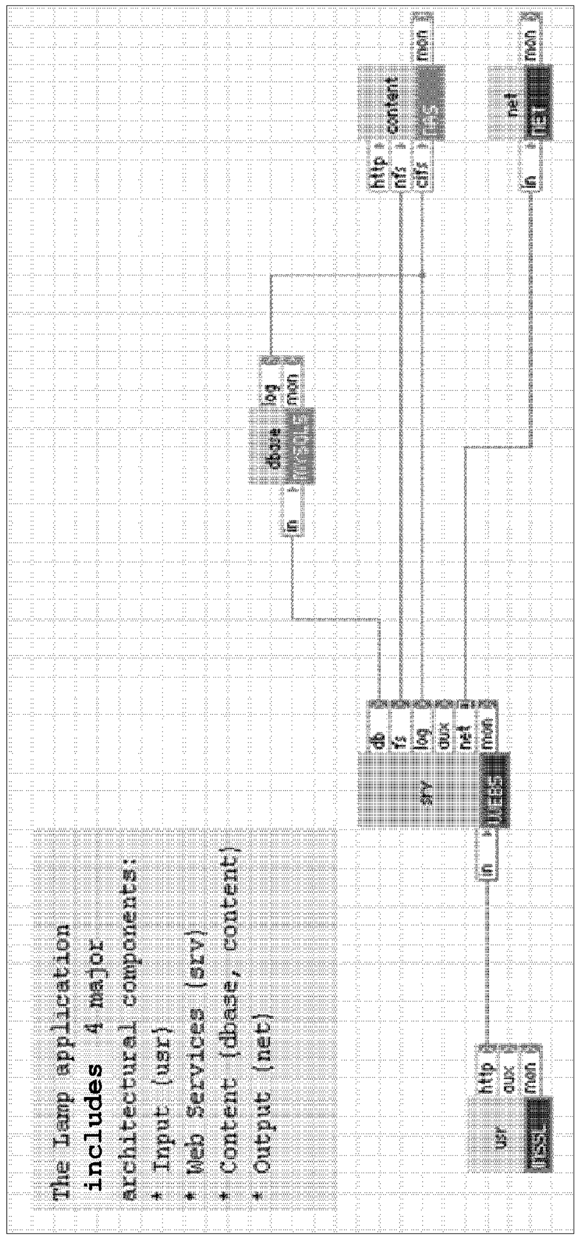

The editor shows the current selection with dashed line. Once one may select a few appliances, one may do the following with them:

- move them as a group. The editor may keep the connection routing between the selected appliances and re-route the connections between the selected appliances and the appliances that remain on the canvas.
- delete them (press the Del key on the keyboard, or select Delete from the right-click menu on one of the selected appliances)
- cut or copy them as a group to the clipboard Annotations (FIG. 74)

One may add one or more notes or annotations to the application such as describing usage of various appliances in its architecture.

An annotation can be created by clicking on the Annotation button on the tool bar. One may edit the annotation by clicking on the created text box. In addition, one may change the color of the background by clicking on the icons in the bottom left corner of the annotation text box. Clicking on the lower right corner of the annotation text box and then dragging the mouse may resize the annotation text box. The color of the text background may be changed by clicking on the icons in the lower left corner of the text box.

Figure 75:
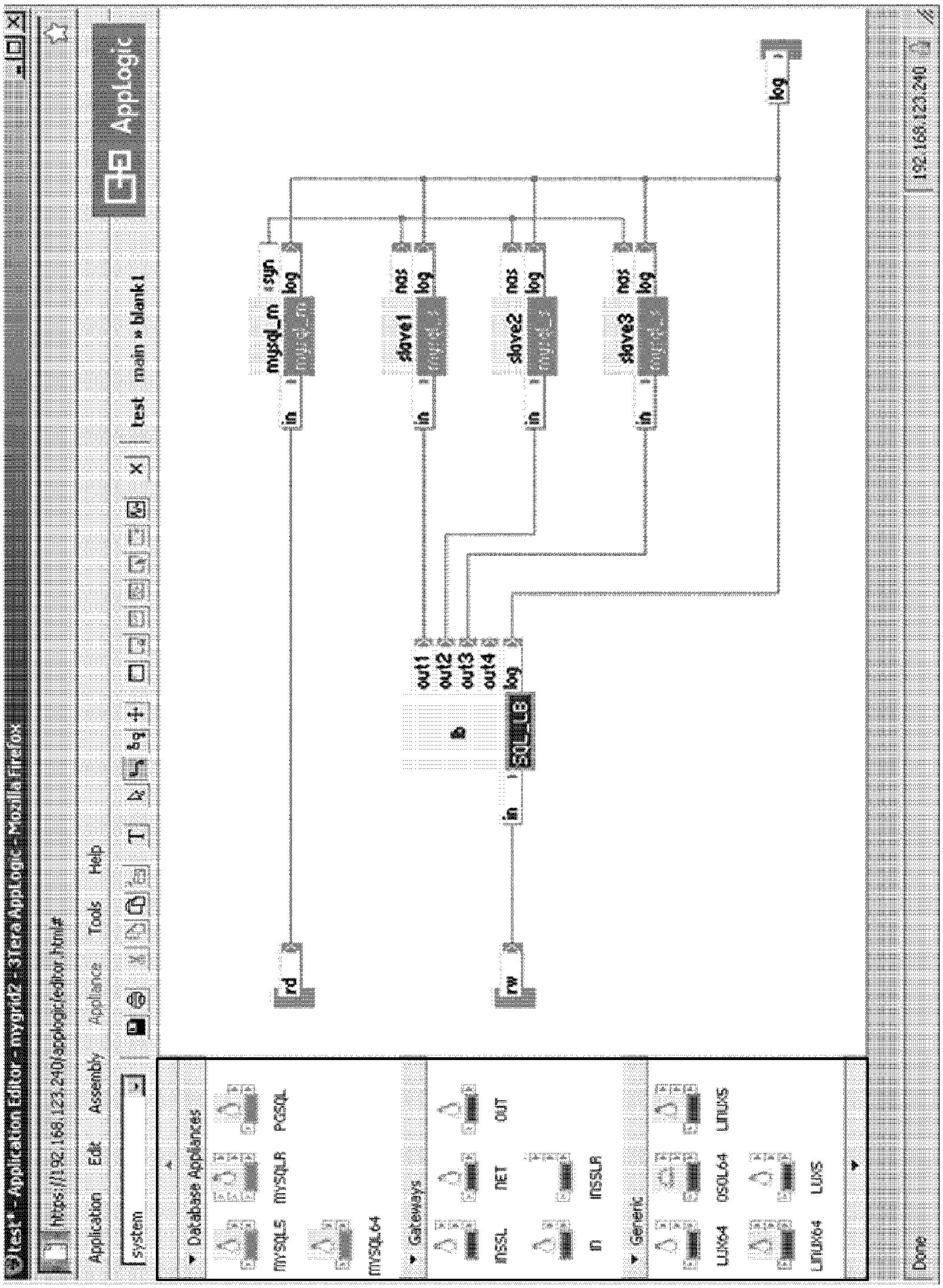

Editing Assemblies (FIG. 75)

This section describes elements and editing capabilities that are available only when editing assemblies that are not the application top-level assembly (main).

The editing of an assembly may be very much like editing and configuring application main. The following may be a description of how to create and edit an assembly class.

- Drag the assembly template class from the "New Singletons" section of the catalog pane onto the canvas.
- Right click on the new assembly appliance shape and chose "Edit Class". Configure the boundary of the assembly class as one may would for a simple class. See Assembly class editor for details).
- To edit the interior of the assembly, Right click on the assembly appliance shape and chose "Edit Interior". One may be presented with a canvas that includes shapes for the assembly as defined by the class boundary.
- Create the infrastructure of the assembly by dragging classes from a catalog or creating new singleton classes as one may would for editing the application main.
- Note, in order to move around the assembly terminals, one may need to click within the gray area on the terminal shape to select it and then drag it to the desired position on the canvas.
- Configure the assembly subordinate instances are required. See class editor for details).
- When one is done creating and configuring the assembly interior, click the "Save" button to save one's changes.
- After testing the assembly, one may move it to a catalog by clicking on the assembly class shape and dragging it to the appropriate catalog as one may would do for a simple class.

In AppLogic, assemblies can be used in any place one may would use a simple appliance. This makes it possible to reuse infrastructure without increasing the complexity of the application. For example, a specialist in database clustering can create a "stock" assembly for clustered database deployment like the one shown above and publish it in a catalog.

Application integrators can then use this assembly in multiple applications, whenever they need database scalability and/or high availability, and without having to know how exactly the cluster may be set up and operates.

Figure 76:
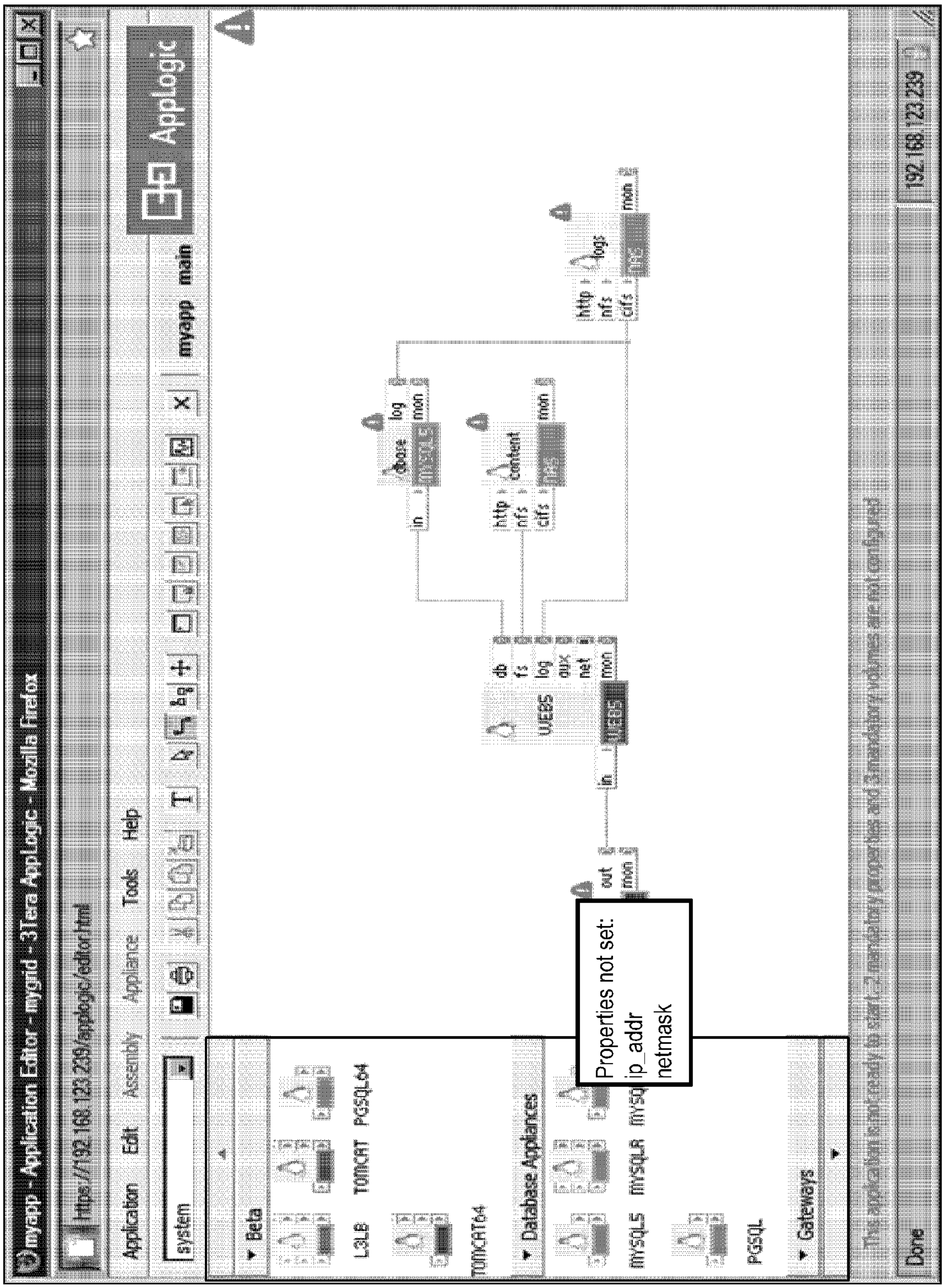

Design Rule Check (FIG. 76)

The editor tracks unconfigured mandatory properties/volumes and unconnected mandatory terminals for all appliances in an application. Such appliances that need configuration and/or are missing connections are visually flagged with a warning icon (e.g., ) on the canvas. When the mouse cursor may be dragged over the flagged appliance, the editor displays the list of properties/volumes/terminals that need attention. The editor also displays on the status bar the number of entities that need attention. This feature also includes highlighting unconfigured mandatory properties/volumes that are not configured on appliances/applications.

Application Provisioning Wizard

FIGS. 77-81 show various example embodiments of graphical user interfaces (GUI) which may be used for implementing one or more features/aspects relating to specific embodiments of an Application Provisioning wizard. In at least one embodiment, the Application Provisioning wizard allows one to provision, configure, and optionally start an application using an application template.

In at least one embodiment, one may reach the Application Provisioning wizard in the following ways:

- from the dashboard, select the Applications tab, select the template application to be provisioned, right-click the mouse and select Provision from the drop-down menu.
- from the dashboard, select the Applications tab, select the template application to be provisioned, and click on the provision button at the top of the application list page.

Figure 77:
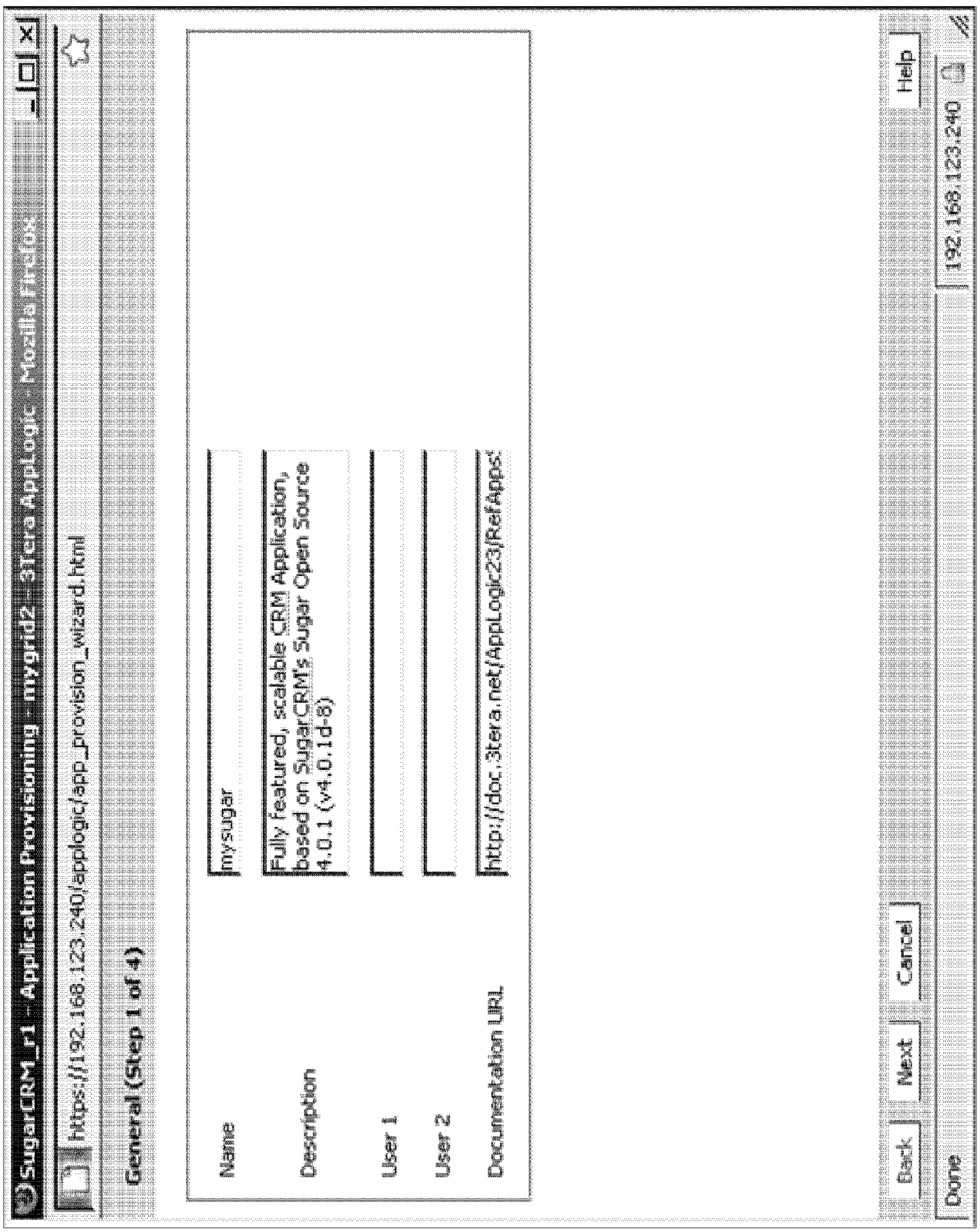

General (Step 1 of 4) (FIG. 77)

Name

Unique name of the provisioned application on this grid.

Description

Human-readable description of the application.

User 1

Free-form user-defined text intended for specifying billing code.

User 2

Free-form user-defined text intended for specifying billing code.

Documentation URL

URL where the documentation for the application can be found. The URL may be opened by clicking on the Open URL text to the right of the field.

Figure 78:
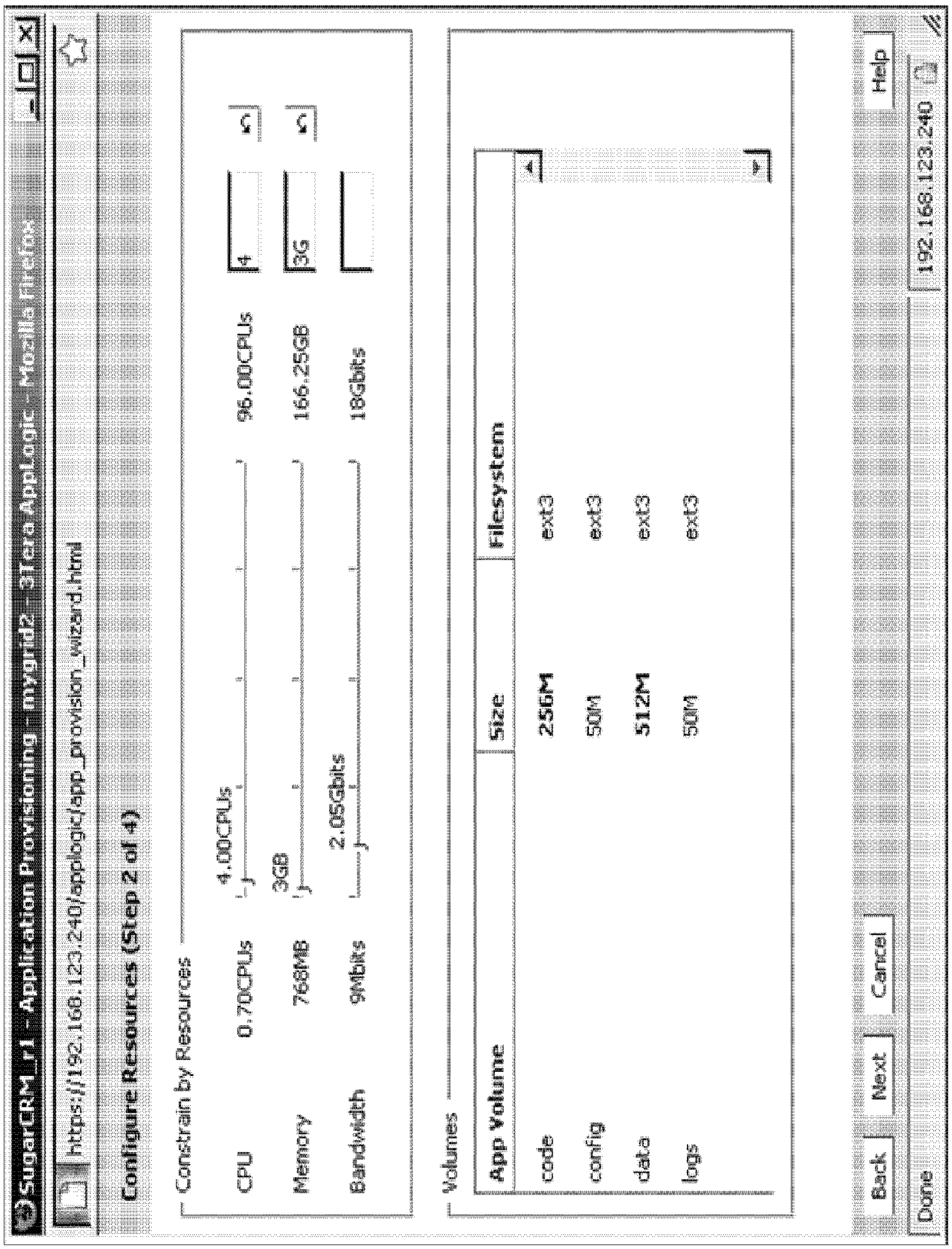

Configuring Resources (Step 2 of 4) (FIG. 78)

Constrain by Resources

Specify the amount of resource for each hardware resource separately (CPU, memory and bandwidth) by moving the slide bar or entering the value manually to the right of the resource range.

The following resource types can be specified:

CPU

Portion of CPU or number of CPUs to be allocated for the application. Fractional amounts can be specified as a decimal number (e.g., 0.5 or 3.5). Whole CPUs are specified simply as an integer (e.g., 12).

Memory

Amount of memory to be allocated for the application. The amount can be specified as an integer value in Megabytes (e.g., 512 M) or in Gigabytes (e.g., 9 G).

Bandwidth

Amount of network bandwidth to be allocated for this application (total for all terminals/interfaces, including the internal communication inside the application). The amount can be specified as an integer value in Megabits/sec (e.g., 10 M) or in Gigabits/sec (e.g., 1 G).

To restore the default value for a particular resource, press the restore button Volumes Specify the new size for the application user and singleton class volumes. The volume size can be specified as an integer value in Megabytes (e.g., 512 m) or in Gigabytes (e.g., 2 G).

The default size of the volumes are shown in normal font weight. Volume sizes explicitly configured for this application are in bold.

Figure 79:
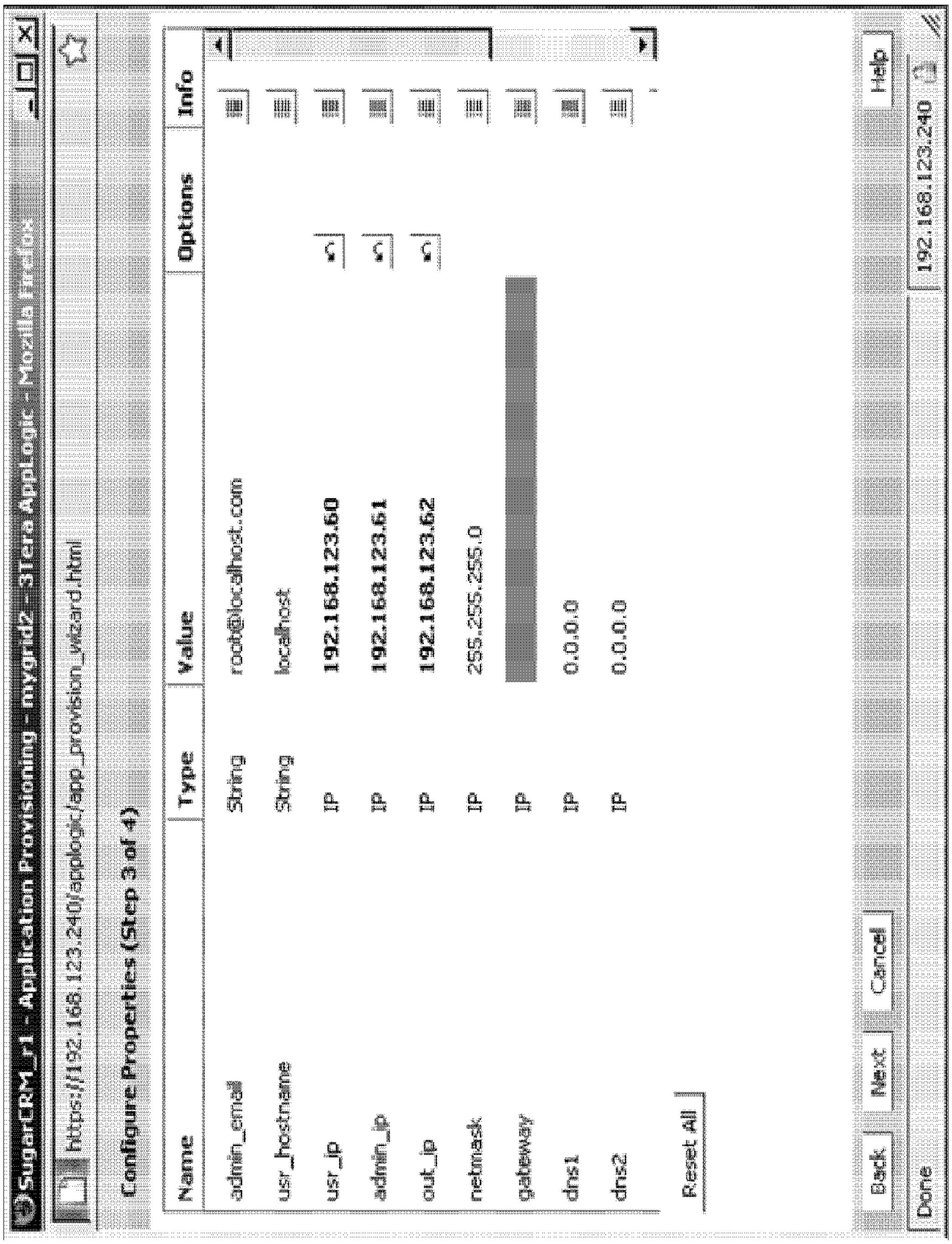

Configuring Properties (Step 3 of 4) (FIG. 79)

The 'Configuration Properties' dialog of the wizard allows one to set values for properties of the application, allowing one to specialize this instance of the application. This may be useful for configuring location-specific parameters, such as IP addresses, and for configuring tuning parameters, such as cache sizes.

The default values of the properties are shown in normal font weight. Property values explicitly configured for this application are in bold. Mandatory property volumes that have not yet been configured are highlighted in red.

For information on the property, its type and allowed values, select the info button . To restore the default value of a property, press the restore button (use the "Reset All" button to reset the values of all properties to their defaults).

Figure 80:
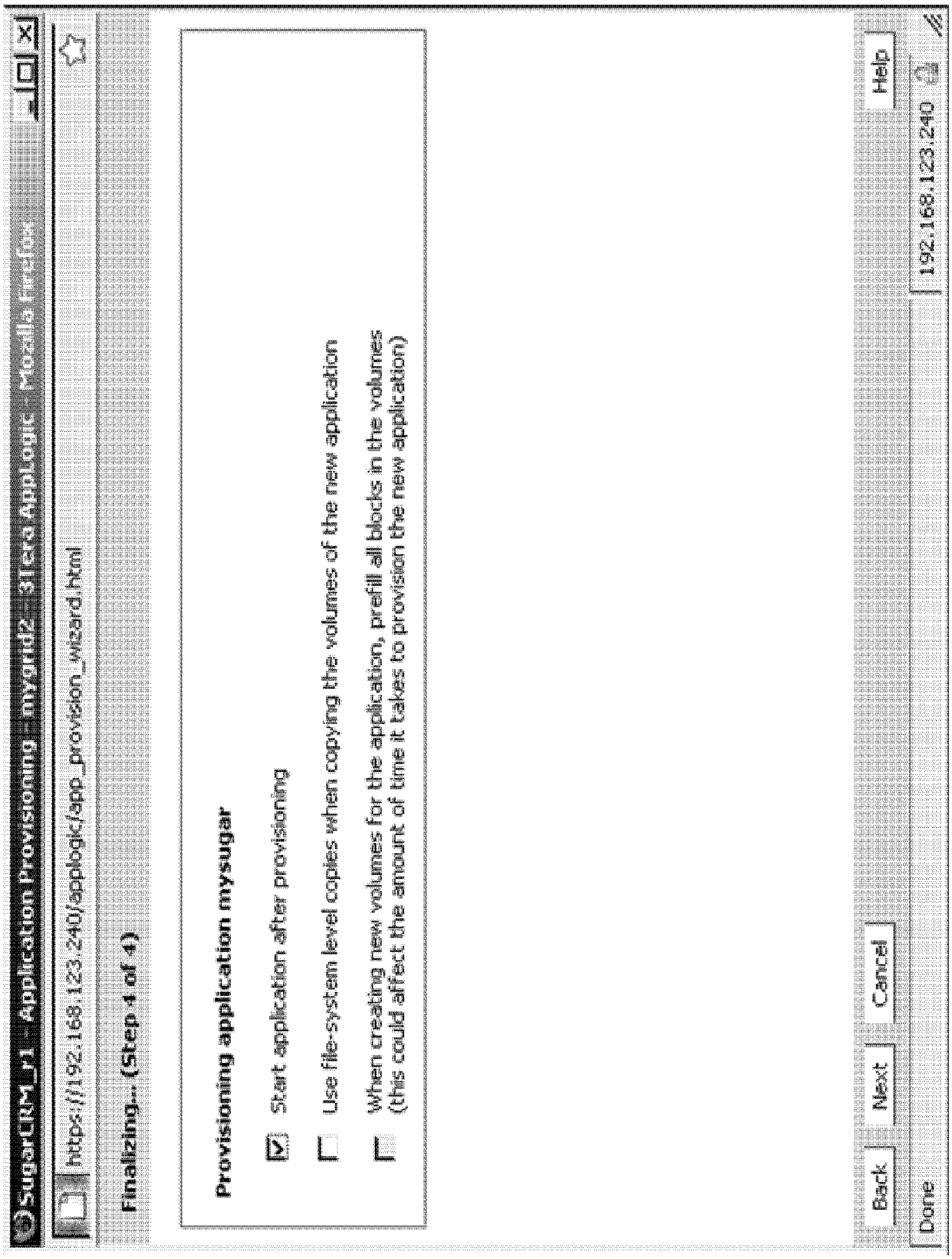

Finalizing (Step 4 of 4) (FIG. 80)

Start Application after Provisioning

Select this if one wants the application to be started after the provisioning. If left unselected, the provisioned application may not be started.

Use Filesystem-level copies when copying the volumes of the new application

Select this if one wants the application volumes copied using filesystem-level copy rather than block-level copy. This may be useful if the application has very large volumes that have little data on them.

When creating volumes for the new application, prefill all blocks in the volumes Select this if one wants the volumes prefilled (e.g., all blocks allocated). Note, this may greatly increase the amount of time it takes to provision the application depending on the size of the application volumes being created.

Figure 81:
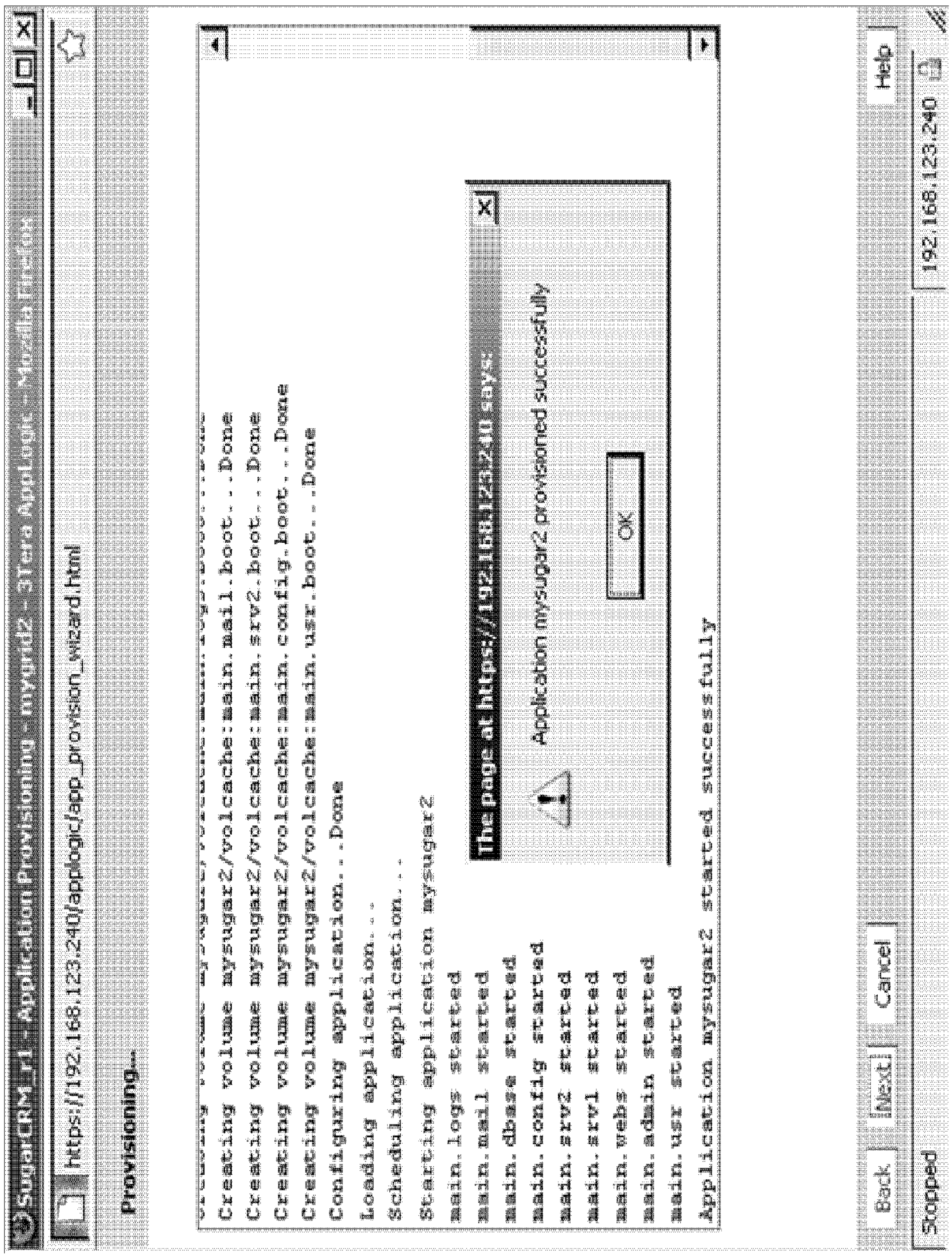

Provisioning (FIG. 81)

The 'Provisioning' dialog of the wizard shows the overall progress for the application provisioning operation.

Virtualization Services Considerations

Utility computing has gained considerable popularity over the past eighteen months as businesses big and small seek to take advantage of the flexibility the new computing model offers. This hasn't always been the case, though. For a time, utility computing seemed a lackluster space that hadn't been able to deliver on its early promise. The renewed interest comes on the heels of rapid market acceptance of server virtualization solutions like VMware and Xen.

Virtualization may be commonly used for server consolidation, carving physical servers into smaller virtual machines (VM) that can be used as if they were real servers. However, to accomplish this virtualization creates a separation of hardware and software, decoupling virtual machine images from physical assets. Users of virtualization have come to accept that virtual machine images can be moved among servers in their data center.

Virtualization by itself, however, may not be a complete utility computing solution. While virtualization systems deal exceptionally well with partitioning CPU and memory within a server, they lack abstractions for network and storage interactions, image management, life-cycle control and other services critical to utility computing. However, as explained herein, various aspects and virtualization techniques provided herein provide features and/or services which may be advantageously used to build a fully functional utility computing system.

Storage

Storage may be one hurdle to utility computing, and if poorly architected can affect cost, performance, scalability and portability of the system.

Virtualized storage systems such as those provided by Xen provide a basic redirection of block devices to the virtual machines. The block devices may be partitions of a physical hard disk attached to the server, a large file from the server's hard disk (loopback), or a SAN logical disk. How the disk is associated with the VM and how it becomes available on the server prior to being redirected to the VM may not be something virtualization systems deal with.

Utility computing systems have to deal with this, they cannot leave to the customer to partition physical hard disks or deal with hard disk and server failures that may make the local disk unavailable. Some systems provide near-line storage outside of the VM, others use IP SANs with an associative namespace. In at least some cases, what may be preferred is a self-managed storage system that fully mimics physical server behavior inside a VM so that regular, existing software code can be used—databases, web servers, etc.

In at least one embodiment, various aspects of the provided herein relate to various techniques for implementing some form of quota or throttling of disk I/O which prevents one virtual machine from monopolizing a storage device and starving others. Another aspect provided herein relates to the ability to improve detection of hardware failures in order, for example, to allow utility computing systems to take corrective actions automatically. In at least one embodiment, such detection tools may be suitably integrated with the virtualization system in order to minimize manual intervention.

Network Virtualization

When installing software on a physical server or virtual machine it's normal practice for each system to be configured with the name or IP addresses of numerous other resources within the data center. For instance, a web server may have the name of a database or NAS. In a utility system, however, configuration isn't quite so simple.

For example, Xen's network configuration provides two mechanisms: (1) flat L2 network, in which domain 0 acts also as a network switch, forwarding packets between the physical network and the VMs; and (2) routed solution, in which domain 0 acts as an IP router, creating a subnet for all VMs on the same server. Both approaches create their own set of problems when used in utility computing systems—from exceeding the MAC address limits on L2 switches to complicating the IP address space and preventing live migration of VMs.

Most existing utility systems implement either point-to-point connection virtualization or security groups similar to VLANs. In at least one embodiment, various aspects of the provided herein relate to various techniques for implementing some form of quota or throttling of network I/O in order, for example, to prevent one VM from monopolizing the network interface and from starving other VMs. Another aspect provided herein relates to the implementation of network virtualization services such as, for example, improved VLAN systems, DHCP and DNS variants which may be able to account for various VM and utility needs.

Scheduling

As users start their applications, the utility system needs a scheduling mechanism that determines where virtual machines will run on available hardware resources. In one embodiment, the scheduler must deal not only with CPU and memory, but also with storage and network capacity across the entire system.

In one embodiment, it may be preferable for utility computing systems take the responsibility of scheduling VMs among the pool of physical servers automatically. However, different utility computing systems may differ in their VM sizing—from single size (fixed CPU/memory), to a few standard sizes, to the full flexibility. In at least one embodiment, it may be preferable for at least some systems to also have provisions for scheduling multiple related VMs in a way to provide a deterministic and fast network between related VMs. Further, it may be preferable to provide the ability to ensure the placement of VMs on different physical servers, so that VMs that serve as backup for each other will not all go down together in case of a server hardware failure.

In at least one embodiment, various aspects of the provided herein relate to various techniques for avoiding fragmentation without losing flexibility in the size of each virtual machine. This may be an important economic factor, as fragmentation leads to wasted resources and therefore higher costs. Another aspect provided herein relates to the ability for utility computing systems to implement global scheduling and/or the ability to place VMs (and/or whole services) in specific geographic locations to optimize cost and quality of service.

Image Management

It may be observed how the number of images in virtualized systems can seemingly explode. Accordingly, one aspect provided herein relates to the ability for utility systems to provide image management that allows users to organize their images and easily deal with version control across the system.

Another aspect provided herein relates to the development improved techniques for: creating instances of images throughout geographically distributed systems; providing global access to images; providing access control to licensed images; and/or providing improved version control. Additionally, in at least one embodiment may be directed to various types of licensing mechanisms that allow for the most popular software to be purchased directly through the utility.

VM Configuration

The tremendous increase in the number of images also exacerbates the manual configuration of virtual machines. Unlike physical servers which are usually configured carefully once and then ideally left alone for a long time, in utility computing systems VMs are frequently moved around and reconfigured, restarted or shut down. Conventioanl virtualization systems offer little to help the configuration process as they're supposed to emulate physical machines and often leave the configuration to the VMs themselves.

Existing utility computing systems provide a variety of ways to provide configuration to the VMs. However, as more operating systems are offered on utility systems these parameterization methods may need to expand. Accordingly, at least one aspect is directed to various techniques for implementing an OS-independent configuration method (e.g., being able to configure a Solaris VM from Linux domain 0). Another aspect is directed to various techniques for improving configuration abstraction facilities.

IP Address Allocation

IP address assignment can create bindings between virtual machines, yet applications often require static IP addresses for public facing interfaces.

Xen simply provides to VMs what is available to physical servers, essentially either a static IP or DHCP configuration per VM. Utility computing systems extend this by automatically constructing private VLANs for related VMs, or automatically assigning IP addresses without the need for global DHCP service. Systems differ in the way they provide access to fully routable IP addresses, from disallowing routable addresses and using NAT, to fully allowing VMs to use IP addresses and configuration with the same flexibility that is available to physical servers.

Accordingly, one aspect is directed to various techniques for establishing external IP addresses in a way that allows automatic allocation, yet is still flexible enough to maintain static addresses for service end-points and interaction with DNS. For example, in one embodiment, at least one mechanism may be provided for allowing IP address assignment to be enforced so that one VM cannot interfere with the operation of another. Additionally, in at least one embodiment, it is preferable to provide services that provide the ability to move IP addresses between geographic locations for disaster recovery, for example, as larger users begin moving mission critical applications onto the services.

Monitoring/High Availability

With applications running on a utility computing service, system administrators still may need to be able to monitor operations and create systems that offer high availability.

Virtualization breaks the one-box-one-function relationship and makes it very hard to manually track down hardware failures and map them to logical servers (VMs) and services (services built from multiple VMs). At the same time, virtualization allows one to provide near transparent failover.

Accordingly, one aspect is directed to techniques for handling the isolation of VMs belonging to different customers, as well as with providing performance data of multiple related VMs in context of a bigger service. Another aspect relates to various techniques for collecting, correlating and analyzing the performance data of large services built of multiple VMs, as well as the ability to take actions based on performance data.

High availability is typically beyond the single server scope of standard server virtualization. Some utility computing systems attempt to leverage the array of physical resources they control to automatically restart VMs from a failed server to another ready server. However, to improve this capability, at least one mechanism may be provided for providing more reliable failure detection and for handling various the issues which may arise from a server, disk, or network. In at least one embodiment, various mechanisms may be provided to offer improved integration with existing data center monitoring systems will also improve response and reporting.

Extended Services

According to different embodiments, other services and/or features may be provided by one or more of the various techniques described herein such as, for example, one or more of the following (or combinations thereof):

- Import/export of VMs, including multiple VMs and their configuration, in a way that can be recovered elsewhere.
- Dynamic resizing of VMs, handling live migration and its interactions with the storage systems.
- Resource metering and reporting, including self-serve access.
- Unified standards that allow for interoperability of systems.

This application incorporates by reference in its entirety and for all purposes U.S. patent application Ser. No. 11/024,641, by Miloushev et al., entitled "APPARATUS, METHOD AND SYSTEM FOR AGGREGRATING COMPUTING RESOURCES", filed Dec. 29, 2004.

Although several preferred embodiments of this invention may be described in detail herein with reference to the accompanying drawings, it is understood that the invention may not be limited to these precise embodiments, and that various changes and modifications may be effected therein by one skilled in the art without departing from the scope of spirit of the invention as defined in the appended claims.

It is claimed:

1. A system for migrating a virtual appliance from a first server grid to a second server grid via a computer network, the system comprising:

at least one processor;

at least one interface operable to provide a communication link to at least one network device; and memory;

the system being operable to:

run a first instance of the virtual appliance at the first server grid, wherein the first server grid has associated therewith a first portion of virtualized computing resources representing computing resources associated with a first plurality of physical servers, wherein the first instance of the virtual appliance has associated therewith a first instance of a virtual machine and a first instance of a virtual volume;

store, at the first instance of the virtual volume, a first disk image for use by the first instance of the virtual appliance;

establish a connection over the computer network from the first server grid to the second server grid;

transfer, to the second server grid, first virtual appliance information relating to the first instance of the virtual appliance, wherein the first virtual appliance information includes virtual appliance descriptor information and virtual appliance configuration information; and start, using the first virtual appliance information, the second instance of the virtual appliance at the second server grid;

wherein the second instance of the virtual appliance includes a second instance of the virtual machine.

2. The system of claim 1 being further operable to:

identify a first portion of updated or modified data relating to the first disk image;

transfer, to the second server grid, information relating to the first portion of updated or modified data relating to the first disk image;

modify, using the first portion of updated or modified data, a second disk image for use by a second instance of the virtual appliance at the second server grid; and start, using the modified second disk image, the second instance of the virtual appliance at the second server grid;

wherein the second instance of the virtual appliance includes a second instance of the virtual volume.

3. The system of claim 2 wherein the first instance of the virtual appliance has associated therewith current virtual appliance state information representing a current state of the first instance of the virtual appliance as of a specific time T, the system being further operable to:

start, using the modified second disk image, the second instance of the virtual appliance at the second server grid at a first state corresponding to the current state of the first instance of the virtual appliance as of the specific time T.

4. The system of claim 2 wherein the first instance of the virtual appliance has associated therewith current virtual appliance state information representing a current state of the first instance of the virtual appliance as of a specific time T, wherein the first instance of the virtual appliance includes a first virtual machine having associated therewith current virtual machine state information representing a current state of the first virtual machine as of the specific time T, the system being further operable to:

start, using the modified second disk image, the second instance of the virtual appliance at the second server grid at a first state corresponding to the current state of the first instance of the virtual appliance as of the specific time T; and start, at the second server grid, an instance of the first virtual machine at a state corresponding to the current state of the first virtual machine as of the specific time T.

5. The system of claim 2 wherein the first instance of the virtual appliance has associated therewith current virtual appliance state information representing a current state of the first instance of the virtual appliance as of a specific time T;

wherein said detecting further comprises detecting, while the first instance of the virtual appliance is running on the first server grid, the first portion of updated or modified data relating to the first disk image;

wherein said transferring further comprises transferring, to the second server grid while the first instance of the virtual appliance is running at the first server grid, the first disk image;

wherein said modifying further comprises modifying, using the first disk image transferred to the second server grid and using the first portion of updated or modified data, the second disk image to thereby generate the modified second disk image; and wherein said starting further comprises starting, using the modified second disk image, the second instance of the virtual appliance at the second server grid at a first state corresponding to the current state of the first instance of the virtual appliance as of the specific time T.

6. The system of claim 2 being further operable to:

identify a first geographic location where the first server grid is deployed; and identify a second geographic location where the second server grid is deployed;

wherein the second geographic location is different than the first geographic location.

7. The system of claim 1 wherein the first server grid is deployed at a first geographic location; and wherein the second server grid is deployed at a second geographic location different than the first geographic location.

8. A system for migrating a distributed application from a first server grid to a second server grid via a computer network, the system comprising:

at least one processor;

at least one interface operable to provide a communication link to at least one network device; and memory;

run a first instance of the distributed application at the first server grid, wherein the first server grid has associated therewith a first portion of virtualized computing resources representing computing resources associated with a first plurality of physical servers, wherein the first instance of the distributed application has associated therewith a first instance of a virtual machine and a first instance of a virtual volume;

store, at the first instance of the virtual volume, a first disk image for use by the first instance of the distributed application;

establish a connection over the computer network from the first server grid to the second server grid;

transfer, to the second server grid, first distributed application information relating to the first instance of the distributed application, wherein the first distributed application information includes distributed application descriptor information and distributed application configuration information; and start, using the first distributed application information, the second instance of the distributed application at the second server grid;

wherein the second instance of the distributed application includes a second instance of the virtual machine.

9. The system of claim 8 being further operable to:

identify a first portion of updated or modified data relating to the first disk image;

establish a connection over the computer network from the first server grid to the second server grid;

transfer, to the second server grid, information relating to the first portion of updated or modified data relating to the first disk image;

modify, using the first portion of updated or modified data, a second disk image for use by a second instance of the distributed application at the second server grid; and start, using the modified second disk image, the second instance of the distributed application at the second server grid;

wherein the second instance of the distributed application includes a second instance of the virtual volume.

10. The system of claim 9 wherein the first instance of the distributed application has associated therewith current distributed application state information representing a current state of the first instance of the distributed application as of a specific time T, the system being further operable to:

start, using the modified second disk image, the second instance of the distributed application at the second server grid at a first state corresponding to the current state of the first instance of the distributed application as of the specific time T.

11. The system of claim 9 wherein the first instance of the distributed application has associated therewith current distributed application state information representing a current state of the first instance of the distributed application as of a specific time T, wherein the first instance of the distributed application includes a first virtual machine having associated therewith current virtual machine state information representing a current state of the first virtual machine as of the specific time T, the system being further operable to:

start, using the modified second disk image, the second instance of the distributed application at the second server grid at a first state corresponding to the current state of the first instance of the distributed application as of the specific time T; and start, at the second server grid, an instance of the first virtual machine at a state corresponding to the current state of the first virtual machine as of the specific time T.

12. The system of claim 9 wherein the first instance of the distributed application has associated therewith current distributed application state information representing a current state of the first instance of the distributed application as of a specific time T;

wherein said detecting further comprises detecting, while the first instance of the distributed application is running on the first server grid, the first portion of updated or modified data relating to the first disk image;

wherein said transferring further comprises transferring, to the second server grid while the first instance of the distributed application is running at the first server grid, the first disk image;

wherein said modifying further comprises modifying, using the first disk image transferred to the second server grid and using the first portion of updated or modified data, the second disk image to thereby generate the modified second disk image; and wherein said starting further comprises starting, using the modified second disk image, the second instance of the distributed application at the second server grid at a first state corresponding to the current state of the first instance of the distributed application as of the specific time T.

13. The system of claim 9 being further operable to:

identify a first geographic location where the first server grid is deployed; and identify a second geographic location where the second server grid is deployed;

wherein the second geographic location is different than the first geographic location.

14. The system of claim 8 wherein the first server grid is deployed at a first geographic location; and wherein the second server grid is deployed at a second geographic location different than the first geographic location.

15. A system for delivering pre-packaged software in virtual appliances to computing systems for use in operating software applications, the system comprising:

at least one processor;

at least one interface operable to provide a communication link to at least one network device; and memory;

the system being operable to:

identify a first virtual appliance class by a first identifier;

request the first virtual appliance class from a first catalog service using the first identifier;

transfer the first virtual appliance class from the catalog service to a first computing system; and start an instance of the first virtual appliance class on the first computing system.

16. The system of claim 15 wherein the first virtual appliance class includes a first class descriptor and a first storage volume, wherein the first class descriptor includes a definition of at least one configurable parameter for instances of the first virtual appliance class, and wherein the first storage volume includes a disk image of an operating system and software sufficient to create a virtual machine instance booted from the first storage volume, the system being further operable to:

create, using at least a portion of the disk image, the virtual machine instance; and boot the virtual machine instance from the first storage volume;

wherein the virtual machine instance is operable to perform functions assigned to the first virtual appliance class.

17. The system of claim 15 being further operable to:

authenticate the first computing system to the first catalog service for a purpose of authorizing the transfer of the first virtual appliance class from the catalog service to the first computing system.

18. The system of claim 15 being further operable to:

request a first set of license terms for using the first virtual appliance; and record an acceptance of the first license terms by an end user.

19. The system of claim 15 being further operable to:

request pricing information relating to a use of the first virtual appliance class.

20. The system of claim 15 being further operable to:

deliver pre-packaged software in virtual appliances to computing systems for use in operating distributed applications on the first computing system;

locate a first copy of the first virtual appliance class at the first computing system;

request from a first catalog service, using the first identifier, first metadata relating to the first virtual appliance class; and verify, using the first metadata, whether the first copy is up-to-date with the first catalog service; starting an instance of the first virtual appliance class on the first computing system using the first copy.

21. The system of claim 20 being further operable to:

determine wherein there is a need to transfer the first appliance class based on an outcome of the verification of the first copy of the first virtual appliance class.

22. An exchange system for renting or leasing computing resources provided over a computing network, the system comprising:

at least one processor;

at least one interface operable to provide a communication link to at least one network device; and memory;

the system being operable to:

register a first set of computing resources provided by a first resource provider;

register a second set of computing resources provided by a second resource provider; and register at least one resource subscriber including a first resource subscriber, wherein the first resource subscriber is registered to use a portion of the first set of computing resources and a portion of the second set of computing resources.

23. The system of claim 22 further comprising:

a metering system operable to measure an amount of computing resources used by the first resource subscriber; and a billing system operable to:

facilitate initiation of a first automated payment relating to the resource subscriber's usage of the first portion of computing resources;

facilitate initiation of a second automated payment relating to the resource subscriber's usage of the second portion of computing resources;

facilitate delivery of the first automated payment to the first resource provider; and facilitate delivery of the second automated payment to the second resource provider.

24. The system of claim 22 further comprising:

a metering system operable to measure usage of computing resources associated with the first resource subscriber; and a billing system operable to facilitate an exchange of payment between the resource subscriber and publishers of the first and second sets of computing resources.

25. The system of claim 22 further comprising:

a first catalog service system operable to:

provide resource subscriber access, via the computing network, to a first catalog of virtual appliances; and record resource subscriber acceptance of licensing terms associated with one or more virtual appliances.

26. The system of claim 22 further comprising:

a first catalog service system operable to:

provide resource subscriber access, via the computing network, to a first catalog of virtual appliances; and facilitate an exchange of payment between the resource subscriber and at least one publisher of virtual appliances associated with the first catalog of virtual appliances.

* * * * *